(12) United States Patent
Hoffberg

(10) Patent No.: US 12,099,997 B1
(45) Date of Patent: Sep. 24, 2024

(54) TOKENIZED FUNGIBLE LIABILITIES

(71) Applicant: Steven Mark Hoffberg, West Harrison, NY (US)

(72) Inventor: Steven Mark Hoffberg, West Harrison, NY (US)

( * ) Notice: Subject to any disclaimer, the term of this patent is extended or adjusted under 35 U.S.C. 154(b) by 235 days.

(21) Appl. No.: 17/163,314

(22) Filed: Jan. 29, 2021

Related U.S. Application Data

(60) Provisional application No. 62/968,496, filed on Jan. 31, 2020.

(51) Int. Cl.
*G06Q 20/38* (2012.01)
*G06Q 20/06* (2012.01)

(52) U.S. Cl.
CPC ..... *G06Q 20/38215* (2013.01); *G06Q 20/065* (2013.01); *G06Q 2220/00* (2013.01); *H04L 2209/56* (2013.01)

(58) Field of Classification Search
CPC .......... G06Q 20/38215; G06Q 20/065; G06Q 2220/00; H04L 2209/56
See application file for complete search history.

(56) References Cited

U.S. PATENT DOCUMENTS

| | | |
|---|---|---|
| 4,351,982 A | 9/1982 | Miller et al. |
| 4,977,595 A | 12/1990 | Ohta et al. |
| 5,224,162 A | 6/1993 | Okamoto et al. |
| 5,237,159 A | 8/1993 | Stephens |
| 5,315,658 A | 5/1994 | Micali |
| 5,392,353 A | 2/1995 | Morales |
| 5,621,201 A | 4/1997 | Langhans |
| 5,623,547 A | 4/1997 | Jones et al. |
| 5,677,955 A | 10/1997 | Doggett et al. |
| 5,679,940 A | 10/1997 | Templeton et al. |
| 5,696,908 A | 12/1997 | Muehlberger et al. |
| 5,717,757 A | 2/1998 | Micali |
| 5,754,939 A | 5/1998 | Herz et al. |
| 5,768,385 A | 6/1998 | Simon |
| 5,793,868 A | 8/1998 | Micali |

(Continued)

FOREIGN PATENT DOCUMENTS

| | | | | |
|---|---|---|---|---|
| AU | 2019/372344 | * | 5/2021 | ........... G06F 21/602 |
| AU | 2019372344 A1 | * | 5/2021 | ........... G06F 21/602 |

(Continued)

*Primary Examiner* — Patrick McAtee
*Assistant Examiner* — Terry Nathan Murray
(74) *Attorney, Agent, or Firm* — Hoffberg & Associates; Steven M. Hoffberg

(57) ABSTRACT

A method of transacting a liability, comprising: defining smart contract which separates a set of rights as a first fungible token type and set of responsibilities as a second fungible token type, the second token type comprising a representation of a liability; in a first transaction, establishing a first transaction consideration which offsets a difference in a value of the set of rights and the set of responsibilities, and allocating a first fungible token with a requirement to pay the consideration to a first party, and allocating the second fungible token with a right to receive the consideration to a second party; and in a second transaction, merging possession of a token of the first fungible token type and a token of the second fungible token type, and extinguish the smart contract set of rights and the set of responsibilities to thereby satisfy the liability.

21 Claims, 1 Drawing Sheet

(56) References Cited

U.S. PATENT DOCUMENTS

| | | | |
|---|---|---|---|
| 5,799,087 | A | 8/1998 | Rosen |
| 5,812,668 | A | 9/1998 | Weber |
| 5,815,657 | A | 9/1998 | Williams et al. |
| 5,828,840 | A | 10/1998 | Cowan et al. |
| 5,832,089 | A | 11/1998 | Kravitz et al. |
| 5,839,119 | A | 11/1998 | Krsul et al. |
| 5,850,446 | A | 12/1998 | Berger et al. |
| 5,857,023 | A | 1/1999 | Demers et al. |
| 5,884,277 | A | 3/1999 | Khosla |
| 5,889,862 | A | 3/1999 | Ohta et al. |
| 5,889,863 | A | 3/1999 | Weber |
| 5,898,154 | A | 4/1999 | Rosen |
| 5,901,229 | A | 5/1999 | Fujisaki et al. |
| 5,903,651 | A | 5/1999 | Kocher |
| 5,903,880 | A | 5/1999 | Biffar |
| 5,915,093 | A | 6/1999 | Berlin et al. |
| 5,920,629 | A | 7/1999 | Rosen |
| 5,926,548 | A | 7/1999 | Okamoto |
| 5,930,777 | A | 7/1999 | Barber |
| 5,933,498 | A | 8/1999 | Schneck et al. |
| 5,937,394 | A | 8/1999 | Wong et al. |
| 5,943,424 | A | 8/1999 | Berger et al. |
| 5,949,045 | A | 9/1999 | Ezawa et al. |
| 5,952,638 | A | 9/1999 | Demers et al. |
| 5,960,083 | A | 9/1999 | Micali |
| 5,963,648 | A | 10/1999 | Rosen |
| 5,963,924 | A | 10/1999 | Williams et al. |
| 5,978,840 | A | 11/1999 | Nguyen et al. |
| 5,983,208 | A | 11/1999 | Haller et al. |
| 5,987,132 | A | 11/1999 | Rowney |
| 5,987,140 | A | 11/1999 | Rowney et al. |
| 5,996,076 | A | 11/1999 | Rowney et al. |
| 5,999,919 | A | 12/1999 | Jarecki et al. |
| 6,002,767 | A | 12/1999 | Kramer |
| 6,003,765 | A | 12/1999 | Okamoto |
| 6,016,484 | A | 1/2000 | Williams et al. |
| 6,018,724 | A | 1/2000 | Arent |
| 6,021,399 | A | 2/2000 | Demers et al. |
| 6,026,163 | A | 2/2000 | Micali |
| 6,026,379 | A | 2/2000 | Haller et al. |
| 6,029,150 | A | 2/2000 | Kravitz |
| 6,029,151 | A | 2/2000 | Nikander |
| 6,035,402 | A | 3/2000 | Vaeth et al. |
| 6,047,067 | A | 4/2000 | Rosen |
| 6,047,887 | A | 4/2000 | Rosen |
| 6,049,786 | A | 4/2000 | Smorodinsky |
| 6,049,787 | A | 4/2000 | Takahashi et al. |
| 6,055,508 | A | 4/2000 | Naor et al. |
| 6,057,872 | A | 5/2000 | Candelore |
| 6,058,381 | A | 5/2000 | Nelson |
| 6,061,448 | A | 5/2000 | Smith et al. |
| 6,061,665 | A | 5/2000 | Bahreman |
| 6,065,675 | A | 5/2000 | Teicher |
| 6,072,870 | A | 6/2000 | Nguyen et al. |
| 6,192,472 | B1 | 2/2001 | Garay et al. |
| 6,587,946 | B1 | 7/2003 | Jakobsson |
| 6,687,822 | B1 | 2/2004 | Jakobsson |
| 6,779,111 | B1 | 8/2004 | Gehrmann et al. |
| 6,859,533 | B1 | 2/2005 | Wang et al. |
| 6,937,726 | B1 | 8/2005 | Wang |
| 7,181,017 | B1 | 2/2007 | Nagel et al. |
| 7,380,119 | B2 | 5/2008 | Bade et al. |
| 7,869,591 | B1 | 1/2011 | Nagel et al. |
| 8,316,237 | B1 | 11/2012 | Felsher et al. |
| 8,449,378 | B2 | 5/2013 | Michaelson et al. |
| 8,453,219 | B2 | 5/2013 | Shuster et al. |
| 8,493,386 | B2 | 7/2013 | Burch et al. |
| 8,501,762 | B2 | 8/2013 | Li et al. |
| 8,505,103 | B2 | 8/2013 | Song et al. |
| 8,522,330 | B2 | 8/2013 | Shuster et al. |
| 8,523,657 | B2 | 9/2013 | Michaelson et al. |
| 8,566,247 | B1 | 10/2013 | Nagel et al. |
| 8,572,207 | B2 | 10/2013 | Shuster et al. |
| 8,621,368 | B2 | 12/2013 | Shuster et al. |
| 8,632,193 | B2 | 1/2014 | Maurel |
| 8,671,142 | B2 | 3/2014 | Shuster et al. |
| 8,688,525 | B2 | 4/2014 | Minde |
| 8,719,131 | B1 | 5/2014 | Roth et al. |
| 8,726,379 | B1 | 5/2014 | Stiansen et al. |
| 8,727,893 | B2 | 5/2014 | Lee et al. |
| 8,756,151 | B1 | 6/2014 | Lubling et al. |
| 8,756,156 | B1 | 6/2014 | Campi et al. |
| 8,769,643 | B1 | 7/2014 | Ben Ayed |
| 8,777,735 | B1 | 7/2014 | Fine et al. |
| 8,862,506 | B2 | 10/2014 | Smith et al. |
| 8,904,181 | B1 | 12/2014 | Felsher et al. |
| 8,905,303 | B1 | 12/2014 | Ben Ayed |
| 8,909,517 | B2 | 12/2014 | Mosko et al. |
| 8,915,781 | B2 | 12/2014 | Fine et al. |
| 8,918,794 | B2 | 12/2014 | Kruglick |
| 8,938,534 | B2 | 1/2015 | Le et al. |
| 8,947,427 | B2 | 2/2015 | Shuster et al. |
| 8,950,004 | B2 | 2/2015 | Messinger et al. |
| 8,961,300 | B2 | 2/2015 | Fine |
| 8,961,301 | B2 | 2/2015 | Fine et al. |
| 8,962,964 | B2 | 2/2015 | Emmerson |
| 8,968,082 | B2 | 3/2015 | Fine et al. |
| 8,968,104 | B2 | 3/2015 | Fine et al. |
| 8,972,612 | B2 | 3/2015 | Le et al. |
| 8,974,284 | B2 | 3/2015 | Selby et al. |
| 8,985,442 | B1 | 3/2015 | Zhou et al. |
| 8,986,096 | B2 | 3/2015 | Fine et al. |
| 8,992,311 | B2 | 3/2015 | Fine |
| 8,992,312 | B2 | 3/2015 | Fine et al. |
| 9,014,661 | B2 | 4/2015 | deCharms |
| 9,015,847 | B1 | 4/2015 | Kaplan et al. |
| 9,020,110 | B1 | 4/2015 | Baharav et al. |
| 9,027,007 | B2 | 5/2015 | Brackman et al. |
| 9,039,508 | B1 | 5/2015 | Arnone et al. |
| 9,046,994 | B2 | 6/2015 | Shuster et al. |
| 9,047,600 | B2 | 6/2015 | Zhou et al. |
| 9,056,253 | B2 | 6/2015 | Thompson et al. |
| 9,070,252 | B2 | 6/2015 | Riahei et al. |
| 9,070,253 | B2 | 6/2015 | Tung et al. |
| 9,071,444 | B2 | 6/2015 | Everett |
| 9,076,294 | B2 | 7/2015 | Fine et al. |
| 9,076,295 | B2 | 7/2015 | Fine et al. |
| 9,087,399 | B2 | 7/2015 | Shuster et al. |
| 9,092,939 | B2 | 7/2015 | Fine et al. |
| 9,092,940 | B2 | 7/2015 | Fine et al. |
| 9,104,873 | B1 | 8/2015 | Chen et al. |
| 9,135,787 | B1 | 9/2015 | Russell et al. |
| 9,138,652 | B1 | 9/2015 | Thompson et al. |
| 9,160,764 | B2 | 10/2015 | Stiansen et al. |
| 9,171,299 | B1 | 10/2015 | Schwartz |
| 9,177,156 | B1 | 11/2015 | Kaplan et al. |
| 9,185,161 | B2 | 11/2015 | Messinger et al. |
| 9,210,472 | B2 | 12/2015 | Andrews, II et al. |
| 9,213,949 | B1 | 12/2015 | Lewis et al. |
| 9,214,063 | B2 | 12/2015 | Fine et al. |
| 9,218,470 | B2 | 12/2015 | Domke et al. |
| 9,219,824 | B1 | 12/2015 | Harper |
| 9,224,262 | B2 | 12/2015 | Fine et al. |
| 9,232,476 | B1 | 1/2016 | Ur et al. |
| 9,256,769 | B1 | 2/2016 | Lamfalusi et al. |
| 9,258,307 | B2 | 2/2016 | Pianese et al. |
| 9,270,534 | B2 | 2/2016 | Hyde et al. |
| 9,275,389 | B1 | 3/2016 | Dides et al. |
| 9,280,792 | B2 | 3/2016 | Xiao |
| 9,294,365 | B2 | 3/2016 | Misra et al. |
| 9,298,806 | B1 | 3/2016 | Vessenes et al. |
| 9,299,071 | B1 | 3/2016 | Klingen |
| 9,299,218 | B2 | 3/2016 | Fine et al. |
| 9,300,724 | B2 | 3/2016 | Misra et al. |
| 9,305,428 | B2 | 4/2016 | Fine et al. |
| 9,305,437 | B1 | 4/2016 | Koopman et al. |
| 9,307,047 | B2 | 4/2016 | Chung et al. |
| 9,311,639 | B2 | 4/2016 | Filler |
| 9,311,640 | B2 | 4/2016 | Filler |
| 9,317,997 | B2 | 4/2016 | Fine et al. |
| 9,317,998 | B2 | 4/2016 | Fine |
| 9,317,999 | B2 | 4/2016 | Fine et al. |
| 9,324,062 | B2 | 4/2016 | Schwartz |
| 9,330,261 | B2 | 5/2016 | Wilson |

(56) References Cited

U.S. PATENT DOCUMENTS

| | | |
|---|---|---|
| 9,332,302 B2 | 5/2016 | Briggs et al. |
| 9,338,499 B2 | 5/2016 | Briggs et al. |
| 9,338,500 B2 | 5/2016 | Briggs et al. |
| 9,344,754 B2 | 5/2016 | Briggs et al. |
| 9,350,753 B2 | 5/2016 | Kaplan et al. |
| 9,350,762 B2 | 5/2016 | Doddapaneni |
| 9,351,032 B2 | 5/2016 | Briggs et al. |
| 9,351,124 B1 | 5/2016 | Shelton |
| D759,073 S | 6/2016 | Winklevoss |
| 9,364,950 B2 | 6/2016 | Izhikevich et al. |
| 9,373,223 B1 | 6/2016 | Webb |
| 9,374,280 B2 | 6/2016 | Misra et al. |
| 9,386,022 B2 | 7/2016 | Shuster et al. |
| 9,397,985 B1 | 7/2016 | Seger, II et al. |
| 9,398,018 B2 | 7/2016 | MacGregor et al. |
| 9,401,850 B2 | 7/2016 | Misra et al. |
| 9,406,195 B2 | 8/2016 | Tung et al. |
| 9,411,976 B2 | 8/2016 | Irvine |
| 9,413,735 B1 | 8/2016 | Hird |
| 9,413,780 B1 | 8/2016 | Kaplan et al. |
| 9,418,213 B1 | 8/2016 | Roth et al. |
| 9,419,951 B1 | 8/2016 | Felsher et al. |
| 9,425,954 B1 | 8/2016 | Chalker |
| 9,426,151 B2 | 8/2016 | Richards et al. |
| 9,426,167 B1 | 8/2016 | Childress et al. |
| 9,430,905 B2 | 8/2016 | Webb |
| 9,436,455 B2 | 9/2016 | Ziat et al. |
| 9,436,811 B2 | 9/2016 | Messinger et al. |
| 9,436,935 B2 | 9/2016 | Hudon |
| 9,440,152 B2 | 9/2016 | Thompson et al. |
| 9,443,383 B2 | 9/2016 | Fine et al. |
| 9,451,010 B2 | 9/2016 | Spitz et al. |
| 9,452,353 B2 | 9/2016 | Lewis |
| 9,454,365 B2 | 9/2016 | Oberheide et al. |
| 9,454,656 B2 | 9/2016 | Oberheide et al. |
| 9,460,322 B2 | 10/2016 | Lamfalusi et al. |
| 9,463,388 B2 | 10/2016 | Thompson et al. |
| 9,465,488 B2 | 10/2016 | Howard |
| 9,466,051 B1 | 10/2016 | Roth et al. |
| 9,473,503 B2 | 10/2016 | Shuster et al. |
| 9,473,524 B2 | 10/2016 | Kaplan et al. |
| 9,485,736 B2 | 11/2016 | Ur et al. |
| 9,489,502 B2 | 11/2016 | Davis et al. |
| 9,489,522 B1 | 11/2016 | El Defrawy et al. |
| 9,489,762 B2 | 11/2016 | Jenkins |
| 9,489,798 B2 | 11/2016 | Fine et al. |
| 9,495,668 B1 | 11/2016 | Juels |
| 9,495,679 B2 | 11/2016 | Kassemi et al. |
| 9,501,791 B2 | 11/2016 | Dziuk |
| 9,509,699 B2 | 11/2016 | Burch et al. |
| 9,514,264 B1 | 12/2016 | Nebesnyi |
| 9,514,293 B1 | 12/2016 | Moritz et al. |
| 9,514,497 B2 | 12/2016 | Baharav et al. |
| 9,514,609 B2 | 12/2016 | Katz et al. |
| 9,514,644 B2 | 12/2016 | Fourie |
| 9,516,035 B1 | 12/2016 | Moritz et al. |
| 9,519,925 B2 | 12/2016 | Crites |
| 9,521,045 B1 | 12/2016 | Childress et al. |
| 9,531,724 B2 | 12/2016 | Shuster et al. |
| 9,532,222 B2 | 12/2016 | Oberheide et al. |
| 9,533,413 B2 | 1/2017 | Izhikevich et al. |
| 9,536,385 B2 | 1/2017 | Fine et al. |
| 9,542,683 B2 | 1/2017 | Kalinin et al. |
| 9,544,143 B2 | 1/2017 | Oberheide et al. |
| 9,548,957 B2 | 1/2017 | Degaugue et al. |
| 9,552,580 B2 | 1/2017 | Dides et al. |
| 9,552,615 B2 | 1/2017 | Mathura et al. |
| 9,552,694 B2 | 1/2017 | Fine et al. |
| 9,552,696 B2 | 1/2017 | Fine et al. |
| 9,553,882 B2 | 1/2017 | Margalit et al. |
| 9,553,888 B2 | 1/2017 | Stiansen et al. |
| 9,553,982 B2 | 1/2017 | Unitt |
| 9,558,623 B2 | 1/2017 | Fine et al. |
| 9,558,624 B2 | 1/2017 | Arnone et al. |
| 9,559,920 B1 | 1/2017 | Childress et al. |
| 9,563,470 B2 | 2/2017 | Modani et al. |
| 9,569,262 B2 | 2/2017 | Modani et al. |
| 9,569,771 B2 | 2/2017 | Lesavich et al. |
| 9,576,426 B2 | 2/2017 | Marshall et al. |
| 9,582,182 B2 | 2/2017 | Katz et al. |
| 9,595,031 B1 | 3/2017 | Grassadonia |
| 9,595,034 B2 | 3/2017 | Van Rooyen et al. |
| 9,596,787 B1 | 3/2017 | Iyengar et al. |
| 9,607,156 B2 | 3/2017 | Oberheide et al. |
| 9,607,330 B2 | 3/2017 | Spitz et al. |
| 9,607,461 B2 | 3/2017 | Taylor |
| 9,608,814 B2 | 3/2017 | Oberheide et al. |
| 9,608,829 B2 | 3/2017 | Spanos et al. |
| 9,619,967 B2 | 4/2017 | Fine et al. |
| 9,633,513 B2 | 4/2017 | Webb |
| 9,635,000 B1 | 4/2017 | Muftic |
| 9,641,338 B2 | 5/2017 | Sriram et al. |
| 9,641,341 B2 | 5/2017 | Oberheide et al. |
| 9,645,604 B1 | 5/2017 | Nebesnyi |
| 9,646,029 B1 | 5/2017 | Baird, III |
| 9,648,015 B1 | 5/2017 | Avetisov et al. |
| 9,648,029 B2 | 5/2017 | Cheng |
| 9,659,104 B2 | 5/2017 | Soon-Shiong et al. |
| 9,659,123 B2 | 5/2017 | Kheterpal et al. |
| 9,659,439 B1 | 5/2017 | Aleksey |
| 9,660,627 B1 | 5/2017 | Nebesnyi |
| 9,660,803 B2 | 5/2017 | Chalker |
| 9,665,239 B1 | 5/2017 | Koh et al. |
| 9,667,427 B2 | 5/2017 | Oberhauser et al. |
| 9,667,600 B2 | 5/2017 | Piqueras Jover et al. |
| 9,667,809 B1 | 5/2017 | López Quirarte |
| 9,672,499 B2 | 6/2017 | Yang et al. |
| 9,672,509 B2 | 6/2017 | Klingen |
| 9,672,518 B2 | 6/2017 | Sobel et al. |
| 9,673,979 B1 | 6/2017 | Poole |
| 9,674,584 B2 | 6/2017 | Briggs et al. |
| 9,679,275 B2 | 6/2017 | Bruscoe |
| 9,679,276 B1 | 6/2017 | Cuende |
| 9,686,247 B2 | 6/2017 | Dow et al. |
| 9,697,342 B2 | 7/2017 | Davis et al. |
| 9,697,362 B2 | 7/2017 | Kaplan et al. |
| 9,704,143 B2 | 7/2017 | Walker et al. |
| 9,704,190 B2 | 7/2017 | Custer |
| 9,710,808 B2 | 7/2017 | Slepinin |
| 9,712,500 B2 | 7/2017 | Dow et al. |
| 9,712,556 B2 | 7/2017 | Hirvonen et al. |
| 9,720,649 B2 | 8/2017 | Sahl et al. |
| 9,721,239 B1 | 8/2017 | Ho |
| 9,722,790 B2 | 8/2017 | Ebrahimi |
| 9,728,037 B2 | 8/2017 | Fine et al. |
| 9,729,318 B2 | 8/2017 | Hoy et al. |
| 9,734,491 B2 | 8/2017 | Jiva et al. |
| 9,735,958 B2 | 8/2017 | Alness et al. |
| 9,740,873 B1 | 8/2017 | Ho |
| 9,740,906 B2 | 8/2017 | AlNasser et al. |
| 9,741,337 B1 | 8/2017 | Shastry et al. |
| 9,742,744 B1 | 8/2017 | Ho |
| 9,747,077 B2 | 8/2017 | Sanguinetti et al. |
| 9,747,586 B1 | 8/2017 | Frolov et al. |
| 9,747,753 B2 | 8/2017 | Katz et al. |
| 9,749,140 B2 | 8/2017 | Oberhauser et al. |
| 9,749,297 B2 | 8/2017 | Gvili |
| 9,749,860 B2 | 8/2017 | Chudy et al. |
| 9,754,131 B2 | 9/2017 | Wilson |
| 9,754,490 B2 | 9/2017 | Kentley et al. |
| 9,762,562 B2 | 9/2017 | Maguire et al. |
| 9,762,590 B2 | 9/2017 | Oberheide et al. |
| 9,763,271 B1 | 9/2017 | Gabel |
| 9,767,520 B2 | 9/2017 | Isaacson et al. |
| 9,767,651 B2 | 9/2017 | Fine et al. |
| 9,769,189 B2 | 9/2017 | Mohaisen et al. |
| 9,772,820 B2 | 9/2017 | Sanguinetti et al. |
| 9,773,232 B1 | 9/2017 | Grassadonia |
| 9,773,351 B2 | 9/2017 | Hudson et al. |
| 9,774,448 B2 | 9/2017 | Oberheide et al. |
| 9,774,578 B1 | 9/2017 | Ateniese et al. |
| 9,774,579 B2 | 9/2017 | Oberheide et al. |
| 9,781,494 B1 | 10/2017 | Barakat et al. |
| 9,785,369 B1 | 10/2017 | Ateniese et al. |

(56) References Cited

U.S. PATENT DOCUMENTS

| | | |
|---|---|---|
| 9,785,912 B2 | 10/2017 | Quezada |
| 9,786,127 B2 | 10/2017 | Marshall et al. |
| 9,787,545 B2 | 10/2017 | Hyde et al. |
| 9,792,600 B1 | 10/2017 | Grassadonia |
| 9,792,742 B2 | 10/2017 | Johnson et al. |
| 9,794,074 B2 | 10/2017 | Toll et al. |
| 9,800,514 B1 | 10/2017 | Chen et al. |
| 9,800,517 B1 | 10/2017 | Anderson |
| 9,807,106 B2 | 10/2017 | Daniel et al. |
| 9,811,981 B2 | 11/2017 | Trepp et al. |
| 9,813,770 B2 | 11/2017 | Andrews, II et al. |
| 9,815,191 B2 | 11/2017 | Oleynik |
| 9,818,092 B2 | 11/2017 | Pennanen |
| 9,818,098 B2 | 11/2017 | Royyuru et al. |
| 9,818,109 B2 | 11/2017 | Loh |
| 9,818,116 B2 | 11/2017 | Caldera |
| 9,820,120 B2 | 11/2017 | deCharms |
| 9,824,222 B1 | 11/2017 | Kaplan et al. |
| 9,824,408 B2 | 11/2017 | Isaacson et al. |
| 9,824,540 B2 | 11/2017 | Webb |
| 9,825,765 B2 | 11/2017 | Oberheide et al. |
| 9,825,931 B2 | 11/2017 | Johnsrud et al. |
| 9,830,580 B2 | 11/2017 | MacGregor et al. |
| 9,830,593 B2 | 11/2017 | Myers |
| 9,836,790 B2 | 12/2017 | Ronca et al. |
| 9,836,908 B2 | 12/2017 | Spanos et al. |
| 9,842,216 B2 | 12/2017 | Unitt |
| 9,846,856 B2 | 12/2017 | Rinzler et al. |
| 9,849,364 B2 | 12/2017 | Tran et al. |
| 9,852,305 B2 | 12/2017 | Gajek |
| 9,852,417 B2 | 12/2017 | Tyler et al. |
| 9,852,426 B2 | 12/2017 | Bacastow |
| 9,852,427 B2 | 12/2017 | Caldera |
| 9,853,819 B2 | 12/2017 | Truu et al. |
| 9,853,977 B1 | 12/2017 | Laucius et al. |
| 9,858,546 B2 | 1/2018 | Rinzler et al. |
| 9,858,766 B2 | 1/2018 | Aleksey |
| 9,858,781 B1 | 1/2018 | Campero et al. |
| 9,862,092 B2 | 1/2018 | Izhikevich et al. |
| 9,864,970 B2 | 1/2018 | Rinzler et al. |
| 9,866,393 B1 | 1/2018 | Rush et al. |
| 9,870,562 B2 | 1/2018 | Davis et al. |
| 9,872,050 B2 | 1/2018 | Uhr et al. |
| 9,875,489 B2 | 1/2018 | Spitz et al. |
| 9,875,510 B1 | 1/2018 | Kasper |
| 9,876,646 B2 | 1/2018 | Ebrahimi et al. |
| 9,876,775 B2 | 1/2018 | Mossbarger |
| 9,881,176 B2 | 1/2018 | Goldfarb et al. |
| 9,882,715 B2 | 1/2018 | Alness et al. |
| 9,885,672 B2 | 2/2018 | Forutanpour et al. |
| 9,886,685 B2 | 2/2018 | Keohane et al. |
| 9,887,975 B1 | 2/2018 | Gifford et al. |
| 9,887,995 B2 | 2/2018 | Rotter et al. |
| 9,888,007 B2 | 2/2018 | Caldera et al. |
| 9,888,026 B2 | 2/2018 | Kaplan et al. |
| 9,889,382 B2 | 2/2018 | Thompson et al. |
| 9,892,141 B2 | 2/2018 | Darcy |
| 9,892,400 B1 | 2/2018 | Grassadonia |
| 9,892,460 B2 | 2/2018 | Winklevoss et al. |
| 9,892,597 B1 | 2/2018 | Trepp et al. |
| 9,894,101 B2 | 2/2018 | Hendrick et al. |
| 9,898,739 B2 | 2/2018 | Monastyrsky et al. |
| 9,898,781 B1 | 2/2018 | Silverman |
| 9,898,782 B1 | 2/2018 | Winklevoss et al. |
| 9,900,841 B2 | 2/2018 | Ur et al. |
| 9,904,544 B2 | 2/2018 | Thomas et al. |
| 9,904,830 B2 | 2/2018 | AlNasser et al. |
| 9,906,513 B2 | 2/2018 | Wuehler |
| 9,906,525 B1 | 2/2018 | Avetisov et al. |
| 9,911,102 B2 | 3/2018 | Bowles et al. |
| 9,911,150 B2 | 3/2018 | Kassemi et al. |
| 9,916,290 B2 | 3/2018 | Soon-Shiong et al. |
| 9,916,432 B2 | 3/2018 | Bower et al. |
| 9,917,754 B2 | 3/2018 | Childress et al. |
| 9,917,802 B2 | 3/2018 | Melzer et al. |
| 9,922,380 B2 | 3/2018 | Isaacson et al. |
| 9,922,381 B2 | 3/2018 | Isaacson et al. |
| 9,922,498 B2 | 3/2018 | Fine et al. |
| 9,930,043 B2 | 3/2018 | Shuster et al. |
| 9,933,790 B2 | 4/2018 | Blackley |
| 9,934,138 B1 | 4/2018 | Bache et al. |
| 9,934,502 B2 | 4/2018 | Grassadonia et al. |
| 9,935,772 B1 | 4/2018 | Madisetti et al. |
| 9,935,948 B2 | 4/2018 | Schultz et al. |
| 9,940,663 B2 | 4/2018 | Ward et al. |
| 9,940,779 B2 | 4/2018 | To et al. |
| 9,942,046 B2 | 4/2018 | Drego et al. |
| 9,942,048 B2 | 4/2018 | Oberheide et al. |
| 9,942,217 B2 | 4/2018 | Gulledge |
| 9,942,231 B1 | 4/2018 | Laucius et al. |
| 9,942,250 B2 | 4/2018 | Stiansen et al. |
| 9,947,033 B1 | 4/2018 | Stickle et al. |
| 9,948,468 B2 | 4/2018 | Nayshtut et al. |
| 9,948,682 B2 | 4/2018 | Anton et al. |
| 9,949,697 B2 | 4/2018 | Iscoe et al. |
| 9,952,908 B2 | 4/2018 | Nedeltchev et al. |
| 9,953,347 B2 | 4/2018 | Spitz et al. |
| 9,958,840 B2 | 5/2018 | Kniazev et al. |
| 9,959,065 B2 | 5/2018 | Ateniese et al. |
| 9,959,080 B2 | 5/2018 | Krilivsky |
| 9,960,909 B2 | 5/2018 | Karighattam et al. |
| 9,960,920 B2 | 5/2018 | Cuende et al. |
| 9,961,050 B2 | 5/2018 | Gvili |
| 9,965,628 B2 | 5/2018 | Ford et al. |
| 9,965,804 B1 | 5/2018 | Winklevoss et al. |
| 9,965,805 B1 | 5/2018 | Winklevoss et al. |
| 9,967,088 B2 | 5/2018 | Ateniese et al. |
| 9,967,091 B2 | 5/2018 | Vandervort |
| 9,967,096 B2 | 5/2018 | Ateniese et al. |
| 9,967,102 B2 | 5/2018 | Osborne et al. |
| 9,967,238 B1 | 5/2018 | Hogan et al. |
| 9,967,333 B2 | 5/2018 | Chen et al. |
| 9,967,334 B2 | 5/2018 | Ford |
| 9,967,747 B2 | 5/2018 | Rotter et al. |
| 9,973,341 B2 | 5/2018 | Ferrin |
| 9,979,718 B2 | 5/2018 | Kurian |
| 9,979,719 B2 | 5/2018 | Oberheide et al. |
| 9,984,243 B1 | 5/2018 | Ho |
| 9,985,699 B1 | 5/2018 | Cronin |
| 9,985,937 B1 | 5/2018 | Ho |
| 9,985,964 B2 | 5/2018 | Andrade |
| 9,986,305 B2 | 5/2018 | Briggs et al. |
| D820,859 S | 6/2018 | Yamazaki et al. |
| 9,987,743 B2 | 6/2018 | Izhikevich et al. |
| 9,990,418 B1 | 6/2018 | Rogers |
| 9,990,504 B1 | 6/2018 | Chapman et al. |
| 9,992,022 B1 | 6/2018 | Chapman et al. |
| 9,992,028 B2 | 6/2018 | Androulaki et al. |
| 9,992,194 B2 | 6/2018 | Oberheide et al. |
| 9,992,620 B2 | 6/2018 | Curry et al. |
| 9,994,339 B2 | 6/2018 | Colson et al. |
| 9,996,325 B2 | 6/2018 | Lim et al. |
| 9,997,023 B2 | 6/2018 | Fine et al. |
| 9,998,150 B1 | 6/2018 | Lazier |
| 9,998,282 B2 | 6/2018 | Oberheide et al. |
| 9,998,286 B1 | 6/2018 | Ramathal et al. |
| 9,998,539 B1 | 6/2018 | Brock et al. |
| 10,002,277 B1 | 6/2018 | Endress et al. |
| 10,002,362 B1 | 6/2018 | Endress et al. |
| 10,002,389 B1 | 6/2018 | Winklevoss et al. |
| 10,002,396 B2 | 6/2018 | Isaacson et al. |
| 10,003,507 B2 | 6/2018 | Wood et al. |
| 10,004,429 B2 | 6/2018 | Shoshan |
| 10,007,405 B2 | 6/2018 | D'Amore et al. |
| 10,007,826 B2 | 6/2018 | Ebrahimi et al. |
| 10,007,893 B2 | 6/2018 | Emmerson |
| 10,007,913 B2 | 6/2018 | Ebrahimi |
| D824,404 S | 7/2018 | Di Nicola et al. |
| 10,012,398 B2 | 7/2018 | Swanson |
| 10,013,548 B2 | 7/2018 | Oberheide et al. |
| 10,013,836 B2 | 7/2018 | Finn |
| 10,019,696 B2 | 7/2018 | Keohane et al. |
| 10,019,874 B1 | 7/2018 | Trepp et al. |
| 10,021,113 B2 | 7/2018 | Oberheide et al. |

(56) References Cited

U.S. PATENT DOCUMENTS

| | | |
|---|---|---|
| 10,022,613 B2 | 7/2018 | Tran et al. |
| 10,022,614 B1 | 7/2018 | Tran et al. |
| 10,025,797 B1 | 7/2018 | Fonss |
| 10,025,887 B1 | 7/2018 | Santarone et al. |
| 10,025,941 B1 | 7/2018 | Griffin et al. |
| 10,026,082 B2 | 7/2018 | Davis |
| 10,026,118 B2 | 7/2018 | Castinado et al. |
| 10,031,775 B2 | 7/2018 | Modani et al. |
| 10,035,065 B2 | 7/2018 | Schupak et al. |
| 10,037,527 B2 | 7/2018 | Han et al. |
| 10,037,533 B2 | 7/2018 | Caldera |
| 10,042,782 B2 | 8/2018 | Struttmann |
| 10,043,174 B1 | 8/2018 | Chikkanna |
| 10,046,228 B2 | 8/2018 | Tran et al. |
| 10,046,521 B2 | 8/2018 | Walker et al. |
| 10,049,017 B2 | 8/2018 | Karame et al. |
| 10,050,779 B2 | 8/2018 | Alness et al. |
| 10,050,959 B2 | 8/2018 | Soon-Shiong et al. |
| 10,055,446 B2 | 8/2018 | Pattanaik et al. |
| 10,055,554 B2 | 8/2018 | Papa et al. |
| 10,055,715 B1 | 8/2018 | Grassadonia et al. |
| 10,055,720 B2 | 8/2018 | MacGregor et al. |
| 10,055,768 B2 | 8/2018 | Briggs et al. |
| 10,055,926 B2 | 8/2018 | Campero et al. |
| 10,055,935 B2 | 8/2018 | Arnone et al. |
| 10,057,065 B2 | 8/2018 | Reinhold |
| 10,057,205 B2 | 8/2018 | Spicer et al. |
| 10,057,222 B2 | 8/2018 | Piqueras Jover et al. |
| 10,057,238 B2 | 8/2018 | Gulledge |
| 10,061,668 B1 | 8/2018 | Lazier et al. |
| 10,063,529 B2 | 8/2018 | Milazzo et al. |
| 10,063,531 B2 | 8/2018 | Oberheide et al. |
| 10,063,548 B1 | 8/2018 | Laucius et al. |
| 10,063,572 B2 | 8/2018 | Milazzo et al. |
| 10,067,994 B2 | 9/2018 | Curtis |
| 10,068,228 B1 | 9/2018 | Winklevoss et al. |
| 10,068,397 B2 | 9/2018 | Day et al. |
| 10,069,672 B2 | 9/2018 | Curtis |
| 10,075,298 B2 | 9/2018 | Struttmann |
| 10,079,682 B2 | 9/2018 | Lu |
| 10,079,881 B2 | 9/2018 | Cohn et al. |
| 10,084,607 B2 | 9/2018 | Toll et al. |
| 10,084,816 B2 | 9/2018 | Zhang et al. |
| 10,087,783 B2 | 10/2018 | Sahl et al. |
| 10,089,176 B1 | 10/2018 | Donlan et al. |
| 10,089,489 B2 | 10/2018 | Goldfarb et al. |
| 10,089,492 B2 | 10/2018 | Shah |
| 10,089,819 B1 | 10/2018 | Halvorson et al. |
| 10,089,830 B2 | 10/2018 | Aleksey |
| 10,091,180 B1 | 10/2018 | Moritz et al. |
| 10,095,253 B2 | 10/2018 | Whidden et al. |
| 10,095,549 B1 | 10/2018 | Needham et al. |
| 10,097,344 B2 | 10/2018 | Davis |
| 10,097,345 B2 | 10/2018 | Agrawal et al. |
| 10,097,356 B2 | 10/2018 | Zinder |
| 10,097,362 B2 | 10/2018 | Lòpez Quirarte |
| 10,097,558 B2 | 10/2018 | Roth et al. |
| 10,102,065 B1 | 10/2018 | Franklin |
| 10,102,265 B1 | 10/2018 | Madisetti et al. |
| 10,102,510 B2 | 10/2018 | Yau et al. |
| 10,102,526 B1 | 10/2018 | Madisetti et al. |
| 10,103,885 B2 | 10/2018 | Davis |
| 10,103,893 B2 | 10/2018 | Kroonmaa et al. |
| 10,103,953 B1 | 10/2018 | Chang et al. |
| 10,104,198 B1 | 10/2018 | Ho |
| 10,108,589 B2 | 10/2018 | Soon-Shiong et al. |
| 10,108,812 B2 | 10/2018 | Ansari et al. |
| 10,108,819 B1 | 10/2018 | Donlan et al. |
| 10,108,938 B1 | 10/2018 | Brock et al. |
| 10,108,954 B2 | 10/2018 | Dunlevy et al. |
| 10,110,385 B1 | 10/2018 | Rush et al. |
| 10,110,576 B2 | 10/2018 | Ateniese et al. |
| 10,114,854 B2 | 10/2018 | Batra et al. |
| 10,114,963 B1 | 10/2018 | Griffin et al. |
| 10,114,969 B1 | 10/2018 | Chaney et al. |
| 10,114,970 B2 | 10/2018 | Goldfarb et al. |
| 10,114,980 B2 | 10/2018 | Barinov et al. |
| 10,115,068 B2 | 10/2018 | Vivier |
| 10,116,453 B2 | 10/2018 | Oberheide et al. |
| 10,116,657 B2 | 10/2018 | Andrade |
| 10,116,667 B2 | 10/2018 | Johnsrud |
| 10,116,765 B2 | 10/2018 | Orbach |
| 10,121,019 B2 | 11/2018 | Struttmann |
| 10,121,025 B1 | 11/2018 | Rice |
| 10,121,126 B2 | 11/2018 | Lamison-White |
| 10,121,143 B1 | 11/2018 | Madisetti et al. |
| 10,121,172 B2 | 11/2018 | Hudson et al. |
| 10,121,186 B2 | 11/2018 | Isaacson et al. |
| 10,121,215 B2 | 11/2018 | Branscomb et al. |
| 10,121,339 B2 | 11/2018 | Strulovitch et al. |
| 10,127,105 B1 | 11/2018 | Donlan |
| 10,127,368 B2 | 11/2018 | Anderson et al. |
| 10,127,378 B2 | 11/2018 | Toth |
| 10,127,528 B2 | 11/2018 | Solis |
| 10,127,552 B2 | 11/2018 | Ronca et al. |
| 10,127,647 B2 | 11/2018 | Forutanpour et al. |
| 10,129,032 B2 | 11/2018 | Vandervort |
| 10,129,238 B2 | 11/2018 | Kurian et al. |
| 10,129,250 B2 | 11/2018 | Oberheide et al. |
| 10,130,013 B1 | 11/2018 | Iyengar et al. |
| 10,130,195 B2 | 11/2018 | Phillips et al. |
| 10,134,201 B2 | 11/2018 | Hudson et al. |
| 10,135,607 B1 | 11/2018 | Roets |
| 10,135,609 B2 | 11/2018 | Bibera et al. |
| 10,135,616 B2 | 11/2018 | Finlow-Bates |
| 10,135,793 B2 | 11/2018 | Durniak et al. |
| 10,135,834 B1 | 11/2018 | Galebach et al. |
| 10,135,870 B2 | 11/2018 | Castinado et al. |
| 10,135,921 B2 | 11/2018 | Finlow-Bates |
| 10,136,098 B2 | 11/2018 | Altenburger et al. |
| 10,140,470 B2 | 11/2018 | Kurian et al. |
| 10,140,602 B2 | 11/2018 | Kelly et al. |
| 10,140,658 B1 | 11/2018 | Bagherzadeh |
| 10,142,098 B2 | 11/2018 | Suresh et al. |
| 10,142,312 B2 | 11/2018 | Johnsrud et al. |
| 10,142,333 B1 | 11/2018 | Griffin et al. |
| 10,142,347 B2 | 11/2018 | Kurian |
| 10,146,792 B1 | 12/2018 | Dobrek et al. |
| 10,146,947 B1 | 12/2018 | Chapman et al. |
| 10,147,264 B1 | 12/2018 | Halvorson |
| 10,147,428 B1 | 12/2018 | Shastry et al. |
| 10,148,441 B2 | 12/2018 | Kaliski, Jr. |
| 10,152,756 B2 | 12/2018 | Isaacson et al. |
| 10,153,905 B2 | 12/2018 | Kaliski, Jr. |
| 10,153,939 B2 | 12/2018 | Curtis |
| 10,153,983 B2 | 12/2018 | Castinado et al. |
| 10,154,029 B1 | 12/2018 | Griffin |
| 10,157,078 B2 | 12/2018 | Curtis |
| 10,157,294 B2 | 12/2018 | Szymanski et al. |
| 10,157,295 B2 | 12/2018 | Barinov et al. |
| 10,157,380 B2 | 12/2018 | Angrish et al. |
| 10,158,480 B1 | 12/2018 | Winklevoss et al. |
| 10,158,492 B2 | 12/2018 | Pearce |
| 10,158,527 B2 | 12/2018 | Anderson et al. |
| 10,158,703 B2 | 12/2018 | Kurian |
| 10,158,737 B2 | 12/2018 | Curtis |
| 10,162,519 B2 | 12/2018 | Hoffman |
| 10,162,704 B1 | 12/2018 | Kirschner et al. |
| 10,162,954 B2 | 12/2018 | Davis et al. |
| 10,163,079 B1 | 12/2018 | Brock et al. |
| 10,163,080 B2 | 12/2018 | Chow et al. |
| 10,163,297 B1 | 12/2018 | Bosak et al. |
| 10,164,773 B2 | 12/2018 | Suresh et al. |
| 10,164,779 B2 | 12/2018 | Uhr et al. |
| 10,164,952 B2 | 12/2018 | Vandervort |
| 10,166,675 B2 | 1/2019 | Izhikevich et al. |
| 10,168,693 B2 | 1/2019 | Kingston et al. |
| 10,169,433 B2 | 1/2019 | Lerios et al. |
| 10,169,586 B2 | 1/2019 | Maciejak et al. |
| 10,169,614 B2 | 1/2019 | Brady et al. |
| 10,169,770 B2 | 1/2019 | Glazier et al. |
| 10,169,937 B1 | 1/2019 | Zwink et al. |
| 10,171,245 B2 | 1/2019 | Wilkins et al. |
| 10,171,555 B2 | 1/2019 | Spitz et al. |

(56) References Cited

U.S. PATENT DOCUMENTS

| | | | |
|---|---|---|---|
| 10,171,967 B2 | 1/2019 | Ameixieira |
| 10,176,308 B2 | 1/2019 | Mintz et al. |
| 10,176,309 B2 | 1/2019 | Tormasov et al. |
| 10,176,352 B2 | 1/2019 | AlNasser et al. |
| 10,176,481 B2 | 1/2019 | Aljawhari |
| 10,176,671 B1 | 1/2019 | Halvorson |
| 10,177,908 B2 | 1/2019 | Hamel et al. |
| 10,178,069 B2 | 1/2019 | Li et al. |
| 10,178,105 B2 | 1/2019 | Kurian et al. |
| 10,180,912 B1 | 1/2019 | Franklin et al. |
| 10,181,113 B2 | 1/2019 | Rivalto et al. |
| 10,182,051 B1 | 1/2019 | Andrade |
| 10,183,214 B2 | 1/2019 | Katz |
| 10,185,550 B2 | 1/2019 | Smith et al. |
| 10,185,759 B2 | 1/2019 | Goldberg |
| 10,185,917 B2 | 1/2019 | Greystoke et al. |
| 10,185,928 B2 | 1/2019 | Quezada |
| 10,186,115 B2 | 1/2019 | Fine et al. |
| 10,187,203 B2 | 1/2019 | Hamel et al. |
| 10,187,214 B2 | 1/2019 | Ferrin |
| 10,187,369 B2 | 1/2019 | Caldera et al. |
| 10,187,373 B1 | 1/2019 | Poole |
| 10,192,073 B2 | 1/2019 | Marin |
| 10,193,695 B1 | 1/2019 | Endress et al. |
| 10,193,696 B2 | 1/2019 | Struttmann et al. |
| 10,193,884 B1 | 1/2019 | Griffin et al. |
| 10,194,320 B1 | 1/2019 | Egner et al. |
| 10,195,513 B2 | 2/2019 | Tran et al. |
| 10,198,311 B1 | 2/2019 | Donlan et al. |
| 10,198,325 B2 | 2/2019 | Davis |
| 10,198,905 B2 | 2/2019 | Arnone et al. |
| 10,198,908 B2 | 2/2019 | Dabrowski |
| 10,198,949 B2 | 2/2019 | Becker |
| 10,200,196 B1 | 2/2019 | Rodriguez De Castro |
| 10,200,197 B1 | 2/2019 | Li et al. |
| 10,200,198 B2 | 2/2019 | Ganesan et al. |
| 10,200,199 B2 | 2/2019 | Truu et al. |
| 10,200,834 B2 | 2/2019 | Tran et al. |
| 10,204,148 B2 | 2/2019 | Madisetti et al. |
| 10,204,339 B2 | 2/2019 | Madisetti et al. |
| 10,204,341 B2 | 2/2019 | Davis |
| 10,204,378 B1 | 2/2019 | Wnuk |
| 10,204,472 B1 | 2/2019 | Halvorson et al. |
| 10,206,082 B2 | 2/2019 | Khan et al. |
| 10,210,502 B2 | 2/2019 | Filler |
| 10,217,037 B1 | 2/2019 | Di Iorio et al. |
| 10,219,744 B2 | 3/2019 | Mauro et al. |
| 10,223,096 B2 | 3/2019 | Ziat et al. |
| 10,223,520 B2 | 3/2019 | Oberheide et al. |
| 10,223,685 B2 | 3/2019 | Cole |
| 10,223,873 B1 | 3/2019 | Bosak |
| 10,225,076 B2 | 3/2019 | Leng et al. |
| 10,225,078 B2 | 3/2019 | Bibera et al. |
| 10,225,289 B1 | 3/2019 | Tucker, IV et al. |
| 10,225,614 B2 | 3/2019 | Andrews, II et al. |
| 10,229,275 B2 | 3/2019 | Unitt |
| 10,229,396 B2 | 3/2019 | Shtylman et al. |
| 10,229,400 B2 | 3/2019 | Kassemi et al. |
| 10,230,526 B2 | 3/2019 | Manning |
| 10,230,530 B2 | 3/2019 | Lancashire et al. |
| 10,231,077 B2 | 3/2019 | Raduchel et al. |
| 10,231,652 B2 | 3/2019 | Mauro |
| 10,235,402 B1 | 3/2019 | Franklin et al. |
| 10,235,529 B1 | 3/2019 | Ho |
| 10,235,538 B2 | 3/2019 | Uhr et al. |
| 10,235,726 B2 | 3/2019 | Branscomb et al. |
| 10,236,006 B1 | 3/2019 | Gurijala et al. |
| 10,237,062 B2 | 3/2019 | Oberheide et al. |
| 10,237,064 B2 | 3/2019 | Hoy et al. |
| 10,237,259 B2 | 3/2019 | Ronda et al. |
| 10,237,583 B1 | 3/2019 | Allen |
| 10,238,288 B2 | 3/2019 | Gupta et al. |
| 10,241,842 B2 | 3/2019 | Smith et al. |
| 10,242,219 B2 | 3/2019 | Struttmann |
| 10,242,538 B2 | 3/2019 | Pierce et al. |
| 10,243,731 B2 | 3/2019 | Velissarios et al. |
| 10,243,738 B2 | 3/2019 | Chase et al. |
| 10,243,743 B1 | 3/2019 | Madisetti et al. |
| 10,243,748 B1 | 3/2019 | Callan et al. |
| 10,243,934 B1 | 3/2019 | Ho |
| 10,248,119 B2 | 4/2019 | Kentley-Klay et al. |
| 10,248,793 B1 | 4/2019 | Kirschner |
| 10,248,813 B2 | 4/2019 | Anderson et al. |
| 10,249,114 B2 | 4/2019 | Day et al. |
| 10,250,381 B1 | 4/2019 | Rice |
| 10,250,522 B1 | 4/2019 | Anderson |
| 10,250,535 B2 | 4/2019 | Kassemi et al. |
| 10,250,583 B2 | 4/2019 | Caldera et al. |
| 10,250,694 B2 | 4/2019 | Mankovskii et al. |
| 10,252,145 B2 | 4/2019 | Tran et al. |
| 10,255,001 B2 | 4/2019 | Warstler |
| 10,255,108 B2 | 4/2019 | Dillenberger et al. |
| 10,255,342 B2 | 4/2019 | Madisetti et al. |
| 10,255,442 B2 | 4/2019 | Sanso et al. |
| 10,255,460 B2 | 4/2019 | Wilson |
| 10,255,600 B2 | 4/2019 | Ronca et al. |
| 10,255,625 B2 | 4/2019 | Liberty et al. |
| 10,255,635 B1 | 4/2019 | Winklevoss et al. |
| 10,256,829 B1 | 4/2019 | Bertsch et al. |
| 10,256,974 B1 | 4/2019 | Rodriguez De Castro |
| 10,257,268 B2 | 4/2019 | Cencini et al. |
| 10,257,270 B2 | 4/2019 | Cohn et al. |
| 10,257,496 B2 | 4/2019 | Peeters et al. |
| 10,257,819 B2 | 4/2019 | Jalkanen et al. |
| 10,257,960 B1 | 4/2019 | Banerjee et al. |
| 10,261,726 B2 | 4/2019 | Krilivsky |
| 10,262,138 B2 | 4/2019 | Boutnaru |
| 10,262,140 B2 | 4/2019 | Smith et al. |
| 10,262,163 B1 | 4/2019 | Rodriguez De Castro |
| 10,262,164 B2 | 4/2019 | Rodriguez De Castro et al. |
| 10,262,311 B1 | 4/2019 | Cronin et al. |
| 10,262,318 B1 | 4/2019 | Cronin |
| 10,262,321 B1 | 4/2019 | Ramanathan et al. |
| 10,262,351 B2 | 4/2019 | Boemi et al. |
| 10,262,377 B2 | 4/2019 | Angelovski et al. |
| 10,268,782 B1 | 4/2019 | Santarone et al. |
| 10,268,829 B2 | 4/2019 | Roets et al. |
| 10,268,994 B2 | 4/2019 | Spitz et al. |
| 10,269,004 B2 | 4/2019 | Tyler et al. |
| 10,269,009 B1 | 4/2019 | Winklevoss et al. |
| 10,269,012 B2 | 4/2019 | Miller et al. |
| 10,269,073 B1 | 4/2019 | Bodson et al. |
| 10,269,110 B2 | 4/2019 | Forutanpour et al. |
| 10,270,475 B1 | 4/2019 | Lazier |
| 10,270,476 B1 | 4/2019 | Lazier |
| 10,270,599 B2 | 4/2019 | Nadeau et al. |
| 10,270,600 B2 | 4/2019 | Vandervort |
| 10,275,363 B2 | 4/2019 | Zaydman et al. |
| 10,275,627 B2 | 4/2019 | Endress et al. |
| 10,275,772 B2 | 4/2019 | Ronca et al. |
| 10,275,902 B2 | 4/2019 | Bradski |
| 10,277,400 B1 | 4/2019 | Griffin et al. |
| 10,277,561 B2 | 4/2019 | Cox et al. |
| 10,282,554 B2 | 5/2019 | Seger, II et al. |
| 10,282,741 B2 | 5/2019 | Yu et al. |
| 10,282,798 B2 | 5/2019 | Sheppard et al. |
| 10,282,938 B2 | 5/2019 | Halvorson |
| 10,284,379 B1 | 5/2019 | Muftic |
| 10,285,133 B2 | 5/2019 | Ur et al. |
| 10,289,631 B2 | 5/2019 | Madisetti et al. |
| 10,289,716 B1 | 5/2019 | Astigarraga et al. |
| 10,289,816 B1 | 5/2019 | Malassenet et al. |
| 10,289,915 B1 | 5/2019 | Bertsch et al. |
| 10,289,987 B1 | 5/2019 | Walker et al. |
| 10,289,989 B2 | 5/2019 | Kelly et al. |
| 10,291,408 B2 | 5/2019 | Campagna et al. |
| 10,291,413 B2 | 5/2019 | Ramathal et al. |
| 10,291,627 B2 | 5/2019 | Gleichauf |
| 10,293,263 B2 | 5/2019 | Thompson et al. |
| 10,296,248 B2 | 5/2019 | Ateniese et al. |
| 10,296,729 B1 | 5/2019 | Bertsch et al. |
| 10,296,764 B1 | 5/2019 | Batishchev |
| 10,296,794 B2 | 5/2019 | Ratti |
| 10,296,865 B2 | 5/2019 | Schmidt |

(56) References Cited

U.S. PATENT DOCUMENTS

| | | |
|---|---|---|
| 10,296,894 B2 | 5/2019 | Tyler et al. |
| 10,297,094 B2 | 5/2019 | Day et al. |
| 10,297,106 B1 | 5/2019 | Simons |
| 10,298,259 B1 | 5/2019 | Lazier |
| 10,298,396 B1 | 5/2019 | Kurani et al. |
| 10,298,405 B2 | 5/2019 | Ramathal et al. |
| 10,298,571 B2 | 5/2019 | Andrade |
| 10,298,572 B2 | 5/2019 | Andrade |
| 10,298,585 B1 | 5/2019 | Treat et al. |
| 10,303,877 B2 | 5/2019 | Roguine et al. |
| 10,303,887 B2 | 5/2019 | Black et al. |
| 10,304,078 B2 | 5/2019 | Rulli et al. |
| 10,304,143 B2 | 5/2019 | Kasper et al. |
| 10,304,147 B2 | 5/2019 | Kelly et al. |
| 10,304,280 B1 | 5/2019 | Halvorson |
| 10,304,283 B2 | 5/2019 | Fine et al. |
| 10,304,295 B1 | 5/2019 | Rhodes et al. |
| 10,305,694 B2 | 5/2019 | Dix et al. |
| 10,305,833 B1 | 5/2019 | Dennis |
| 10,305,875 B1 | 5/2019 | Ateniese et al. |
| 10,311,240 B1 | 6/2019 | Nissler et al. |
| 10,311,250 B2 | 6/2019 | Khi et al. |
| 10,311,406 B2 | 6/2019 | Kassemi et al. |
| 10,311,515 B2 | 6/2019 | Katsuyama et al. |
| 10,311,668 B1 | 6/2019 | Halvorson |
| 10,313,108 B2 | 6/2019 | Suresh et al. |
| 10,313,360 B2 | 6/2019 | Wilson |
| 10,313,376 B2 | 6/2019 | Thom et al. |
| 10,313,385 B2 | 6/2019 | Shakarian et al. |
| 10,313,510 B2 | 6/2019 | Chang et al. |
| 10,318,505 B2 | 6/2019 | Baird, III |
| 10,318,738 B2 | 6/2019 | Smith et al. |
| 10,318,747 B1 | 6/2019 | MacCarthaigh et al. |
| 10,318,753 B2 | 6/2019 | Anton et al. |
| 10,318,938 B2 | 6/2019 | Johnsrud et al. |
| 10,320,569 B1 | 6/2019 | Wentz et al. |
| 10,320,768 B2 | 6/2019 | Maguire et al. |
| 10,320,843 B1 | 6/2019 | Dobrek et al. |
| 10,320,969 B2 | 6/2019 | Chang et al. |
| 10,321,603 B1 | 6/2019 | Banerjee et al. |
| 10,324,790 B1 | 6/2019 | Franklin et al. |
| 10,325,156 B1 | 6/2019 | Bertsch et al. |
| 10,325,257 B1 | 6/2019 | Winklevoss et al. |
| 10,325,596 B1 | 6/2019 | Tran et al. |
| 10,326,766 B2 | 6/2019 | Egner et al. |
| 10,331,123 B2 | 6/2019 | Mattingly et al. |
| 10,331,412 B2 | 6/2019 | Sanguinetti et al. |
| 10,332,169 B2 | 6/2019 | Degauque et al. |
| 10,332,205 B1 | 6/2019 | Russell et al. |
| 10,332,335 B2 | 6/2019 | Halvorson et al. |
| 10,332,336 B1 | 6/2019 | Halvorson |
| 10,333,696 B2 | 6/2019 | Ahmed |
| 10,333,705 B2 | 6/2019 | Smith et al. |
| 10,333,706 B2 | 6/2019 | Smith et al. |
| 10,333,721 B2 | 6/2019 | Uhr et al. |
| 10,333,910 B2 | 6/2019 | Hogan et al. |
| 10,334,050 B2 | 6/2019 | Kentley-Klay et al. |
| 10,335,063 B2 | 7/2019 | Mauro et al. |
| 10,335,064 B2 | 7/2019 | Mauro et al. |
| 10,338,558 B2 | 7/2019 | Firu et al. |
| 10,338,913 B2 | 7/2019 | Franchitti |
| 10,339,014 B2 | 7/2019 | Smith et al. |
| 10,339,506 B2 | 7/2019 | Kassemi et al. |
| 10,339,523 B2 | 7/2019 | McDonough et al. |
| 10,339,750 B1 | 7/2019 | Wegelin |
| 10,339,754 B1 | 7/2019 | Halvorson |
| 10,340,038 B2 | 7/2019 | Witchey |
| 10,341,105 B2 | 7/2019 | Innes et al. |
| 10,341,121 B2 | 7/2019 | Androulaki et al. |
| 10,341,123 B2 | 7/2019 | Ebrahimi et al. |
| 10,341,309 B1 | 7/2019 | Ramirez et al. |
| 10,341,431 B2 | 7/2019 | Finlow-Bates |
| 10,346,406 B2 | 7/2019 | Booz et al. |
| 10,346,428 B2 | 7/2019 | Madhavan et al. |
| 10,346,814 B2 | 7/2019 | Pennanen |
| 10,346,815 B2 | 7/2019 | Glover et al. |
| 10,346,826 B2 | 7/2019 | Boudville |
| 10,346,845 B2 | 7/2019 | Sherlock et al. |
| 10,346,846 B2 | 7/2019 | Kassemi et al. |
| 10,346,848 B2 | 7/2019 | Ziat et al. |
| 10,346,869 B1 | 7/2019 | Ahmed et al. |
| 10,347,026 B2 | 7/2019 | Tokuchi |
| 10,348,368 B2 | 7/2019 | Cronin |
| 10,348,484 B2 | 7/2019 | King |
| 10,348,707 B2 | 7/2019 | Ateniese et al. |
| 10,348,756 B2 | 7/2019 | Oberheide et al. |
| 10,352,797 B2 | 7/2019 | Gunawan et al. |
| 10,354,236 B1 | 7/2019 | Wang |
| 10,354,301 B2 | 7/2019 | Chang et al. |
| 10,354,325 B1 | 7/2019 | Skala et al. |
| 10,354,494 B2 | 7/2019 | Hartl |
| 10,355,869 B2 | 7/2019 | Bisti |
| 10,356,066 B2 | 7/2019 | Ateniese et al. |
| 10,356,094 B2 | 7/2019 | Anton et al. |
| 10,356,099 B2 | 7/2019 | Caldera et al. |
| 10,361,849 B2 | 7/2019 | Smith et al. |
| 10,361,859 B2 | 7/2019 | Clark et al. |
| 10,361,870 B2 | 7/2019 | Chow et al. |
| 10,362,010 B2 | 7/2019 | Sharp et al. |
| 10,362,058 B2 | 7/2019 | Hu et al. |
| 10,362,278 B1 | 7/2019 | Palazzolo et al. |
| 10,362,517 B2 | 7/2019 | Crawford |
| 10,365,981 B2 | 7/2019 | Marripudi et al. |
| 10,366,062 B1 | 7/2019 | Lazier et al. |
| 10,366,204 B2 | 7/2019 | Tanner, Jr. et al. |
| 10,366,247 B2 | 7/2019 | Beecham et al. |
| 10,366,388 B2 | 7/2019 | Campero et al. |
| 10,366,419 B2 | 7/2019 | Storti |
| 10,367,353 B1 | 7/2019 | McNamara et al. |
| 10,367,645 B2 | 7/2019 | Dechu et al. |
| 10,367,803 B2 | 7/2019 | Adrian |
| 10,367,905 B2 | 7/2019 | Kouru et al. |
| 10,372,942 B1 | 8/2019 | Uhr et al. |
| 10,372,943 B1 | 8/2019 | Rodriguez De Castro et al. |
| 10,373,129 B1 | 8/2019 | James et al. |
| 10,373,158 B1 | 8/2019 | James et al. |
| 10,373,426 B2 | 8/2019 | Robinson et al. |
| 10,373,438 B2 | 8/2019 | Fine et al. |
| 10,373,441 B1 | 8/2019 | Halvorson |
| 10,375,037 B2 | 8/2019 | Baird, III et al. |
| 10,375,105 B2 | 8/2019 | Kozloski et al. |
| 10,380,359 B2 | 8/2019 | Naqvi et al. |
| 10,380,373 B2 | 8/2019 | Rong et al. |
| 10,380,574 B2 | 8/2019 | Crites |
| 10,380,589 B2 | 8/2019 | Studnitzer |
| 10,380,594 B1 | 8/2019 | Bayer et al. |
| 10,380,613 B1 | 8/2019 | Liu |
| 10,380,682 B2 | 8/2019 | Kundu |
| 10,380,685 B1 | 8/2019 | Phillips et al. |
| 10,380,702 B2 | 8/2019 | McCoy et al. |
| 10,380,812 B2 | 8/2019 | Pickover et al. |
| 10,380,842 B2 | 8/2019 | Jayachandran |
| 10,381,758 B1 | 8/2019 | Scanlon |
| 10,382,196 B2 | 8/2019 | Shields et al. |
| 10,382,205 B1 | 8/2019 | Ko |
| 10,382,208 B2 | 8/2019 | Shields et al. |
| 10,382,388 B2 | 8/2019 | Li et al. |
| 10,386,988 B1 | 8/2019 | Koh et al. |
| 10,387,850 B1 | 8/2019 | Srinivasan |
| 10,387,878 B2 | 8/2019 | Johnsrud et al. |
| 10,387,881 B2 | 8/2019 | Studnitzer |
| 10,387,950 B2 | 8/2019 | Dziuk |
| 10,388,097 B1 | 8/2019 | Ivanov et al. |
| 10,388,106 B2 | 8/2019 | Arnone et al. |
| 10,389,518 B2 | 8/2019 | Chen et al. |
| 10,389,535 B2 | 8/2019 | Fiege et al. |
| 10,389,713 B2 | 8/2019 | Andrade |
| 10,389,749 B2 | 8/2019 | Kozloski et al. |
| 10,390,458 B2 | 8/2019 | Tufty et al. |
| 10,391,628 B2 | 8/2019 | Izhikevich et al. |
| 10,394,762 B1 | 8/2019 | Franklin et al. |
| 10,394,789 B1 | 8/2019 | Animesh et al. |
| 10,394,845 B2 | 8/2019 | Madisetti et al. |
| 10,395,053 B2 | 8/2019 | Samid |

(56) References Cited

U.S. PATENT DOCUMENTS

| | | |
|---|---|---|
| 10,395,058 B1 | 8/2019 | Kothavale et al. |
| 10,395,062 B2 | 8/2019 | Uhr et al. |
| 10,396,988 B2 | 8/2019 | Davis |
| 10,396,992 B2 | 8/2019 | Anton et al. |
| 10,396,997 B2 | 8/2019 | Brady et al. |
| 10,396,999 B2 | 8/2019 | Zhang |
| 10,397,328 B2 | 8/2019 | Bohli et al. |
| 10,401,411 B2 | 9/2019 | Snook et al. |
| 10,402,594 B2 | 9/2019 | Takaai et al. |
| 10,402,792 B2 | 9/2019 | Lin et al. |
| 10,402,793 B2 | 9/2019 | Haldenby et al. |
| 10,402,796 B2 | 9/2019 | Castagna |
| 10,402,808 B1 | 9/2019 | Peterson |
| 10,402,823 B1 | 9/2019 | Vlasov et al. |
| 10,402,829 B1 | 9/2019 | Baar et al. |
| 10,402,845 B2 | 9/2019 | Glazier et al. |
| 10,403,093 B1 | 9/2019 | Halvorson |
| 10,404,454 B1 | 9/2019 | Rodriguez De Castro |
| 10,404,455 B2 | 9/2019 | Ateniese et al. |
| 10,404,463 B1 | 9/2019 | Rodriguez De Castro |
| 10,404,469 B2 | 9/2019 | Madhavan et al. |
| 10,404,471 B1 | 9/2019 | Griffin et al. |
| 10,404,523 B2 | 9/2019 | Cencini et al. |
| 10,404,703 B1 | 9/2019 | Peterson |
| 10,405,215 B2 | 9/2019 | Tavares Coutinho et al. |
| 10,406,422 B1 | 9/2019 | Pasternak et al. |
| 10,409,783 B1 | 9/2019 | Miller et al. |
| 10,409,827 B2 | 9/2019 | Kheterpal et al. |
| 10,410,209 B2 | 9/2019 | Boyle et al. |
| 10,410,211 B2 | 9/2019 | Reese et al. |
| 10,410,232 B1 | 9/2019 | Lueken |
| 10,410,604 B2 | 9/2019 | Greco et al. |
| 10,411,897 B2 | 9/2019 | Paolini-Subramanya et al. |
| 10,411,905 B2 | 9/2019 | Smith et al. |
| 10,412,086 B1 | 9/2019 | Lintilhac et al. |
| 10,412,113 B2 | 9/2019 | Hanley et al. |
| 10,412,185 B2 | 9/2019 | Lu |
| 10,412,536 B2 | 9/2019 | Gabel |
| 10,417,188 B2 | 9/2019 | King |
| 10,417,217 B2 | 9/2019 | Pierce et al. |
| 10,417,615 B2 | 9/2019 | Bowles et al. |
| 10,419,152 B2 | 9/2019 | Hanneman, Jr. |
| 10,419,209 B1 | 9/2019 | Griffin et al. |
| 10,419,225 B2 | 9/2019 | Deery et al. |
| 10,419,454 B2 | 9/2019 | El-Moussa et al. |
| 10,423,921 B2 | 9/2019 | Wilkinson et al. |
| 10,423,938 B1 | 9/2019 | Gaeta et al. |
| 10,423,947 B1 | 9/2019 | Baar et al. |
| 10,423,961 B1 | 9/2019 | El Defrawy et al. |
| 10,423,993 B2 | 9/2019 | Metnick |
| 10,424,125 B2 | 9/2019 | Hudson et al. |
| 10,424,140 B2 | 9/2019 | Johnson et al. |
| 10,424,149 B1 | 9/2019 | Halvorson |
| 10,424,164 B2 | 9/2019 | Kehoe |
| 10,425,230 B1 | 9/2019 | Tang et al. |
| 10,425,426 B1 | 9/2019 | Simons |
| 10,425,428 B2 | 9/2019 | Krishnamurthy |
| 10,425,436 B2 | 9/2019 | Firstenberg et al. |
| 10,425,698 B2 | 9/2019 | Briggs et al. |
| 10,430,162 B2 | 10/2019 | Roetteler et al. |
| 10,430,499 B2 | 10/2019 | Soon-Shiong et al. |
| 10,430,563 B2 | 10/2019 | Mintz et al. |
| 10,430,574 B2 | 10/2019 | Anderson et al. |
| 10,430,751 B2 | 10/2019 | Wilkinson et al. |
| 10,430,771 B2 | 10/2019 | Bonestell et al. |
| 10,430,789 B1 | 10/2019 | Herald, Jr. et al. |
| 10,430,874 B1 | 10/2019 | Lee et al. |
| 10,430,898 B2 | 10/2019 | Sun et al. |
| 10,432,402 B1 | 10/2019 | Griffin et al. |
| 10,432,411 B2 | 10/2019 | Barinov et al. |
| 10,433,112 B2 | 10/2019 | Santarone et al. |
| 10,435,185 B2 | 10/2019 | Divine et al. |
| 10,437,328 B2 | 10/2019 | Nelson |
| 10,437,630 B2 | 10/2019 | Curtis |
| 10,437,790 B1 | 10/2019 | Paterra et al. |
| 10,438,106 B2 | 10/2019 | Breed et al. |
| 10,438,170 B2 | 10/2019 | Kozloski et al. |
| 10,438,174 B2 | 10/2019 | Bowles et al. |
| 10,438,197 B2 | 10/2019 | Kote |
| 10,438,198 B1 | 10/2019 | Griffin et al. |
| 10,438,207 B2 | 10/2019 | Subhedar et al. |
| 10,438,209 B2 | 10/2019 | Kurian |
| 10,438,249 B2 | 10/2019 | Briggs et al. |
| 10,438,290 B1 | 10/2019 | Winklevoss et al. |
| 10,440,101 B2 | 10/2019 | Kurian et al. |
| 10,444,818 B1 | 10/2019 | McNamara et al. |
| 10,445,643 B2 | 10/2019 | Katz et al. |
| 10,445,698 B2 | 10/2019 | Hunn |
| 10,445,708 B2 | 10/2019 | Hunt et al. |
| 10,445,709 B2 | 10/2019 | McDonald et al. |
| 10,445,732 B2 | 10/2019 | Oberheide et al. |
| 10,445,754 B2 | 10/2019 | Snider et al. |
| 10,445,836 B2 | 10/2019 | Hertz et al. |
| 10,445,963 B2 | 10/2019 | Brandwijk |
| 10,445,965 B2 | 10/2019 | Ivanov et al. |
| 10,446,037 B2 | 10/2019 | Kentley-Klay et al. |
| 10,447,478 B2 | 10/2019 | Gray |
| 10,447,480 B2 | 10/2019 | Alas et al. |
| 10,447,664 B2 | 10/2019 | Haldenby et al. |
| 10,447,696 B2 | 10/2019 | Armknecht et al. |
| 10,448,064 B1 | 10/2019 | Allen |
| 10,448,251 B1 | 10/2019 | Maria |
| 10,452,127 B1 | 10/2019 | McNamara et al. |
| 10,452,863 B2 | 10/2019 | Miller |
| 10,453,065 B2 | 10/2019 | Wagner |
| 10,453,319 B2 | 10/2019 | Jarvis et al. |
| 10,454,878 B2 | 10/2019 | Khan et al. |
| 10,454,927 B2 | 10/2019 | Oberhauser et al. |
| 10,454,933 B2 | 10/2019 | Chenard et al. |
| 10,454,970 B2 | 10/2019 | Anton et al. |
| 10,455,742 B2 | 10/2019 | Yu et al. |
| 10,459,946 B2 | 10/2019 | Madisetti et al. |
| 10,459,990 B1 | 10/2019 | Li et al. |
| 10,460,118 B2 | 10/2019 | Hamel et al. |
| 10,460,283 B2 | 10/2019 | Madisetti et al. |
| 10,460,312 B1 | 10/2019 | Kurani et al. |
| 10,460,313 B1 | 10/2019 | Clark |
| 10,460,394 B2 | 10/2019 | Perl et al. |
| 10,461,940 B2 | 10/2019 | Cheng et al. |
| 10,462,153 B2 | 10/2019 | Stocker |
| 10,462,174 B2 | 10/2019 | Kaplan et al. |
| 10,462,185 B2 | 10/2019 | Attfield et al. |
| 10,466,277 B1 | 11/2019 | Brooks |
| 10,467,353 B2 | 11/2019 | Santarone et al. |
| 10,467,391 B1 | 11/2019 | Bertsch et al. |
| 10,467,506 B2 | 11/2019 | Tyrrell |
| 10,467,586 B2 | 11/2019 | Fuller et al. |
| 10,467,694 B2 | 11/2019 | Katsuyama et al. |
| 10,467,861 B2 | 11/2019 | Aleksey |
| 10,469,248 B2 | 11/2019 | Chalakudi et al. |
| 10,469,250 B2 | 11/2019 | Rady |
| 10,469,264 B2 | 11/2019 | Uhr et al. |
| 10,469,487 B1 | 11/2019 | Griffin et al. |
| 10,469,507 B2 | 11/2019 | El-Moussa et al. |
| 10,469,525 B2 | 11/2019 | Hittel et al. |
| 10,474,640 B1 | 11/2019 | Roche, Jr. |
| 10,474,836 B1 | 11/2019 | Cieslak et al. |
| 10,474,945 B2 | 11/2019 | McDonald et al. |
| 10,475,002 B2 | 11/2019 | Silva et al. |
| 10,475,030 B2 | 11/2019 | Castinado et al. |
| 10,475,062 B2 | 11/2019 | Narayanam et al. |
| 10,475,092 B1 | 11/2019 | Patterson |
| 10,475,115 B2 | 11/2019 | Minsley et al. |
| 10,475,272 B2 | 11/2019 | Campero et al. |
| 10,475,273 B2 | 11/2019 | Campero et al. |
| 10,475,275 B1 | 11/2019 | Halvorson |
| 10,475,287 B2 | 11/2019 | Daumling et al. |
| 10,476,665 B1 | 11/2019 | Griffin et al. |
| 10,476,701 B2 | 11/2019 | Wang et al. |
| 10,476,847 B1 | 11/2019 | Smith et al. |
| 10,476,879 B2 | 11/2019 | Bathen et al. |
| 10,476,907 B2 | 11/2019 | Hittel et al. |
| 10,482,288 B2 | 11/2019 | Rice |
| 10,482,446 B2 | 11/2019 | Cooper et al. |

(56) References Cited

U.S. PATENT DOCUMENTS

| | | |
|---|---|---|
| 10,482,470 B2 | 11/2019 | Larson et al. |
| 10,482,538 B1 | 11/2019 | White et al. |
| 10,484,168 B2 | 11/2019 | Ford et al. |
| 10,484,178 B2 | 11/2019 | Andrade |
| 10,484,341 B1 | 11/2019 | Todd et al. |
| 10,484,346 B2 | 11/2019 | Russinovich et al. |
| 10,484,376 B1 | 11/2019 | Laucius et al. |
| 10,484,413 B2 | 11/2019 | Kar et al. |
| 10,484,415 B1 | 11/2019 | Peterson |
| 10,489,385 B2 | 11/2019 | Baird, III et al. |
| 10,489,485 B2 | 11/2019 | Wu et al. |
| 10,489,709 B2 | 11/2019 | Katz et al. |
| 10,489,757 B2 | 11/2019 | Melika et al. |
| 10,489,780 B2 | 11/2019 | Miller et al. |
| 10,489,834 B2 | 11/2019 | Gupta |
| 10,489,837 B2 | 11/2019 | Degaugue et al. |
| 10,491,375 B2 | 11/2019 | Maggu et al. |
| 10,491,378 B2 | 11/2019 | Binning et al. |
| 10,491,396 B2 | 11/2019 | Uhr et al. |
| 10,491,402 B2 | 11/2019 | Kaehler |
| 10,491,404 B1 | 11/2019 | Yamamoto |
| 10,491,414 B1 | 11/2019 | Weed et al. |
| 10,491,608 B1 | 11/2019 | Tatge et al. |
| 10,492,337 B2 | 11/2019 | Kim |
| 10,493,996 B2 | 12/2019 | Phillips et al. |
| 10,496,327 B1 | 12/2019 | Paterra et al. |
| 10,496,633 B2 | 12/2019 | Pattanaik et al. |
| 10,496,914 B2 | 12/2019 | Scaife et al. |
| 10,496,923 B2 | 12/2019 | Katz et al. |
| 10,496,963 B2 | 12/2019 | Silva et al. |
| 10,496,976 B2 | 12/2019 | Singh et al. |
| 10,496,989 B2 | 12/2019 | Castinado et al. |
| 10,496,994 B2 | 12/2019 | Hopper |
| 10,497,037 B2 | 12/2019 | Isaacson et al. |
| 10,497,209 B2 | 12/2019 | Macdonald |
| 10,497,325 B1 | 12/2019 | Staton et al. |
| 10,498,535 B2 | 12/2019 | Bohli et al. |
| 10,498,541 B2 | 12/2019 | Ebrahimi et al. |
| 10,498,542 B2 | 12/2019 | Ebrahimi et al. |
| 10,499,525 B1 | 12/2019 | Singh |
| 10,503,614 B2 | 12/2019 | Abraham et al. |
| 10,503,750 B2 | 12/2019 | Curtis |
| 10,503,933 B2 | 12/2019 | Auh |
| 10,504,080 B2 | 12/2019 | Melika et al. |
| 10,504,163 B2 | 12/2019 | Dogin et al. |
| 10,504,178 B2 | 12/2019 | Pierce et al. |
| 10,504,179 B1 | 12/2019 | McGuire et al. |
| 10,504,193 B2 | 12/2019 | Isaacson et al. |
| 10,504,314 B2 | 12/2019 | Ivanov et al. |
| 10,504,843 B2 | 12/2019 | de Rochemont |
| 10,505,708 B2 | 12/2019 | Xia |
| 10,505,717 B2 | 12/2019 | Davis |
| 10,505,720 B2 | 12/2019 | Li |
| 10,505,723 B1 | 12/2019 | Griffin et al. |
| 10,505,726 B1 | 12/2019 | Andon et al. |
| 10,505,740 B2 | 12/2019 | Struttmann et al. |
| 10,505,949 B2 | 12/2019 | Zhang |
| 10,507,787 B2 | 12/2019 | Ferguson et al. |
| 10,509,919 B1 | 12/2019 | Wang et al. |
| 10,509,932 B2 | 12/2019 | Ebrahimi et al. |
| 10,510,034 B2 | 12/2019 | Larson et al. |
| 10,510,053 B2 | 12/2019 | Armstrong |
| 10,510,079 B2 | 12/2019 | Larson et al. |
| 10,510,441 B2 | 12/2019 | Wall Warner et al. |
| 10,511,447 B1 | 12/2019 | Lakk |
| 10,511,580 B2 | 12/2019 | Isaacson et al. |
| 10,511,686 B2 | 12/2019 | Orbach |
| 10,511,827 B2 | 12/2019 | Peeters et al. |
| 10,512,839 B2 | 12/2019 | Nelson et al. |
| 10,512,843 B1 | 12/2019 | Cunningham et al. |
| 10,515,333 B2 | 12/2019 | Vivier |
| 10,515,409 B2 | 12/2019 | Creighton, IV et al. |
| 10,515,516 B1 | 12/2019 | Eckman et al. |
| 10,518,178 B1 | 12/2019 | Cunningham et al. |
| 10,518,409 B2 | 12/2019 | Oleynik |
| 10,521,593 B2 | 12/2019 | Kaplan et al. |
| 10,521,604 B2 | 12/2019 | Miller |
| 10,521,623 B2 | 12/2019 | Rodriguez et al. |
| 10,521,775 B2 | 12/2019 | Hearn et al. |
| 10,521,814 B1 | 12/2019 | Collins et al. |
| 10,521,973 B2 | 12/2019 | Bekas et al. |
| 10,522,006 B2 | 12/2019 | Alexander |
| 10,522,016 B2 | 12/2019 | Strulovitch et al. |
| 10,522,112 B2 | 12/2019 | Greco et al. |
| 10,523,421 B2 | 12/2019 | Hunt et al. |
| 10,523,443 B1 | 12/2019 | Kleinman |
| 10,523,447 B2 | 12/2019 | Yang |
| 10,523,526 B2 | 12/2019 | Dementev et al. |
| 10,523,643 B1 | 12/2019 | Davis et al. |
| 10,526,142 B2 | 1/2020 | Jin et al. |
| 10,528,377 B2 | 1/2020 | Vyas et al. |
| 10,528,551 B2 | 1/2020 | Li et al. |
| 10,528,722 B2 | 1/2020 | Gray |
| 10,528,776 B1 | 1/2020 | Levy et al. |
| 10,528,868 B2 | 1/2020 | Gillespie |
| 10,528,924 B2 | 1/2020 | Schwartz |
| 10,528,947 B2 | 1/2020 | Sheerin |
| 10,529,015 B1 | 1/2020 | Hill et al. |
| 10,529,041 B2 | 1/2020 | Brown et al. |
| 10,529,042 B2 | 1/2020 | Brown et al. |
| 10,529,190 B1 | 1/2020 | Halvorson |
| 10,530,577 B1 | 1/2020 | Pazhoor et al. |
| 10,530,585 B2 | 1/2020 | Lindell |
| 10,530,734 B2 | 1/2020 | Kaliski, Jr. et al. |
| 10,530,756 B1 | 1/2020 | Youngs et al. |
| 10,530,834 B2 | 1/2020 | Tian |
| 10,530,859 B1 | 1/2020 | Todd |
| 10,531,230 B2 | 1/2020 | Wootton et al. |
| 10,532,268 B2 | 1/2020 | Tran et al. |
| 10,534,634 B2 | 1/2020 | Yang et al. |
| 10,534,913 B2 | 1/2020 | Daniel et al. |
| 10,535,063 B2 | 1/2020 | Lingham et al. |
| 10,535,065 B2 | 1/2020 | Muftic |
| 10,535,111 B2 | 1/2020 | O'Brien |
| 10,535,207 B1 | 1/2020 | Goluguri et al. |
| 10,536,265 B2 | 1/2020 | Tong |
| 10,536,430 B2 | 1/2020 | Liu et al. |
| 10,536,434 B2 | 1/2020 | Kothavale et al. |
| 10,536,445 B1 | 1/2020 | Lerner |
| 10,536,482 B2 | 1/2020 | Gabaev et al. |
| 10,538,034 B2 | 1/2020 | Walker et al. |
| 10,540,209 B2 | 1/2020 | Wang |
| 10,540,344 B2 | 1/2020 | Shen et al. |
| 10,540,514 B1 | 1/2020 | Winarski |
| 10,540,619 B2 | 1/2020 | Castle et al. |
| 10,540,639 B2 | 1/2020 | Brock et al. |
| 10,540,640 B1 | 1/2020 | James et al. |
| 10,540,653 B1 | 1/2020 | James et al. |
| 10,540,654 B1 | 1/2020 | James et al. |
| 10,540,671 B2 | 1/2020 | Glazier et al. |
| 10,541,806 B2 | 1/2020 | Rosenoer |
| 10,541,820 B2 | 1/2020 | Takada Chino et al. |
| 10,541,821 B2 | 1/2020 | Toll et al. |
| 10,542,030 B2 | 1/2020 | Oberheide et al. |
| 10,542,046 B2 | 1/2020 | Katragadda et al. |
| 10,542,060 B2 | 1/2020 | Xie et al. |
| 10,542,800 B2 | 1/2020 | Gross |
| 10,545,491 B2 | 1/2020 | Kingston et al. |
| 10,545,794 B2 | 1/2020 | Qiu |
| 10,546,296 B2 | 1/2020 | Narasimhan et al. |
| 10,546,326 B2 | 1/2020 | Publicover et al. |
| 10,547,401 B2 | 1/2020 | Yu |
| 10,547,441 B2 | 1/2020 | Di Nicola et al. |
| 10,547,446 B2 | 1/2020 | Sriram et al. |
| 10,547,457 B1 | 1/2020 | Duccini et al. |
| 10,547,594 B2 | 1/2020 | Chang et al. |
| 10,547,643 B2 | 1/2020 | Varley et al. |
| 10,547,981 B2 | 1/2020 | Ye et al. |
| 10,554,394 B1 | 2/2020 | Krut |
| 10,554,753 B2 | 2/2020 | Tormasov et al. |
| 10,572,679 B2 | 2/2020 | Frank et al. |
| 10,572,684 B2 | 2/2020 | LFever et al. |
| 10,581,805 B2 | 3/2020 | Simons et al. |
| 10,581,869 B2 | 3/2020 | Simons |

(56) References Cited

U.S. PATENT DOCUMENTS

| | | |
|---|---|---|
| 10,592,985 B2 | 3/2020 | Ford et al. |
| 10,593,157 B2 | 3/2020 | Simons |
| 10,594,484 B2 | 3/2020 | Rodriguez et al. |
| 10,600,006 B1 | 3/2020 | Wang et al. |
| 10,614,661 B2 | 4/2020 | Simons |
| 10,615,960 B2 | 4/2020 | Zhang et al. |
| 10,621,164 B1 | 4/2020 | Kain |
| 10,621,366 B2 | 4/2020 | Campagna et al. |
| 10,630,468 B1 | 4/2020 | Wang et al. |
| 10,630,477 B1 | 4/2020 | Ju et al. |
| 10,637,645 B2 | 4/2020 | Gray |
| 10,643,288 B2 | 5/2020 | Orsini et al. |
| 10,650,313 B2 | 5/2020 | Ackerman et al. |
| 10,652,014 B2 | 5/2020 | Wright et al. |
| 10,657,595 B2 | 5/2020 | de Jong et al. |
| 10,664,353 B2 | 5/2020 | Karame et al. |
| 10,664,591 B2 | 5/2020 | Gray |
| 10,664,835 B2 | 5/2020 | Ma et al. |
| 10,678,931 B2 | 6/2020 | Liu et al. |
| 10,680,800 B2 | 6/2020 | Zhang et al. |
| 10,681,033 B2 | 6/2020 | Gray |
| 10,685,399 B2 | 6/2020 | Snow et al. |
| 10,692,085 B2 | 6/2020 | Zagarese et al. |
| 10,700,850 B2 | 6/2020 | Ma et al. |
| 10,708,039 B1 | 7/2020 | Zhang et al. |
| 10,708,250 B2 | 7/2020 | Simons |
| 10,713,731 B2 | 7/2020 | Karame et al. |
| 10,715,317 B2 | 7/2020 | Chari et al. |
| 10,715,326 B2 | 7/2020 | Maim |
| 10,715,500 B2 | 7/2020 | Ma et al. |
| 10,719,623 B1 | 7/2020 | Miller et al. |
| 10,721,058 B2 | 7/2020 | Housholder et al. |
| 10,721,217 B2 | 7/2020 | Treat et al. |
| 10,721,240 B2 | 7/2020 | Gleichauf |
| 10,726,657 B2 | 7/2020 | Cui et al. |
| 10,728,283 B1 | 7/2020 | Dobrek et al. |
| 10,740,455 B2 | 8/2020 | Gray |
| 10,747,905 B2 | 8/2020 | Gray |
| 10,748,370 B2 | 8/2020 | Cui et al. |
| 10,748,644 B2 | 8/2020 | Shriberg et al. |
| 10,749,687 B2 | 8/2020 | Gray |
| 10,749,848 B2 | 8/2020 | Voell et al. |
| 10,755,276 B2 | 8/2020 | Ma |
| 10,761,877 B2 | 9/2020 | Peffers et al. |
| 10,762,228 B2 | 9/2020 | Liu et al. |
| 10,762,506 B1 | 9/2020 | Cash et al. |
| 10,778,410 B2 | 9/2020 | Han et al. |
| 10,789,590 B2 | 9/2020 | Tran et al. |
| 10,790,961 B2 | 9/2020 | Lin |
| 10,790,964 B2 | 9/2020 | Chopra et al. |
| 10,790,987 B2 | 9/2020 | Zhang et al. |
| 10,790,990 B2 | 9/2020 | Zhang |
| 10,797,887 B2 | 10/2020 | Zhang |
| 10,803,205 B1 | 10/2020 | Yu et al. |
| 10,803,451 B2 | 10/2020 | Peikert et al. |
| 10,810,550 B1 | 10/2020 | Narayanan |
| 10,810,583 B2 | 10/2020 | Peikert et al. |
| 10,812,274 B2 | 10/2020 | Back et al. |
| 10,817,872 B2 | 10/2020 | Lin |
| 10,819,505 B2 | 10/2020 | Ma et al. |
| 10,819,959 B2 | 10/2020 | Palazzolo |
| 10,824,763 B2 | 11/2020 | Yu |
| 10,825,024 B1 | 11/2020 | Pennington et al. |
| 10,825,295 B2 | 11/2020 | Simons |
| 10,831,903 B2 | 11/2020 | Li et al. |
| 10,832,522 B2 | 11/2020 | Simons |
| 10,833,858 B2 | 11/2020 | Gray |
| 10,839,107 B2 | 11/2020 | Wei et al. |
| 10,839,411 B2 | 11/2020 | Benoliel et al. |
| 10,841,100 B2 | 11/2020 | Lam et al. |
| 10,846,372 B1 | 11/2020 | Jayachandran et al. |
| 10,853,592 B2 | 12/2020 | Rodriguez et al. |
| 10,855,455 B2 | 12/2020 | Wang et al. |
| 10,861,016 B2 | 12/2020 | Ma |
| 10,868,865 B2 | 12/2020 | Shadmon et al. |
| 10,872,487 B2 | 12/2020 | Komo et al. |
| 10,878,108 B1 | 12/2020 | Nicolas et al. |
| 10,878,429 B2 | 12/2020 | Bakalis |
| 10,880,089 B2 | 12/2020 | Brown et al. |
| 10,885,203 B2 | 1/2021 | Li et al. |
| 10,885,735 B2 | 1/2021 | Cui et al. |
| 10,887,100 B2 | 1/2021 | Wentz |
| 10,887,104 B1 | 1/2021 | Jayachandran et al. |
| 10,892,888 B2 | 1/2021 | Ma et al. |
| 10,892,894 B2 | 1/2021 | Baughman et al. |
| 10,904,000 B2 | 1/2021 | Gray |
| 11,068,978 B1 * | 7/2021 | Ferreira ............... H04L 9/3239 |
| 2001/0034640 A1 | 10/2001 | Chaum |
| 2002/0007457 A1 | 1/2002 | Neff |
| 2002/0026345 A1 | 2/2002 | Juels |
| 2002/0049601 A1 | 4/2002 | Asokan |
| 2002/0073202 A1 | 6/2002 | Wang |
| 2002/0073318 A1 | 6/2002 | Gennaro et al. |
| 2002/0103999 A1 | 8/2002 | Camnisch et al. |
| 2002/0128978 A1 | 9/2002 | Neff |
| 2002/0131600 A1 | 9/2002 | Ionescu |
| 2002/0152252 A1 | 10/2002 | Kaminaga et al. |
| 2003/0028423 A1 | 2/2003 | Neff |
| 2003/0059041 A1 | 3/2003 | MacKenzie et al. |
| 2003/0074330 A1 | 4/2003 | Asokan et al. |
| 2003/0085997 A1 | 5/2003 | Takagi et al. |
| 2003/0191956 A1 | 10/2003 | Ishiguro et al. |
| 2004/0003278 A1 | 1/2004 | Chen et al. |
| 2004/0062399 A1 | 4/2004 | Takase |
| 2004/0193529 A1 * | 9/2004 | Asher ............... G06Q 30/0641 |
| | | 705/37 |
| 2004/0215828 A1 | 10/2004 | Li et al. |
| 2004/0246960 A1 | 12/2004 | Irish et al. |
| 2004/0264927 A1 | 12/2004 | Evans et al. |
| 2005/0005266 A1 | 1/2005 | Datig |
| 2005/0008152 A1 | 1/2005 | Mackenzie |
| 2005/0021479 A1 | 1/2005 | Jorba et al. |
| 2005/0028009 A1 | 2/2005 | Neff |
| 2005/0039034 A1 | 2/2005 | Doyle et al. |
| 2005/0099960 A1 | 5/2005 | Boss et al. |
| 2005/0108391 A1 | 5/2005 | Boss et al. |
| 2005/0138364 A1 | 6/2005 | Roskind et al. |
| 2005/0144468 A1 | 6/2005 | Northcutt et al. |
| 2005/0152596 A1 | 7/2005 | Walmsley |
| 2005/0153624 A1 | 7/2005 | Wieland et al. |
| 2005/0182937 A1 | 8/2005 | Bedi |
| 2005/0193048 A1 | 9/2005 | Vaudenay et al. |
| 2006/0015737 A1 | 1/2006 | Canard et al. |
| 2006/0052962 A1 | 3/2006 | Shipton et al. |
| 2006/0059333 A1 | 3/2006 | Gentry et al. |
| 2006/0063205 A1 | 3/2006 | Carlson |
| 2006/0071951 A1 | 4/2006 | Walmsley et al. |
| 2006/0071981 A1 | 4/2006 | Plunkett |
| 2006/0082609 A1 | 4/2006 | Walmsley et al. |
| 2006/0085647 A1 | 4/2006 | Neff |
| 2006/0085651 A1 | 4/2006 | Staddon et al. |
| 2006/0098814 A1 | 5/2006 | Al-Khoraidly et al. |
| 2006/0136728 A1 | 6/2006 | Gentry et al. |
| 2006/0137006 A1 | 6/2006 | Ramzan et al. |
| 2006/0140401 A1 | 6/2006 | Johnson et al. |
| 2006/0156392 A1 | 7/2006 | Baugher |
| 2006/0156416 A1 | 7/2006 | Huotari et al. |
| 2006/0167784 A1 | 7/2006 | Hoffberg |
| 2006/0190378 A1 | 8/2006 | Szydlo |
| 2006/0205011 A1 | 9/2006 | Carlson |
| 2006/0242699 A1 | 10/2006 | Ramzan et al. |
| 2006/0248334 A1 | 11/2006 | Ramzan et al. |
| 2007/0005594 A1 | 1/2007 | Pinkas et al. |
| 2007/0006150 A9 | 1/2007 | Walmsley |
| 2007/0016528 A1 | 1/2007 | Verhaegh et al. |
| 2007/0044139 A1 | 2/2007 | Tuyls et al. |
| 2007/0053506 A1 | 3/2007 | Takashima |
| 2007/0053507 A1 | 3/2007 | Smaragdis et al. |
| 2007/0053513 A1 | 3/2007 | Hoffberg |
| 2007/0074036 A1 | 3/2007 | Ramzan et al. |
| 2007/0079342 A1 | 4/2007 | Ellis et al. |
| 2007/0087756 A1 | 4/2007 | Hoffberg |
| 2007/0095909 A1 | 5/2007 | Chaum |
| 2007/0106908 A1 | 5/2007 | Miyazaki et al. |

(56) References Cited

U.S. PATENT DOCUMENTS

| | | |
|---|---|---|
| 2007/0116283 A1 | 5/2007 | Tuyls et al. |
| 2007/0118746 A1 | 5/2007 | Lauter et al. |
| 2007/0150404 A1 | 6/2007 | Golle |
| 2007/0150596 A1 | 6/2007 | Miller et al. |
| 2007/0156553 A1 | 7/2007 | Zimmerman |
| 2007/0156586 A1 | 7/2007 | Kerschbaum |
| 2007/0171050 A1 | 7/2007 | Westhoff et al. |
| 2007/0171851 A1 | 7/2007 | Beckmann et al. |
| 2007/0185878 A1 | 8/2007 | Fierstein et al. |
| 2007/0189519 A1 | 8/2007 | Neff |
| 2007/0192864 A1 | 8/2007 | Bryant et al. |
| 2007/0219933 A1 | 9/2007 | Datig |
| 2007/0220279 A1 | 9/2007 | Northcutt et al. |
| 2007/0233602 A1 | 10/2007 | Zweig et al. |
| 2007/0233606 A1 | 10/2007 | Zweig et al. |
| 2007/0234431 A1 | 10/2007 | Evans et al. |
| 2007/0248232 A1 | 10/2007 | Driscoll et al. |
| 2007/0250718 A1 | 10/2007 | Lee et al. |
| 2007/0280482 A1 | 12/2007 | Yan et al. |
| 2007/0299952 A1 | 12/2007 | Goodman et al. |
| 2008/0000969 A1 | 1/2008 | Salomonsen et al. |
| 2008/0002578 A1 | 1/2008 | Coffman et al. |
| 2008/0006615 A1 | 1/2008 | Rosario et al. |
| 2008/0034203 A1 | 2/2008 | Camnisch et al. |
| 2008/0037785 A1 | 2/2008 | Gantman et al. |
| 2008/0059791 A1 | 3/2008 | Lee et al. |
| 2008/0063210 A1 | 3/2008 | Goodman et al. |
| 2008/0065882 A1 | 3/2008 | Goodman et al. |
| 2008/0065903 A1 | 3/2008 | Goodman et al. |
| 2008/0086757 A1 | 4/2008 | Pestoni |
| 2008/0114681 A1 | 5/2008 | Staddon et al. |
| 2008/0114682 A1 | 5/2008 | Staddon et al. |
| 2008/0126801 A1 | 5/2008 | Lee et al. |
| 2008/0130902 A1 | 6/2008 | Foo Kune et al. |
| 2008/0137863 A1 | 6/2008 | Thomas |
| 2008/0140577 A1 | 6/2008 | Rahman et al. |
| 2008/0159294 A1 | 7/2008 | Irish et al. |
| 2008/0165956 A1 | 7/2008 | Zhu et al. |
| 2008/0172233 A1 | 7/2008 | Smaragdis et al. |
| 2008/0172333 A1 | 7/2008 | Neff |
| 2008/0201398 A1 | 8/2008 | Meyer |
| 2008/0208560 A1 | 8/2008 | Johnson et al. |
| 2008/0212780 A1 | 9/2008 | Lemma et al. |
| 2008/0215897 A1 | 9/2008 | Doyle et al. |
| 2008/0216051 A1 | 9/2008 | Johnson et al. |
| 2008/0262893 A1 | 10/2008 | Hoffberg |
| 2008/0273696 A1 | 11/2008 | Greco et al. |
| 2008/0273697 A1 | 11/2008 | Greco et al. |
| 2008/0280559 A1 | 11/2008 | Dandekar et al. |
| 2008/0292104 A1 | 11/2008 | Loc'H et al. |
| 2008/0294909 A1 | 11/2008 | Ostrovsky et al. |
| 2008/0301448 A1 | 12/2008 | Charles et al. |
| 2008/0304657 A1 | 12/2008 | Tuyls et al. |
| 2008/0313264 A1 | 12/2008 | Pestoni |
| 2008/0313691 A1 | 12/2008 | Cholas et al. |
| 2008/0320300 A1 | 12/2008 | Gkantsidis et al. |
| 2009/0006855 A1 | 1/2009 | Tuyls et al. |
| 2009/0028322 A1 | 1/2009 | Goodman et al. |
| 2009/0028336 A1 | 1/2009 | Goodman et al. |
| 2009/0028339 A1 | 1/2009 | Goodman et al. |
| 2009/0062942 A1 | 3/2009 | Smaragdis et al. |
| 2009/0074006 A1 | 3/2009 | Qi et al. |
| 2009/0077444 A1 | 3/2009 | Qi et al. |
| 2009/0083279 A1 | 3/2009 | Hasek |
| 2009/0083546 A1 | 3/2009 | Staddon et al. |
| 2009/0089789 A1 | 4/2009 | Faltings et al. |
| 2009/0094464 A1 | 4/2009 | Futa et al. |
| 2009/0097642 A1 | 4/2009 | Schnell et al. |
| 2009/0109916 A1 | 4/2009 | Berg et al. |
| 2009/0119518 A1 | 5/2009 | Staddon et al. |
| 2009/0136033 A1 | 5/2009 | Sy |
| 2009/0138486 A1 | 5/2009 | Hydrie et al. |
| 2009/0150982 A1 | 6/2009 | Kim |
| 2009/0158054 A1 | 6/2009 | Dijk et al. |
| 2009/0177591 A1 | 7/2009 | Thorpe et al. |
| 2009/0182667 A1 | 7/2009 | Parkes et al. |
| 2009/0182997 A1 | 7/2009 | Gillard et al. |
| 2009/0187757 A1 | 7/2009 | Kerschbaum |
| 2009/0196304 A1 | 8/2009 | Sayenko |
| 2009/0207819 A1 | 8/2009 | Kroselberg et al. |
| 2009/0216970 A1 | 8/2009 | Basler et al. |
| 2009/0221439 A1 | 9/2009 | Carlson |
| 2009/0238365 A1 | 9/2009 | Bardera Bosch et al. |
| 2009/0252327 A1 | 10/2009 | Ciet et al. |
| 2009/0259843 A1 | 10/2009 | Gentry et al. |
| 2009/0265547 A1 | 10/2009 | Gentry et al. |
| 2009/0265548 A1 | 10/2009 | Gentry et al. |
| 2009/0265737 A1 | 10/2009 | Issa et al. |
| 2009/0268908 A1 | 10/2009 | Bikel et al. |
| 2009/0276841 A1 | 11/2009 | Guo et al. |
| 2009/0279694 A1 | 11/2009 | Takahashi et al. |
| 2009/0282039 A1 | 11/2009 | Diamond |
| 2009/0287924 A1 | 11/2009 | Gentry et al. |
| 2009/0310582 A1 | 12/2009 | Beser |
| 2009/0319802 A1 | 12/2009 | Walmsley |
| 2009/0325575 A1 | 12/2009 | Rantanen et al. |
| 2009/0327141 A1 | 12/2009 | Rabin et al. |
| 2010/0005309 A1 | 1/2010 | Gentry et al. |
| 2010/0005310 A1 | 1/2010 | Gentry et al. |
| 2010/0027784 A1 | 2/2010 | Tuyls et al. |
| 2010/0042828 A1 | 2/2010 | Masui et al. |
| 2010/0067462 A1 | 3/2010 | Beser et al. |
| 2010/0080152 A1 | 4/2010 | Lindh et al. |
| 2010/0093364 A1 | 4/2010 | Ribeiro et al. |
| 2010/0111296 A1 | 5/2010 | Brown et al. |
| 2010/0119069 A1 | 5/2010 | Kamikura et al. |
| 2010/0138671 A1 | 6/2010 | Kim et al. |
| 2010/0138882 A1 | 6/2010 | Ellis et al. |
| 2010/0142704 A1 | 6/2010 | Camenisch et al. |
| 2010/0146299 A1 | 6/2010 | Swaminathan et al. |
| 2010/0153714 A1 | 6/2010 | Ramzan et al. |
| 2010/0161998 A1 | 6/2010 | Chen et al. |
| 2010/0174904 A1 | 7/2010 | Ramzan et al. |
| 2010/0185863 A1 | 7/2010 | Rabin et al. |
| 2010/0199090 A1 | 8/2010 | Berbain et al. |
| 2010/0205430 A1 | 8/2010 | Chiou et al. |
| 2010/0217613 A1 | 8/2010 | Kelly |
| 2010/0218037 A1 | 8/2010 | Swartz et al. |
| 2010/0220643 A1 | 9/2010 | Qi et al. |
| 2010/0223057 A1 | 9/2010 | Capman et al. |
| 2010/0234022 A1 | 9/2010 | Winterbottom |
| 2010/0235285 A1 | 9/2010 | Hoffberg |
| 2010/0246812 A1 | 9/2010 | Rane et al. |
| 2010/0267386 A1 | 10/2010 | Lim et al. |
| 2010/0278221 A1 | 11/2010 | Qi et al. |
| 2010/0281267 A1 | 11/2010 | Sakumoto |
| 2010/0281269 A1 | 11/2010 | Kindarji et al. |
| 2010/0287370 A1 | 11/2010 | Gentry et al. |
| 2010/0290617 A1 | 11/2010 | Nath |
| 2010/0293293 A1 | 11/2010 | Beser |
| 2010/0317420 A1 | 12/2010 | Hoffberg |
| 2010/0329448 A1 | 12/2010 | Rane et al. |
| 2010/0329454 A1 | 12/2010 | Takashima |
| 2011/0004513 A1 | 1/2011 | Hoffberg |
| 2011/0026781 A1 | 2/2011 | Osadchy et al. |
| 2011/0039589 A1 | 2/2011 | Skov |
| 2011/0040820 A1 | 2/2011 | Rane et al. |
| 2011/0041178 A1 | 2/2011 | Jakobsson et al. |
| 2011/0041180 A1 | 2/2011 | Jakobsson et al. |
| 2011/0051931 A1 | 3/2011 | Farrugia et al. |
| 2011/0055300 A1 | 3/2011 | Sun et al. |
| 2011/0060901 A1 | 3/2011 | Troncoso Pastoriza et al. |
| 2011/0060917 A1 | 3/2011 | Troncoso Pastoriza et al. |
| 2011/0060918 A1 | 3/2011 | Troncoso Pastoriza et al. |
| 2011/0067012 A1 | 3/2011 | Eisen et al. |
| 2011/0069630 A1 | 3/2011 | Doppler et al. |
| 2011/0074850 A1 | 3/2011 | Walmsley et al. |
| 2011/0085658 A1 | 4/2011 | Kerschbaum |
| 2011/0087885 A1 | 4/2011 | Lerner |
| 2011/0090879 A1 | 4/2011 | Hamiti et al. |
| 2011/0103253 A1 | 5/2011 | Qi et al. |
| 2011/0103374 A1 | 5/2011 | Lajoie et al. |
| 2011/0107105 A1 | 5/2011 | Hada |
| 2011/0107364 A1 | 5/2011 | Lajoie et al. |

(56) References Cited

U.S. PATENT DOCUMENTS

| | | |
|---|---|---|
| 2011/0107379 A1 | 5/2011 | Lajoie et al. |
| 2011/0110525 A1 | 5/2011 | Gentry |
| 2011/0135096 A1 | 6/2011 | Rane et al. |
| 2011/0154016 A1 | 6/2011 | Niccolini et al. |
| 2011/0202766 A1 | 8/2011 | Lerner |
| 2011/0211692 A1 | 9/2011 | Raykova et al. |
| 2011/0213962 A1 | 9/2011 | Pestoni |
| 2011/0219067 A1 | 9/2011 | Bernosky et al. |
| 2011/0231555 A1 | 9/2011 | Ebrahimi et al. |
| 2011/0243320 A1 | 10/2011 | Halevi et al. |
| 2011/0243324 A1 | 10/2011 | Lima et al. |
| 2011/0255687 A1 | 10/2011 | Farrugia et al. |
| 2011/0264920 A1 | 10/2011 | Rieffel et al. |
| 2011/0283099 A1 | 11/2011 | Nath et al. |
| 2011/0289311 A1 | 11/2011 | Roy-Chowdhury et al. |
| 2011/0295752 A1 | 12/2011 | Parkes et al. |
| 2011/0296438 A1 | 12/2011 | Lue-Sang et al. |
| 2011/0296481 A1 | 12/2011 | Cholas et al. |
| 2012/0002811 A1 | 1/2012 | Smart |
| 2012/0005719 A1 | 1/2012 | McDougal |
| 2012/0009939 A1 | 1/2012 | Islam et al. |
| 2012/0009949 A1 | 1/2012 | Islam et al. |
| 2012/0009950 A1 | 1/2012 | Islam et al. |
| 2012/0030468 A1 | 2/2012 | Papamanthou et al. |
| 2012/0039463 A1 | 2/2012 | Gentry et al. |
| 2012/0039465 A1 | 2/2012 | Gentry et al. |
| 2012/0039473 A1 | 2/2012 | Gentry et al. |
| 2012/0045056 A1 | 2/2012 | Takashima et al. |
| 2012/0063593 A1 | 3/2012 | Camenisch et al. |
| 2012/0072737 A1 | 3/2012 | Schrijen et al. |
| 2012/0089494 A1 | 4/2012 | Danezis et al. |
| 2012/0102335 A1 | 4/2012 | Goodman et al. |
| 2012/0114123 A1 | 5/2012 | Garcia Morchon et al. |
| 2012/0121080 A1 | 5/2012 | Kerschbaum |
| 2012/0124393 A1 | 5/2012 | Sethumadhavan et al. |
| 2012/0127890 A1 | 5/2012 | Islam |
| 2012/0129550 A1 | 5/2012 | Hannan et al. |
| 2012/0129551 A1 | 5/2012 | Islam |
| 2012/0143922 A1 | 6/2012 | Rane et al. |
| 2012/0144186 A1 | 6/2012 | Puiggali Allepuz et al. |
| 2012/0144459 A1 | 6/2012 | Nguyen et al. |
| 2012/0163222 A1 | 6/2012 | Islam et al. |
| 2012/0163584 A1 | 6/2012 | Adjedj |
| 2012/0172050 A1 | 7/2012 | Ledlie et al. |
| 2012/0185437 A1 | 7/2012 | Pavlov et al. |
| 2012/0198560 A1 | 8/2012 | Fiske |
| 2012/0201378 A1 | 8/2012 | Nabeel et al. |
| 2012/0204026 A1 | 8/2012 | Shi et al. |
| 2012/0207299 A1 | 8/2012 | Hattori et al. |
| 2012/0209790 A1 | 8/2012 | Szydlo |
| 2012/0213359 A1 | 8/2012 | Troncoso Pastoriza et al. |
| 2012/0215845 A1 | 8/2012 | Aad et al. |
| 2012/0224474 A1 | 9/2012 | Beser |
| 2012/0224688 A1 | 9/2012 | Rodgers et al. |
| 2012/0226900 A1 | 9/2012 | Rodgers et al. |
| 2012/0233460 A1 | 9/2012 | Kamara et al. |
| 2012/0239932 A1 | 9/2012 | Allepuz et al. |
| 2012/0239944 A1 | 9/2012 | Goodman et al. |
| 2012/0240062 A1 | 9/2012 | Passmore et al. |
| 2012/0260092 A1 | 10/2012 | Girao et al. |
| 2012/0260348 A1 | 10/2012 | Woodruff |
| 2012/0269348 A1 | 10/2012 | Rong et al. |
| 2012/0275592 A1 | 11/2012 | Zweig et al. |
| 2012/0278622 A1 | 11/2012 | Lesavich et al. |
| 2012/0284530 A1 | 11/2012 | Takashima et al. |
| 2012/0297198 A1 | 11/2012 | Danezis et al. |
| 2012/0297201 A1 | 11/2012 | Matsuda et al. |
| 2012/0317034 A1 | 12/2012 | Guha et al. |
| 2012/0317656 A1 | 12/2012 | Woodruff |
| 2012/0323981 A1 | 12/2012 | Yamamoto et al. |
| 2013/0010686 A1 | 1/2013 | Shatzkamer et al. |
| 2013/0010950 A1 | 1/2013 | Kerschbaum |
| 2013/0011215 A1 | 1/2013 | Wells et al. |
| 2013/0014270 A1 | 1/2013 | Sy et al. |
| 2013/0024689 A1 | 1/2013 | Liu et al. |
| 2013/0024693 A1 | 1/2013 | Chiou et al. |
| 2013/0024933 A1 | 1/2013 | Jakobsson et al. |
| 2013/0024936 A1 | 1/2013 | Jakobsson et al. |
| 2013/0028415 A1 | 1/2013 | Takashima et al. |
| 2013/0035979 A1 | 2/2013 | Tenbrock |
| 2013/0039489 A1 | 2/2013 | Takashima et al. |
| 2013/0051551 A1 | 2/2013 | El Aimani |
| 2013/0061263 A1 | 3/2013 | Issa et al. |
| 2013/0080307 A1 | 3/2013 | Hoffberg |
| 2013/0085916 A1 | 4/2013 | Abbe et al. |
| 2013/0086378 A1 | 4/2013 | Yao et al. |
| 2013/0096943 A1 | 4/2013 | Carey et al. |
| 2013/0097431 A1 | 4/2013 | Hriljac |
| 2013/0111205 A1 | 5/2013 | Biswas |
| 2013/0114811 A1 | 5/2013 | Boufounos et al. |
| 2013/0148551 A1 | 6/2013 | Lindh et al. |
| 2013/0148868 A1 | 6/2013 | Troncoso Pastoriza et al. |
| 2013/0152160 A1 | 6/2013 | Smith et al. |
| 2013/0156188 A1 | 6/2013 | Xu et al. |
| 2013/0170640 A1 | 7/2013 | Gentry |
| 2013/0173917 A1 | 7/2013 | Clifton et al. |
| 2013/0173929 A1 | 7/2013 | Takashima et al. |
| 2013/0182848 A1 | 7/2013 | Sundaram et al. |
| 2013/0191650 A1 | 7/2013 | Balakrishnan et al. |
| 2013/0195267 A1 | 8/2013 | Alessio et al. |
| 2013/0198522 A1 | 8/2013 | Kohno et al. |
| 2013/0198854 A1 | 8/2013 | Erway et al. |
| 2013/0202109 A1 | 8/2013 | Ducharme |
| 2013/0205331 A1 | 8/2013 | Ducharme |
| 2013/0216044 A1 | 8/2013 | Gentry et al. |
| 2013/0227283 A1 | 8/2013 | Williamson et al. |
| 2013/0232567 A1 | 9/2013 | Kaid et al. |
| 2013/0238897 A1 | 9/2013 | Mashatan et al. |
| 2013/0246813 A1 | 9/2013 | Mori et al. |
| 2013/0247230 A1 | 9/2013 | Parann-Nissany et al. |
| 2013/0254532 A1 | 9/2013 | Raykova et al. |
| 2013/0268772 A1 | 10/2013 | Golle |
| 2013/0275743 A1 | 10/2013 | Jawurek et al. |
| 2013/0275752 A1 | 10/2013 | Zhang et al. |
| 2013/0279690 A1 | 10/2013 | Durham et al. |
| 2013/0283393 A1 | 10/2013 | Hierro et al. |
| 2013/0315390 A1 | 11/2013 | Gentry et al. |
| 2013/0318351 A1 | 11/2013 | Hirano et al. |
| 2013/0318360 A1 | 11/2013 | Yamamoto et al. |
| 2013/0318560 A1 | 11/2013 | Cholas et al. |
| 2013/0322627 A1 | 12/2013 | Takashima et al. |
| 2013/0324155 A1 | 12/2013 | Islam et al. |
| 2013/0326224 A1 | 12/2013 | Yavuz |
| 2013/0329883 A1 | 12/2013 | Tamayo-Rios |
| 2013/0336474 A1 | 12/2013 | Takashima et al. |
| 2013/0339743 A1 | 12/2013 | Hada |
| 2013/0339754 A1 | 12/2013 | Takashima et al. |
| 2013/0339814 A1 | 12/2013 | Rane et al. |
| 2014/0007087 A1 | 1/2014 | Scott-Nash et al. |
| 2014/0041039 A1 | 2/2014 | Saldamli et al. |
| 2014/0047544 A1 | 2/2014 | Jakobsson |
| 2014/0056426 A1 | 2/2014 | Ducharme |
| 2014/0059345 A1 | 2/2014 | Camenisch et al. |
| 2014/0059347 A1 | 2/2014 | Dougherty et al. |
| 2014/0075183 A1 | 3/2014 | Wang et al. |
| 2014/0081793 A1 | 3/2014 | Hoffberg |
| 2014/0090023 A1 | 3/2014 | Hu et al. |
| 2014/0090036 A1 | 3/2014 | Roberts |
| 2014/0093077 A1 | 4/2014 | Jawurek et al. |
| 2014/0095860 A1 | 4/2014 | Shikfa et al. |
| 2014/0095865 A1 | 4/2014 | Yerra et al. |
| 2014/0098960 A1 | 4/2014 | Xu et al. |
| 2014/0101765 A1 | 4/2014 | Jakobsson et al. |
| 2014/0108020 A1 | 4/2014 | Sharma et al. |
| 2014/0115090 A1 | 4/2014 | Hasek |
| 2014/0115321 A1 | 4/2014 | Isshiki |
| 2014/0115322 A1 | 4/2014 | Xu et al. |
| 2014/0121990 A1 | 5/2014 | Baldi et al. |
| 2014/0123301 A1 | 5/2014 | Kaliski, Jr. |
| 2014/0139608 A1 | 5/2014 | Rosario et al. |
| 2014/0140514 A1 | 5/2014 | Gentry |
| 2014/0142958 A1 | 5/2014 | Sharma et al. |
| 2014/0143369 A1 | 5/2014 | Dobre |
| 2014/0143764 A1 | 5/2014 | Kerschbaum |

(56) References Cited

U.S. PATENT DOCUMENTS

| | | |
|---|---|---|
| 2014/0143878 A1 | 5/2014 | Milman et al. |
| 2014/0143879 A1 | 5/2014 | Milman et al. |
| 2014/0153717 A1 | 6/2014 | Sakumoto |
| 2014/0164760 A1 | 6/2014 | Hybertson |
| 2014/0177828 A1 | 6/2014 | Loftus et al. |
| 2014/0185797 A1 | 7/2014 | Yasuda et al. |
| 2014/0185803 A1 | 7/2014 | Lima et al. |
| 2014/0189361 A1 | 7/2014 | Sakumoto |
| 2014/0189792 A1 | 7/2014 | Lesavich et al. |
| 2014/0195818 A1 | 7/2014 | Neumann et al. |
| 2014/0211943 A1 | 7/2014 | Nyang |
| 2014/0215217 A1 | 7/2014 | Gronowski et al. |
| 2014/0215222 A1 | 7/2014 | Sakumoto et al. |
| 2014/0228049 A1 | 8/2014 | Hannan et al. |
| 2014/0233726 A1 | 8/2014 | Yajima et al. |
| 2014/0233731 A1 | 8/2014 | Naccache et al. |
| 2014/0233740 A1 | 8/2014 | Niamut et al. |
| 2014/0237253 A1 | 8/2014 | Joye et al. |
| 2014/0237254 A1 | 8/2014 | Joye et al. |
| 2014/0247939 A1 | 9/2014 | Hattori et al. |
| 2014/0250301 A1 | 9/2014 | Chang et al. |
| 2014/0258396 A1 | 9/2014 | Miller |
| 2014/0270159 A1 | 9/2014 | Youn et al. |
| 2014/0273958 A1 | 9/2014 | Messana et al. |
| 2014/0281511 A1 | 9/2014 | Kaushik et al. |
| 2014/0281567 A1 | 9/2014 | Rane et al. |
| 2014/0289536 A1 | 9/2014 | MacCarthy et al. |
| 2014/0298028 A1 | 10/2014 | Takashima et al. |
| 2014/0310243 A1 | 10/2014 | McGee et al. |
| 2014/0310527 A1 | 10/2014 | Veugen et al. |
| 2014/0314232 A1 | 10/2014 | Fahrny |
| 2014/0321642 A1 | 10/2014 | El Aimani et al. |
| 2014/0321644 A1 | 10/2014 | Lemieux |
| 2014/0324447 A1 | 10/2014 | Dittus |
| 2014/0325217 A1 | 10/2014 | Mori et al. |
| 2014/0325230 A1 | 10/2014 | Sy et al. |
| 2014/0328279 A1 | 11/2014 | Beser |
| 2014/0331059 A1 | 11/2014 | Rane et al. |
| 2014/0334622 A1 | 11/2014 | Smyth et al. |
| 2014/0344575 A1 | 11/2014 | Saremi |
| 2014/0348326 A1 | 11/2014 | Meyer et al. |
| 2014/0351104 A1 | 11/2014 | Abbe et al. |
| 2014/0372769 A1 | 12/2014 | Kerschbaum et al. |
| 2014/0379991 A1 | 12/2014 | Lomet et al. |
| 2015/0006908 A1 | 1/2015 | Mori et al. |
| 2015/0010147 A1 | 1/2015 | Takashima et al. |
| 2015/0033033 A1 | 1/2015 | Halevi et al. |
| 2015/0033120 A1 | 1/2015 | Cooke et al. |
| 2015/0039586 A1 | 2/2015 | Kerschbaum et al. |
| 2015/0039912 A1 | 2/2015 | Payton et al. |
| 2015/0046450 A1 | 2/2015 | Yoshino et al. |
| 2015/0046708 A1 | 2/2015 | Yasuda et al. |
| 2015/0063563 A1 | 3/2015 | Vaya |
| 2015/0067336 A1 | 3/2015 | Ding |
| 2015/0067874 A1 | 3/2015 | Johnson et al. |
| 2015/0067875 A1 | 3/2015 | Johnson et al. |
| 2015/0074803 A1 | 3/2015 | Johnson et al. |
| 2015/0082425 A1 | 3/2015 | Johnson et al. |
| 2015/0089243 A1 | 3/2015 | Veugen |
| 2015/0089589 A1 | 3/2015 | Cucinotta et al. |
| 2015/0092667 A1 | 4/2015 | Beser et al. |
| 2015/0098566 A1 | 4/2015 | Takashima et al. |
| 2015/0100785 A1 | 4/2015 | Joye et al. |
| 2015/0100794 A1 | 4/2015 | Joye et al. |
| 2015/0111591 A1 | 4/2015 | Hoffberg |
| 2015/0121062 A1 | 4/2015 | Gajek et al. |
| 2015/0124962 A1 | 5/2015 | Gentry et al. |
| 2015/0135329 A1 | 5/2015 | Aghasaryan et al. |
| 2015/0143111 A1 | 5/2015 | Parann-Nissany et al. |
| 2015/0149767 A1 | 5/2015 | Oualha et al. |
| 2015/0149773 A1 | 5/2015 | Kerschbaum et al. |
| 2015/0154357 A1 | 6/2015 | Biswas et al. |
| 2015/0161398 A1 | 6/2015 | De Cristofaro et al. |
| 2015/0169889 A1 | 6/2015 | Swaminathan et al. |
| 2015/0170197 A1 | 6/2015 | Smith et al. |
| 2015/0172049 A1 | 6/2015 | Chida et al. |
| 2015/0172258 A1 | 6/2015 | Komano et al. |
| 2015/0172260 A1 | 6/2015 | Brenner |
| 2015/0181308 A1 | 6/2015 | Ducharme |
| 2015/0186683 A1 | 7/2015 | Fiske |
| 2015/0188949 A1 | 7/2015 | Mahaffey et al. |
| 2015/0193628 A1 | 7/2015 | Maniatakos et al. |
| 2015/0193633 A1 | 7/2015 | Chida et al. |
| 2015/0195083 A1 | 7/2015 | Jacquin et al. |
| 2015/0200840 A1 | 7/2015 | Beser |
| 2015/0205967 A1 | 7/2015 | Naedele et al. |
| 2015/0207630 A1 | 7/2015 | Shimoyama et al. |
| 2015/0207846 A1 | 7/2015 | Famaey et al. |
| 2015/0213239 A1 | 7/2015 | Johnson et al. |
| 2015/0215123 A1 | 7/2015 | Kipnis et al. |
| 2015/0215669 A1 | 7/2015 | Cholas et al. |
| 2015/0222422 A1 | 8/2015 | Yung et al. |
| 2015/0222648 A1 | 8/2015 | Kim et al. |
| 2015/0222938 A1 | 8/2015 | Hasek |
| 2015/0227930 A1 | 8/2015 | Quigley et al. |
| 2015/0229472 A1 | 8/2015 | Takashima et al. |
| 2015/0229480 A1 | 8/2015 | Joye et al. |
| 2015/0229619 A1 | 8/2015 | Costa et al. |
| 2015/0236849 A1 | 8/2015 | Ayday et al. |
| 2015/0237519 A1 | 8/2015 | Ghai |
| 2015/0244517 A1 | 8/2015 | Nita |
| 2015/0244710 A1 | 8/2015 | Koster et al. |
| 2015/0264626 A1 | 9/2015 | Perdomo |
| 2015/0264627 A1 | 9/2015 | Perdomo |
| 2015/0270952 A1 | 9/2015 | Sethumadhavan et al. |
| 2015/0270967 A1 | 9/2015 | Susella et al. |
| 2015/0271541 A1 | 9/2015 | Gonder et al. |
| 2015/0288519 A1 | 10/2015 | Tuyls et al. |
| 2015/0288662 A1 | 10/2015 | Bilogrevic et al. |
| 2015/0288665 A1 | 10/2015 | El Emam et al. |
| 2015/0294117 A1 | 10/2015 | Cucinotta et al. |
| 2015/0295712 A1 | 10/2015 | Veugen |
| 2015/0304329 A1 | 10/2015 | Yan et al. |
| 2015/0304851 A1 | 10/2015 | Chen et al. |
| 2015/0309863 A1 | 10/2015 | Shi et al. |
| 2015/0310228 A1 | 10/2015 | Benz et al. |
| 2015/0312031 A1 | 10/2015 | Seo et al. |
| 2015/0317362 A1 | 11/2015 | Teranishi |
| 2015/0326389 A1 | 11/2015 | Johnson et al. |
| 2015/0326392 A1 | 11/2015 | Cheng et al. |
| 2015/0333905 A1 | 11/2015 | Parann-Nissany et al. |
| 2015/0341173 A1 | 11/2015 | Camenisch et al. |
| 2015/0341174 A1 | 11/2015 | Mandal et al. |
| 2015/0341326 A1 | 11/2015 | Premnath et al. |
| 2015/0341335 A1 | 11/2015 | Camenisch et al. |
| 2015/0347435 A1 | 12/2015 | Pavlov et al. |
| 2015/0348087 A1 | 12/2015 | Cordery et al. |
| 2015/0356281 A1 | 12/2015 | Van Deventer et al. |
| 2015/0358153 A1 | 12/2015 | Gentry |
| 2015/0358167 A1 | 12/2015 | Wang et al. |
| 2015/0365227 A1 | 12/2015 | Billau et al. |
| 2015/0365435 A1 | 12/2015 | Billau et al. |
| 2015/0365440 A1 | 12/2015 | Billau et al. |
| 2015/0372809 A1 | 12/2015 | Lima et al. |
| 2015/0379301 A1 | 12/2015 | Lesavich et al. |
| 2015/0381348 A1 | 12/2015 | Takenaka et al. |
| 2015/0381349 A1 | 12/2015 | Nikolaenko et al. |
| 2015/0381350 A1 | 12/2015 | Joye et al. |
| 2015/0381588 A1 | 12/2015 | Huang et al. |
| 2016/0004874 A1 | 1/2016 | Ioannidis et al. |
| 2016/0004879 A1 | 1/2016 | Fisher et al. |
| 2016/0012238 A1 | 1/2016 | Ioannidis et al. |
| 2016/0012240 A1 | 1/2016 | Smith et al. |
| 2016/0013930 A1 | 1/2016 | Ducharme |
| 2016/0014456 A1 | 1/2016 | Ducharme |
| 2016/0019279 A1 | 1/2016 | Sengupta et al. |
| 2016/0020898 A1 | 1/2016 | Nikolaenko et al. |
| 2016/0020904 A1 | 1/2016 | Ioannidis et al. |
| 2016/0026807 A1 | 1/2016 | Antipa et al. |
| 2016/0028698 A1 | 1/2016 | Antipa et al. |
| 2016/0029076 A1 | 1/2016 | Huber et al. |
| 2016/0036584 A1 | 2/2016 | Nikolaenko et al. |
| 2016/0044003 A1 | 2/2016 | Raykova et al. |
| 2016/0063189 A1 | 3/2016 | Soon-Shiong et al. |

(56) References Cited

U.S. PATENT DOCUMENTS

| | | |
|---|---|---|
| 2016/0066027 A1 | 3/2016 | Ellis et al. |
| 2016/0072623 A1 | 3/2016 | Joye et al. |
| 2016/0072800 A1 | 3/2016 | Soon-Shiong et al. |
| 2016/0088012 A1 | 3/2016 | Casey et al. |
| 2016/0098198 A1 | 4/2016 | Bosshart et al. |
| 2016/0099872 A1 | 4/2016 | Kim et al. |
| 2016/0105400 A1 | 4/2016 | Straub |
| 2016/0105402 A1 | 4/2016 | Soon-Shiong et al. |
| 2016/0105414 A1 | 4/2016 | Bringer et al. |
| 2016/0110403 A1 | 4/2016 | Lomet et al. |
| 2016/0110500 A1 | 4/2016 | Wang et al. |
| 2016/0112197 A1 | 4/2016 | Johnston |
| 2016/0112396 A1 | 4/2016 | Paya et al. |
| 2016/0119119 A1 | 4/2016 | Calapodescu et al. |
| 2016/0125141 A1 | 5/2016 | Raisaro et al. |
| 2016/0127125 A1 | 5/2016 | Yagisawa |
| 2016/0127128 A1 | 5/2016 | Chen et al. |
| 2016/0127335 A1 | 5/2016 | Yamamoto et al. |
| 2016/0132317 A1 | 5/2016 | Mitchell et al. |
| 2016/0132692 A1 | 5/2016 | Kerschbaum et al. |
| 2016/0133164 A1 | 5/2016 | Yoshida et al. |
| 2016/0140348 A1 | 5/2016 | Nawaz et al. |
| 2016/0142750 A1 | 5/2016 | Huber et al. |
| 2016/0149866 A1 | 5/2016 | Dolev et al. |
| 2016/0154971 A9 | 6/2016 | Swaminathan et al. |
| 2016/0156595 A1 | 6/2016 | Wu et al. |
| 2016/0164670 A1 | 6/2016 | Gentry et al. |
| 2016/0164671 A1 | 6/2016 | Gentry et al. |
| 2016/0164676 A1 | 6/2016 | Gentry et al. |
| 2016/0165268 A1 | 6/2016 | Williamson et al. |
| 2016/0167164 A9 | 6/2016 | Rosario et al. |
| 2016/0170996 A1 | 6/2016 | Frank et al. |
| 2016/0171212 A1 | 6/2016 | Majumdar et al. |
| 2016/0173275 A1 | 6/2016 | Yasuda et al. |
| 2016/0182222 A1 | 6/2016 | Rane et al. |
| 2016/0182226 A1 | 6/2016 | Yasuda et al. |
| 2016/0189461 A1 | 6/2016 | Kanon et al. |
| 2016/0191233 A1 | 6/2016 | Loftus et al. |
| 2016/0197726 A1 | 7/2016 | Yasuda |
| 2016/0204917 A1 | 7/2016 | Lindh et al. |
| 2016/0204936 A1 | 7/2016 | Sakemi et al. |
| 2016/0205074 A1 | 7/2016 | Mitchell |
| 2016/0210131 A1 | 7/2016 | Vangelov et al. |
| 2016/0212103 A1 | 7/2016 | Rhoads et al. |
| 2016/0224735 A1 | 8/2016 | Ayday et al. |
| 2016/0224803 A1 | 8/2016 | Frank et al. |
| 2016/0224951 A1 | 8/2016 | Hoffberg |
| 2016/0224964 A1 | 8/2016 | Vergari et al. |
| 2016/0232553 A1 | 8/2016 | Reddy K et al. |
| 2016/0234010 A1 | 8/2016 | Kipnis et al. |
| 2016/0234686 A1 | 8/2016 | Bone et al. |
| 2016/0239647 A1 | 8/2016 | Johnson et al. |
| 2016/0239653 A1 | 8/2016 | Loughlin-Mchugh et al. |
| 2016/0239657 A1 | 8/2016 | Loughlin-Mchugh et al. |
| 2016/0239658 A1 | 8/2016 | Loughlin-Mchugh et al. |
| 2016/0241531 A1 | 8/2016 | Loughlin-Mchugh et al. |
| 2016/0241532 A1 | 8/2016 | Loughlin-Mchugh et al. |
| 2016/0254911 A1 | 9/2016 | Manchepalli et al. |
| 2016/0254914 A1 | 9/2016 | Saito et al. |
| 2016/0255498 A1 | 9/2016 | Jager et al. |
| 2016/0261404 A1 | 9/2016 | Ford et al. |
| 2016/0261592 A1 | 9/2016 | Hubert et al. |
| 2016/0269174 A1 | 9/2016 | Yasuda |
| 2016/0269775 A1 | 9/2016 | Cholas et al. |
| 2016/0275308 A1 | 9/2016 | Hubaux et al. |
| 2016/0285836 A1 | 9/2016 | Kaliski, Jr. |
| 2016/0292430 A1 | 10/2016 | Antonopoulos et al. |
| 2016/0293172 A1 | 10/2016 | Sharma et al. |
| 2016/0300252 A1 | 10/2016 | Frank et al. |
| 2016/0315761 A1 | 10/2016 | Gorissen et al. |
| 2016/0321654 A1 | 11/2016 | Lesavich et al. |
| 2016/0323098 A1 | 11/2016 | Bathen |
| 2016/0330018 A1 | 11/2016 | Miyata et al. |
| 2016/0330026 A1 | 11/2016 | Joye et al. |
| 2016/0330034 A1 | 11/2016 | Back et al. |
| 2016/0330209 A1 | 11/2016 | Iacob et al. |
| 2016/0335440 A1 | 11/2016 | Clark et al. |
| 2016/0335450 A1 | 11/2016 | Yoshino et al. |
| 2016/0337319 A1 | 11/2016 | Vaya et al. |
| 2016/0337464 A1 | 11/2016 | Eriksson et al. |
| 2016/0344557 A1 | 11/2016 | Chabanne et al. |
| 2016/0350552 A1 | 12/2016 | Matsuzaki et al. |
| 2016/0350648 A1 | 12/2016 | Gilad-Bachrach et al. |
| 2016/0352510 A1 | 12/2016 | Morikawa et al. |
| 2016/0352710 A1 | 12/2016 | Hibshoosh et al. |
| 2016/0357791 A1 | 12/2016 | Levandoski et al. |
| 2016/0357869 A1 | 12/2016 | Hang et al. |
| 2016/0358165 A1 | 12/2016 | Maxwell |
| 2016/0359617 A1 | 12/2016 | Patel et al. |
| 2016/0365973 A1 | 12/2016 | van Deventer et al. |
| 2016/0371064 A1 | 12/2016 | Rougerie et al. |
| 2016/0371771 A1* | 12/2016 | Serrano ............... H04L 67/12 |
| 2016/0373440 A1 | 12/2016 | Mather et al. |
| 2016/0381405 A1 | 12/2016 | Smith et al. |
| 2017/0005787 A1 | 1/2017 | Weaver et al. |
| 2017/0012970 A1 | 1/2017 | Mandal et al. |
| 2017/0012996 A1 | 1/2017 | Hu et al. |
| 2017/0019248 A1 | 1/2017 | Mustafa et al. |
| 2017/0024585 A1 | 1/2017 | Mooij et al. |
| 2017/0039377 A1 | 2/2017 | Nicholls |
| 2017/0039386 A1 | 2/2017 | Lehnhardt et al. |
| 2017/0041132 A1 | 2/2017 | Nicholls |
| 2017/0041298 A1 | 2/2017 | Lehnhardt et al. |
| 2017/0041300 A1 | 2/2017 | Kim et al. |
| 2017/0041395 A1 | 2/2017 | Kupcu et al. |
| 2017/0048208 A1 | 2/2017 | Raykova et al. |
| 2017/0053249 A1 | 2/2017 | Tunnell et al. |
| 2017/0053282 A1 | 2/2017 | Olumofin et al. |
| 2017/0061833 A1 | 3/2017 | Joye et al. |
| 2017/0063526 A1 | 3/2017 | Kahrobaei et al. |
| 2017/0070340 A1 | 3/2017 | Hibshoosh et al. |
| 2017/0070351 A1 | 3/2017 | Yan |
| 2017/0077950 A1 | 3/2017 | Pavlov et al. |
| 2017/0078438 A1 | 3/2017 | Yamaura et al. |
| 2017/0085382 A1 | 3/2017 | Kamakari et al. |
| 2017/0089291 A1 | 3/2017 | Suzuki |
| 2017/0099133 A1 | 4/2017 | Gu et al. |
| 2017/0099262 A1 | 4/2017 | Kerschbaum |
| 2017/0099263 A1 | 4/2017 | Matsuzaki et al. |
| 2017/0103217 A1 | 4/2017 | Arasu et al. |
| 2017/0103227 A1 | 4/2017 | Kerschbaum et al. |
| 2017/0103391 A1 | 4/2017 | Wilson, Jr. et al. |
| 2017/0103457 A1 | 4/2017 | Acuna-Rohter et al. |
| 2017/0104582 A1 | 4/2017 | Yamamoto et al. |
| 2017/0104583 A1 | 4/2017 | Yamamoto et al. |
| 2017/0104752 A1 | 4/2017 | Sakemi et al. |
| 2017/0111165 A1 | 4/2017 | Yamamoto et al. |
| 2017/0116396 A1 | 4/2017 | Gu et al. |
| 2017/0116410 A1 | 4/2017 | Wajs et al. |
| 2017/0124348 A1 | 5/2017 | Pourzandi et al. |
| 2017/0132279 A1 | 5/2017 | Teranishi |
| 2017/0132537 A1 | 5/2017 | Chavez |
| 2017/0133022 A1 | 5/2017 | Gurijala et al. |
| 2017/0134158 A1 | 5/2017 | Pasol et al. |
| 2017/0142109 A1 | 5/2017 | Mandal et al. |
| 2017/0147835 A1 | 5/2017 | Bacon et al. |
| 2017/0149558 A1 | 5/2017 | Patel et al. |
| 2017/0149796 A1 | 5/2017 | Gvili |
| 2017/0155515 A1 | 6/2017 | Androulaki et al. |
| 2017/0155628 A1 | 6/2017 | Rohloff et al. |
| 2017/0161314 A1 | 6/2017 | Joosten |
| 2017/0161829 A1 | 6/2017 | Mazier |
| 2017/0169241 A1 | 6/2017 | Unagami et al. |
| 2017/0169425 A1 | 6/2017 | Metral |
| 2017/0170960 A1 | 6/2017 | Shaked et al. |
| 2017/0173262 A1 | 6/2017 | Veltz |
| 2017/0177899 A1 | 6/2017 | Ng et al. |
| 2017/0186255 A1 | 6/2017 | Fuji et al. |
| 2017/0199818 A1 | 7/2017 | Lomet et al. |
| 2017/0206512 A1 | 7/2017 | Hoffberg |
| 2017/0207919 A1 | 7/2017 | Mandal et al. |
| 2017/0208043 A1 | 7/2017 | Bohli et al. |
| 2017/0213287 A1 | 7/2017 | Bruno |
| 2017/0214666 A1 | 7/2017 | Hybertson |

(56) References Cited

U.S. PATENT DOCUMENTS

| | | |
|---|---|---|
| 2017/0220617 A1 | 8/2017 | Bortnikov et al. |
| 2017/0222800 A1 | 8/2017 | Haber et al. |
| 2017/0223008 A1 | 8/2017 | Camenisch et al. |
| 2017/0228559 A1 | 8/2017 | Jackson |
| 2017/0230171 A1 | 8/2017 | Gadepally et al. |
| 2017/0230344 A1 | 8/2017 | Dhar et al. |
| 2017/0232300 A1 | 8/2017 | Tran et al. |
| 2017/0235736 A1 | 8/2017 | Swaminathan et al. |
| 2017/0235969 A1 | 8/2017 | Kamara et al. |
| 2017/0237551 A1 | 8/2017 | Van Foreest et al. |
| 2017/0237725 A1 | 8/2017 | Camenisch et al. |
| 2017/0242961 A1 | 8/2017 | Shukla et al. |
| 2017/0243028 A1 | 8/2017 | LaFever et al. |
| 2017/0243284 A1 | 8/2017 | Rubman et al. |
| 2017/0244553 A1 | 8/2017 | Savry et al. |
| 2017/0244988 A1 | 8/2017 | Hasek |
| 2017/0249460 A1 | 8/2017 | Lipton et al. |
| 2017/0250796 A1 | 8/2017 | Samid |
| 2017/0250799 A1 | 8/2017 | Stueve et al. |
| 2017/0250819 A1 | 8/2017 | Hoffstein et al. |
| 2017/0255769 A1 | 9/2017 | Loughlin-Mchugh et al. |
| 2017/0262651 A1 | 9/2017 | Kaliski, Jr. |
| 2017/0264426 A1 | 9/2017 | Joye et al. |
| 2017/0277773 A1 | 9/2017 | Iasi et al. |
| 2017/0277774 A1 | 9/2017 | Eigner et al. |
| 2017/0277775 A1 | 9/2017 | Eigner et al. |
| 2017/0277906 A1 | 9/2017 | Camenisch et al. |
| 2017/0287068 A1 | 10/2017 | Nugent |
| 2017/0288856 A1 | 10/2017 | Payton et al. |
| 2017/0289008 A1 | 10/2017 | Lau |
| 2017/0289111 A1 | 10/2017 | Voell et al. |
| 2017/0293913 A1 | 10/2017 | Gulak et al. |
| 2017/0295143 A1 | 10/2017 | Bone et al. |
| 2017/0295226 A1 | 10/2017 | Basta et al. |
| 2017/0301052 A1 | 10/2017 | Abt, Jr. et al. |
| 2017/0308580 A1 | 10/2017 | Naganuma et al. |
| 2017/0316391 A1 | 11/2017 | Peikert et al. |
| 2017/0322800 A1 | 11/2017 | Mitchell et al. |
| 2017/0322977 A1 | 11/2017 | Naganuma et al. |
| 2017/0323118 A1 | 11/2017 | Fink et al. |
| 2017/0329980 A1 | 11/2017 | Hu et al. |
| 2017/0346627 A1 | 11/2017 | Alleaume |
| 2017/0353296 A1 | 12/2017 | Yamamoto et al. |
| 2017/0353310 A1 | 12/2017 | Guasch Castello et al. |
| 2017/0357826 A1 | 12/2017 | Gouget et al. |
| 2017/0358161 A1 | 12/2017 | Hao et al. |
| 2017/0359321 A1 | 12/2017 | Rindal et al. |
| 2017/0359323 A1 | 12/2017 | Weis et al. |
| 2017/0366338 A1 | 12/2017 | Gajek |
| 2017/0372201 A1 | 12/2017 | Gupta et al. |
| 2017/0372226 A1 | 12/2017 | Costa et al. |
| 2018/0004743 A1 | 1/2018 | Shuman et al. |
| 2018/0011801 A1 | 1/2018 | Sengupta et al. |
| 2018/0011996 A1 | 1/2018 | Dolev et al. |
| 2018/0013748 A1 | 1/2018 | Paya et al. |
| 2018/0013828 A1 | 1/2018 | Kupcu et al. |
| 2018/0014241 A1 | 1/2018 | Perdomo |
| 2018/0019983 A1 | 1/2018 | Tissot et al. |
| 2018/0025435 A1 | 1/2018 | Karame et al. |
| 2018/0041345 A1 | 2/2018 | Maim |
| 2018/0041481 A1 | 2/2018 | Paz de Araujo |
| 2018/0046812 A1 | 2/2018 | Kaushik et al. |
| 2018/0048459 A1 | 2/2018 | Ding |
| 2018/0048467 A1 | 2/2018 | Yoshino et al. |
| 2018/0048628 A1 | 2/2018 | Soon-Shiong et al. |
| 2018/0049043 A1 | 2/2018 | Hoffberg |
| 2018/0060604 A1 | 3/2018 | Bent et al. |
| 2018/0068358 A1 | 3/2018 | Hoffberg |
| 2018/0068359 A1 | 3/2018 | Preston et al. |
| 2018/0071789 A1 | 3/2018 | Kingston et al. |
| 2018/0074481 A1 | 3/2018 | Kingston et al. |
| 2018/0075386 A1 | 3/2018 | Kingston et al. |
| 2018/0075406 A1 | 3/2018 | Kingston et al. |
| 2018/0075421 A1 * | 3/2018 | Serrano ............... G06Q 20/105 |
| 2018/0076956 A1 | 3/2018 | Camenisch et al. |
| 2018/0078843 A1 | 3/2018 | Tran et al. |
| 2018/0082043 A1 | 3/2018 | Witchey et al. |
| 2018/0089419 A1 | 3/2018 | Loughlin-McHugh et al. |
| 2018/0089644 A1 * | 3/2018 | Chen ..................... G06Q 20/06 |
| 2018/0091306 A1 | 3/2018 | Antonopoulos et al. |
| 2018/0096166 A1 | 4/2018 | Rogers et al. |
| 2018/0101697 A1 | 4/2018 | Rane et al. |
| 2018/0109376 A1 | 4/2018 | Gentry et al. |
| 2018/0109541 A1 | 4/2018 | Gleichauf |
| 2018/0109831 A1 | 4/2018 | Smith et al. |
| 2018/0115412 A1 | 4/2018 | Smeets et al. |
| 2018/0117446 A1 | 5/2018 | Tran et al. |
| 2018/0117447 A1 | 5/2018 | Tran et al. |
| 2018/0123802 A1 | 5/2018 | Graul et al. |
| 2018/0131507 A1 | 5/2018 | Payton et al. |
| 2018/0131512 A1 | 5/2018 | Gajek |
| 2018/0137549 A1 | 5/2018 | Vadura et al. |
| 2018/0139190 A1 | 5/2018 | Chaum |
| 2018/0139481 A1 | 5/2018 | Cross |
| 2018/0145825 A1 | 5/2018 | Isshiki et al. |
| 2018/0150642 A1 | 5/2018 | Kiribuchi et al. |
| 2018/0152299 A1 | 5/2018 | Rossi |
| 2018/0152300 A1 | 5/2018 | Rossi |
| 2018/0152426 A1 | 5/2018 | Rossi |
| 2018/0157558 A1 | 6/2018 | Karame et al. |
| 2018/0157854 A1 | 6/2018 | Smith et al. |
| 2018/0159680 A1 | 6/2018 | Jost et al. |
| 2018/0165470 A1 | 6/2018 | Nachenberg |
| 2018/0165781 A1 | 6/2018 | Rodriguez et al. |
| 2018/0167197 A1 | 6/2018 | Anderson |
| 2018/0173890 A1 | 6/2018 | Lehnhardt et al. |
| 2018/0173906 A1 | 6/2018 | Rodriguez et al. |
| 2018/0176017 A1 | 6/2018 | Rodriguez et al. |
| 2018/0176216 A1 | 6/2018 | Mather et al. |
| 2018/0181964 A1 | 6/2018 | Zagarese et al. |
| 2018/0182036 A1 | 6/2018 | Thorpe et al. |
| 2018/0183570 A1 | 6/2018 | Zheng |
| 2018/0183571 A1 | 6/2018 | Gajek |
| 2018/0183572 A1 | 6/2018 | Kahrobaei et al. |
| 2018/0183768 A1 | 6/2018 | Lobban et al. |
| 2018/0189753 A1 | 7/2018 | Konda et al. |
| 2018/0191692 A1 | 7/2018 | Frank |
| 2018/0198601 A1 | 7/2018 | Laine et al. |
| 2018/0198613 A1 | 7/2018 | Anderson et al. |
| 2018/0198630 A1 | 7/2018 | Androulaki et al. |
| 2018/0198632 A1 | 7/2018 | Gajek et al. |
| 2018/0203808 A1 | 7/2018 | Unagami et al. |
| 2018/0204111 A1 | 7/2018 | Zadeh et al. |
| 2018/0204284 A1 | 7/2018 | Cerezo Sanchez |
| 2018/0211673 A1 | 7/2018 | Sharma et al. |
| 2018/0212750 A1 | 7/2018 | Hoffstein et al. |
| 2018/0212751 A1 | 7/2018 | Williams et al. |
| 2018/0212752 A1 | 7/2018 | Williams et al. |
| 2018/0212753 A1 | 7/2018 | Williams |
| 2018/0212755 A1 | 7/2018 | Williams et al. |
| 2018/0212764 A1 | 7/2018 | Shi et al. |
| 2018/0212775 A1 | 7/2018 | Williams |
| 2018/0212933 A1 | 7/2018 | Williams |
| 2018/0219913 A1 | 8/2018 | Manasse et al. |
| 2018/0227121 A1 | 8/2018 | Schneider et al. |
| 2018/0227278 A1 | 8/2018 | Camenisch et al. |
| 2018/0232381 A1 | 8/2018 | Tormasov et al. |
| 2018/0234253 A1 | 8/2018 | Camenisch et al. |
| 2018/0234254 A1 | 8/2018 | Camenisch et al. |
| 2018/0240191 A1 | 8/2018 | Aronson |
| 2018/0248684 A1 | 8/2018 | Oliver et al. |
| 2018/0254893 A1 | 9/2018 | Saxena et al. |
| 2018/0260576 A1 | 9/2018 | Miguel |
| 2018/0262485 A1 | 9/2018 | Roth et al. |
| 2018/0264347 A1 | 9/2018 | Tran et al. |
| 2018/0267981 A1 | 9/2018 | Sirdey et al. |
| 2018/0268062 A1 | 9/2018 | Gilula |
| 2018/0276400 A1 | 9/2018 | Lehnhardt et al. |
| 2018/0276409 A1 | 9/2018 | Hubaux et al. |
| 2018/0276417 A1 | 9/2018 | Cerezo Sanchez |
| 2018/0276626 A1 | 9/2018 | Laiben |
| 2018/0278410 A1 | 9/2018 | Hirano et al. |
| 2018/0278421 A1 | 9/2018 | Karabina et al. |
| 2018/0285576 A1 | 10/2018 | Cannings et al. |

(56) References Cited

U.S. PATENT DOCUMENTS

| | | |
|---|---|---|
| 2018/0285840 A1 | 10/2018 | Hasan |
| 2018/0285970 A1 | 10/2018 | Snow et al. |
| 2018/0285996 A1 | 10/2018 | Ma |
| 2018/0288023 A1 | 10/2018 | Hibshoosh et al. |
| 2018/0288039 A1 | 10/2018 | Haase et al. |
| 2018/0294951 A1 | 10/2018 | Paz de Araujo et al. |
| 2018/0294952 A1 | 10/2018 | Yuan et al. |
| 2018/0300497 A1 | 10/2018 | Carpov et al. |
| 2018/0302380 A1 | 10/2018 | Lehmann et al. |
| 2018/0302382 A1 | 10/2018 | Lehmann et al. |
| 2018/0303420 A1 | 10/2018 | Mauro et al. |
| 2018/0303421 A1 | 10/2018 | Mauro et al. |
| 2018/0303422 A1 | 10/2018 | Mauro et al. |
| 2018/0303423 A1 | 10/2018 | Mauro et al. |
| 2018/0303424 A1 | 10/2018 | Mauro et al. |
| 2018/0307859 A1 | 10/2018 | LaFever et al. |
| 2018/0316495 A1 | 11/2018 | Wall et al. |
| 2018/0316676 A1 | 11/2018 | Gilpin et al. |
| 2018/0326291 A1 | 11/2018 | Tran et al. |
| 2018/0329783 A1 | 11/2018 | Karame et al. |
| 2018/0330077 A1 | 11/2018 | Gray |
| 2018/0330078 A1 | 11/2018 | Gray |
| 2018/0330079 A1 | 11/2018 | Gray |
| 2018/0330125 A1 | 11/2018 | Gray |
| 2018/0330179 A1 | 11/2018 | Streit |
| 2018/0330343 A1 | 11/2018 | Gray |
| 2018/0331821 A1 | 11/2018 | Gray |
| 2018/0331835 A1 | 11/2018 | Jackson |
| 2018/0332011 A1 | 11/2018 | Gray |
| 2018/0337775 A1 | 11/2018 | Camenisch et al. |
| 2018/0337860 A1 | 11/2018 | Kim et al. |
| 2018/0337899 A1 | 11/2018 | Becker et al. |
| 2018/0343109 A1 | 11/2018 | Koseki et al. |
| 2018/0349577 A1 | 12/2018 | Goldwasser et al. |
| 2018/0349632 A1 | 12/2018 | Bent et al. |
| 2018/0349636 A1 | 12/2018 | Bhowmick et al. |
| 2018/0349637 A1 | 12/2018 | Decker et al. |
| 2018/0349638 A1 | 12/2018 | Barraclough et al. |
| 2018/0349740 A1 | 12/2018 | Schneider et al. |
| 2018/0351745 A1 | 12/2018 | Hamada et al. |
| 2018/0351922 A1 | 12/2018 | Hybertson |
| 2018/0357434 A1 | 12/2018 | Roy |
| 2018/0359078 A1 | 12/2018 | Jain et al. |
| 2018/0359079 A1 | 12/2018 | Hu et al. |
| 2018/0359084 A1 | 12/2018 | Jain et al. |
| 2018/0359097 A1 | 12/2018 | Lindell |
| 2018/0365201 A1 | 12/2018 | Hunn et al. |
| 2018/0365764 A1 | 12/2018 | Nelson |
| 2018/0366036 A1 | 12/2018 | Furukawa |
| 2018/0367294 A1 | 12/2018 | Hu et al. |
| 2018/0373834 A1 | 12/2018 | Cho et al. |
| 2018/0373849 A1 | 12/2018 | Gidley et al. |
| 2018/0373882 A1 | 12/2018 | Veugen |
| 2018/0375639 A1 | 12/2018 | Lauter et al. |
| 2018/0375640 A1 | 12/2018 | Laine et al. |
| 2019/0004999 A1 | 1/2019 | Kawamoto |
| 2019/0005254 A1 | 1/2019 | Arasu et al. |
| 2019/0005471 A1 | 1/2019 | Chandaria |
| 2019/0007059 A1 | 1/2019 | Lagunas |
| 2019/0007197 A1 | 1/2019 | Laine et al. |
| 2019/0007212 A1 | 1/2019 | Neve de Mevergnies et al. |
| 2019/0012660 A1 | 1/2019 | Masters |
| 2019/0012663 A1 | 1/2019 | Masters |
| 2019/0013943 A1 | 1/2019 | Maim |
| 2019/0013950 A1 | 1/2019 | Becker et al. |
| 2019/0014176 A1 | 1/2019 | Tormasov et al. |
| 2019/0019183 A1 | 1/2019 | Karame et al. |
| 2019/0020470 A1 | 1/2019 | Shamee et al. |
| 2019/0020651 A1 | 1/2019 | Soon-Shiong et al. |
| 2019/0020712 A1 | 1/2019 | Basta et al. |
| 2019/0026146 A1 | 1/2019 | Peffers et al. |
| 2019/0026730 A1 | 1/2019 | Moy et al. |
| 2019/0036678 A1 | 1/2019 | Ahmed |
| 2019/0044697 A1 | 2/2019 | Paz de Araujo et al. |
| 2019/0044703 A1 | 2/2019 | Smith |
| 2019/0050589 A1 | 2/2019 | Rane et al. |
| 2019/0050591 A1 | 2/2019 | Rane et al. |
| 2019/0052458 A1 | 2/2019 | Wright et al. |
| 2019/0058580 A1 | 2/2019 | Tormasov et al. |
| 2019/0068374 A1 | 2/2019 | Veeningen et al. |
| 2019/0080392 A1 | 3/2019 | Youb et al. |
| 2019/0081783 A1 | 3/2019 | Bohli et al. |
| 2019/0087600 A1 | 3/2019 | Sion et al. |
| 2019/0089372 A1 | 3/2019 | Roth et al. |
| 2019/0089526 A1 | 3/2019 | Locher et al. |
| 2019/0089537 A1 | 3/2019 | Gray |
| 2019/0089547 A1 | 3/2019 | Simplicio, Jr. et al. |
| 2019/0095880 A1 | 3/2019 | Glover et al. |
| 2019/0095995 A1 | 3/2019 | Rohlfs |
| 2019/0097787 A1 | 3/2019 | Schneider et al. |
| 2019/0097985 A1 | 3/2019 | Torres et al. |
| 2019/0102163 A1 | 4/2019 | Witherspoon |
| 2019/0108350 A1 | 4/2019 | Bohli et al. |
| 2019/0109701 A1 | 4/2019 | Paz de Araujo et al. |
| 2019/0109712 A1 | 4/2019 | Blass et al. |
| 2019/0109828 A1 | 4/2019 | Song |
| 2019/0114706 A1 | 4/2019 | Bell et al. |
| 2019/0116035 A1 | 4/2019 | Mustafa et al. |
| 2019/0116174 A1 | 4/2019 | Gray |
| 2019/0116180 A1 | 4/2019 | Teranishi et al. |
| 2019/0118767 A1 | 4/2019 | Britt |
| 2019/0122297 A1 | 4/2019 | Goto |
| 2019/0124051 A1 | 4/2019 | Soon-Shiong et al. |
| 2019/0130125 A1 | 5/2019 | Yoshino et al. |
| 2019/0130483 A1 | 5/2019 | de Jong |
| 2019/0130698 A1 | 5/2019 | Simons |
| 2019/0130701 A1 | 5/2019 | Simons |
| 2019/0132295 A1 | 5/2019 | Lenz et al. |
| 2019/0139007 A1 | 5/2019 | Rahn |
| 2019/0140818 A1 | 5/2019 | Bent et al. |
| 2019/0141051 A1 | 5/2019 | Ikarashi |
| 2019/0141568 A1 | 5/2019 | Balakrishnan et al. |
| 2019/0146917 A1 | 5/2019 | Lomet et al. |
| 2019/0147143 A1 | 5/2019 | Zweig et al. |
| 2019/0147415 A1 | 5/2019 | Peikert et al. |
| 2019/0149317 A1 | 5/2019 | Payton et al. |
| 2019/0152435 A1 | 5/2019 | Ujkashevic et al. |
| 2019/0155643 A1 | 5/2019 | Bhageria et al. |
| 2019/0156078 A1 | 5/2019 | Hale et al. |
| 2019/0158272 A1 | 5/2019 | Chopra et al. |
| 2019/0158594 A1 | 5/2019 | Shadmon et al. |
| 2019/0158906 A1 | 5/2019 | Gonder et al. |
| 2019/0164152 A1 | 5/2019 | Bucher |
| 2019/0164153 A1 | 5/2019 | Agrawal et al. |
| 2019/0166113 A1 | 5/2019 | Paya et al. |
| 2019/0166161 A1 | 5/2019 | Anand et al. |
| 2019/0166162 A1 | 5/2019 | Anand et al. |
| 2019/0171847 A1 | 6/2019 | Schneider et al. |
| 2019/0182027 A1 | 6/2019 | Kipnis et al. |
| 2019/0182035 A1 | 6/2019 | Chari et al. |
| 2019/0182216 A1 | 6/2019 | Gulak et al. |
| 2019/0183255 A1 | 6/2019 | Louks et al. |
| 2019/0188708 A1 | 6/2019 | Shah |
| 2019/0188711 A1 | 6/2019 | Wu et al. |
| 2019/0188712 A1 | 6/2019 | Fedorov et al. |
| 2019/0188732 A1 | 6/2019 | Hill |
| 2019/0188787 A1 | 6/2019 | Besanson Tuma et al. |
| 2019/0188790 A1 | 6/2019 | Lovato et al. |
| 2019/0188793 A1 | 6/2019 | Molinari et al. |
| 2019/0188806 A1 | 6/2019 | Torrenegra et al. |
| 2019/0188941 A1 | 6/2019 | Campero et al. |
| 2019/0190261 A1 | 6/2019 | Valkov |
| 2019/0190694 A1 | 6/2019 | Joye et al. |
| 2019/0190695 A1 | 6/2019 | Kaul et al. |
| 2019/0190698 A1 | 6/2019 | Nuzzi |
| 2019/0190701 A1 | 6/2019 | Mitra et al. |
| 2019/0190713 A1 | 6/2019 | Hirano et al. |
| 2019/0190714 A1 | 6/2019 | Joye et al. |
| 2019/0190719 A1 | 6/2019 | van de Ruit et al. |
| 2019/0190742 A1 | 6/2019 | Reinelt et al. |
| 2019/0190987 A1 | 6/2019 | Waffner |
| 2019/0197094 A1 | 6/2019 | Warstler |
| 2019/0197249 A1 | 6/2019 | Jancosek et al. |
| 2019/0197378 A1 | 6/2019 | Garner |

(56) References Cited

U.S. PATENT DOCUMENTS

| | | |
|---|---|---|
| 2019/0197534 A1 | 6/2019 | Alastair |
| 2019/0197589 A1 | 6/2019 | Singh et al. |
| 2019/0197600 A1 | 6/2019 | Chang |
| 2019/0197622 A1 | 6/2019 | Molinari et al. |
| 2019/0197635 A1 | 6/2019 | Kim |
| 2019/0197831 A1 | 6/2019 | Batton |
| 2019/0197835 A1 | 6/2019 | Keilwert et al. |
| 2019/0198144 A1 | 6/2019 | Blackley et al. |
| 2019/0199511 A1 | 6/2019 | Kyakuno et al. |
| 2019/0199514 A1 | 6/2019 | Hari et al. |
| 2019/0199516 A1 | 6/2019 | Carver et al. |
| 2019/0199518 A1 | 6/2019 | Rady |
| 2019/0199531 A1 | 6/2019 | Staples et al. |
| 2019/0199535 A1 | 6/2019 | Falk |
| 2019/0199693 A1 | 6/2019 | Vityaz |
| 2019/0199695 A1 | 6/2019 | Bhardwaj et al. |
| 2019/0199700 A1 | 6/2019 | Abramowitz |
| 2019/0204881 A1 | 7/2019 | Plavsic |
| 2019/0205066 A1 | 7/2019 | Warstler |
| 2019/0205115 A1 | 7/2019 | Gomes |
| 2019/0205317 A1 | 7/2019 | Tobias et al. |
| 2019/0205486 A1 | 7/2019 | Santarone et al. |
| 2019/0205547 A1 | 7/2019 | Horvath |
| 2019/0205558 A1 | 7/2019 | Gonzales, Jr. |
| 2019/0205563 A1 | 7/2019 | Gonzales, Jr. |
| 2019/0205568 A1 | 7/2019 | Veugen |
| 2019/0205773 A1 | 7/2019 | Ackerman et al. |
| 2019/0205832 A1 | 7/2019 | Henderson |
| 2019/0205844 A1 | 7/2019 | Nuzzi |
| 2019/0205849 A1 | 7/2019 | Nuzzi |
| 2019/0205853 A1 | 7/2019 | Kassemi et al. |
| 2019/0205870 A1 | 7/2019 | Kamalsky et al. |
| 2019/0205873 A1 | 7/2019 | Kamalsky et al. |
| 2019/0205875 A1 | 7/2019 | Gulak et al. |
| 2019/0205881 A1 | 7/2019 | Borzilleri et al. |
| 2019/0205886 A1 | 7/2019 | Ramakrishnan et al. |
| 2019/0205894 A1 | 7/2019 | Gonzales, Jr. et al. |
| 2019/0205932 A1 | 7/2019 | Ericson |
| 2019/0205943 A1 | 7/2019 | Candelore |
| 2019/0205970 A1 | 7/2019 | McHale et al. |
| 2019/0205980 A1 | 7/2019 | Pierce et al. |
| 2019/0206182 A1 | 7/2019 | Hiten et al. |
| 2019/0206183 A1 | 7/2019 | Hiten et al. |
| 2019/0206191 A1 | 7/2019 | Halvorson |
| 2019/0206272 A1 | 7/2019 | Isozu |
| 2019/0207757 A1 | 7/2019 | Hennebert |
| 2019/0207760 A1 | 7/2019 | Hennebert |
| 2019/0207763 A1 | 7/2019 | Jin et al. |
| 2019/0207767 A1 | 7/2019 | Ahn |
| 2019/0207770 A1 | 7/2019 | Zhou et al. |
| 2019/0207781 A1 | 7/2019 | Harpur et al. |
| 2019/0207951 A1 | 7/2019 | Oberhauser et al. |
| 2019/0207955 A1 | 7/2019 | El-Moussa et al. |
| 2019/0207969 A1 | 7/2019 | Brown |
| 2019/0207995 A1 | 7/2019 | Gonzales, Jr. |
| 2019/0208354 A1 | 7/2019 | Raduchel et al. |
| 2019/0208414 A1 | 7/2019 | Roennow et al. |
| 2019/0208422 A1 | 7/2019 | Haleem et al. |
| 2019/0212159 A1 | 7/2019 | Petersen et al. |
| 2019/0213311 A1 | 7/2019 | Tussy |
| 2019/0213312 A1 | 7/2019 | Tussy |
| 2019/0213333 A1 | 7/2019 | Williams et al. |
| 2019/0213335 A1 | 7/2019 | Unitt |
| 2019/0213371 A1 | 7/2019 | Endress et al. |
| 2019/0213462 A1 | 7/2019 | McDonald et al. |
| 2019/0213573 A1 | 7/2019 | Zelten et al. |
| 2019/0213584 A1 | 7/2019 | Shanmugam |
| 2019/0213586 A1 | 7/2019 | Baratam |
| 2019/0213590 A1 | 7/2019 | Eagleton |
| 2019/0213633 A1 | 7/2019 | Kokernak |
| 2019/0213699 A1 | 7/2019 | Branscomb et al. |
| 2019/0213751 A1 | 7/2019 | Bradski |
| 2019/0213840 A1 | 7/2019 | Alexander |
| 2019/0214848 A1 | 7/2019 | Waffner |
| 2019/0215159 A1 | 7/2019 | Notani |
| 2019/0215311 A1 | 7/2019 | Cox et al. |
| 2019/0215404 A1 | 7/2019 | Stocker et al. |
| 2019/0215670 A1 | 7/2019 | Ameixieira |
| 2019/0217022 A1 | 7/2019 | Gentz et al. |
| 2019/0220010 A1 | 7/2019 | Leonard et al. |
| 2019/0220324 A1 | 7/2019 | Carver et al. |
| 2019/0220603 A1 | 7/2019 | Gopalakrishnan et al. |
| 2019/0220624 A1 | 7/2019 | Uhr et al. |
| 2019/0220768 A1 | 7/2019 | Li et al. |
| 2019/0220813 A1 | 7/2019 | Madisetti et al. |
| 2019/0220836 A1 | 7/2019 | Caldwell |
| 2019/0220851 A1 | 7/2019 | Barnes et al. |
| 2019/0220852 A1 | 7/2019 | Black et al. |
| 2019/0220854 A1 | 7/2019 | Pesci et al. |
| 2019/0220856 A1 | 7/2019 | Li et al. |
| 2019/0220857 A1 | 7/2019 | Black et al. |
| 2019/0220858 A1 | 7/2019 | Weight et al. |
| 2019/0220859 A1 | 7/2019 | Weight et al. |
| 2019/0220860 A1 | 7/2019 | Whitmyer, Jr. |
| 2019/0220861 A1 | 7/2019 | Silver et al. |
| 2019/0220886 A1 | 7/2019 | Le et al. |
| 2019/0220919 A1 | 7/2019 | Martinez et al. |
| 2019/0220922 A1 | 7/2019 | Barkas et al. |
| 2019/0221076 A1 | 7/2019 | Simons |
| 2019/0222424 A1 | 7/2019 | Lindemann |
| 2019/0222567 A1 | 7/2019 | Caldera et al. |
| 2019/0222575 A1 | 7/2019 | Oberhauser et al. |
| 2019/0222586 A1 | 7/2019 | Sachkov et al. |
| 2019/0226850 A1 | 7/2019 | Young et al. |
| 2019/0227515 A1 | 7/2019 | Fink et al. |
| 2019/0227553 A1 | 7/2019 | Kentley-Klay et al. |
| 2019/0228019 A1 | 7/2019 | Madisetti et al. |
| 2019/0228133 A1 | 7/2019 | Ansari et al. |
| 2019/0228174 A1 | 7/2019 | Withrow et al. |
| 2019/0228178 A1 | 7/2019 | Sharma et al. |
| 2019/0228351 A1 | 7/2019 | Simpson et al. |
| 2019/0228386 A1 | 7/2019 | Onnainty |
| 2019/0228387 A1 | 7/2019 | Chu et al. |
| 2019/0228397 A1 | 7/2019 | Madden |
| 2019/0228407 A1 | 7/2019 | Wu |
| 2019/0228409 A1 | 7/2019 | Madisetti et al. |
| 2019/0228413 A1 | 7/2019 | Naganuma et al. |
| 2019/0228461 A1 | 7/2019 | Domokos et al. |
| 2019/0228469 A1 | 7/2019 | Yu et al. |
| 2019/0228484 A1 | 7/2019 | Sheppard et al. |
| 2019/0228612 A1 | 7/2019 | Pierce et al. |
| 2019/0229887 A1 | 7/2019 | Ding et al. |
| 2019/0229889 A1 | 7/2019 | Kounavis |
| 2019/0229891 A1 | 7/2019 | Naqvi et al. |
| 2019/0229892 A1 | 7/2019 | Jevans |
| 2019/0229909 A1 | 7/2019 | Patel et al. |
| 2019/0229911 A1 | 7/2019 | Allen |
| 2019/0229914 A1 | 7/2019 | Patel et al. |
| 2019/0229918 A1 | 7/2019 | Naqvi et al. |
| 2019/0229920 A1 | 7/2019 | Naqvi et al. |
| 2019/0229921 A1 | 7/2019 | Pulsifer |
| 2019/0229927 A1 | 7/2019 | Guo et al. |
| 2019/0229930 A1 | 7/2019 | Haque et al. |
| 2019/0230054 A1 | 7/2019 | Kassemi et al. |
| 2019/0230070 A1 | 7/2019 | Isaacson et al. |
| 2019/0230073 A1 | 7/2019 | Patel et al. |
| 2019/0230092 A1 | 7/2019 | Patel et al. |
| 2019/0230114 A1 | 7/2019 | Grebovich |
| 2019/0232161 A1 | 8/2019 | Fortuna, Jr. |
| 2019/0233060 A1 | 8/2019 | Moffat et al. |
| 2019/0235933 A1 | 8/2019 | Levandoski et al. |
| 2019/0235946 A1 | 8/2019 | Guo et al. |
| 2019/0236214 A1 | 8/2019 | Kokernak |
| 2019/0236286 A1 | 8/2019 | Scriber et al. |
| 2019/0236298 A1 | 8/2019 | Agarwal |
| 2019/0236300 A1 | 8/2019 | Guo et al. |
| 2019/0236559 A1 | 8/2019 | Padmanabhan |
| 2019/0236561 A1 | 8/2019 | Hamilton et al. |
| 2019/0236562 A1 | 8/2019 | Padmanabhan |
| 2019/0236563 A1 | 8/2019 | Tan |
| 2019/0236564 A1 | 8/2019 | Cantrell et al. |
| 2019/0236591 A1 | 8/2019 | Iaremenko et al. |
| 2019/0236593 A1 | 8/2019 | Vorobyev et al. |
| 2019/0236594 A1 | 8/2019 | Ehrlich-Quinn |

(56) References Cited

U.S. PATENT DOCUMENTS

| | | |
|---|---|---|
| 2019/0236598 A1 | 8/2019 | Padmanabhan |
| 2019/0236606 A1 | 8/2019 | Padmanabhan et al. |
| 2019/0236627 A1 | 8/2019 | Christensen |
| 2019/0236665 A1 | 8/2019 | Liberty et al. |
| 2019/0236698 A1 | 8/2019 | Postrel |
| 2019/0236699 A1 | 8/2019 | Newton |
| 2019/0236716 A1 | 8/2019 | Kasper et al. |
| 2019/0236879 A1 | 8/2019 | Ivanov et al. |
| 2019/0236880 A1 | 8/2019 | Ivanov et al. |
| 2019/0236881 A1 | 8/2019 | Ivanov et al. |
| 2019/0236893 A1 | 8/2019 | Halvorson |
| 2019/0237095 A1 | 8/2019 | Duguid et al. |
| 2019/0237171 A1 | 8/2019 | Kain et al. |
| 2019/0238311 A1 | 8/2019 | Zheng |
| 2019/0238316 A1 | 8/2019 | Padmanabhan |
| 2019/0238319 A1 | 8/2019 | Beck |
| 2019/0238327 A1 | 8/2019 | Li et al. |
| 2019/0238337 A1 | 8/2019 | Laremenko et al. |
| 2019/0238344 A1 | 8/2019 | Kaga et al. |
| 2019/0238487 A1 | 8/2019 | Ciano et al. |
| 2019/0238525 A1 | 8/2019 | Padmanabhan et al. |
| 2019/0243611 A1 | 8/2019 | Martin et al. |
| 2019/0243820 A1 | 8/2019 | Shen et al. |
| 2019/0243912 A1 | 8/2019 | Duraisamy Soundrapandian et al. |
| 2019/0243988 A1 | 8/2019 | Khi et al. |
| 2019/0244138 A1 | 8/2019 | Bhowmick et al. |
| 2019/0244195 A1 | 8/2019 | Ma et al. |
| 2019/0244215 A1 | 8/2019 | Watanabe et al. |
| 2019/0244227 A1 | 8/2019 | Inoue |
| 2019/0244255 A1 | 8/2019 | Cohen |
| 2019/0244287 A1 | 8/2019 | Prasad Datta et al. |
| 2019/0244290 A1 | 8/2019 | Massacci et al. |
| 2019/0244294 A1 | 8/2019 | Shao et al. |
| 2019/0244298 A1 | 8/2019 | Doney |
| 2019/0244483 A1 | 8/2019 | Collins |
| 2019/0244531 A1 | 8/2019 | Jones et al. |
| 2019/0245680 A1 | 8/2019 | Boutaba et al. |
| 2019/0245917 A1 | 8/2019 | Mendiola et al. |
| 2019/0251018 A1 | 8/2019 | Jin et al. |
| 2019/0251075 A1 | 8/2019 | Yan |
| 2019/0251077 A1 | 8/2019 | Yang |
| 2019/0251078 A1 | 8/2019 | Yan |
| 2019/0251079 A1 | 8/2019 | Yan |
| 2019/0251080 A1 | 8/2019 | Lu et al. |
| 2019/0251124 A1 | 8/2019 | Pan et al. |
| 2019/0251187 A1 | 8/2019 | Lin |
| 2019/0251199 A1* | 8/2019 | Klianev ............... G06Q 40/04 |
| 2019/0251249 A1 | 8/2019 | Sprague et al. |
| 2019/0251262 A1 | 8/2019 | Fiske |
| 2019/0251270 A1 | 8/2019 | Liu et al. |
| 2019/0251271 A1 | 8/2019 | Roets et al. |
| 2019/0251284 A1 | 8/2019 | Anton et al. |
| 2019/0251296 A1 | 8/2019 | Maneval et al. |
| 2019/0251489 A1 | 8/2019 | Berti et al. |
| 2019/0251503 A1 | 8/2019 | Simpson |
| 2019/0251509 A1 | 8/2019 | Simpson |
| 2019/0251523 A1 | 8/2019 | Rittman et al. |
| 2019/0251524 A1 | 8/2019 | Sadrizadeh et al. |
| 2019/0251526 A1 | 8/2019 | Jackson |
| 2019/0251527 A1 | 8/2019 | Surdak |
| 2019/0251551 A1 | 8/2019 | Mousavi |
| 2019/0251552 A1 | 8/2019 | Kurian |
| 2019/0251553 A1 | 8/2019 | Ma et al. |
| 2019/0251554 A1 | 8/2019 | Ma et al. |
| 2019/0251557 A1 | 8/2019 | Jin et al. |
| 2019/0251558 A1 | 8/2019 | Liu et al. |
| 2019/0251563 A1 | 8/2019 | Yan |
| 2019/0251566 A1 | 8/2019 | Pan et al. |
| 2019/0251573 A1 | 8/2019 | Toyota et al. |
| 2019/0251575 A1 | 8/2019 | Berti et al. |
| 2019/0251576 A1 | 8/2019 | Saab et al. |
| 2019/0251603 A1 | 8/2019 | Jaatinen et al. |
| 2019/0251624 A1 | 8/2019 | Tsuboi |
| 2019/0251627 A1 | 8/2019 | Wang |
| 2019/0251629 A1 | 8/2019 | Gordon et al. |
| 2019/0251648 A1 | 8/2019 | Liu et al. |
| 2019/0253235 A1 | 8/2019 | Zhang et al. |
| 2019/0253239 A1 | 8/2019 | Shao et al. |
| 2019/0253244 A1 | 8/2019 | Hamel et al. |
| 2019/0253245 A1 | 8/2019 | Zhang et al. |
| 2019/0253250 A1 | 8/2019 | Bruner et al. |
| 2019/0253252 A1 | 8/2019 | Qiu |
| 2019/0253254 A1 | 8/2019 | Brownlee et al. |
| 2019/0253256 A1 | 8/2019 | Saab et al. |
| 2019/0253257 A1 | 8/2019 | Yan |
| 2019/0253258 A1 | 8/2019 | Thekadath et al. |
| 2019/0253259 A1 | 8/2019 | Qiu |
| 2019/0253260 A1 | 8/2019 | Uehara et al. |
| 2019/0253261 A1 | 8/2019 | Gero et al. |
| 2019/0253263 A1 | 8/2019 | Qiu |
| 2019/0253265 A1 | 8/2019 | Pan et al. |
| 2019/0253523 A1 | 8/2019 | Raduchel et al. |
| 2019/0253524 A1 | 8/2019 | Hoshizuki |
| 2019/0258523 A1 | 8/2019 | Tappeiner et al. |
| 2019/0258610 A1 | 8/2019 | Dang et al. |
| 2019/0258687 A1 | 8/2019 | Spangenberg et al. |
| 2019/0258807 A1 | 8/2019 | DiMaggio et al. |
| 2019/0258828 A1 | 8/2019 | Rice |
| 2019/0258953 A1 | 8/2019 | Lang et al. |
| 2019/0258971 A1 | 8/2019 | Winarski |
| 2019/0259008 A1 | 8/2019 | Lindsey |
| 2019/0259013 A1 | 8/2019 | Armstrong et al. |
| 2019/0259025 A1 | 8/2019 | Hilton et al. |
| 2019/0259029 A1 | 8/2019 | Chilton et al. |
| 2019/0259093 A1 | 8/2019 | Turato |
| 2019/0259095 A1 | 8/2019 | Templeton |
| 2019/0259099 A1 | 8/2019 | Katsuyama et al. |
| 2019/0259114 A1 | 8/2019 | Spangenberg et al. |
| 2019/0259120 A1 | 8/2019 | Mattingly et al. |
| 2019/0260574 A1 | 8/2019 | Shi et al. |
| 2019/0260579 A1 | 8/2019 | Hamel et al. |
| 2019/0260585 A1 | 8/2019 | Kawai et al. |
| 2019/0260715 A1 | 8/2019 | Suzuki et al. |
| 2019/0260761 A1 | 8/2019 | Wilson |
| 2019/0260788 A1 | 8/2019 | Torkelson et al. |
| 2019/0260829 A1 | 8/2019 | Cencini et al. |
| 2019/0266128 A1 | 8/2019 | Maeda et al. |
| 2019/0266146 A1 | 8/2019 | Rose et al. |
| 2019/0266178 A1 | 8/2019 | Madhavan et al. |
| 2019/0266235 A1 | 8/2019 | Northrup et al. |
| 2019/0266263 A1 | 8/2019 | Jiang et al. |
| 2019/0266327 A1 | 8/2019 | Satpathy |
| 2019/0266576 A1 | 8/2019 | McCauley et al. |
| 2019/0266577 A1 | 8/2019 | Baldet et al. |
| 2019/0266597 A1 | 8/2019 | Mohtar |
| 2019/0266601 A1 | 8/2019 | Allen |
| 2019/0266612 A1 | 8/2019 | McHale et al. |
| 2019/0266897 A1 | 8/2019 | Turato |
| 2019/0267119 A1 | 8/2019 | Witchey |
| 2019/0268138 A1 | 8/2019 | Mankovskii et al. |
| 2019/0268141 A1 | 8/2019 | Pandurangan et al. |
| 2019/0268147 A1 | 8/2019 | Baird |
| 2019/0268163 A1 | 8/2019 | Nadeau et al. |
| 2019/0268165 A1 | 8/2019 | Monica et al. |
| 2019/0268284 A1 | 8/2019 | Karame et al. |
| 2019/0268312 A1 | 8/2019 | Ma et al. |
| 2019/0268466 A1 | 8/2019 | Inoue |
| 2019/0271959 A1 | 9/2019 | Firu et al. |
| 2019/0272393 A1 | 9/2019 | Rodriguez De Castro et al. |
| 2019/0272512 A1 | 9/2019 | Dwivedi et al. |
| 2019/0272534 A1 | 9/2019 | Griffith |
| 2019/0272537 A1 | 9/2019 | Miller et al. |
| 2019/0272538 A1 | 9/2019 | Arneson et al. |
| 2019/0272589 A1 | 9/2019 | Simpson |
| 2019/0272721 A1 | 9/2019 | Dwivedi et al. |
| 2019/0273610 A1 | 9/2019 | Fan et al. |
| 2019/0273616 A1 | 9/2019 | Bres |
| 2019/0273619 A1 | 9/2019 | Campagna et al. |
| 2019/0273725 A1 | 9/2019 | Allen |
| 2019/0273739 A1 | 9/2019 | Pemmaraju |
| 2019/0275894 A1 | 9/2019 | Amacker et al. |
| 2019/0278765 A1 | 9/2019 | Ying et al. |
| 2019/0278907 A1 | 9/2019 | Boivie et al. |

(56) References Cited

U.S. PATENT DOCUMENTS

| | | |
|---|---|---|
| 2019/0278918 A1 | 9/2019 | Boivie et al. |
| 2019/0278920 A1 | 9/2019 | Black et al. |
| 2019/0278921 A1 | 9/2019 | Unitt |
| 2019/0279143 A1 | 9/2019 | Rinzler et al. |
| 2019/0279160 A1 | 9/2019 | Whitney et al. |
| 2019/0279172 A1 | 9/2019 | Duffield et al. |
| 2019/0279181 A1 | 9/2019 | Kelly et al. |
| 2019/0279197 A1 | 9/2019 | Wright et al. |
| 2019/0279204 A1 | 9/2019 | Norton et al. |
| 2019/0279206 A1 | 9/2019 | Song et al. |
| 2019/0279210 A1 | 9/2019 | Pen |
| 2019/0279215 A1 | 9/2019 | Kuchar et al. |
| 2019/0279247 A1 | 9/2019 | Finken et al. |
| 2019/0279257 A1 | 9/2019 | Kokernak |
| 2019/0279321 A1 | 9/2019 | Sheets et al. |
| 2019/0280856 A1 | 9/2019 | Yeap et al. |
| 2019/0280861 A1 | 9/2019 | Smith et al. |
| 2019/0280864 A1 | 9/2019 | Cheng et al. |
| 2019/0280872 A1 | 9/2019 | Falk |
| 2019/0280873 A1 | 9/2019 | Yang |
| 2019/0280880 A1 | 9/2019 | Zhang et al. |
| 2019/0281026 A1 | 9/2019 | Mitchell et al. |
| 2019/0281028 A1 | 9/2019 | Gillan et al. |
| 2019/0281030 A1 | 9/2019 | Isaacson et al. |
| 2019/0281066 A1 | 9/2019 | Simons |
| 2019/0281259 A1 | 9/2019 | Palazzolo |
| 2019/0281465 A1 | 9/2019 | Moshir et al. |
| 2019/0281857 A1 | 9/2019 | Cocchi et al. |
| 2019/0282906 A1 | 9/2019 | Yong |
| 2019/0283239 A1 | 9/2019 | Skaaksrud et al. |
| 2019/0283240 A1 | 9/2019 | Skaaksrud et al. |
| 2019/0283252 A1 | 9/2019 | Skaaksrud et al. |
| 2019/0283648 A1 | 9/2019 | Skaaksrud et al. |
| 2019/0283962 A1 | 9/2019 | Skaaksrud et al. |
| 2019/0286102 A1 | 9/2019 | Carbone et al. |
| 2019/0286138 A1 | 9/2019 | Skaaksrud et al. |
| 2019/0286139 A1 | 9/2019 | Skaaksrud et al. |
| 2019/0286152 A1 | 9/2019 | Skaaksrud et al. |
| 2019/0286164 A1 | 9/2019 | Skaaksrud et al. |
| 2019/0286490 A1 | 9/2019 | Wang |
| 2019/0286532 A1 | 9/2019 | Guo et al. |
| 2019/0286805 A1 | 9/2019 | Law et al. |
| 2019/0287046 A1 | 9/2019 | Skaaksrud et al. |
| 2019/0287047 A1 | 9/2019 | Skaaksrud et al. |
| 2019/0287059 A1 | 9/2019 | Skaaksrud et al. |
| 2019/0287062 A1 | 9/2019 | Skaaksrud et al. |
| 2019/0287063 A1 | 9/2019 | Skaaksrud et al. |
| 2019/0287069 A1 | 9/2019 | Kassemi et al. |
| 2019/0287102 A1 | 9/2019 | Cocchi et al. |
| 2019/0287105 A1 | 9/2019 | Fedorov et al. |
| 2019/0287107 A1 | 9/2019 | Gaur et al. |
| 2019/0287149 A1 | 9/2019 | Papp et al. |
| 2019/0287174 A1 | 9/2019 | Black et al. |
| 2019/0287175 A1 | 9/2019 | Hill et al. |
| 2019/0287199 A1 | 9/2019 | Messerges et al. |
| 2019/0287200 A1 | 9/2019 | Schuler et al. |
| 2019/0288832 A1 | 9/2019 | Dang et al. |
| 2019/0288850 A1 | 9/2019 | Beecham et al. |
| 2019/0288853 A1 | 9/2019 | Gray |
| 2019/0289068 A1 | 9/2019 | Ma et al. |
| 2019/0289454 A1 | 9/2019 | Inoue |
| 2019/0290964 A1 | 9/2019 | Oren |
| 2019/0290965 A1 | 9/2019 | Oren |
| 2019/0290991 A1 | 9/2019 | Pasternak et al. |
| 2019/0294513 A1 | 9/2019 | Marripudi et al. |
| 2019/0294689 A1 | 9/2019 | Mathur et al. |
| 2019/0294805 A1 | 9/2019 | Taylor et al. |
| 2019/0294817 A1 | 9/2019 | Hennebert et al. |
| 2019/0294822 A1 | 9/2019 | Hennebert |
| 2019/0294956 A1 | 9/2019 | Cheung et al. |
| 2019/0295038 A1 | 9/2019 | Kozloski et al. |
| 2019/0295045 A1 | 9/2019 | Stocker et al. |
| 2019/0295049 A1 | 9/2019 | Karame et al. |
| 2019/0295050 A1 | 9/2019 | Chalkias |
| 2019/0295069 A1 | 9/2019 | Pala et al. |
| 2019/0295073 A1 | 9/2019 | Cabre et al. |
| 2019/0295078 A1 | 9/2019 | Bae |
| 2019/0295079 A1 | 9/2019 | Bae |
| 2019/0295114 A1 | 9/2019 | Pavletic et al. |
| 2019/0295126 A1 | 9/2019 | Madden |
| 2019/0295159 A1 | 9/2019 | Samid |
| 2019/0295176 A1 | 9/2019 | Parker, Jr. |
| 2019/0295177 A1 | 9/2019 | Parker, Jr. |
| 2019/0295182 A1 | 9/2019 | Kfir et al. |
| 2019/0295193 A1 | 9/2019 | Winand et al. |
| 2019/0295350 A1 | 9/2019 | Wegelin |
| 2019/0295371 A1 | 9/2019 | Simons |
| 2019/0295415 A1 | 9/2019 | Haneda |
| 2019/0295547 A1 | 9/2019 | Gandhi et al. |
| 2019/0295722 A1 | 9/2019 | Abramoff |
| 2019/0296895 A1 | 9/2019 | Banks et al. |
| 2019/0296896 A1 | 9/2019 | Resch et al. |
| 2019/0296897 A1 | 9/2019 | Resch et al. |
| 2019/0296902 A1 | 9/2019 | Kumar et al. |
| 2019/0296903 A1 | 9/2019 | Ramesh |
| 2019/0296904 A1 | 9/2019 | Smith et al. |
| 2019/0296907 A1 | 9/2019 | Versteeg et al. |
| 2019/0296910 A1 | 9/2019 | Cheung |
| 2019/0296915 A1 | 9/2019 | Lancashire |
| 2019/0296916 A1 | 9/2019 | Qiu |
| 2019/0296920 A1 | 9/2019 | Uhr et al. |
| 2019/0296958 A1 | 9/2019 | Cencini et al. |
| 2019/0297031 A1 | 9/2019 | Basheer et al. |
| 2019/0297062 A1 | 9/2019 | Chaum |
| 2019/0297064 A1 | 9/2019 | Resch et al. |
| 2019/0297101 A1 | 9/2019 | Dhakshinamoorthy et al. |
| 2019/0297109 A1 | 9/2019 | Guo et al. |
| 2019/0297134 A1 | 9/2019 | Gold |
| 2019/0297442 A1 | 9/2019 | Lyren et al. |
| 2019/0297544 A1 | 9/2019 | Crawford |
| 2019/0299105 A1 | 10/2019 | Knight et al. |
| 2019/0301875 A1 | 10/2019 | Ringer et al. |
| 2019/0301883 A1 | 10/2019 | Xia |
| 2019/0302249 A1 | 10/2019 | High et al. |
| 2019/0302717 A1 | 10/2019 | Pelton |
| 2019/0302993 A1 | 10/2019 | Francis |
| 2019/0303111 A1 | 10/2019 | Warstler |
| 2019/0303121 A1 | 10/2019 | Padmanabhan |
| 2019/0303250 A1 | 10/2019 | Smith et al. |
| 2019/0303296 A1 | 10/2019 | Jagtap |
| 2019/0303349 A1 | 10/2019 | Burshteyn |
| 2019/0303353 A1 | 10/2019 | Letz et al. |
| 2019/0303362 A1 | 10/2019 | Yang et al. |
| 2019/0303363 A1 | 10/2019 | Leung et al. |
| 2019/0303413 A1 | 10/2019 | Colangelo |
| 2019/0303441 A1 | 10/2019 | Bacarella et al. |
| 2019/0303445 A1 | 10/2019 | Padmanabhan |
| 2019/0303448 A1 | 10/2019 | Colangelo |
| 2019/0303463 A1 | 10/2019 | Catalano et al. |
| 2019/0303540 A1 | 10/2019 | Shirasaka et al. |
| 2019/0303541 A1 | 10/2019 | Reddy et al. |
| 2019/0303543 A1 | 10/2019 | Savanah et al. |
| 2019/0303550 A1 | 10/2019 | Ibrahim et al. |
| 2019/0303551 A1 | 10/2019 | Tussy |
| 2019/0303552 A1 | 10/2019 | Houseworth et al. |
| 2019/0303559 A1 | 10/2019 | Hamel et al. |
| 2019/0303579 A1 | 10/2019 | Reddy et al. |
| 2019/0303587 A1 | 10/2019 | Hamel et al. |
| 2019/0303590 A1 | 10/2019 | Hamel et al. |
| 2019/0303600 A1 | 10/2019 | Hamel et al. |
| 2019/0303603 A1 | 10/2019 | Courtney et al. |
| 2019/0303620 A1 | 10/2019 | Jacobs |
| 2019/0303621 A1 | 10/2019 | Baset et al. |
| 2019/0303622 A1 | 10/2019 | Versteeg et al. |
| 2019/0303623 A1 | 10/2019 | Reddy et al. |
| 2019/0303670 A1 | 10/2019 | Bryden |
| 2019/0303781 A1 | 10/2019 | Clark et al. |
| 2019/0303790 A1 | 10/2019 | Harvilla et al. |
| 2019/0303805 A1 | 10/2019 | Mizutani et al. |
| 2019/0303807 A1 | 10/2019 | Gueye |
| 2019/0303834 A1 | 10/2019 | Paul et al. |
| 2019/0303843 A1 | 10/2019 | O'Brien et al. |
| 2019/0303853 A1 | 10/2019 | Cantrell et al. |
| 2019/0303854 A1 | 10/2019 | O'Brien et al. |

(56) References Cited

U.S. PATENT DOCUMENTS

| | | |
|---|---|---|
| 2019/0303867 A1 | 10/2019 | Nair |
| 2019/0303879 A1 | 10/2019 | Mankovskii et al. |
| 2019/0303882 A1 | 10/2019 | Purushothaman et al. |
| 2019/0303886 A1 | 10/2019 | Kikinis |
| 2019/0303887 A1 | 10/2019 | Wright et al. |
| 2019/0303888 A1 | 10/2019 | Hamasni et al. |
| 2019/0303892 A1 | 10/2019 | Yantis et al. |
| 2019/0303893 A1 | 10/2019 | Ramasamy et al. |
| 2019/0303913 A1 | 10/2019 | Muchang et al. |
| 2019/0303920 A1 | 10/2019 | Balaraman et al. |
| 2019/0303921 A1 | 10/2019 | Mutter |
| 2019/0303922 A1 | 10/2019 | Hamasni et al. |
| 2019/0303926 A1 | 10/2019 | Yantis et al. |
| 2019/0303927 A1 | 10/2019 | Shao et al. |
| 2019/0303929 A1 | 10/2019 | Brown et al. |
| 2019/0303931 A1 | 10/2019 | Valencia |
| 2019/0303932 A1 | 10/2019 | Klaedtke |
| 2019/0303933 A1 | 10/2019 | Lindsay et al. |
| 2019/0303935 A1 | 10/2019 | Cantrell et al. |
| 2019/0303939 A1 | 10/2019 | Kurian et al. |
| 2019/0303942 A1 | 10/2019 | Balaraman et al. |
| 2019/0303951 A1 | 10/2019 | Bakalis |
| 2019/0303960 A1 | 10/2019 | Walsh |
| 2019/0304005 A1 | 10/2019 | Ward et al. |
| 2019/0304012 A1 | 10/2019 | Ramirez et al. |
| 2019/0304027 A1 | 10/2019 | Hu et al. |
| 2019/0304038 A1 | 10/2019 | Purushothaman et al. |
| 2019/0304165 A1 | 10/2019 | Jacobs |
| 2019/0304253 A1 | 10/2019 | Dabrowski |
| 2019/0304259 A1 | 10/2019 | Joao |
| 2019/0304260 A1 | 10/2019 | Bosak |
| 2019/0304578 A1 | 10/2019 | Kain et al. |
| 2019/0304582 A1 | 10/2019 | Blumenthal et al. |
| 2019/0305931 A1 | 10/2019 | Borst et al. |
| 2019/0305932 A1 | 10/2019 | Townsend |
| 2019/0305933 A1 | 10/2019 | Miyamae et al. |
| 2019/0305934 A1 | 10/2019 | Cantrell et al. |
| 2019/0305935 A1 | 10/2019 | Qiu |
| 2019/0305936 A1 | 10/2019 | King |
| 2019/0305937 A1 | 10/2019 | Baykaner et al. |
| 2019/0305938 A1 | 10/2019 | Sandberg-Maitland et al. |
| 2019/0305943 A1 | 10/2019 | Hoersten et al. |
| 2019/0305949 A1 | 10/2019 | Hamel et al. |
| 2019/0305950 A1 | 10/2019 | Treat et al. |
| 2019/0305952 A1 | 10/2019 | Hamel et al. |
| 2019/0305954 A1 | 10/2019 | Hamel et al. |
| 2019/0305956 A1 | 10/2019 | Irani |
| 2019/0305957 A1 | 10/2019 | Reddy et al. |
| 2019/0305958 A1 | 10/2019 | Qiu |
| 2019/0305959 A1 | 10/2019 | Reddy et al. |
| 2019/0305960 A1 | 10/2019 | Szollosi |
| 2019/0305964 A1 | 10/2019 | Hamel et al. |
| 2019/0305965 A1 | 10/2019 | Hamel et al. |
| 2019/0305966 A1 | 10/2019 | Qiu |
| 2019/0305967 A1 | 10/2019 | Hamel et al. |
| 2019/0305968 A1 | 10/2019 | Versteeg et al. |
| 2019/0306124 A1 | 10/2019 | Bild et al. |
| 2019/0306128 A1 | 10/2019 | Kothavale et al. |
| 2019/0306137 A1 | 10/2019 | Isaacson et al. |
| 2019/0306143 A1 | 10/2019 | Hamel et al. |
| 2019/0306147 A1 | 10/2019 | Uhr et al. |
| 2019/0306148 A1 | 10/2019 | Uhr et al. |
| 2019/0306150 A1 | 10/2019 | Letz et al. |
| 2019/0306151 A1 | 10/2019 | Hamel et al. |
| 2019/0306173 A1 | 10/2019 | Reddy et al. |
| 2019/0306176 A1 | 10/2019 | Gleichauf |
| 2019/0306190 A1 | 10/2019 | Suraparaju |
| 2019/0306230 A1 | 10/2019 | Purushothaman et al. |
| 2019/0306232 A1 | 10/2019 | Brock |
| 2019/0306235 A1 | 10/2019 | Veale et al. |
| 2019/0306463 A1 | 10/2019 | Zuckerman et al. |
| 2019/0306549 A1 | 10/2019 | Dietz et al. |
| 2019/0306552 A1 | 10/2019 | Wood et al. |
| 2019/0306574 A1 | 10/2019 | Eccles et al. |
| 2019/0306647 A1 | 10/2019 | Lyren et al. |
| 2019/0306757 A1 | 10/2019 | Husain et al. |
| 2019/0307388 A1 | 10/2019 | Bobo et al. |
| 2019/0308806 A1 | 10/2019 | Gathman et al. |
| 2019/0310137 A1 | 10/2019 | Pop |
| 2019/0310695 A1 | 10/2019 | North et al. |
| 2019/0310878 A1 | 10/2019 | Qiu |
| 2019/0310900 A1 | 10/2019 | Lee et al. |
| 2019/0310943 A1 | 10/2019 | Noll et al. |
| 2019/0310980 A1 | 10/2019 | Zhang et al. |
| 2019/0311006 A1 | 10/2019 | Yelton et al. |
| 2019/0311033 A1 | 10/2019 | Evans |
| 2019/0311054 A1 | 10/2019 | Pundir et al. |
| 2019/0311090 A1 | 10/2019 | Nishida et al. |
| 2019/0311096 A1 | 10/2019 | Eldefrawy |
| 2019/0311100 A1 | 10/2019 | Lindell et al. |
| 2019/0311102 A1 | 10/2019 | Tussy |
| 2019/0311108 A1 | 10/2019 | Achkir et al. |
| 2019/0311116 A1 | 10/2019 | Li |
| 2019/0311125 A1 | 10/2019 | Mulgaonkar et al. |
| 2019/0311147 A1 | 10/2019 | Gollogly |
| 2019/0311148 A1 | 10/2019 | Andrade |
| 2019/0311153 A1 | 10/2019 | Hollinger et al. |
| 2019/0311196 A1 | 10/2019 | Chandrashekar et al. |
| 2019/0311296 A1 | 10/2019 | Fan et al. |
| 2019/0311336 A1 | 10/2019 | Kim et al. |
| 2019/0311337 A1 | 10/2019 | Madisetti et al. |
| 2019/0311341 A1 | 10/2019 | Rice |
| 2019/0311343 A1 | 10/2019 | Cantrell et al. |
| 2019/0311351 A1 | 10/2019 | Zhang et al. |
| 2019/0311352 A1 | 10/2019 | Lui et al. |
| 2019/0311353 A1 | 10/2019 | Solis |
| 2019/0311357 A1 | 10/2019 | Madisetti et al. |
| 2019/0311358 A1 | 10/2019 | Bhagavatha et al. |
| 2019/0311359 A1 | 10/2019 | Fett |
| 2019/0311392 A1 | 10/2019 | Swamidurai |
| 2019/0311417 A1 | 10/2019 | Randisi et al. |
| 2019/0311428 A1 | 10/2019 | Adjaoute |
| 2019/0311429 A1 | 10/2019 | Barkas et al. |
| 2019/0311431 A1 | 10/2019 | Simpson |
| 2019/0311437 A1 | 10/2019 | Sivakumar et al. |
| 2019/0311443 A1 | 10/2019 | Blades |
| 2019/0311447 A1 | 10/2019 | Strnad |
| 2019/0311571 A1 | 10/2019 | Halvorson et al. |
| 2019/0312440 A1 | 10/2019 | Pignier et al. |
| 2019/0312719 A1 | 10/2019 | Cheon et al. |
| 2019/0312727 A1 | 10/2019 | Del Pino et al. |
| 2019/0312728 A1 | 10/2019 | Poeppelmann |
| 2019/0312731 A1 | 10/2019 | Eldefrawy et al. |
| 2019/0312734 A1 | 10/2019 | Wentz et al. |
| 2019/0312736 A1 | 10/2019 | Dickenson et al. |
| 2019/0312792 A1 | 10/2019 | Srinivasan |
| 2019/0312831 A1 | 10/2019 | Gupta et al. |
| 2019/0312848 A1 | 10/2019 | Chennupalli et al. |
| 2019/0312852 A1 | 10/2019 | Hogan et al. |
| 2019/0312855 A1 | 10/2019 | Sharma et al. |
| 2019/0312863 A1 | 10/2019 | Chow et al. |
| 2019/0312869 A1 | 10/2019 | Han et al. |
| 2019/0312875 A1 | 10/2019 | Sardesai et al. |
| 2019/0312877 A1 | 10/2019 | Zhang et al. |
| 2019/0312878 A1 | 10/2019 | Brown et al. |
| 2019/0312879 A1 | 10/2019 | Agrawal et al. |
| 2019/0312886 A1 | 10/2019 | Ford et al. |
| 2019/0312915 A1 | 10/2019 | LaJoie et al. |
| 2019/0312928 A1 | 10/2019 | D'Ercoli et al. |
| 2019/0312939 A1 | 10/2019 | Noble |
| 2019/0312941 A1 | 10/2019 | Maccini et al. |
| 2019/0313576 A1 | 10/2019 | Haneda et al. |
| 2019/0314726 A1 | 10/2019 | Masini |
| 2019/0315314 A1 | 10/2019 | Haneda et al. |
| 2019/0316912 A1 | 10/2019 | Maggiore et al. |
| 2019/0317220 A1 | 10/2019 | Kocer et al. |
| 2019/0317651 A1 | 10/2019 | Chopra et al. |
| 2019/0317677 A1 | 10/2019 | Tanaka et al. |
| 2019/0317810 A1 | 10/2019 | Nguyen et al. |
| 2019/0317924 A1 | 10/2019 | Alimi et al. |
| 2019/0317934 A1 | 10/2019 | Jentzsch et al. |
| 2019/0317935 A1 | 10/2019 | Berti et al. |
| 2019/0317936 A1 | 10/2019 | Keskar |
| 2019/0317961 A1 | 10/2019 | Brener et al. |

(56) References Cited

U.S. PATENT DOCUMENTS

| | | |
|---|---|---|
| 2019/0317964 A1 | 10/2019 | O'Brien |
| 2019/0317968 A1 | 10/2019 | De Los Santos Vilchez et al. |
| 2019/0318012 A1 | 10/2019 | Danilov et al. |
| 2019/0318043 A1 | 10/2019 | Leka |
| 2019/0318066 A1 | 10/2019 | Davis et al. |
| 2019/0318109 A1 | 10/2019 | Thomas |
| 2019/0318117 A1 | 10/2019 | Beecham et al. |
| 2019/0318122 A1 | 10/2019 | Hockey et al. |
| 2019/0318128 A1 | 10/2019 | Ackerman et al. |
| 2019/0318129 A1 | 10/2019 | David et al. |
| 2019/0318243 A1 | 10/2019 | Margaglia et al. |
| 2019/0318257 A1 | 10/2019 | Gould et al. |
| 2019/0318265 A1 | 10/2019 | Gould et al. |
| 2019/0318286 A1 | 10/2019 | Simpson |
| 2019/0318291 A1 | 10/2019 | Diriye et al. |
| 2019/0318302 A1 | 10/2019 | Lawler, Jr. et al. |
| 2019/0318326 A1 | 10/2019 | Russell et al. |
| 2019/0318327 A1 | 10/2019 | Sowell et al. |
| 2019/0318328 A1 | 10/2019 | Castinado et al. |
| 2019/0318329 A1 | 10/2019 | Castinado et al. |
| 2019/0318332 A1 | 10/2019 | Whelan et al. |
| 2019/0318333 A1 | 10/2019 | Castinado et al. |
| 2019/0318338 A1 | 10/2019 | Verma et al. |
| 2019/0318346 A1 | 10/2019 | Ben-David et al. |
| 2019/0318348 A1 | 10/2019 | Brenner et al. |
| 2019/0318349 A1 | 10/2019 | Palombo et al. |
| 2019/0318350 A1 | 10/2019 | Hinkel et al. |
| 2019/0318351 A1 | 10/2019 | Ardashev et al. |
| 2019/0318353 A1 | 10/2019 | Castinado et al. |
| 2019/0318356 A1 | 10/2019 | Martin et al. |
| 2019/0318358 A1 | 10/2019 | Chamberlain et al. |
| 2019/0318359 A1 | 10/2019 | Arora |
| 2019/0318367 A1 | 10/2019 | Myles |
| 2019/0318377 A1 | 10/2019 | Sundaram et al. |
| 2019/0318399 A1 | 10/2019 | Davis et al. |
| 2019/0318408 A1 | 10/2019 | Chao et al. |
| 2019/0318423 A1 | 10/2019 | Kajicek et al. |
| 2019/0318424 A1 | 10/2019 | McWilliams et al. |
| 2019/0318425 A1 | 10/2019 | Tilley et al. |
| 2019/0318427 A1 | 10/2019 | Doney |
| 2019/0318433 A1 | 10/2019 | McGee et al. |
| 2019/0318631 A1 | 10/2019 | Seaman et al. |
| 2019/0318807 A1 | 10/2019 | O'Hara et al. |
| 2019/0318814 A1 | 10/2019 | Unwin |
| 2019/0318816 A1 | 10/2019 | Witchey |
| 2019/0319780 A1 | 10/2019 | Teo et al. |
| 2019/0319791 A1 | 10/2019 | Bos et al. |
| 2019/0319792 A1 | 10/2019 | Irwan et al. |
| 2019/0319794 A1 | 10/2019 | Haldar |
| 2019/0319798 A1 | 10/2019 | Chalkias |
| 2019/0319806 A1 | 10/2019 | Cheng et al. |
| 2019/0319808 A1 | 10/2019 | Fallah et al. |
| 2019/0319809 A1 | 10/2019 | Rowley |
| 2019/0319861 A1 | 10/2019 | Pan et al. |
| 2019/0319927 A1 | 10/2019 | Levine et al. |
| 2019/0319928 A1 | 10/2019 | Nesbit |
| 2019/0319932 A1 | 10/2019 | Kandregula |
| 2019/0319938 A1 | 10/2019 | Castinado et al. |
| 2019/0319939 A1 | 10/2019 | Hamel et al. |
| 2019/0319940 A1 | 10/2019 | Hamel et al. |
| 2019/0319945 A1 | 10/2019 | Levy et al. |
| 2019/0319948 A1 | 10/2019 | Triola et al. |
| 2019/0319961 A1 | 10/2019 | Levy et al. |
| 2019/0319964 A1 | 10/2019 | Smith et al. |
| 2019/0319968 A1 | 10/2019 | Mehta |
| 2019/0319971 A1 | 10/2019 | Levy et al. |
| 2019/0319980 A1 | 10/2019 | Levy et al. |
| 2019/0319987 A1 | 10/2019 | Levy et al. |
| 2019/0319993 A1 | 10/2019 | Christmas et al. |
| 2019/0320004 A1 | 10/2019 | Allen et al. |
| 2019/0320006 A1 | 10/2019 | Allen et al. |
| 2019/0320014 A1 | 10/2019 | Allen et al. |
| 2019/0320037 A1 | 10/2019 | Nair |
| 2019/0320061 A1 | 10/2019 | Salandy-Defour et al. |
| 2019/0320070 A1 | 10/2019 | Adams et al. |
| 2019/0320210 A1 | 10/2019 | Ilhan et al. |
| 2019/0320242 A1 | 10/2019 | Vaughn et al. |
| 2019/0320580 A1 | 10/2019 | Haneda et al. |
| 2019/0320898 A1 | 10/2019 | Dirghangi et al. |
| 2019/0321132 A1 | 10/2019 | Weir et al. |
| 2019/0322187 A1 | 10/2019 | Winkler et al. |
| 2019/0322426 A1 | 10/2019 | Verma et al. |
| 2019/0323858 A1 | 10/2019 | Wilkinson et al. |
| 2019/0324431 A1 | 10/2019 | Cella et al. |
| 2019/0324432 A1 | 10/2019 | Cella et al. |
| 2019/0324433 A1 | 10/2019 | Cella et al. |
| 2019/0324434 A1 | 10/2019 | Cella et al. |
| 2019/0324435 A1 | 10/2019 | Cella et al. |
| 2019/0324436 A1 | 10/2019 | Cella et al. |
| 2019/0324437 A1 | 10/2019 | Cella et al. |
| 2019/0324438 A1 | 10/2019 | Cella et al. |
| 2019/0324439 A1 | 10/2019 | Cella et al. |
| 2019/0324440 A1 | 10/2019 | Cella et al. |
| 2019/0324441 A1 | 10/2019 | Cella et al. |
| 2019/0324442 A1 | 10/2019 | Cella et al. |
| 2019/0324443 A1 | 10/2019 | Cella et al. |
| 2019/0324444 A1 | 10/2019 | Cella et al. |
| 2019/0324772 A1 | 10/2019 | Fan et al. |
| 2019/0324867 A1 | 10/2019 | Tang |
| 2019/0324958 A1 | 10/2019 | Ow et al. |
| 2019/0324989 A1 | 10/2019 | Borochoff et al. |
| 2019/0324995 A1 | 10/2019 | Jakobsson |
| 2019/0325038 A1 | 10/2019 | Finlow-Bates |
| 2019/0325044 A1 | 10/2019 | Gray |
| 2019/0325048 A1 | 10/2019 | Watkins et al. |
| 2019/0325082 A1 | 10/2019 | Laine et al. |
| 2019/0325085 A1 | 10/2019 | Stein et al. |
| 2019/0325115 A1 | 10/2019 | Wilkinson et al. |
| 2019/0325148 A1 | 10/2019 | Chen et al. |
| 2019/0325161 A1 | 10/2019 | Zavesky et al. |
| 2019/0325162 A1 | 10/2019 | Gireesan et al. |
| 2019/0325165 A1 | 10/2019 | Rodriguez De Castro et al. |
| 2019/0325227 A1 | 10/2019 | Smith et al. |
| 2019/0325258 A1 | 10/2019 | Stein et al. |
| 2019/0325262 A1 | 10/2019 | Stein et al. |
| 2019/0325367 A1 | 10/2019 | Tovey et al. |
| 2019/0325402 A1 | 10/2019 | Kassemi et al. |
| 2019/0325403 A1 | 10/2019 | Srinivasan |
| 2019/0325405 A1 | 10/2019 | Melika et al. |
| 2019/0325406 A1 | 10/2019 | Melika et al. |
| 2019/0325407 A1 | 10/2019 | Zhou et al. |
| 2019/0325408 A1 | 10/2019 | Goroff et al. |
| 2019/0325420 A1 | 10/2019 | Gardner |
| 2019/0325430 A1 | 10/2019 | Cui et al. |
| 2019/0325431 A1 | 10/2019 | Mann |
| 2019/0325432 A1 | 10/2019 | Ow et al. |
| 2019/0325433 A1 | 10/2019 | Hirsch et al. |
| 2019/0325436 A1 | 10/2019 | Cheng et al. |
| 2019/0325447 A1 | 10/2019 | Studnitzer |
| 2019/0325452 A1 | 10/2019 | Farjami |
| 2019/0325468 A1 | 10/2019 | Nagarajan |
| 2019/0325473 A1 | 10/2019 | Swamidurai |
| 2019/0325478 A1 | 10/2019 | Forsblom |
| 2019/0325495 A1 | 10/2019 | Stark |
| 2019/0325498 A1 | 10/2019 | Clark |
| 2019/0325502 A1 | 10/2019 | Tovey et al. |
| 2019/0325507 A1 | 10/2019 | Rowley et al. |
| 2019/0325512 A1 | 10/2019 | Watson et al. |
| 2019/0325515 A1 | 10/2019 | Weisberger et al. |
| 2019/0325517 A1 | 10/2019 | Jayaram et al. |
| 2019/0325522 A1 | 10/2019 | Bathia et al. |
| 2019/0325523 A1 | 10/2019 | Demetry et al. |
| 2019/0325526 A1 | 10/2019 | Slavin |
| 2019/0325528 A1 | 10/2019 | Adjaoute |
| 2019/0325532 A1 | 10/2019 | Torrenegra et al. |
| 2019/0325541 A1 | 10/2019 | Simpson |
| 2019/0325642 A1 | 10/2019 | Martinet |
| 2019/0325684 A1 | 10/2019 | Hackmann |
| 2019/0325691 A1 | 10/2019 | Tovey et al. |
| 2019/0325692 A1 | 10/2019 | Tovey et al. |
| 2019/0325700 A1 | 10/2019 | Jayachandran |
| 2019/0325719 A1 | 10/2019 | Bender et al. |
| 2019/0325794 A1 | 10/2019 | Huang |
| 2019/0327077 A1 | 10/2019 | Mandal et al. |

(56) References Cited

U.S. PATENT DOCUMENTS

| | | |
|---|---|---|
| 2019/0327078 A1 | 10/2019 | Zhang et al. |
| 2019/0327079 A1 | 10/2019 | Nandakumar et al. |
| 2019/0327080 A1 | 10/2019 | Liu et al. |
| 2019/0327081 A1 | 10/2019 | Ow et al. |
| 2019/0327082 A1 | 10/2019 | Ow et al. |
| 2019/0327083 A1 | 10/2019 | De Filippi |
| 2019/0327084 A1 | 10/2019 | Oh et al. |
| 2019/0327088 A1 | 10/2019 | Camenisch et al. |
| 2019/0327090 A1 | 10/2019 | Innes et al. |
| 2019/0327094 A1 | 10/2019 | Kan et al. |
| 2019/0327097 A1 | 10/2019 | Tang |
| 2019/0327102 A1 | 10/2019 | Ashwood-Smith et al. |
| 2019/0327180 A1 | 10/2019 | Todd et al. |
| 2019/0327200 A1 | 10/2019 | Buckingham et al. |
| 2019/0327216 A1 | 10/2019 | Walters |
| 2019/0327218 A1 | 10/2019 | Altenhofen et al. |
| 2019/0327234 A1 | 10/2019 | Smith et al. |
| 2019/0327239 A1 | 10/2019 | Ferguson |
| 2019/0327259 A1 | 10/2019 | DeFelice |
| 2019/0327292 A1 | 10/2019 | Ziebell et al. |
| 2019/0327299 A1 | 10/2019 | Diamanti et al. |
| 2019/0327328 A1 | 10/2019 | Smith et al. |
| 2019/0327329 A1 | 10/2019 | Kouru et al. |
| 2019/0328227 A1 | 10/2019 | Eades et al. |
| 2019/0328457 A1 | 10/2019 | Villongco et al. |
| 2019/0329669 A1 | 10/2019 | Soeda et al. |
| 2019/0331505 A1 | 10/2019 | Probst et al. |
| 2019/0331702 A1 | 10/2019 | Menhardt et al. |
| 2019/0332430 A1 | 10/2019 | Qiu |
| 2019/0332431 A1 | 10/2019 | Bhageria et al. |
| 2019/0332552 A1 | 10/2019 | Rodriguez De Castro |
| 2019/0332586 A1 | 10/2019 | Wang |
| 2019/0332608 A1 | 10/2019 | Qiu |
| 2019/0332691 A1 | 10/2019 | Beadles et al. |
| 2019/0332702 A1 | 10/2019 | Manamohan et al. |
| 2019/0332718 A1 | 10/2019 | Keskar et al. |
| 2019/0332719 A1 | 10/2019 | Keskar |
| 2019/0332729 A1 | 10/2019 | Villongco |
| 2019/0332783 A1 | 10/2019 | Bhardwaj et al. |
| 2019/0332791 A1 | 10/2019 | Mahalle |
| 2019/0332807 A1 | 10/2019 | LaFever et al. |
| 2019/0332809 A1 | 10/2019 | Uhr et al. |
| 2019/0332810 A1 | 10/2019 | Uhr et al. |
| 2019/0332817 A1 | 10/2019 | Rodriguez De Castro |
| 2019/0332818 A1 | 10/2019 | Rodriguez De Castro |
| 2019/0332821 A1 | 10/2019 | Ebert et al. |
| 2019/0332921 A1 | 10/2019 | Rodriguez |
| 2019/0332931 A1 | 10/2019 | Montantes |
| 2019/0332955 A1 | 10/2019 | Manamohan et al. |
| 2019/0332966 A1 | 10/2019 | Gidney |
| 2019/0332974 A1 | 10/2019 | Karatekeli et al. |
| 2019/0332995 A1 | 10/2019 | Tseng |
| 2019/0333029 A1 | 10/2019 | Kravitz |
| 2019/0333030 A1 | 10/2019 | Ramasamy et al. |
| 2019/0333031 A1 | 10/2019 | Kravitz |
| 2019/0333032 A1 | 10/2019 | Jayachandran et al. |
| 2019/0333033 A1 | 10/2019 | Finlow-Bates |
| 2019/0333048 A1 | 10/2019 | DiCross et al. |
| 2019/0333051 A1 | 10/2019 | Brogger |
| 2019/0333054 A1 | 10/2019 | Cona et al. |
| 2019/0333056 A1 | 10/2019 | Wilkinson et al. |
| 2019/0333057 A1 | 10/2019 | Miller |
| 2019/0333058 A1 | 10/2019 | Hong et al. |
| 2019/0333059 A1 | 10/2019 | Fallah et al. |
| 2019/0333066 A1 | 10/2019 | Kassemi et al. |
| 2019/0333096 A1 | 10/2019 | Johnson et al. |
| 2019/0333097 A1 | 10/2019 | Sohum et al. |
| 2019/0333116 A1 | 10/2019 | Bhardwaj et al. |
| 2019/0333142 A1 | 10/2019 | Thomas |
| 2019/0333143 A1 | 10/2019 | Williams |
| 2019/0333146 A1 | 10/2019 | Nuti |
| 2019/0333147 A1 | 10/2019 | Oved et al. |
| 2019/0333148 A1 | 10/2019 | Nuti |
| 2019/0333149 A1 | 10/2019 | Kim |
| 2019/0333166 A1 | 10/2019 | Simpson |
| 2019/0333169 A1 | 10/2019 | Povar et al. |
| 2019/0333171 A1 | 10/2019 | Tokhtabaev |
| 2019/0333181 A1 | 10/2019 | Simpson |
| 2019/0333214 A1 | 10/2019 | Haneda et al. |
| 2019/0333304 A1 | 10/2019 | Flynn et al. |
| 2019/0334694 A1 | 10/2019 | Chen et al. |
| 2019/0334695 A1 | 10/2019 | Veeningen |
| 2019/0334697 A1 | 10/2019 | Winslow et al. |
| 2019/0334698 A1 | 10/2019 | Singh |
| 2019/0334699 A1 | 10/2019 | Tang |
| 2019/0334700 A1 | 10/2019 | Callan et al. |
| 2019/0334703 A1 | 10/2019 | Keskar |
| 2019/0334704 A1 | 10/2019 | Keskar |
| 2019/0334708 A1 | 10/2019 | Carpov et al. |
| 2019/0334711 A1 | 10/2019 | Rodriguez De Castro |
| 2019/0334715 A1 | 10/2019 | Gray |
| 2019/0334716 A1 | 10/2019 | Kocsis et al. |
| 2019/0334717 A1 | 10/2019 | Lelcuk et al. |
| 2019/0334719 A1 | 10/2019 | Naqvi et al. |
| 2019/0334723 A1 | 10/2019 | Endress et al. |
| 2019/0334724 A1 | 10/2019 | Anton et al. |
| 2019/0334725 A1 | 10/2019 | Zhuang et al. |
| 2019/0334726 A1 | 10/2019 | Kelly |
| 2019/0334728 A1 | 10/2019 | Zhang |
| 2019/0334730 A1 | 10/2019 | Endress et al. |
| 2019/0334859 A1 | 10/2019 | Kannan et al. |
| 2019/0334886 A1 | 10/2019 | Lelcuk et al. |
| 2019/0334904 A1 | 10/2019 | Lelcuk et al. |
| 2019/0334905 A1 | 10/2019 | Lelcuk et al. |
| 2019/0334912 A1 | 10/2019 | Sloane et al. |
| 2019/0334920 A1 | 10/2019 | Kelly |
| 2019/0334954 A1 | 10/2019 | Manamohan et al. |
| 2019/0334957 A1 | 10/2019 | Davis et al. |
| 2019/0334997 A1 | 10/2019 | Yang |
| 2019/0335551 A1 | 10/2019 | Williams et al. |
| 2019/0335715 A1 | 11/2019 | Hicks et al. |
| 2019/0336401 A1 | 11/2019 | Hsu |
| 2019/0338962 A1 | 11/2019 | Minnoy |
| 2019/0339668 A1 | 11/2019 | Biernat et al. |
| 2019/0339678 A1 | 11/2019 | Biernat et al. |
| 2019/0339684 A1 | 11/2019 | Cella et al. |
| 2019/0339685 A1 | 11/2019 | Cella et al. |
| 2019/0339686 A1 | 11/2019 | Cella et al. |
| 2019/0339687 A1 | 11/2019 | Cella et al. |
| 2019/0339688 A1 | 11/2019 | Cella et al. |
| 2019/0339712 A1 | 11/2019 | Williams et al. |
| 2019/0339756 A1 | 11/2019 | Lewis et al. |
| 2019/0339974 A1 | 11/2019 | Wallach |
| 2019/0339975 A1 | 11/2019 | Wallach |
| 2019/0339977 A1 | 11/2019 | Wallach |
| 2019/0339978 A1 | 11/2019 | Wallach |
| 2019/0340013 A1 | 11/2019 | Cella |
| 2019/0340042 A1 | 11/2019 | Li |
| 2019/0340110 A1 | 11/2019 | Kupitman et al. |
| 2019/0340136 A1 | 11/2019 | Irwin et al. |
| 2019/0340169 A1 | 11/2019 | Shima et al. |
| 2019/0340170 A1 | 11/2019 | Pierce et al. |
| 2019/0340216 A1 | 11/2019 | Dutta et al. |
| 2019/0340264 A1 | 11/2019 | Yu et al. |
| 2019/0340266 A1 | 11/2019 | Vo et al. |
| 2019/0340267 A1 | 11/2019 | Vo et al. |
| 2019/0340269 A1 | 11/2019 | Biernat et al. |
| 2019/0340306 A1 | 11/2019 | Harrison et al. |
| 2019/0340350 A1 | 11/2019 | Campbell |
| 2019/0340352 A1 | 11/2019 | Peeters et al. |
| 2019/0340361 A1 | 11/2019 | Daniel et al. |
| 2019/0340362 A1 | 11/2019 | Wright et al. |
| 2019/0340369 A1 | 11/2019 | Hadi |
| 2019/0340371 A1 | 11/2019 | Williams |
| 2019/0340379 A1 | 11/2019 | Beecham |
| 2019/0340467 A1 | 11/2019 | Cella |
| 2019/0340575 A1 | 11/2019 | Kankaria et al. |
| 2019/0340584 A1 | 11/2019 | Arora et al. |
| 2019/0340586 A1 | 11/2019 | Sheng et al. |
| 2019/0340587 A1 | 11/2019 | Batton |
| 2019/0340588 A1 | 11/2019 | Haldenby et al. |
| 2019/0340594 A1 | 11/2019 | Peterson |
| 2019/0340597 A1 | 11/2019 | Carlyle et al. |
| 2019/0340600 A1 | 11/2019 | Hudson et al. |

(56) References Cited

U.S. PATENT DOCUMENTS

| | | |
|---|---|---|
| 2019/0340605 A1 | 11/2019 | Lewis et al. |
| 2019/0340607 A1 | 11/2019 | Lynn et al. |
| 2019/0340608 A1 | 11/2019 | Lindsay et al. |
| 2019/0340609 A1 | 11/2019 | Mayadas et al. |
| 2019/0340619 A1 | 11/2019 | Leong et al. |
| 2019/0340623 A1 | 11/2019 | Rivkind et al. |
| 2019/0340627 A1 | 11/2019 | Cella |
| 2019/0340645 A1 | 11/2019 | Cella |
| 2019/0340673 A1 | 11/2019 | Noviello et al. |
| 2019/0340683 A1 | 11/2019 | Kundu |
| 2019/0340685 A1 | 11/2019 | Wade et al. |
| 2019/0340686 A1 | 11/2019 | Cella |
| 2019/0340689 A1 | 11/2019 | Gordon et al. |
| 2019/0340703 A1 | 11/2019 | West et al. |
| 2019/0340707 A1 | 11/2019 | Cella |
| 2019/0340715 A1 | 11/2019 | Cella |
| 2019/0340716 A1 | 11/2019 | Cella |
| 2019/0340885 A1 | 11/2019 | Kehoe |
| 2019/0340888 A1 | 11/2019 | Hartl |
| 2019/0340906 A1 | 11/2019 | Williams |
| 2019/0340946 A1 | 11/2019 | Elmessiry et al. |
| 2019/0341134 A1 | 11/2019 | Shah |
| 2019/0342073 A1 | 11/2019 | Dai |
| 2019/0342074 A1 | 11/2019 | Housholder et al. |
| 2019/0342076 A1 | 11/2019 | O'Connor |
| 2019/0342077 A1 | 11/2019 | McMurdie et al. |
| 2019/0342078 A1 | 11/2019 | Li |
| 2019/0342084 A1 | 11/2019 | Mehedy et al. |
| 2019/0342085 A1 | 11/2019 | Kube et al. |
| 2019/0342087 A1 | 11/2019 | Rodriguez De Castro |
| 2019/0342094 A1 | 11/2019 | Davis |
| 2019/0342095 A1 | 11/2019 | Simons |
| 2019/0342099 A1 | 11/2019 | Rodriguez De Castro |
| 2019/0342143 A1 | 11/2019 | Lin |
| 2019/0342149 A1 | 11/2019 | Guo et al. |
| 2019/0342270 A1 | 11/2019 | Laine et al. |
| 2019/0342290 A1 | 11/2019 | Mittal et al. |
| 2019/0342295 A1 | 11/2019 | Peterson |
| 2019/0342336 A1 | 11/2019 | Finkelstein et al. |
| 2019/0342344 A1 | 11/2019 | Anton et al. |
| 2019/0342382 A1 | 11/2019 | Tang et al. |
| 2019/0342407 A1 | 11/2019 | Ma et al. |
| 2019/0342415 A1 | 11/2019 | Lu |
| 2019/0342422 A1 | 11/2019 | Li |
| 2019/0342528 A1 | 11/2019 | Broaddus |
| 2019/0342731 A1 | 11/2019 | Krishnamoorth et al. |
| 2019/0343317 A1 | 11/2019 | Cantrell et al. |
| 2019/0343429 A1 | 11/2019 | Elhawary et al. |
| 2019/0347105 A1 | 11/2019 | Cella |
| 2019/0347243 A1 | 11/2019 | Wilkinson et al. |
| 2019/0347268 A1 | 11/2019 | Griffith |
| 2019/0347290 A1 | 11/2019 | Yang |
| 2019/0347347 A1 | 11/2019 | Griffith |
| 2019/0347368 A1 | 11/2019 | Duff et al. |
| 2019/0347397 A1 | 11/2019 | Cramer |
| 2019/0347398 A1 | 11/2019 | Cramer |
| 2019/0347399 A1 | 11/2019 | Cramer |
| 2019/0347420 A1 | 11/2019 | Schultz et al. |
| 2019/0347433 A1 | 11/2019 | Chakravorty et al. |
| 2019/0347442 A1 | 11/2019 | Marlin et al. |
| 2019/0347444 A1 | 11/2019 | Lowagie |
| 2019/0347601 A1 | 11/2019 | Aborishade |
| 2019/0347605 A1 | 11/2019 | Wan et al. |
| 2019/0347624 A1 | 11/2019 | Pustizzi |
| 2019/0347625 A1 | 11/2019 | Neron |
| 2019/0347626 A1 | 11/2019 | Wullschleger et al. |
| 2019/0347627 A1 | 11/2019 | Lin et al. |
| 2019/0347628 A1 | 11/2019 | Al-Naji et al. |
| 2019/0347651 A1 | 11/2019 | Moreno |
| 2019/0347652 A1 | 11/2019 | Johnson |
| 2019/0347653 A1 | 11/2019 | Lu et al. |
| 2019/0347654 A1 | 11/2019 | Lu et al. |
| 2019/0347655 A1 | 11/2019 | Sewell |
| 2019/0347656 A1 | 11/2019 | Lu et al. |
| 2019/0347657 A1 | 11/2019 | Guo et al. |
| 2019/0347658 A1 | 11/2019 | Haimes et al. |
| 2019/0347660 A1 | 11/2019 | Wilkinson et al. |
| 2019/0347661 A1 | 11/2019 | Grenader et al. |
| 2019/0347663 A1 | 11/2019 | Li |
| 2019/0347685 A1 | 11/2019 | Glazier et al. |
| 2019/0347699 A1 | 11/2019 | Bradley et al. |
| 2019/0347724 A1 | 11/2019 | Krupp |
| 2019/0347725 A1 | 11/2019 | de Jong |
| 2019/0347738 A1 | 11/2019 | Ledesma et al. |
| 2019/0348158 A1 | 11/2019 | Livesay et al. |
| 2019/0348174 A1 | 11/2019 | Spirer |
| 2019/0349185 A1 | 11/2019 | Kim et al. |
| 2019/0349188 A1 | 11/2019 | Guo et al. |
| 2019/0349190 A1 | 11/2019 | Smith et al. |
| 2019/0349191 A1 | 11/2019 | Soriente et al. |
| 2019/0349195 A1 | 11/2019 | Finlow-Bates |
| 2019/0349199 A1 | 11/2019 | Wang et al. |
| 2019/0349200 A1 | 11/2019 | Wang et al. |
| 2019/0349201 A1 | 11/2019 | Fuerstner |
| 2019/0349203 A1 | 11/2019 | Scherrer et al. |
| 2019/0349205 A1 | 11/2019 | Brady et al. |
| 2019/0349254 A1 | 11/2019 | Nolan et al. |
| 2019/0349261 A1 | 11/2019 | Smith et al. |
| 2019/0349321 A1 | 11/2019 | Cai et al. |
| 2019/0349343 A1 | 11/2019 | Gollogly |
| 2019/0349346 A1 | 11/2019 | Curtis et al. |
| 2019/0349347 A1 | 11/2019 | Curtis et al. |
| 2019/0349356 A1 | 11/2019 | McElwee et al. |
| 2019/0349361 A1 | 11/2019 | Brown et al. |
| 2019/0349371 A1 | 11/2019 | Smith et al. |
| 2019/0349372 A1 | 11/2019 | Smith et al. |
| 2019/0349426 A1 | 11/2019 | Smith et al. |
| 2019/0349433 A1 | 11/2019 | Smith et al. |
| 2019/0349628 A1 | 11/2019 | Cholas et al. |
| 2019/0349680 A1 | 11/2019 | Sculley et al. |
| 2019/0349708 A1 | 11/2019 | Jones |
| 2019/0349733 A1 | 11/2019 | Nolan et al. |
| 2019/0349794 A1 | 11/2019 | Tavares Coutinho et al. |
| 2019/0351694 A1 | 11/2019 | Trexler et al. |
| 2019/0353139 A1 | 11/2019 | Sheldon-Coulson et al. |
| 2019/0353629 A1 | 11/2019 | Jung et al. |
| 2019/0353685 A1 | 11/2019 | Almeida Cavoto et al. |
| 2019/0353709 A1 | 11/2019 | Kaisers |
| 2019/0354076 A1 | 11/2019 | Henson et al. |
| 2019/0354170 A1 | 11/2019 | Rosedale |
| 2019/0354189 A1 | 11/2019 | Rosedale |
| 2019/0354191 A1 | 11/2019 | Reynolds |
| 2019/0354374 A1 | 11/2019 | Cella |
| 2019/0354397 A1 | 11/2019 | Goel et al. |
| 2019/0354398 A1 | 11/2019 | Aggarwal et al. |
| 2019/0354450 A1 | 11/2019 | Grunwald et al. |
| 2019/0354518 A1 | 11/2019 | Zochowski |
| 2019/0354523 A1 | 11/2019 | Kheterpal et al. |
| 2019/0354606 A1 | 11/2019 | Snow |
| 2019/0354607 A1 | 11/2019 | Snow |
| 2019/0354611 A1 | 11/2019 | Snow |
| 2019/0354614 A1 | 11/2019 | Chui et al. |
| 2019/0354628 A1 | 11/2019 | Grunwald et al. |
| 2019/0354693 A1 | 11/2019 | Yoon et al. |
| 2019/0354694 A1 | 11/2019 | Azoulay |
| 2019/0354708 A1 | 11/2019 | Fisher et al. |
| 2019/0354723 A1 | 11/2019 | Dassenno |
| 2019/0354724 A1 | 11/2019 | Lowagie |
| 2019/0354725 A1 | 11/2019 | Lowagie |
| 2019/0354771 A1 | 11/2019 | Kleinrock et al. |
| 2019/0354829 A1 | 11/2019 | McDonald et al. |
| 2019/0354887 A1 | 11/2019 | Subramanian et al. |
| 2019/0354922 A1 | 11/2019 | Berti et al. |
| 2019/0354943 A1 | 11/2019 | Mulye et al. |
| 2019/0354944 A1 | 11/2019 | Russinovich |
| 2019/0354945 A1 | 11/2019 | Mahajan et al. |
| 2019/0354962 A1 | 11/2019 | Spector |
| 2019/0354963 A1 | 11/2019 | Di Iorio et al. |
| 2019/0354964 A1 | 11/2019 | Snow |
| 2019/0354966 A1 | 11/2019 | Himura et al. |
| 2019/0354967 A1 | 11/2019 | Lee et al. |
| 2019/0354968 A1 | 11/2019 | Sato et al. |
| 2019/0354969 A1 | 11/2019 | Spector et al. |
| 2019/0354970 A1 | 11/2019 | Di Iorio et al. |

(56) References Cited

U.S. PATENT DOCUMENTS

| | | |
|---|---|---|
| 2019/0354971 A1 | 11/2019 | Ettensohn et al. |
| 2019/0354972 A1 | 11/2019 | Di Nicola |
| 2019/0354975 A1 | 11/2019 | Wettan |
| 2019/0354976 A1 | 11/2019 | Vincent |
| 2019/0354977 A1 | 11/2019 | Tang |
| 2019/0354989 A1 | 11/2019 | Saket et al. |
| 2019/0355005 A1 | 11/2019 | Kappagantu et al. |
| 2019/0355025 A1 | 11/2019 | Yang |
| 2019/0355031 A1 | 11/2019 | Cella |
| 2019/0355053 A1 | 11/2019 | Hwang |
| 2019/0355057 A1 | 11/2019 | Phillips et al. |
| 2019/0355059 A1 | 11/2019 | Liberman et al. |
| 2019/0355060 A1 | 11/2019 | Collins et al. |
| 2019/0355076 A1 | 11/2019 | Marcinkowski et al. |
| 2019/0355113 A1 | 11/2019 | Wirch et al. |
| 2019/0355450 A1 | 11/2019 | Altstadter et al. |
| 2019/0355460 A1 | 11/2019 | Mann |
| 2019/0355472 A1 | 11/2019 | Kutzko |
| 2019/0355483 A1 | 11/2019 | Smurro |
| 2019/0356164 A1 | 11/2019 | Ghaemi et al. |
| 2019/0356467 A1 | 11/2019 | Vincent |
| 2019/0356469 A1 | 11/2019 | Deshpande et al. |
| 2019/0356470 A1 | 11/2019 | Deshpande et al. |
| 2019/0356471 A1 | 11/2019 | Vaughn et al. |
| 2019/0356472 A1 | 11/2019 | Allen |
| 2019/0356473 A1 | 11/2019 | Rosenoer et al. |
| 2019/0356475 A1 | 11/2019 | Resch et al. |
| 2019/0356481 A1 | 11/2019 | Spector et al. |
| 2019/0356484 A1 | 11/2019 | Ettensohn et al. |
| 2019/0356491 A1 | 11/2019 | Herder et al. |
| 2019/0356493 A1 | 11/2019 | Fisher et al. |
| 2019/0356539 A1 | 11/2019 | Soon-Shiong et al. |
| 2019/0356609 A1 | 11/2019 | Grunwald et al. |
| 2019/0356638 A1 | 11/2019 | Filter et al. |
| 2019/0356641 A1 | 11/2019 | Isaacson et al. |
| 2019/0356657 A1 | 11/2019 | Andrade |
| 2019/0356658 A1 | 11/2019 | Arana et al. |
| 2019/0356662 A1 | 11/2019 | Scott et al. |
| 2019/0356672 A1 | 11/2019 | Bondugula et al. |
| 2019/0356674 A1 | 11/2019 | Irazabal et al. |
| 2019/0356680 A1 | 11/2019 | Dogu et al. |
| 2019/0356733 A1 | 11/2019 | Snow |
| 2019/0356736 A1 | 11/2019 | Narayanaswamy et al. |
| 2019/0356745 A1 | 11/2019 | Rosedale |
| 2019/0356775 A1 | 11/2019 | Patel et al. |
| 2019/0356945 A1 | 11/2019 | Ellis et al. |
| 2019/0357049 A1 | 11/2019 | Tali et al. |
| 2019/0358428 A1 | 11/2019 | Wang |
| 2019/0358515 A1 | 11/2019 | Tran et al. |
| 2019/0358543 A1 | 11/2019 | Turner et al. |
| 2019/0359056 A1 | 11/2019 | Wilson et al. |
| 2019/0361626 A1 | 11/2019 | East |
| 2019/0361663 A1 | 11/2019 | De Angelis et al. |
| 2019/0361697 A1 | 11/2019 | Hu et al. |
| 2019/0361731 A1 | 11/2019 | Qiu |
| 2019/0361842 A1 | 11/2019 | Wood et al. |
| 2019/0361867 A1 | 11/2019 | Nilsson et al. |
| 2019/0361869 A1 | 11/2019 | Krabbenhoft et al. |
| 2019/0361874 A1 | 11/2019 | Fukuchi et al. |
| 2019/0361891 A1 | 11/2019 | Griffith et al. |
| 2019/0361917 A1 | 11/2019 | Tran et al. |
| 2019/0361992 A1 | 11/2019 | Kaguma et al. |
| 2019/0362054 A1 | 11/2019 | Diehl |
| 2019/0362068 A1 | 11/2019 | Wang |
| 2019/0362287 A1 | 11/2019 | Achkir |
| 2019/0362305 A1 | 11/2019 | Johnson |
| 2019/0362323 A1 | 11/2019 | Singleton |
| 2019/0362340 A1 | 11/2019 | Strong et al. |
| 2019/0362348 A1 | 11/2019 | Wong et al. |
| 2019/0362352 A1 | 11/2019 | Kumawat et al. |
| 2019/0362361 A1 | 11/2019 | Irazabal et al. |
| 2019/0362376 A1 | 11/2019 | Newell et al. |
| 2019/0362388 A1 | 11/2019 | Bugga et al. |
| 2019/0362389 A1 | 11/2019 | Turner et al. |
| 2019/0362392 A1 | 11/2019 | Kim |
| 2019/0362400 A1 | 11/2019 | Onizuka |
| 2019/0362430 A1 | 11/2019 | Jass |
| 2019/0362443 A1 | 11/2019 | McCoy et al. |
| 2019/0362446 A1 | 11/2019 | Navarro |
| 2019/0362457 A1 | 11/2019 | Mozarkar |
| 2019/0362616 A1 | 11/2019 | Hermann et al. |
| 2019/0362716 A1 | 11/2019 | Tran et al. |
| 2019/0362826 A1 | 11/2019 | Viskovich et al. |
| 2019/0362828 A1 | 11/2019 | Laxer |
| 2019/0363854 A1 | 11/2019 | Wang et al. |
| 2019/0363870 A1 | 11/2019 | Wagner |
| 2019/0363871 A1 | 11/2019 | Cheon et al. |
| 2019/0363872 A1 | 11/2019 | Shim et al. |
| 2019/0363873 A1 | 11/2019 | Fry et al. |
| 2019/0363874 A1 | 11/2019 | Shirley et al. |
| 2019/0363875 A1 | 11/2019 | Iseminger |
| 2019/0363877 A1 | 11/2019 | Figueira |
| 2019/0363878 A1 | 11/2019 | Sato et al. |
| 2019/0363881 A1 | 11/2019 | Bakalis et al. |
| 2019/0363882 A1 | 11/2019 | Levy |
| 2019/0363883 A1 | 11/2019 | Rao et al. |
| 2019/0363884 A1 | 11/2019 | Johnson |
| 2019/0363889 A1 | 11/2019 | Wang |
| 2019/0363890 A1 | 11/2019 | Johnson |
| 2019/0363892 A1 | 11/2019 | Wang |
| 2019/0363896 A1 | 11/2019 | Finlow-Bates |
| 2019/0363905 A1 | 11/2019 | Yarvis et al. |
| 2019/0363938 A1 | 11/2019 | Liebinger Portela et al. |
| 2019/0364021 A1 | 11/2019 | Mitchell |
| 2019/0364045 A1 | 11/2019 | Armknecht et al. |
| 2019/0364046 A1 | 11/2019 | Kurian et al. |
| 2019/0364055 A1 | 11/2019 | Ford |
| 2019/0364056 A1 | 11/2019 | Ford |
| 2019/0364057 A1 | 11/2019 | Hazay et al. |
| 2019/0364426 A1 | 11/2019 | Muthukrishnan et al. |
| 2019/0364698 A1 | 11/2019 | Johnson et al. |
| 2019/0365014 A1 | 12/2019 | Andon |
| 2019/0365016 A1 | 12/2019 | Andon et al. |
| 2019/0365063 A1 | 12/2019 | Nyfeler et al. |
| 2019/0365282 A1 | 12/2019 | Gibson |
| 2019/0365592 A1 | 12/2019 | Norton et al. |
| 2019/0366475 A1 | 12/2019 | Scarselli et al. |
| 2019/0368233 A1 | 12/2019 | Gengler et al. |
| 2019/0369644 A1 | 12/2019 | Goudy et al. |
| 2019/0369721 A1 | 12/2019 | Rajasingham |
| 2019/0370012 A1 | 12/2019 | Sears et al. |
| 2019/0370058 A1 | 12/2019 | Gupta et al. |
| 2019/0370223 A1 | 12/2019 | Yang et al. |
| 2019/0370241 A1 | 12/2019 | Miraldo et al. |
| 2019/0370250 A1 | 12/2019 | Tipton et al. |
| 2019/0370286 A1 | 12/2019 | Bertsch et al. |
| 2019/0370330 A1 | 12/2019 | Chen et al. |
| 2019/0370334 A1 | 12/2019 | Bhowmick et al. |
| 2019/0370358 A1 | 12/2019 | Nation et al. |
| 2019/0370366 A1 | 12/2019 | Scott et al. |
| 2019/0370446 A1 | 12/2019 | Davis et al. |
| 2019/0370479 A1 | 12/2019 | Uhr et al. |
| 2019/0370484 A1 | 12/2019 | Klein |
| 2019/0370486 A1 | 12/2019 | Wang et al. |
| 2019/0370500 A1 | 12/2019 | Lee et al. |
| 2019/0370504 A1 | 12/2019 | Edwardsson |
| 2019/0370624 A1 | 12/2019 | Khoche |
| 2019/0370634 A1 | 12/2019 | Ferreira Moreno et al. |
| 2019/0370652 A1 | 12/2019 | Shen et al. |
| 2019/0370732 A1 | 12/2019 | Luzada et al. |
| 2019/0370740 A1 | 12/2019 | Brow |
| 2019/0370760 A1 | 12/2019 | Kundu et al. |
| 2019/0370761 A1 | 12/2019 | Iwanami |
| 2019/0370762 A1 | 12/2019 | Byington et al. |
| 2019/0370788 A1 | 12/2019 | Aronson |
| 2019/0370789 A1 | 12/2019 | McCallum |
| 2019/0370791 A1 | 12/2019 | Stark et al. |
| 2019/0370792 A1 | 12/2019 | Lam |
| 2019/0370793 A1 | 12/2019 | Zhu et al. |
| 2019/0370797 A1 | 12/2019 | Jevans et al. |
| 2019/0370798 A1 | 12/2019 | Hu et al. |
| 2019/0370799 A1 | 12/2019 | Vivas et al. |
| 2019/0370806 A1 | 12/2019 | Wang et al. |
| 2019/0370807 A1 | 12/2019 | Hu et al. |

(56) References Cited

U.S. PATENT DOCUMENTS

| | | |
|---|---|---|
| 2019/0370808 A1 | 12/2019 | Jackman et al. |
| 2019/0370809 A1 | 12/2019 | Hu et al. |
| 2019/0370810 A1 | 12/2019 | Hu et al. |
| 2019/0370811 A1 | 12/2019 | Zhang et al. |
| 2019/0370813 A1 | 12/2019 | Bravick et al. |
| 2019/0370816 A1 | 12/2019 | Hu |
| 2019/0370839 A1 | 12/2019 | Fahmie et al. |
| 2019/0370842 A1 | 12/2019 | Boyapally et al. |
| 2019/0370847 A1 | 12/2019 | Khan |
| 2019/0370855 A1 | 12/2019 | Boyapally et al. |
| 2019/0370857 A1 | 12/2019 | Boyapally et al. |
| 2019/0370866 A1 | 12/2019 | Lawbaugh et al. |
| 2019/0370905 A1 | 12/2019 | Hu |
| 2019/0370919 A1 | 12/2019 | Woodrow et al. |
| 2019/0370925 A1 | 12/2019 | Edwards |
| 2019/0371102 A1 | 12/2019 | Prostko et al. |
| 2019/0371106 A1 | 12/2019 | Kaye |
| 2019/0371117 A1 | 12/2019 | Hiten et al. |
| 2019/0371129 A1 | 12/2019 | Hall |
| 2019/0371176 A1 | 12/2019 | Montemurro et al. |
| 2019/0371335 A1 | 12/2019 | Shastry et al. |
| 2019/0371457 A1 | 12/2019 | Paffel et al. |
| 2019/0372345 A1 | 12/2019 | Bain et al. |
| 2019/0372754 A1 | 12/2019 | Gou et al. |
| 2019/0372755 A1 | 12/2019 | Tadie |
| 2019/0372756 A1 | 12/2019 | Kim et al. |
| 2019/0372759 A1 | 12/2019 | Rix |
| 2019/0372760 A1 | 12/2019 | Zheng et al. |
| 2019/0372762 A1 | 12/2019 | Shainski et al. |
| 2019/0372763 A1 | 12/2019 | Yang et al. |
| 2019/0372765 A1 | 12/2019 | Tegeder et al. |
| 2019/0372768 A1 | 12/2019 | Veeningen |
| 2019/0372769 A1 | 12/2019 | Fisher et al. |
| 2019/0372770 A1 | 12/2019 | Xu et al. |
| 2019/0372772 A1 | 12/2019 | Novotny et al. |
| 2019/0372773 A1 | 12/2019 | Bertsch et al. |
| 2019/0372776 A1 | 12/2019 | Kroneisen et al. |
| 2019/0372778 A1 | 12/2019 | Palaniappan et al. |
| 2019/0372779 A1 | 12/2019 | Monica et al. |
| 2019/0372781 A1 | 12/2019 | Ra et al. |
| 2019/0372786 A1 | 12/2019 | Ra et al. |
| 2019/0372825 A1 | 12/2019 | Suga |
| 2019/0372834 A1 | 12/2019 | Patil et al. |
| 2019/0372882 A1 | 12/2019 | Imai |
| 2019/0372931 A1 | 12/2019 | Irwan et al. |
| 2019/0372938 A1 | 12/2019 | Pasdar |
| 2019/0372950 A1 | 12/2019 | McClure |
| 2019/0372956 A1 | 12/2019 | Breu |
| 2019/0372965 A1 | 12/2019 | Kravitz et al. |
| 2019/0372985 A1 | 12/2019 | Zamora Duran et al. |
| 2019/0372987 A1 | 12/2019 | He et al. |
| 2019/0373015 A1 | 12/2019 | Kozloski et al. |
| 2019/0373047 A1 | 12/2019 | Ziebell et al. |
| 2019/0373051 A1 | 12/2019 | Binotto et al. |
| 2019/0373134 A1 | 12/2019 | Arakawa |
| 2019/0373136 A1 | 12/2019 | Diaz et al. |
| 2019/0373137 A1 | 12/2019 | Krukar et al. |
| 2019/0373339 A1 | 12/2019 | Bradley et al. |
| 2019/0373459 A1 | 12/2019 | Barkan |
| 2019/0373472 A1 | 12/2019 | Smith et al. |
| 2019/0373521 A1 | 12/2019 | Crawford |
| 2019/0373862 A1 | 12/2019 | Hummer et al. |
| 2019/0375373 A1 | 12/2019 | Pepe et al. |
| 2019/0377029 A1 | 12/2019 | Shiiyama et al. |
| 2019/0377336 A1 | 12/2019 | Avery et al. |
| 2019/0377394 A1 | 12/2019 | Klaba |
| 2019/0377461 A1 | 12/2019 | Akhanov et al. |
| 2019/0377617 A1 | 12/2019 | Jacobs et al. |
| 2019/0377645 A1 | 12/2019 | Abraham et al. |
| 2019/0377648 A1 | 12/2019 | Abraham et al. |
| 2019/0377660 A1 | 12/2019 | Huang |
| 2019/0377712 A1 | 12/2019 | Miller et al. |
| 2019/0377722 A1 | 12/2019 | Stefferud et al. |
| 2019/0377724 A1 | 12/2019 | Pennington et al. |
| 2019/0377805 A1 | 12/2019 | Chilakamarri et al. |
| 2019/0377806 A1 | 12/2019 | Padmanabhan et al. |
| 2019/0377811 A1 | 12/2019 | Aleksander et al. |
| 2019/0377889 A1 | 12/2019 | Mertens et al. |
| 2019/0377899 A1 | 12/2019 | Stecher |
| 2019/0377904 A1 | 12/2019 | Sinha et al. |
| 2019/0378024 A1 | 12/2019 | Singh et al. |
| 2019/0378069 A1 | 12/2019 | Deshpande et al. |
| 2019/0378073 A1 | 12/2019 | Lopez et al. |
| 2019/0378080 A1 | 12/2019 | Srinivasan et al. |
| 2019/0378081 A1 | 12/2019 | Swartz et al. |
| 2019/0378092 A1 | 12/2019 | Alexander et al. |
| 2019/0378094 A1 | 12/2019 | Quinn |
| 2019/0378096 A1 | 12/2019 | Bielak, Sr. |
| 2019/0378098 A1 | 12/2019 | Lam et al. |
| 2019/0378106 A1 | 12/2019 | Bonestell et al. |
| 2019/0378119 A1 | 12/2019 | Hyuga et al. |
| 2019/0378121 A1 | 12/2019 | Marshall et al. |
| 2019/0378122 A1 | 12/2019 | Furukawa |
| 2019/0378127 A1 | 12/2019 | Dudar et al. |
| 2019/0378128 A1 | 12/2019 | Moore et al. |
| 2019/0378133 A1 | 12/2019 | Deshpande et al. |
| 2019/0378134 A1 | 12/2019 | Asari |
| 2019/0378136 A1 | 12/2019 | Efraim et al. |
| 2019/0378137 A1 | 12/2019 | Honey et al. |
| 2019/0378139 A1 | 12/2019 | Stribady et al. |
| 2019/0378140 A1 | 12/2019 | Sarkissian et al. |
| 2019/0378142 A1 | 12/2019 | Darnell et al. |
| 2019/0378152 A1 | 12/2019 | Zhang et al. |
| 2019/0378153 A1 | 12/2019 | Eich et al. |
| 2019/0378162 A1 | 12/2019 | Goldberg et al. |
| 2019/0378164 A1 | 12/2019 | Eich et al. |
| 2019/0378165 A1 | 12/2019 | Frutschy |
| 2019/0378166 A1 | 12/2019 | Eich et al. |
| 2019/0378176 A1 | 12/2019 | O'Brien |
| 2019/0378192 A1 | 12/2019 | Fox |
| 2019/0378207 A1 | 12/2019 | Dibner-Dunlap et al. |
| 2019/0378220 A1 | 12/2019 | Ibrahim |
| 2019/0378224 A1 | 12/2019 | Krych |
| 2019/0378227 A1 | 12/2019 | Vanzetta |
| 2019/0378230 A1 | 12/2019 | Lawrenson et al. |
| 2019/0378352 A1 | 12/2019 | Dey et al. |
| 2019/0378386 A1 | 12/2019 | Bender et al. |
| 2019/0378418 A1 | 12/2019 | Menadue |
| 2019/0378619 A1 | 12/2019 | Meyer et al. |
| 2019/0379529 A1 | 12/2019 | Meyer et al. |
| 2019/0379530 A1 | 12/2019 | Suthar et al. |
| 2019/0379531 A1 | 12/2019 | Aleksander et al. |
| 2019/0379538 A1 | 12/2019 | Oh et al. |
| 2019/0379543 A1 | 12/2019 | Sethi et al. |
| 2019/0379544 A1 | 12/2019 | Suthar et al. |
| 2019/0379545 A1 | 12/2019 | Wong |
| 2019/0379546 A1 | 12/2019 | Chang et al. |
| 2019/0379619 A1 | 12/2019 | Pierini et al. |
| 2019/0379639 A1 | 12/2019 | Corning |
| 2019/0379642 A1 | 12/2019 | Simons et al. |
| 2019/0379646 A1 | 12/2019 | Mandal et al. |
| 2019/0379649 A1 | 12/2019 | Fuchs et al. |
| 2019/0379653 A1 | 12/2019 | Mead |
| 2019/0379660 A1 | 12/2019 | Thirumavalava |
| 2019/0379664 A1 | 12/2019 | Suthar et al. |
| 2019/0379673 A1 | 12/2019 | Coonrod |
| 2019/0379699 A1 | 12/2019 | Katragadda et al. |
| 2019/0379724 A1 | 12/2019 | Roche, Jr. |
| 2019/0379727 A1 | 12/2019 | Kurian et al. |
| 2019/0379754 A1 | 12/2019 | Krishnaswamy |
| 2019/0379761 A1 | 12/2019 | Acosta et al. |
| 2019/0379768 A1 | 12/2019 | Amicangioli et al. |
| 2019/0379797 A1 | 12/2019 | Sahagun |
| 2019/0379925 A1 | 12/2019 | Wexler et al. |
| 2019/0380030 A1 | 12/2019 | Suthar et al. |
| 2019/0380031 A1 | 12/2019 | Suthar et al. |
| 2019/0380032 A1 | 12/2019 | Newman et al. |
| 2019/0381242 A1 | 12/2019 | Ambrosina et al. |
| 2019/0381654 A1 | 12/2019 | Oleynik |
| 2019/0384250 A1 | 12/2019 | Cella et al. |
| 2019/0384263 A1 | 12/2019 | Kono et al. |
| 2019/0384385 A1 | 12/2019 | Idris et al. |
| 2019/0384587 A1 | 12/2019 | Rao et al. |
| 2019/0384593 A1 | 12/2019 | Michiyama et al. |

(56) References Cited

U.S. PATENT DOCUMENTS

| | | |
|---|---|---|
| 2019/0384594 A1 | 12/2019 | Michiyama et al. |
| 2019/0384595 A1 | 12/2019 | Mills |
| 2019/0384627 A1 | 12/2019 | De Caro et al. |
| 2019/0384639 A1 | 12/2019 | Gustafsson et al. |
| 2019/0384686 A1 | 12/2019 | Estes et al. |
| 2019/0384748 A1 | 12/2019 | Roennow et al. |
| 2019/0384832 A1 | 12/2019 | Estes et al. |
| 2019/0384833 A1 | 12/2019 | Estes et al. |
| 2019/0384834 A1 | 12/2019 | Nelluri et al. |
| 2019/0384839 A1 | 12/2019 | Esposito et al. |
| 2019/0384842 A1 | 12/2019 | Rao |
| 2019/0384892 A1 | 12/2019 | Holland et al. |
| 2019/0384895 A1 | 12/2019 | Jin et al. |
| 2019/0384927 A1 | 12/2019 | Bhatnagar et al. |
| 2019/0384932 A1 | 12/2019 | Pratt et al. |
| 2019/0384933 A1 | 12/2019 | Lebel et al. |
| 2019/0384935 A1 | 12/2019 | Miller |
| 2019/0384968 A1 | 12/2019 | Brown et al. |
| 2019/0385096 A1 | 12/2019 | Ibrahim |
| 2019/0385100 A1 | 12/2019 | Zaman et al. |
| 2019/0385115 A1 | 12/2019 | Biermann et al. |
| 2019/0385120 A1 | 12/2019 | Yund et al. |
| 2019/0385130 A1 | 12/2019 | Mossoba et al. |
| 2019/0385136 A1 | 12/2019 | Blagov et al. |
| 2019/0385153 A1 | 12/2019 | Cui et al. |
| 2019/0385154 A1 | 12/2019 | Cui et al. |
| 2019/0385156 A1 | 12/2019 | Liu |
| 2019/0385157 A1 | 12/2019 | Mallela et al. |
| 2019/0385160 A1 | 12/2019 | Safak et al. |
| 2019/0385162 A1 | 12/2019 | Zhang et al. |
| 2019/0385165 A1 | 12/2019 | Castinado et al. |
| 2019/0385167 A1 | 12/2019 | Subhedar et al. |
| 2019/0385170 A1 | 12/2019 | Arrabothu et al. |
| 2019/0385172 A1 | 12/2019 | Jayaram et al. |
| 2019/0385175 A1 | 12/2019 | Chamberlain et al. |
| 2019/0385182 A1 | 12/2019 | Price et al. |
| 2019/0385183 A1 | 12/2019 | Ryu |
| 2019/0385215 A1 | 12/2019 | Ferenczi et al. |
| 2019/0385223 A1 | 12/2019 | Sharma |
| 2019/0385229 A1 | 12/2019 | Leonard et al. |
| 2019/0385236 A1 | 12/2019 | McConnell et al. |
| 2019/0385240 A1 | 12/2019 | Lee et al. |
| 2019/0385244 A1 | 12/2019 | Stelmar Netto et al. |
| 2019/0385256 A1 | 12/2019 | Nahamoo et al. |
| 2019/0385269 A1 | 12/2019 | Zachary |
| 2019/0385407 A1 | 12/2019 | Hiten et al. |
| 2019/0385711 A1 | 12/2019 | Shriberg et al. |
| 2019/0385748 A1 | 12/2019 | Thomas |
| 2019/0386814 A1 | 12/2019 | Ahmed |
| 2019/0386817 A1 | 12/2019 | Carson et al. |
| 2019/0386818 A1 | 12/2019 | Cran |
| 2019/0386829 A1 | 12/2019 | Karame et al. |
| 2019/0386832 A1 | 12/2019 | Palyutina et al. |
| 2019/0386833 A1 | 12/2019 | Alger et al. |
| 2019/0386834 A1 | 12/2019 | Furukawa |
| 2019/0386940 A1 | 12/2019 | Hong et al. |
| 2019/0386951 A1 | 12/2019 | Uhll |
| 2019/0386968 A1 | 12/2019 | Good et al. |
| 2019/0386969 A1 | 12/2019 | Verzun et al. |
| 2019/0386970 A1 | 12/2019 | Signorini et al. |
| 2019/0386975 A1 | 12/2019 | Li |
| 2019/0386986 A1 | 12/2019 | O'Brien et al. |
| 2019/0386990 A1 | 12/2019 | Liu et al. |
| 2019/0386995 A1 | 12/2019 | Chafe et al. |
| 2019/0387000 A1 | 12/2019 | Zavesky et al. |
| 2019/0387058 A1 | 12/2019 | Heller |
| 2019/0387060 A1 | 12/2019 | Kentley-Klay et al. |
| 2019/0387281 A1 | 12/2019 | Turley et al. |
| 2019/0387341 A1 | 12/2019 | Lyren et al. |
| 2019/0387356 A1 | 12/2019 | Branscomb et al. |
| 2019/0387832 A1 | 12/2019 | Andon et al. |
| 2019/0389323 A1 | 12/2019 | Winkler et al. |
| 2019/0391268 A1 | 12/2019 | Houts et al. |
| 2019/0391540 A1 | 12/2019 | Velt et al. |
| 2019/0391550 A1 | 12/2019 | Cella et al. |
| 2019/0391551 A1 | 12/2019 | Cella et al. |
| 2019/0391552 A1 | 12/2019 | Cella et al. |
| 2019/0391663 A1 | 12/2019 | Richter et al. |
| 2019/0391829 A1 | 12/2019 | Cronie et al. |
| 2019/0391845 A1 | 12/2019 | Gasser et al. |
| 2019/0391971 A1 | 12/2019 | Bernat et al. |
| 2019/0391972 A1 | 12/2019 | Bates et al. |
| 2019/0391973 A1 | 12/2019 | Qiu |
| 2019/0391979 A1 | 12/2019 | Bistram |
| 2019/0391980 A1 | 12/2019 | Mundar |
| 2019/0392019 A1 | 12/2019 | Brannon et al. |
| 2019/0392049 A1 | 12/2019 | Estes et al. |
| 2019/0392064 A1 | 12/2019 | Swope et al. |
| 2019/0392088 A1 | 12/2019 | Duff et al. |
| 2019/0392118 A1 | 12/2019 | Elden et al. |
| 2019/0392119 A1 | 12/2019 | Rahiman et al. |
| 2019/0392123 A1 | 12/2019 | Larsen et al. |
| 2019/0392138 A1 | 12/2019 | Rice |
| 2019/0392159 A1 | 12/2019 | Wojcik |
| 2019/0392162 A1 | 12/2019 | Stern et al. |
| 2019/0392164 A1 | 12/2019 | Dutta |
| 2019/0392178 A1 | 12/2019 | Rice |
| 2019/0392361 A1 | 12/2019 | Paul et al. |
| 2019/0392386 A1 | 12/2019 | Wilkinson et al. |
| 2019/0392392 A1 | 12/2019 | Elden et al. |
| 2019/0392403 A1 | 12/2019 | Rainaldi et al. |
| 2019/0392406 A1 | 12/2019 | Deshpande et al. |
| 2019/0392407 A1 | 12/2019 | Keskar |
| 2019/0392429 A1 | 12/2019 | Keskar et al. |
| 2019/0392432 A1 | 12/2019 | Keskar et al. |
| 2019/0392434 A1 | 12/2019 | Castinado et al. |
| 2019/0392437 A1 | 12/2019 | Castagna et al. |
| 2019/0392438 A1 | 12/2019 | Rice |
| 2019/0392439 A1 | 12/2019 | Perullo |
| 2019/0392457 A1 | 12/2019 | Kuntagod et al. |
| 2019/0392468 A1 | 12/2019 | Stanciu et al. |
| 2019/0392470 A1 | 12/2019 | Blanton et al. |
| 2019/0392489 A1 | 12/2019 | Tietzen et al. |
| 2019/0392511 A1 | 12/2019 | Mahajan et al. |
| 2019/0392530 A1 | 12/2019 | Kursun |
| 2019/0392536 A1 | 12/2019 | Rice |
| 2019/0392659 A1 | 12/2019 | Seenivasagam et al. |
| 2019/0392677 A1 | 12/2019 | Halvorson |
| 2019/0392683 A1 | 12/2019 | Halvorson |
| 2019/0392684 A1 | 12/2019 | McDonald et al. |
| 2019/0392928 A1 | 12/2019 | Hosseini et al. |
| 2019/0393627 A1 | 12/2019 | Etsunagi et al. |
| 2019/0393699 A1 | 12/2019 | Shastri et al. |
| 2019/0393701 A1 | 12/2019 | Saynevirta |
| 2019/0393721 A1 | 12/2019 | Pignier et al. |
| 2019/0393722 A1 | 12/2019 | Stocker et al. |
| 2019/0394018 A1 | 12/2019 | Isshiki et al. |
| 2019/0394019 A1 | 12/2019 | Gao |
| 2019/0394023 A1 | 12/2019 | Menon et al. |
| 2019/0394025 A1 | 12/2019 | Maim |
| 2019/0394026 A1 | 12/2019 | Bookman et al. |
| 2019/0394027 A1 | 12/2019 | Falk |
| 2019/0394039 A1 | 12/2019 | Higo et al. |
| 2019/0394044 A1 | 12/2019 | Snow et al. |
| 2019/0394046 A1 | 12/2019 | Su |
| 2019/0394047 A1 | 12/2019 | Karame et al. |
| 2019/0394048 A1 | 12/2019 | Deery et al. |
| 2019/0394050 A1 | 12/2019 | Goeringer et al. |
| 2019/0394052 A1 | 12/2019 | Li et al. |
| 2019/0394091 A1 | 12/2019 | Sevindik |
| 2019/0394100 A1 | 12/2019 | Lamba et al. |
| 2019/0394113 A1 | 12/2019 | Huang |
| 2019/0394175 A1 | 12/2019 | Zhang et al. |
| 2019/0394176 A1 | 12/2019 | Haldenby et al. |
| 2019/0394179 A1 | 12/2019 | Androulaki et al. |
| 2019/0394203 A1 | 12/2019 | Estes et al. |
| 2019/0394222 A1 | 12/2019 | Smelker et al. |
| 2019/0394242 A1 | 12/2019 | Wig et al. |
| 2019/0394243 A1 | 12/2019 | Wiig et al. |
| 2019/0394257 A1 | 12/2019 | Estes et al. |
| 2019/0394267 A1 | 12/2019 | Bistram |
| 2019/0394302 A1 | 12/2019 | Kristiansson et al. |
| 2019/0394511 A1 | 12/2019 | Kalaboukis et al. |
| 2019/0394637 A1 | 12/2019 | Viswanathan et al. |

(56) References Cited

U.S. PATENT DOCUMENTS

| | | |
|---|---|---|
| 2019/0394648 A1 | 12/2019 | Tipton et al. |
| 2020/0000366 A1 | 1/2020 | Katabi et al. |
| 2020/0001185 A1 | 1/2020 | Eatedali et al. |
| 2020/0001836 A1 | 1/2020 | Koketsu et al. |
| 2020/0004016 A1 | 1/2020 | Gross et al. |
| 2020/0004500 A1 | 1/2020 | Guttmann |
| 2020/0004611 A1 | 1/2020 | Sarin |
| 2020/0004643 A1 | 1/2020 | Yang |
| 2020/0004732 A1 | 1/2020 | Childress et al. |
| 2020/0004737 A1 | 1/2020 | Qiu |
| 2020/0004771 A1 | 1/2020 | Keskar et al. |
| 2020/0004788 A1 | 1/2020 | Qiu |
| 2020/0004846 A1 | 1/2020 | Camenisch et al. |
| 2020/0004854 A1 | 1/2020 | Inturi et al. |
| 2020/0004855 A1 | 1/2020 | Chepak, Jr. et al. |
| 2020/0004932 A1 | 1/2020 | Eatedali et al. |
| 2020/0004945 A1 | 1/2020 | Anderson et al. |
| 2020/0004946 A1 | 1/2020 | Gilpin et al. |
| 2020/0004951 A1 | 1/2020 | Speak et al. |
| 2020/0004962 A1 | 1/2020 | Araujo et al. |
| 2020/0004969 A1 | 1/2020 | Benke et al. |
| 2020/0004973 A1 | 1/2020 | Li et al. |
| 2020/0004981 A1 | 1/2020 | Miyaji |
| 2020/0004986 A1 | 1/2020 | Brannon et al. |
| 2020/0004987 A1 | 1/2020 | Brannon et al. |
| 2020/0004988 A1 | 1/2020 | Brannon et al. |
| 2020/0004995 A1 | 1/2020 | Kawaguchi et al. |
| 2020/0004996 A1 | 1/2020 | Kawaguchi et al. |
| 2020/0004997 A1 | 1/2020 | Kawaguchi et al. |
| 2020/0004998 A1 | 1/2020 | Kawaguchi et al. |
| 2020/0004999 A1 | 1/2020 | Kawaguchi et al. |
| 2020/0005031 A1 | 1/2020 | DeWitt |
| 2020/0005107 A1 | 1/2020 | Kawaguchi et al. |
| 2020/0005168 A1 | 1/2020 | Bhargava et al. |
| 2020/0005173 A1 | 1/2020 | del Pino et al. |
| 2020/0005180 A1 | 1/2020 | Fritchman et al. |
| 2020/0005189 A1 | 1/2020 | Cuomo et al. |
| 2020/0005207 A1 | 1/2020 | Lee et al. |
| 2020/0005212 A1 | 1/2020 | Stevens |
| 2020/0005213 A1 | 1/2020 | Clemens |
| 2020/0005219 A1 | 1/2020 | Stevens |
| 2020/0005224 A1 | 1/2020 | O'Brien et al. |
| 2020/0005253 A1 | 1/2020 | Rangarajan et al. |
| 2020/0005254 A1 | 1/2020 | Wright et al. |
| 2020/0005255 A1 | 1/2020 | Wu |
| 2020/0005264 A1 | 1/2020 | Patterson et al. |
| 2020/0005267 A1 | 1/2020 | Siefken et al. |
| 2020/0005271 A1 | 1/2020 | Baar et al. |
| 2020/0005281 A1 | 1/2020 | Patel |
| 2020/0005282 A1 | 1/2020 | Kim |
| 2020/0005283 A1 | 1/2020 | Zimmerman et al. |
| 2020/0005284 A1 | 1/2020 | Vijayan |
| 2020/0005285 A1 | 1/2020 | Jimenez-Delgado |
| 2020/0005286 A1 | 1/2020 | Sewell et al. |
| 2020/0005290 A1 | 1/2020 | Madisetti et al. |
| 2020/0005292 A1 | 1/2020 | Mao et al. |
| 2020/0005293 A1 | 1/2020 | Opeola |
| 2020/0005295 A1 | 1/2020 | Murphy |
| 2020/0005296 A1 | 1/2020 | Green |
| 2020/0005299 A1 | 1/2020 | Castinado et al. |
| 2020/0005302 A1 | 1/2020 | Baar et al. |
| 2020/0005307 A1 | 1/2020 | Snyder et al. |
| 2020/0005308 A1 | 1/2020 | Snyder et al. |
| 2020/0005316 A1 | 1/2020 | Wagner |
| 2020/0005332 A1 | 1/2020 | Gadol |
| 2020/0005349 A1 | 1/2020 | Brody et al. |
| 2020/0005388 A1 | 1/2020 | Lim et al. |
| 2020/0005390 A1 | 1/2020 | Minsley et al. |
| 2020/0005398 A1 | 1/2020 | Castinado et al. |
| 2020/0005403 A1 | 1/2020 | Patterson et al. |
| 2020/0005404 A1 | 1/2020 | Patterson et al. |
| 2020/0005410 A1 | 1/2020 | McKee |
| 2020/0005415 A1 | 1/2020 | Schuler et al. |
| 2020/0005559 A1 | 1/2020 | Grunbok et al. |
| 2020/0005587 A1 | 1/2020 | Hartl et al. |
| 2020/0005589 A1 | 1/2020 | Halvorson |
| 2020/0005590 A1 | 1/2020 | Halvorson |
| 2020/0005591 A1 | 1/2020 | Halvorson |
| 2020/0005597 A1 | 1/2020 | Halvorson |
| 2020/0005767 A1 | 1/2020 | Ye et al. |
| 2020/0005777 A1 | 1/2020 | Wittke |
| 2020/0005912 A1 | 1/2020 | Saliman et al. |
| 2020/0007311 A1 | 1/2020 | Oberhofer et al. |
| 2020/0007312 A1 | 1/2020 | Vouk et al. |
| 2020/0007313 A1 | 1/2020 | Vouk et al. |
| 2020/0007314 A1 | 1/2020 | Vouk et al. |
| 2020/0007315 A1 | 1/2020 | Vouk et al. |
| 2020/0007316 A1 | 1/2020 | Krishnamacharya et al. |
| 2020/0007317 A1 | 1/2020 | Thompson |
| 2020/0007318 A1 | 1/2020 | Camenisch et al. |
| 2020/0007322 A1 | 1/2020 | Weldemariam et al. |
| 2020/0007331 A1 | 1/2020 | Wentz |
| 2020/0007333 A1 | 1/2020 | Young |
| 2020/0007336 A1 | 1/2020 | Wengel |
| 2020/0007338 A1 | 1/2020 | Oh |
| 2020/0007342 A1 | 1/2020 | Liem et al. |
| 2020/0007343 A1 | 1/2020 | Evans |
| 2020/0007344 A1 | 1/2020 | Chepak, Jr. et al. |
| 2020/0007345 A1 | 1/2020 | Barry et al. |
| 2020/0007346 A1 | 1/2020 | Callan et al. |
| 2020/0007393 A1 | 1/2020 | Davis |
| 2020/0007414 A1 | 1/2020 | Smith et al. |
| 2020/0007464 A1 | 1/2020 | Lo et al. |
| 2020/0007511 A1 | 1/2020 | Van de Groenendaal et al. |
| 2020/0007513 A1 | 1/2020 | Gleichauf |
| 2020/0007514 A1 | 1/2020 | Li et al. |
| 2020/0007525 A1 | 1/2020 | Castinado et al. |
| 2020/0007540 A1 | 1/2020 | Kawaguchi et al. |
| 2020/0007544 A1 | 1/2020 | Wang et al. |
| 2020/0007558 A1 | 1/2020 | Inokuchi et al. |
| 2020/0007581 A1 | 1/2020 | Vouk et al. |
| 2020/0007918 A1 | 1/2020 | Frank |
| 2020/0008299 A1 | 1/2020 | Tran et al. |
| 2020/0008320 A1 | 1/2020 | Yu et al. |
| 2020/0009983 A1 | 1/2020 | Oshima et al. |
| 2020/0009990 A1 | 1/2020 | Shiiyama et al. |
| 2020/0010080 A1 | 1/2020 | Weldemariam et al. |
| 2020/0011557 A1 | 1/2020 | Thomas, Sr. |
| 2020/0011683 A1 | 1/2020 | Simpson |
| 2020/0012248 A1 | 1/2020 | Cella et al. |
| 2020/0012527 A1 | 1/2020 | Hartsock |
| 2020/0012579 A1 | 1/2020 | Anokhin et al. |
| 2020/0012625 A1 | 1/2020 | Nelluri et al. |
| 2020/0012634 A1 | 1/2020 | Eberhardt |
| 2020/0012676 A1 | 1/2020 | Singh Narang et al. |
| 2020/0012703 A1 | 1/2020 | Burzlaff |
| 2020/0012731 A1 | 1/2020 | Deshpande et al. |
| 2020/0012763 A1 | 1/2020 | Arngren et al. |
| 2020/0012765 A1 | 1/2020 | Smaiely et al. |
| 2020/0012767 A1 | 1/2020 | Votaw et al. |
| 2020/0012768 A1 | 1/2020 | Votaw et al. |
| 2020/0012779 A1 | 1/2020 | Chandrasekaran et al. |
| 2020/0012805 A1 | 1/2020 | Winarski |
| 2020/0012806 A1 | 1/2020 | Bates et al. |
| 2020/0012809 A1 | 1/2020 | Winarski |
| 2020/0012810 A1 | 1/2020 | Chavez |
| 2020/0013025 A1 | 1/2020 | Verma et al. |
| 2020/0013026 A1 | 1/2020 | Noonan et al. |
| 2020/0013027 A1 | 1/2020 | Zhu |
| 2020/0013028 A1 | 1/2020 | Black et al. |
| 2020/0013029 A1 | 1/2020 | Gu et al. |
| 2020/0013045 A1 | 1/2020 | Spalding et al. |
| 2020/0013046 A1 | 1/2020 | Joao |
| 2020/0013047 A1 | 1/2020 | Weissenmayer et al. |
| 2020/0013048 A1 | 1/2020 | Love |
| 2020/0013049 A1 | 1/2020 | Ingram et al. |
| 2020/0013050 A1 | 1/2020 | Finlow-Bates et al. |
| 2020/0013053 A1 | 1/2020 | Amin |
| 2020/0013055 A1 | 1/2020 | Sandor |
| 2020/0013062 A1 | 1/2020 | Pratt et al. |
| 2020/0013063 A1 | 1/2020 | Kurian et al. |
| 2020/0013073 A1 | 1/2020 | Bakalis |
| 2020/0013083 A1 | 1/2020 | Narayanam et al. |
| 2020/0013093 A1 | 1/2020 | Brooks |

(56) References Cited

U.S. PATENT DOCUMENTS

| | | |
|---|---|---|
| 2020/0013118 A1 | 1/2020 | Treat et al. |
| 2020/0013229 A1 | 1/2020 | Lee et al. |
| 2020/0013250 A1 | 1/2020 | Jakubek et al. |
| 2020/0013251 A1 | 1/2020 | Ivanov et al. |
| 2020/0013268 A1 | 1/2020 | Jarvis et al. |
| 2020/0013302 A1 | 1/2020 | Lawrenson et al. |
| 2020/0014527 A1 | 1/2020 | Subramaniam |
| 2020/0014528 A1 | 1/2020 | Nandakumar et al. |
| 2020/0014529 A1 | 1/2020 | Kanza et al. |
| 2020/0014531 A1 | 1/2020 | Falco et al. |
| 2020/0014536 A1 | 1/2020 | Walden et al. |
| 2020/0014537 A1 | 1/2020 | Ortiz et al. |
| 2020/0014542 A1 | 1/2020 | McIver et al. |
| 2020/0014546 A1 | 1/2020 | Karame et al. |
| 2020/0014632 A1 | 1/2020 | Way |
| 2020/0014664 A1 | 1/2020 | Brown et al. |
| 2020/0014668 A1 | 1/2020 | Statica et al. |
| 2020/0014671 A1 | 1/2020 | Isaacson et al. |
| 2020/0014691 A1 | 1/2020 | Ortiz et al. |
| 2020/0014720 A1 | 1/2020 | Giura |
| 2020/0014745 A1 | 1/2020 | Thurimella et al. |
| 2020/0014759 A1 | 1/2020 | Wunderlich |
| 2020/0014816 A1 | 1/2020 | Speasl et al. |
| 2020/0015034 A1 | 1/2020 | Ahn et al. |
| 2020/0015078 A1 | 1/2020 | He et al. |
| 2020/0016363 A1 | 1/2020 | Macri et al. |
| 2020/0017117 A1 | 1/2020 | Milton |
| 2020/0018800 A1 | 1/2020 | Oshima et al. |
| 2020/0019154 A1 | 1/2020 | Cella et al. |
| 2020/0019155 A1 | 1/2020 | Cella et al. |
| 2020/0019288 A1 | 1/2020 | D'Amore et al. |
| 2020/0019397 A1 | 1/2020 | Duran et al. |
| 2020/0019421 A1 | 1/2020 | Sun |
| 2020/0019450 A1 | 1/2020 | Patton et al. |
| 2020/0019538 A1 | 1/2020 | Lauriston |
| 2020/0019545 A1 | 1/2020 | Ye |
| 2020/0019613 A1 | 1/2020 | Bacarella et al. |
| 2020/0019616 A1 | 1/2020 | Sukhija et al. |
| 2020/0019626 A1 | 1/2020 | Todd et al. |
| 2020/0019677 A1 | 1/2020 | Pangaev |
| 2020/0019680 A1 | 1/2020 | Frederick et al. |
| 2020/0019706 A1 | 1/2020 | Zhu et al. |
| 2020/0019707 A1 | 1/2020 | Zhu et al. |
| 2020/0019723 A1 | 1/2020 | Binsztok |
| 2020/0019821 A1 | 1/2020 | Baracaldo-Angel et al. |
| 2020/0019864 A1 | 1/2020 | Gu et al. |
| 2020/0019865 A1 | 1/2020 | Wang et al. |
| 2020/0019867 A1 | 1/2020 | Nandakumar et al. |
| 2020/0019894 A1 | 1/2020 | Jin et al. |
| 2020/0019898 A1 | 1/2020 | Harrison |
| 2020/0019923 A1 | 1/2020 | Santhar et al. |
| 2020/0019931 A1 | 1/2020 | Prabhakar et al. |
| 2020/0019936 A1 | 1/2020 | Irazabal |
| 2020/0019937 A1 | 1/2020 | Edwards et al. |
| 2020/0019938 A1 | 1/2020 | Wang et al. |
| 2020/0019946 A1 | 1/2020 | Walker et al. |
| 2020/0019959 A1 | 1/2020 | Fan et al. |
| 2020/0019961 A1 | 1/2020 | Silvestre |
| 2020/0019963 A1 | 1/2020 | Nakamura |
| 2020/0019966 A1 | 1/2020 | Abdi Taghi Abad et al. |
| 2020/0019967 A1 | 1/2020 | Abdi Taghi Abad et al. |
| 2020/0019980 A1 | 1/2020 | Arora et al. |
| 2020/0020032 A1 | 1/2020 | Bleznak et al. |
| 2020/0020037 A1 | 1/2020 | Idrobo |
| 2020/0020038 A1 | 1/2020 | Haile et al. |
| 2020/0020064 A1 | 1/2020 | Smith et al. |
| 2020/0020091 A1 | 1/2020 | Forutanpour et al. |
| 2020/0020174 A1 | 1/2020 | Hudson et al. |
| 2020/0020175 A1 | 1/2020 | Smith et al. |
| 2020/0020176 A1 | 1/2020 | Smith et al. |
| 2020/0020187 A1 | 1/2020 | Soeda |
| 2020/0020319 A1 | 1/2020 | Malhotra et al. |
| 2020/0020398 A1 | 1/2020 | Miller et al. |
| 2020/0020424 A1 | 1/2020 | Lin |
| 2020/0020425 A1 | 1/2020 | Qu et al. |
| 2020/0020440 A1 | 1/2020 | Beinhauer |
| 2020/0020454 A1 | 1/2020 | McGarvey et al. |
| 2020/0021429 A1 | 1/2020 | Harrington |
| 2020/0021439 A1 | 1/2020 | Sato |
| 2020/0021443 A1 | 1/2020 | Falk |
| 2020/0021444 A1 | 1/2020 | Young et al. |
| 2020/0021446 A1 | 1/2020 | Roennow et al. |
| 2020/0021546 A1 | 1/2020 | Cardinal et al. |
| 2020/0021568 A1 | 1/2020 | Becher et al. |
| 2020/0021569 A1 | 1/2020 | Simons |
| 2020/0021570 A1 | 1/2020 | Lin |
| 2020/0021588 A1 | 1/2020 | Wittrock et al. |
| 2020/0021589 A1 | 1/2020 | Smith et al. |
| 2020/0021590 A1 | 1/2020 | Jeuk et al. |
| 2020/0021598 A1 | 1/2020 | Lee et al. |
| 2020/0021600 A1 | 1/2020 | Simons |
| 2020/0021602 A1 | 1/2020 | Irazabal |
| 2020/0021643 A1 | 1/2020 | Purushothaman et al. |
| 2020/0021649 A1 | 1/2020 | Natanzon |
| 2020/0021714 A1 | 1/2020 | Chuang |
| 2020/0022201 A1 | 1/2020 | Ross et al. |
| 2020/0022416 A1 | 1/2020 | Alarcon |
| 2020/0023273 A1 | 1/2020 | Tsurusaki et al. |
| 2020/0023846 A1 | 1/2020 | Husain et al. |
| 2020/0026076 A1 | 1/2020 | Beckman |
| 2020/0026253 A1 | 1/2020 | Fuhr et al. |
| 2020/0026270 A1 | 1/2020 | Cella et al. |
| 2020/0026289 A1 | 1/2020 | Alvarez et al. |
| 2020/0026444 A1 | 1/2020 | Dai et al. |
| 2020/0026510 A1 | 1/2020 | Adams et al. |
| 2020/0026548 A1 | 1/2020 | Huang |
| 2020/0026552 A1 | 1/2020 | Zhang et al. |
| 2020/0026613 A1 | 1/2020 | Kaji et al. |
| 2020/0026619 A1 | 1/2020 | Kaji et al. |
| 2020/0026691 A1 | 1/2020 | Qiu |
| 2020/0026699 A1 | 1/2020 | Zhang et al. |
| 2020/0026700 A1 | 1/2020 | Qiu |
| 2020/0026712 A1 | 1/2020 | Madisetti et al. |
| 2020/0026741 A1 | 1/2020 | Gilula |
| 2020/0026785 A1 | 1/2020 | Patangia et al. |
| 2020/0026787 A1 | 1/2020 | Alam |
| 2020/0026800 A1 | 1/2020 | Siu |
| 2020/0026834 A1 | 1/2020 | Vimadalal et al. |
| 2020/0026862 A1 | 1/2020 | Zhang et al. |
| 2020/0026867 A1 | 1/2020 | Nicholls |
| 2020/0026973 A1 | 1/2020 | Osborn et al. |
| 2020/0027005 A1 | 1/2020 | Harrison et al. |
| 2020/0027010 A1 | 1/2020 | Lorenc et al. |
| 2020/0027050 A1 | 1/2020 | Ghosh et al. |
| 2020/0027066 A1 | 1/2020 | Ramasamy et al. |
| 2020/0027067 A1 | 1/2020 | Hertzog et al. |
| 2020/0027079 A1 | 1/2020 | Kurian |
| 2020/0027080 A1 | 1/2020 | Holland et al. |
| 2020/0027082 A1 | 1/2020 | Nakagawa |
| 2020/0027084 A1 | 1/2020 | Groarke et al. |
| 2020/0027085 A1 | 1/2020 | Lee et al. |
| 2020/0027089 A1 | 1/2020 | Kuchar et al. |
| 2020/0027091 A1 | 1/2020 | Hassani et al. |
| 2020/0027093 A1 | 1/2020 | Volk |
| 2020/0027096 A1 | 1/2020 | Cooner |
| 2020/0027106 A1 | 1/2020 | Kendrick |
| 2020/0027117 A1 | 1/2020 | Cotsakos et al. |
| 2020/0027120 A1 | 1/2020 | Segalov et al. |
| 2020/0027125 A1 | 1/2020 | Segalov et al. |
| 2020/0027132 A1 | 1/2020 | Segalov et al. |
| 2020/0027133 A1 | 1/2020 | Segalov et al. |
| 2020/0027162 A1 | 1/2020 | Singh et al. |
| 2020/0027169 A1 | 1/2020 | Valencia |
| 2020/0027179 A1 | 1/2020 | Liss |
| 2020/0027183 A1 | 1/2020 | Guttridge |
| 2020/0027303 A1 | 1/2020 | Thomas |
| 2020/0027314 A1 | 1/2020 | Pilnock et al. |
| 2020/0027315 A1 | 1/2020 | Cotton |
| 2020/0027565 A1 | 1/2020 | Poppe |
| 2020/0028360 A1 | 1/2020 | Heintel et al. |
| 2020/0028667 A1 | 1/2020 | Castinado et al. |
| 2020/0028668 A1 | 1/2020 | Ramasamy et al. |
| 2020/0028675 A1 | 1/2020 | Gancarz |
| 2020/0028681 A1 | 1/2020 | Chen et al. |

(56) References Cited

U.S. PATENT DOCUMENTS

| | | |
|---|---|---|
| 2020/0028688 A1 | 1/2020 | Takada |
| 2020/0028691 A1 | 1/2020 | Rao et al. |
| 2020/0028692 A1 | 1/2020 | Wu |
| 2020/0028693 A1 | 1/2020 | Wu et al. |
| 2020/0028697 A1 | 1/2020 | Unger et al. |
| 2020/0028775 A1 | 1/2020 | Chen |
| 2020/0028797 A1 | 1/2020 | Castinado et al. |
| 2020/0028800 A1 | 1/2020 | Strathman et al. |
| 2020/0028804 A1 | 1/2020 | Ergen |
| 2020/0028834 A1 | 1/2020 | Nakata et al. |
| 2020/0028844 A1 | 1/2020 | Aime et al. |
| 2020/0028885 A1 | 1/2020 | Gordon et al. |
| 2020/0028908 A1 | 1/2020 | Coleman et al. |
| 2020/0028926 A1 | 1/2020 | Sprague et al. |
| 2020/0028947 A1 | 1/2020 | Yang |
| 2020/0029128 A1 | 1/2020 | Erskine |
| 2020/0029139 A1 | 1/2020 | García Osma et al. |
| 2020/0029190 A1 | 1/2020 | Bruns |
| 2020/0029250 A1 | 1/2020 | Ibek et al. |
| 2020/0030172 A1 | 1/2020 | Fassihi et al. |
| 2020/0030971 A1 | 1/2020 | Oleynik |
| 2020/0033821 A1 | 1/2020 | Krishnamurthy et al. |
| 2020/0033834 A1 | 1/2020 | Samid |
| 2020/0033837 A1 | 1/2020 | Simmons et al. |
| 2020/0033887 A1 | 1/2020 | Kim |
| 2020/0033931 A1 | 1/2020 | de Rochemont |
| 2020/0034311 A1 | 1/2020 | Wang |
| 2020/0034334 A1 | 1/2020 | Lu |
| 2020/0034338 A1 | 1/2020 | Gentile et al. |
| 2020/0034343 A1 | 1/2020 | Keskar |
| 2020/0034352 A1 | 1/2020 | Li et al. |
| 2020/0034353 A1 | 1/2020 | Innocenti |
| 2020/0034356 A1 | 1/2020 | Yu |
| 2020/0034395 A1 | 1/2020 | Lu |
| 2020/0034411 A1 | 1/2020 | Soon-Shiong et al. |
| 2020/0034448 A1 | 1/2020 | Sato et al. |
| 2020/0034453 A1 | 1/2020 | Sato et al. |
| 2020/0034454 A1 | 1/2020 | Chamarajnager et al. |
| 2020/0034456 A1 | 1/2020 | Montgomery-Recht et al. |
| 2020/0034457 A1 | 1/2020 | Brody et al. |
| 2020/0034469 A1 | 1/2020 | Sato et al. |
| 2020/0034501 A1 | 1/2020 | Duff et al. |
| 2020/0034536 A1 | 1/2020 | Tagomori |
| 2020/0034548 A1 | 1/2020 | Wu et al. |
| 2020/0034550 A1 | 1/2020 | Kim et al. |
| 2020/0034551 A1 | 1/2020 | Cantrell et al. |
| 2020/0034552 A1 | 1/2020 | Korres et al. |
| 2020/0034553 A1 | 1/2020 | Kenyon et al. |
| 2020/0034571 A1 | 1/2020 | Fett |
| 2020/0034610 A1 | 1/2020 | Taylor et al. |
| 2020/0034712 A1 | 1/2020 | Katz et al. |
| 2020/0034766 A1 | 1/2020 | Borges |
| 2020/0034788 A1 | 1/2020 | Ynion, Jr. |
| 2020/0034792 A1 | 1/2020 | Rogers et al. |
| 2020/0034804 A1 | 1/2020 | Mousko et al. |
| 2020/0034813 A1 | 1/2020 | Calinog et al. |
| 2020/0034818 A1 | 1/2020 | Selfin et al. |
| 2020/0034828 A1 | 1/2020 | Elishkov |
| 2020/0034833 A1 | 1/2020 | Collen et al. |
| 2020/0034834 A1 | 1/2020 | Li et al. |
| 2020/0034836 A1 | 1/2020 | Shah |
| 2020/0034839 A1 | 1/2020 | Soundararajan et al. |
| 2020/0034841 A1 | 1/2020 | Kurian |
| 2020/0034868 A1 | 1/2020 | Momary et al. |
| 2020/0034869 A1 | 1/2020 | Harrison |
| 2020/0034876 A1 | 1/2020 | Soundararajan et al. |
| 2020/0034888 A1 | 1/2020 | Soundararajan et al. |
| 2020/0034919 A1 | 1/2020 | Qiu et al. |
| 2020/0034925 A1 | 1/2020 | Dziuk |
| 2020/0034928 A1 | 1/2020 | Lim et al. |
| 2020/0034944 A1 | 1/2020 | Johansson et al. |
| 2020/0034945 A1 | 1/2020 | Soundararajan et al. |
| 2020/0035059 A1 | 1/2020 | Campero et al. |
| 2020/0035337 A1 | 1/2020 | Sohne et al. |
| 2020/0035339 A1 | 1/2020 | Eevani et al. |
| 2020/0035340 A1 | 1/2020 | Kain et al. |
| 2020/0035341 A1 | 1/2020 | Kain et al. |
| 2020/0036225 A1 | 1/2020 | Kolling et al. |
| 2020/0036511 A1 | 1/2020 | Cheon et al. |
| 2020/0036514 A1 | 1/2020 | Christensen et al. |
| 2020/0036515 A1 | 1/2020 | Chari et al. |
| 2020/0036517 A1 | 1/2020 | Denham |
| 2020/0036519 A1 | 1/2020 | Bitauld et al. |
| 2020/0036520 A1 | 1/2020 | Kilian |
| 2020/0036523 A1 | 1/2020 | Patin |
| 2020/0036530 A1 | 1/2020 | Lampkins et al. |
| 2020/0036531 A1 | 1/2020 | Minovic et al. |
| 2020/0036533 A1 | 1/2020 | Soundararajan et al. |
| 2020/0036549 A1 | 1/2020 | Staton et al. |
| 2020/0036585 A1 | 1/2020 | Todd et al. |
| 2020/0036687 A1 | 1/2020 | May |
| 2020/0036695 A1 | 1/2020 | Sharp et al. |
| 2020/0036707 A1 | 1/2020 | Callahan et al. |
| 2020/0036712 A1 | 1/2020 | Soundararajan et al. |
| 2020/0036728 A1 | 1/2020 | Spanke et al. |
| 2020/0036729 A1 | 1/2020 | Maneval et al. |
| 2020/0036740 A1 | 1/2020 | Ford |
| 2020/0036743 A1 | 1/2020 | Almukaynizi et al. |
| 2020/0037034 A1 | 1/2020 | Greyling |
| 2020/0037158 A1 | 1/2020 | Soundararajan et al. |
| 2020/0037381 A1 | 1/2020 | Ross et al. |
| 2020/0042988 A1 | 2/2020 | Snow et al. |
| 2020/0042989 A1 | 2/2020 | Ramadoss et al. |
| 2020/0042994 A1 | 2/2020 | Zhang et al. |
| 2020/0042995 A1 | 2/2020 | Snow et al. |
| 2020/0042998 A1 | 2/2020 | Mendhi et al. |
| 2020/0042999 A1 | 2/2020 | Zhang et al. |
| 2020/0043007 A1 | 2/2020 | Simons |
| 2020/0044837 A1 | 2/2020 | Bos et al. |
| 2020/0044863 A1 | 2/2020 | Yadlin et al. |
| 2020/0050774 A1 | 2/2020 | Unagami |
| 2020/0051077 A1 | 2/2020 | Ma et al. |
| 2020/0051188 A1 | 2/2020 | Chopra et al. |
| 2020/0051361 A1 | 2/2020 | Cui et al. |
| 2020/0052890 A1 | 2/2020 | Baron et al. |
| 2020/0052898 A1 | 2/2020 | Wentz |
| 2020/0052903 A1 | 2/2020 | Lam et al. |
| 2020/0053054 A1 | 2/2020 | Ma et al. |
| 2020/0053124 A1 | 2/2020 | Manasse et al. |
| 2020/0057755 A1 | 2/2020 | Veeningen |
| 2020/0057876 A1 | 2/2020 | Chang |
| 2020/0057920 A1 | 2/2020 | Collins et al. |
| 2020/0058022 A1 | 2/2020 | Ma et al. |
| 2020/0059495 A1 | 2/2020 | Karame et al. |
| 2020/0065480 A1 | 2/2020 | Gu et al. |
| 2020/0067699 A1 | 2/2020 | Resch et al. |
| 2020/0067707 A1 | 2/2020 | Resch et al. |
| 2020/0068404 A1 | 2/2020 | Newman et al. |
| 2020/0073560 A1 | 3/2020 | Adanve |
| 2020/0074110 A1 | 3/2020 | Veeningen et al. |
| 2020/0074112 A1 | 3/2020 | Ren et al. |
| 2020/0074456 A1 | 3/2020 | Coleman et al. |
| 2020/0074457 A1 | 3/2020 | Coleman et al. |
| 2020/0074459 A1 | 3/2020 | Ma et al. |
| 2020/0074460 A1 | 3/2020 | Tapang |
| 2020/0074548 A1 | 3/2020 | Aidoo et al. |
| 2020/0074552 A1 | 3/2020 | Shier et al. |
| 2020/0076570 A1 | 3/2020 | Musuvathi et al. |
| 2020/0076614 A1 | 3/2020 | Georgieva et al. |
| 2020/0076829 A1 | 3/2020 | Wentz |
| 2020/0082113 A1 | 3/2020 | Van Liesdonk et al. |
| 2020/0082126 A1 | 3/2020 | Brown et al. |
| 2020/0082259 A1 | 3/2020 | Gu et al. |
| 2020/0082360 A1 | 3/2020 | Regev |
| 2020/0082433 A1 | 3/2020 | Brown et al. |
| 2020/0082738 A1 | 3/2020 | Poeppelmann |
| 2020/0084017 A1 | 3/2020 | Bent et al. |
| 2020/0084039 A1 | 3/2020 | Chabanne et al. |
| 2020/0084191 A1 | 3/2020 | Nicholls |
| 2020/0084288 A1 | 3/2020 | Baig et al. |
| 2020/0084483 A1 | 3/2020 | Brown et al. |
| 2020/0086828 A1 | 3/2020 | Ujkashevic et al. |
| 2020/0089872 A1 | 3/2020 | Gray |
| 2020/0089906 A1 | 3/2020 | Bent et al. |

(56) References Cited

U.S. PATENT DOCUMENTS

| | | |
|---|---|---|
| 2020/0089919 A1 | 3/2020 | Courousse et al. |
| 2020/0092094 A1 | 3/2020 | Resch et al. |
| 2020/0097256 A1 | 3/2020 | Marin |
| 2020/0097849 A1 | 3/2020 | Kelly |
| 2020/0098011 A1 | 3/2020 | Bonawitz et al. |
| 2020/0099530 A1* | 3/2020 | Khatib ............... G06N 20/00 |
| 2020/0099666 A1 | 3/2020 | Soon-Shiong et al. |
| 2020/0104636 A1 | 4/2020 | Halevi et al. |
| 2020/0104705 A1 | 4/2020 | Bhowmick et al. |
| 2020/0106708 A1 | 4/2020 | Sleevi |
| 2020/0111022 A1 | 4/2020 | Silberman et al. |
| 2020/0111093 A1 | 4/2020 | Ma et al. |
| 2020/0112424 A1 | 4/2020 | Gouget |
| 2020/0112429 A1 | 4/2020 | Keselman et al. |
| 2020/0112442 A1 | 4/2020 | Wentz |
| 2020/0112545 A1 | 4/2020 | Smith et al. |
| 2020/0117690 A1 | 4/2020 | Tran et al. |
| 2020/0118458 A1 | 4/2020 | Shriberg et al. |
| 2020/0119921 A1 | 4/2020 | Rodriguez et al. |
| 2020/0119969 A1 | 4/2020 | Niederfeld et al. |
| 2020/0120023 A1 | 4/2020 | Munson et al. |
| 2020/0120070 A1 | 4/2020 | Thubert et al. |
| 2020/0120074 A1 | 4/2020 | Ma et al. |
| 2020/0125739 A1 | 4/2020 | Verma et al. |
| 2020/0125744 A1 | 4/2020 | Smith et al. |
| 2020/0125999 A1 | 4/2020 | Simpson |
| 2020/0126070 A1 | 4/2020 | Joseph |
| 2020/0126075 A1 | 4/2020 | Fisch |
| 2020/0126365 A1 | 4/2020 | Eckman et al. |
| 2020/0126660 A1 | 4/2020 | Costantino et al. |
| 2020/0127810 A1 | 4/2020 | Hiromasa et al. |
| 2020/0127834 A1* | 4/2020 | Westland ............. H04L 9/3221 |
| 2020/0128075 A1 | 4/2020 | Tormasov et al. |
| 2020/0134207 A1 | 4/2020 | Doshi et al. |
| 2020/0134612 A1 | 4/2020 | Fostiropulo et al. |
| 2020/0134624 A1 | 4/2020 | Zhang et al. |
| 2020/0134625 A1 | 4/2020 | Li et al. |
| 2020/0136797 A1 | 4/2020 | Yu et al. |
| 2020/0136798 A1 | 4/2020 | Kim et al. |
| 2020/0136799 A1 | 4/2020 | Smith et al. |
| 2020/0136829 A1 | 4/2020 | Keon et al. |
| 2020/0142986 A1 | 5/2020 | Ragnoli et al. |
| 2020/0143066 A1 | 5/2020 | Klontz |
| 2020/0143076 A1 | 5/2020 | Oberhofer et al. |
| 2020/0143368 A1 | 5/2020 | Zhang et al. |
| 2020/0143459 A1 | 5/2020 | Simpson |
| 2020/0143466 A1 | 5/2020 | Wu et al. |
| 2020/0145195 A1 | 5/2020 | Ma et al. |
| 2020/0145384 A1 | 5/2020 | Chauhan |
| 2020/0150885 A1 | 5/2020 | Rattan et al. |
| 2020/0151356 A1 | 5/2020 | Rohloff et al. |
| 2020/0151709 A1 | 5/2020 | Bryan |
| 2020/0151992 A1 | 5/2020 | Cui et al. |
| 2020/0153624 A1 | 5/2020 | Wentz et al. |
| 2020/0153627 A1 | 5/2020 | Wentz |
| 2020/0153628 A1 | 5/2020 | Sakai et al. |
| 2020/0153801 A1 | 5/2020 | Ma et al. |
| 2020/0153803 A1 | 5/2020 | Treat et al. |
| 2020/0160290 A1 | 5/2020 | Peikert et al. |
| 2020/0160388 A1 | 5/2020 | Sabeg et al. |
| 2020/0160641 A1 | 5/2020 | Ruskin et al. |
| 2020/0162235 A1 | 5/2020 | Cheon et al. |
| 2020/0162251 A1 | 5/2020 | Wentz |
| 2020/0162268 A1 | 5/2020 | Wentz |
| 2020/0162451 A1 | 5/2020 | Alhawaj et al. |
| 2020/0167503 A1 | 5/2020 | Wei et al. |
| 2020/0167512 A1 | 5/2020 | Chitra et al. |
| 2020/0174949 A1 | 6/2020 | Ramasamy et al. |
| 2020/0174990 A1 | 6/2020 | Pratkanis |
| 2020/0175180 A1 | 6/2020 | Li et al. |
| 2020/0175183 A1 | 6/2020 | Ramasamy et al. |
| 2020/0175502 A1 | 6/2020 | Ma et al. |
| 2020/0175509 A1 | 6/2020 | Qi |
| 2020/0175611 A1 | 6/2020 | Gelfand |
| 2020/0175623 A1 | 6/2020 | Howie |
| 2020/0177366 A1 | 6/2020 | Han et al. |
| 2020/0184036 A1 | 6/2020 | Wu et al. |
| 2020/0184093 A1 | 6/2020 | Liu et al. |
| 2020/0184278 A1 | 6/2020 | Zadeh et al. |
| 2020/0184465 A1 | 6/2020 | Kislev et al. |
| 2020/0184471 A1 | 6/2020 | Liu et al. |
| 2020/0184555 A1 | 6/2020 | Gleizer |
| 2020/0184556 A1 | 6/2020 | Cella |
| 2020/0186325 A1 | 6/2020 | Anderson |
| 2020/0186350 A1 | 6/2020 | Wentz et al. |
| 2020/0186352 A1 | 6/2020 | Arora et al. |
| 2020/0186528 A1 | 6/2020 | Fan et al. |
| 2020/0187018 A1 | 6/2020 | Hoffberg |
| 2020/0192957 A1 | 6/2020 | Augustine et al. |
| 2020/0193042 A1 | 6/2020 | Johns |
| 2020/0193066 A1 | 6/2020 | Johns |
| 2020/0193292 A1 | 6/2020 | Weng et al. |
| 2020/0193418 A1 | 6/2020 | Augustine et al. |
| 2020/0193419 A1 | 6/2020 | Lin |
| 2020/0193434 A1 | 6/2020 | Ma |
| 2020/0193516 A9 | 6/2020 | de Jong et al. |
| 2020/0193541 A1 | 6/2020 | Barry et al. |
| 2020/0195419 A1 | 6/2020 | Zhang et al. |
| 2020/0195437 A1 | 6/2020 | Gallagher et al. |
| 2020/0201679 A1 | 6/2020 | Wentz |
| 2020/0201910 A1 | 6/2020 | Gavaudan et al. |
| 2020/0202018 A1 | 6/2020 | Ciocarlie et al. |
| 2020/0202171 A1 | 6/2020 | Hughes et al. |
| 2020/0202345 A1 | 6/2020 | Zhang |
| 2020/0202376 A1 | 6/2020 | Benoliel et al. |
| 2020/0202427 A1 | 6/2020 | Cella |
| 2020/0202429 A1 | 6/2020 | Cella |
| 2020/0204340 A1 | 6/2020 | Curran |
| 2020/0204375 A1 | 6/2020 | Coulmeau et al. |
| 2020/0204524 A1 | 6/2020 | Simons et al. |
| 2020/0204563 A1 | 6/2020 | Simons |
| 2020/0210380 A1 | 7/2020 | Cage et al. |
| 2020/0210392 A1 | 7/2020 | Kain |
| 2020/0210404 A1 | 7/2020 | Kain et al. |
| 2020/0210405 A1 | 7/2020 | Kain |
| 2020/0211018 A1 | 7/2020 | Li et al. |
| 2020/0213079 A1 | 7/2020 | Kreeger et al. |
| 2020/0213110 A1 | 7/2020 | Cage et al. |
| 2020/0213130 A1 | 7/2020 | Zhang |
| 2020/0213134 A1 | 7/2020 | Zhang |
| 2020/0213291 A1 | 7/2020 | Cage et al. |
| 2020/0213292 A1 | 7/2020 | Cage et al. |
| 2020/0213329 A1 | 7/2020 | Simons |
| 2020/0213331 A1 | 7/2020 | Li et al. |
| 2020/0213839 A1 | 7/2020 | Truchan et al. |
| 2020/0218825 A1 | 7/2020 | Krishnamoorthy |
| 2020/0219017 A1 | 7/2020 | Simpson |
| 2020/0219188 A1 | 7/2020 | Cella |
| 2020/0219362 A1 | 7/2020 | Simons |
| 2020/0220851 A1 | 7/2020 | Storm et al. |
| 2020/0220870 A1 | 7/2020 | Wagner et al. |
| 2020/0226470 A1 | 7/2020 | Storm et al. |
| 2020/0226687 A1 | 7/2020 | Krishna |
| 2020/0226867 A1 | 7/2020 | Komo et al. |
| 2020/0228307 A1 | 7/2020 | Cheon et al. |
| 2020/0228309 A1 | 7/2020 | Hoffstein et al. |
| 2020/0228313 A1 | 7/2020 | Storm et al. |
| 2020/0228314 A1 | 7/2020 | Ikarashi et al. |
| 2020/0228317 A1 | 7/2020 | Ma et al. |
| 2020/0228325 A1 | 7/2020 | Fan et al. |
| 2020/0228339 A1 | 7/2020 | Barham et al. |
| 2020/0228340 A1 | 7/2020 | Blackhurst et al. |
| 2020/0228341 A1 | 7/2020 | Mohassel et al. |
| 2020/0234719 A1 | 7/2020 | Filler et al. |
| 2020/0234794 A1 | 7/2020 | Esteves-Verissimo et al. |
| 2020/0235908 A1 | 7/2020 | Hiromasa |
| 2020/0241960 A1 | 7/2020 | Yanovsky et al. |
| 2020/0242102 A1 | 7/2020 | Kain |
| 2020/0242466 A1 | 7/2020 | Mohassel et al. |
| 2020/0242557 A1 | 7/2020 | Carey et al. |
| 2020/0243176 A1 | 7/2020 | Soon-Shiong et al. |
| 2020/0244435 A1 | 7/2020 | Shpurov et al. |
| 2020/0244437 A1 | 7/2020 | Ruan |
| 2020/0250318 A1 | 8/2020 | Al Belooshi |

(56) References Cited

U.S. PATENT DOCUMENTS

| | | |
|---|---|---|
| 2020/0250320 A1 | 8/2020 | Liu et al. |
| 2020/0250590 A1 | 8/2020 | Augustine et al. |
| 2020/0250679 A1 | 8/2020 | Arora et al. |
| 2020/0252198 A1 | 8/2020 | Nandakumar et al. |
| 2020/0252199 A1 | 8/2020 | Cheon et al. |
| 2020/0258339 A1 | 8/2020 | Cui et al. |
| 2020/0258340 A1 | 8/2020 | Cui et al. |
| 2020/0259638 A1 | 8/2020 | Carmignani et al. |
| 2020/0259639 A1 | 8/2020 | Robert et al. |
| 2020/0259896 A1 | 8/2020 | Sachs et al. |
| 2020/0265159 A1 | 8/2020 | Schmatz et al. |
| 2020/0266974 A1 | 8/2020 | Cheon et al. |
| 2020/0267144 A1 | 8/2020 | Wagner et al. |
| 2020/0267553 A1 | 8/2020 | Wagner et al. |
| 2020/0272475 A1 | 8/2020 | Courousse |
| 2020/0272744 A1 | 8/2020 | Kaushik et al. |
| 2020/0273028 A1 | 8/2020 | Zhang et al. |
| 2020/0273099 A1 | 8/2020 | Cella |
| 2020/0273100 A1 | 8/2020 | Cella |
| 2020/0273101 A1 | 8/2020 | Cella |
| 2020/0273578 A1 | 8/2020 | Kutzko et al. |
| 2020/0274693 A1 | 8/2020 | von Vistauxx |
| 2020/0279045 A1 | 9/2020 | Tueno et al. |
| 2020/0279253 A1 | 9/2020 | Ma et al. |
| 2020/0279260 A1 | 9/2020 | Ma |
| 2020/0279324 A1 | 9/2020 | Snow et al. |
| 2020/0279325 A1 | 9/2020 | Snow et al. |
| 2020/0279326 A1 | 9/2020 | Snow et al. |
| 2020/0280430 A1 | 9/2020 | Tueno et al. |
| 2020/0280431 A1 | 9/2020 | Ma et al. |
| 2020/0280553 A1 | 9/2020 | Simons |
| 2020/0286083 A1 | 9/2020 | Ma et al. |
| 2020/0286092 A1 | 9/2020 | Zhang et al. |
| 2020/0286170 A1 | 9/2020 | Kramer et al. |
| 2020/0293643 A1 | 9/2020 | Wang |
| 2020/0294128 A1 | 9/2020 | Cella |
| 2020/0294129 A1 | 9/2020 | Cella |
| 2020/0294131 A1 | 9/2020 | Cella |
| 2020/0294132 A1 | 9/2020 | Cella |
| 2020/0294133 A1 | 9/2020 | Cella |
| 2020/0294134 A1 | 9/2020 | Cella |
| 2020/0294135 A1 | 9/2020 | Cella |
| 2020/0294136 A1 | 9/2020 | Cella |
| 2020/0294137 A1 | 9/2020 | Cella |
| 2020/0294138 A1 | 9/2020 | Cella |
| 2020/0294139 A1 | 9/2020 | Cella |
| 2020/0294158 A1 | 9/2020 | Karame et al. |
| 2020/0295926 A1 | 9/2020 | Androulaki et al. |
| 2020/0296128 A1 | 9/2020 | Wentz |
| 2020/0302523 A1 | 9/2020 | Cella |
| 2020/0302525 A1 | 9/2020 | Cella |
| 2020/0304284 A1 | 9/2020 | Markram et al. |
| 2020/0304290 A1 | 9/2020 | Coulmeau et al. |
| 2020/0304293 A1 | 9/2020 | Gama et al. |
| 2020/0310767 A1 | 10/2020 | Mallon et al. |
| 2020/0311300 A1 | 10/2020 | Callcut et al. |
| 2020/0311566 A1 | 10/2020 | Ackerman et al. |
| 2020/0311695 A1 | 10/2020 | Cao et al. |
| 2020/0311720 A1 | 10/2020 | Zhang et al. |
| 2020/0311816 A1 | 10/2020 | Calvin |
| 2020/0313886 A1 | 10/2020 | Poeppelmann |
| 2020/0319853 A1 | 10/2020 | Tanaka et al. |
| 2020/0320043 A1 | 10/2020 | Sen et al. |
| 2020/0320206 A1 | 10/2020 | Cammarota et al. |
| 2020/0320340 A1 | 10/2020 | Wentz |
| 2020/0320481 A1 | 10/2020 | Narayanan |
| 2020/0320825 A1 | 10/2020 | Simons |
| 2020/0322125 A1 | 10/2020 | Veugen |
| 2020/0322127 A1 | 10/2020 | Lozac'h et al. |
| 2020/0326937 A1 | 10/2020 | Levin et al. |
| 2020/0327250 A1 | 10/2020 | Wang et al. |
| 2020/0327252 A1 | 10/2020 | McFall et al. |
| 2020/0327254 A1 | 10/2020 | Abilash et al. |
| 2020/0327378 A1 | 10/2020 | Smith et al. |
| 2020/0327546 A1 | 10/2020 | Pennington et al. |
| 2020/0327609 A1 | 10/2020 | Dubrofsky |
| 2020/0334669 A1 | 10/2020 | Makowski |
| 2020/0334776 A1 | 10/2020 | Hasan |
| 2020/0335107 A1 | 10/2020 | Hahn et al. |
| 2020/0336292 A1 | 10/2020 | Soriente et al. |
| 2020/0336468 A1 | 10/2020 | Marchese-Ribeaux |
| 2020/0336470 A1 | 10/2020 | Kravitz et al. |
| 2020/0342118 A1 | 10/2020 | Yeo et al. |
| 2020/0342331 A1 | 10/2020 | Takenouchi |
| 2020/0342452 A1 | 10/2020 | Diamond |
| 2020/0342528 A1 | 10/2020 | Zhu et al. |
| 2020/0342529 A1 | 10/2020 | Zhu et al. |
| 2020/0342530 A1 | 10/2020 | Zhu et al. |
| 2020/0344049 A1 | 10/2020 | Yasuda et al. |
| 2020/0344060 A1 | 10/2020 | Munson et al. |
| 2020/0349054 A1 | 11/2020 | Dai et al. |
| 2020/0349274 A1 | 11/2020 | Miller et al. |
| 2020/0349435 A1 | 11/2020 | Gupta et al. |
| 2020/0349563 A1 | 11/2020 | Lu et al. |
| 2020/0351078 A1 | 11/2020 | Kolte et al. |
| 2020/0351083 A1 | 11/2020 | Bartolucci et al. |
| 2020/0351089 A1 | 11/2020 | Wentz |
| 2020/0351098 A1 | 11/2020 | Wentz |
| 2020/0351253 A1 | 11/2020 | Treat et al. |
| 2020/0351258 A1 | 11/2020 | Simons |
| 2020/0351657 A1 | 11/2020 | Wentz |
| 2020/0356085 A1 | 11/2020 | Wentz et al. |
| 2020/0356689 A1 | 11/2020 | McEnroe et al. |
| 2020/0357031 A1 | 11/2020 | Schroepfer et al. |
| 2020/0358187 A1 | 11/2020 | Tran et al. |
| 2020/0358594 A1 | 11/2020 | Becher et al. |
| 2020/0358595 A1 | 11/2020 | Ma et al. |
| 2020/0358599 A1 | 11/2020 | Baracaldo Angel et al. |
| 2020/0358601 A1 | 11/2020 | Gama et al. |
| 2020/0358610 A1 | 11/2020 | Yeo et al. |
| 2020/0358611 A1 | 11/2020 | Hoang |
| 2020/0358746 A1 | 11/2020 | Soon-Shiong et al. |
| 2020/0359207 A1 | 11/2020 | Lee et al. |
| 2020/0359222 A1 | 11/2020 | Lee et al. |
| 2020/0359550 A1 | 11/2020 | Tran et al. |
| 2020/0359582 A1 | 11/2020 | Tran et al. |
| 2020/0364456 A1 | 11/2020 | Tran et al. |
| 2020/0364700 A1 | 11/2020 | Lin |
| 2020/0364703 A1 | 11/2020 | Joveski et al. |
| 2020/0364704 A1 | 11/2020 | Qi |
| 2020/0366459 A1 | 11/2020 | Nandakumar et al. |
| 2020/0366460 A1 | 11/2020 | Han et al. |
| 2020/0366487 A1 | 11/2020 | Neve De Mevergnies et al. |
| 2020/0366503 A1 | 11/2020 | Zhang et al. |
| 2020/0372145 A1 | 11/2020 | Cramer |
| 2020/0374100 A1 | 11/2020 | Georgieva et al. |
| 2020/0374103 A1 | 11/2020 | Cheon |
| 2020/0374118 A1 | 11/2020 | Maim |
| 2020/0374135 A1 | 11/2020 | Lu et al. |
| 2020/0374270 A1 | 11/2020 | Mishra |
| 2020/0380476 A1 | 12/2020 | Trudeau et al. |
| 2020/0382274 A1 | 12/2020 | Williams et al. |
| 2020/0382288 A1 | 12/2020 | Solomon et al. |
| 2020/0382299 A1 | 12/2020 | Tanaka et al. |
| 2020/0382325 A1 | 12/2020 | Simplicio, Jr. et al. |
| 2020/0382478 A1 | 12/2020 | Voell et al. |
| 2020/0382510 A1 | 12/2020 | Dunjic et al. |
| 2020/0387777 A1 | 12/2020 | Vestimehr et al. |
| 2020/0387891 A1 | 12/2020 | Paschini et al. |
| 2020/0387893 A1 | 12/2020 | Maim |
| 2020/0387896 A1 | 12/2020 | Tran et al. |
| 2020/0387965 A1 | 12/2020 | Cella |
| 2020/0387966 A1 | 12/2020 | Cella |
| 2020/0387967 A1 | 12/2020 | Cella |
| 2020/0387968 A1 | 12/2020 | Cella |
| 2020/0389292 A1 | 12/2020 | Bartolucci et al. |
| 2020/0389298 A1 | 12/2020 | Saxena et al. |
| 2020/0389301 A1 | 12/2020 | Detres et al. |
| 2020/0389303 A1 | 12/2020 | Kim et al. |
| 2020/0394287 A1 | 12/2020 | Mucciolo et al. |
| 2020/0394518 A1 | 12/2020 | Sirdey et al. |
| 2020/0394652 A1 | 12/2020 | Youb et al. |
| 2020/0394708 A1 | 12/2020 | Cella |
| 2020/0394709 A1* | 12/2020 | Cella .............. G06N 3/042 |

(56) References Cited

U.S. PATENT DOCUMENTS

| | | |
|---|---|---|
| 2020/0396065 A1 | 12/2020 | Gutierrez-Sheris |
| 2020/0402073 A1 | 12/2020 | Tang et al. |
| 2020/0402171 A1 | 12/2020 | Isshiki et al. |
| 2020/0402623 A1 | 12/2020 | Carl et al. |
| 2020/0402625 A1 | 12/2020 | Aravamudan et al. |
| 2020/0403772 A1 | 12/2020 | Gentry et al. |
| 2020/0403781 A1 | 12/2020 | Gentry et al. |
| 2020/0404023 A1 | 12/2020 | Zhu et al. |
| 2020/0410134 A1 | 12/2020 | Bhowmick et al. |
| 2020/0410399 A1 | 12/2020 | Lang et al. |
| 2020/0410585 A1 | 12/2020 | Austin et al. |
| 2020/0412550 A1 | 12/2020 | Zhang |
| 2020/0412702 A1 | 12/2020 | Torres et al. |
| 2020/0412715 A1 | 12/2020 | Chen et al. |
| 2021/0004493 A1 | 1/2021 | Breskvar |
| 2021/0004502 A1 | 1/2021 | Johns |
| 2021/0005112 A1 | 1/2021 | Furukawa |
| 2021/0012029 A1 | 1/2021 | Gustafsson et al. |
| 2021/0012282 A1 | 1/2021 | Smith et al. |
| 2021/0012335 A1 | 1/2021 | Zhu et al. |
| 2021/0012416 A1 | 1/2021 | Zhu et al. |
| 2021/0012419 A1 | 1/2021 | Zhu et al. |
| 2021/0012421 A1 | 1/2021 | Kramer et al. |
| 2021/0012433 A1 | 1/2021 | Zhu et al. |
| 2021/0014047 A1 | 1/2021 | Guim Bernat et al. |
| 2021/0014063 A1 | 1/2021 | Arora et al. |
| 2021/0014071 A1 | 1/2021 | Zhang |
| 2021/0014150 A1 | 1/2021 | Munson et al. |
| 2021/0018953 A1 | 1/2021 | Ford |
| 2021/0019143 A1 | 1/2021 | Landman |
| 2021/0019792 A9 | 1/2021 | Preston et al. |
| 2021/0019893 A1 | 1/2021 | Ananthanarayanan et al. |
| 2021/0021606 A1 | 1/2021 | Gvili |
| 2021/0082044 A1* | 3/2021 | Sliwka .................. H04L 9/3255 |
| 2021/0342836 A1* | 11/2021 | Cella .................... H04L 9/3239 |

FOREIGN PATENT DOCUMENTS

| | | | |
|---|---|---|---|
| FR | 3018377 | 9/2015 | |
| WO | WO2016120826 | 8/2016 | |
| WO | WO2016120826 A2 | 8/2016 | |
| WO | WO-2019217555 A1 * | 11/2019 | ......... G06F 16/2379 |

\* cited by examiner

TOKENIZED FUNGIBLE LIABILITIES

CROSS REFERENCE TO RELATED APPLICATIONS

The present application is a non-provisional of, and claims benefit of priority under 35 U.S.C. § 119(e), from U.S. Provisional Patent Application No. 62/968,196, filed Jan. 31, 2020, the entirety of which is expressly incorporated herein by reference. See 37 C.F.R. § 1.57.

FIELD OF THE INVENTION

The present invention relates to the field of tokenized and cryptographically secured economic values useful in transactions, which employ distributed authentication and/or transaction closing. In particular, the technology addresses tokens which represent liabilities or net liabilities, and which are transferable, and may be anonymous and/or unsecured.

Note that a tokenized debt asset merely associated with a third party liability is not a tokenized liability per se.

INCORPORATION BY REFERENCE

Citation or identification of any reference herein, or any section of this application shall not be construed as an admission that such reference is available as prior art. The disclosure of each publication and patent listed or referenced herein are hereby incorporated by reference in their entirety in this application, see 37 C.F.R. § 1.57(c), and shall be treated as if the entirety thereof forms a part of this application. Such references are provided for their disclosure of technologies as may be required to enable practice of the present invention, to provide written description for claim language, to make clear applicant's possession of the invention with respect to the various aggregates, combinations, permutations, and subcombinations of the respective disclosures or portions thereof (within a particular reference or across multiple references) in conjunction with the combinations, permutations, and subcombinations of various disclosure provided herein, to demonstrate the non-abstract nature of the technology, and for any other purpose. Except as expressly indicated, the scope of the invention is inclusive, and therefore the disclosure of a technology or teaching within these incorporated materials is intended to encompass that technology or teaching as being an option of, or an addition to, other disclosure of the present invention. Likewise, the combination of incorporated teachings consistent with this disclosure is also encompassed. The citation of references is intended to be part of the disclosure of the invention, and not merely supplementary background information. While cited references may be prior art, the combinations thereof and with the material disclosed herein is not admitted as being prior art.

The incorporation by reference does not extend to teachings which are inconsistent with the invention as expressly described herein as being essential. The incorporated references are rebuttable evidence of a proper interpretation of terms, phrases, and concepts employed herein by persons of ordinary skill in the art. No admission is made that any incorporated reference is analogous art to the issues presented to the inventor, and the selection, combination, and disclosure of these disparate teachings is itself a part of the invention herein disclosed.

BACKGROUND OF THE INVENTION

A distributed authentication system is one in which "truth" is determined by a distributed set agents, without central control or authority.

A distributed consensus system is one in which "truth" is determined by a vote or poll, of a distributed set agents, each with the ability to independently ascertain the validity of a proposition. A rule is applied to the vote or poll, to achieve consensus.

A blockchain is a growing list of records or blocks, each containing a cryptographic hash of a prior record or block, a timestamp, and transaction data, e.g. a Merkle tree. Typically, the data in each proposed new block is subject to test or contest, while prior blocks are presumed authenticated according to a correspondence of the block data to the hash. By design, a blockchain is resistant to modification of its data. This is because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system with high Byzantine fault tolerance. In general, blockchain technologies have been considered as a way to represent and manage assets, that is rights that have affirmative positive value for the rights holder. This derives from their original invention as a means to provide anonymity and transferability, non-repudiation of a transaction, avoidance of double spending, and distributed architecture without a trusted third party.

The first decentralized cryptocurrency, bitcoin, was created in 2009 by presumably pseudonymous developer Satoshi Nakamoto. It used SHA-256, a cryptographic hash function, in its proof-of-work scheme. In April 2011. Namecoin was created as an attempt at forming a decentralized DNS, which would make internet censorship very difficult. Soon after, in October 2011. Litecoin was released. It used scrypt as its hash function instead of SHA-256. Another notable cryptocurrency, Peercoin used a proof-of-work/proof-of-stake hybrid. Satoshi Nakamoto, "Bitcoin: A Peer-to-Peer Electronic Cash System", whitepaper, Oct. 31, 2008 defined the original vision of Bitcoin. Bitcoin is described as a purely peer-to-peer version of electronic cash would allow online payments to be sent directly from one party to another without going through a financial institution. Digital signatures provide part of the solution, but the main benefits are lost if a trusted third party is still required to prevent double-spending. Bitcoin proposed a solution to the double-spending problem using a peer-to-peer network. The network timestamps transactions by hashing them into an ongoing chain of hash-based proof-of-work, forming a record that cannot be changed without redoing the proof-of-work. The longest chain not only serves as proof of the sequence of events witnessed, but proof that it came from the largest pool of CPU power. Thus Bitcoin is predicated on a competition based largely on computational complexity. As long as a majority of CPU power is controlled by nodes that are not cooperating to attack the network, they'll generate the longest chain and outpace attackers. The network itself requires minimal structure. Messages are broadcast on a best effort basis, and nodes can leave and rejoin the network at will, accepting the longest proof-of-work chain as proof of what happened while they were gone. Bitcoin, and its progeny, therefore focus on a competition predicated on a desirability of the token representation of wealth, the so-called "Bitcoin", and that game theory controlled its utility. However, that same competitive paradigm according to game theory, does not directly reveal how a token with a negative value, i.e., objectively undesirable, might be feasible to conduct transactions without a trusted intermediate.

Bitcoin serves the need for an electronic payment system based on cryptographic proof instead of trust, allowing any two willing parties to transact directly with each other without the need for a trusted third party. Transactions that are computationally impractical to reverse would protect sellers from fraud, and routine escrow mechanisms could easily be implemented to protect buyers. Bitcoin provides a solution to the double-spending problem using a peer-to-peer distributed timestamp server to generate computational proof of the chronological order of transactions. The system is secure as long as honest nodes collectively control more CPU power than any cooperating group of attacker nodes. But, it does not address the antithesis a token representing a debt or obligation, since the possessor of a token is generally anonymous according to the protocol, and each transfer is identified only by a cryptographic digital wallet address Bitcoin defines an electronic coin as a chain of digital signatures. Each owner transfers the coin to the next by digitally signing a hash of the previous transaction and the public key of the next owner and adding these to the end of the coin. A payee can verify the signatures to verify the chain of ownership.

A previously known cryptocurrency (or crypto currency or crypto for short) is a digital asset designed to work as a medium of exchange wherein individual coin ownership records are stored in a ledger existing in a form of computerized database using strong cryptography to secure transaction records, to control the creation of additional coins and to verify the transfer of coin ownership. It typically does not exist in physical form (like paper money) and is typically not issued by a central authority. Cryptocurrencies typically use decentralized control as opposed to centralized digital currency and central banking systems. When a known cryptocurrency is minted or created prior to issuance or issued by a single issuer, it is generally considered centralized. When implemented with decentralized control, each cryptocurrency works through distributed ledger technology, typically a blockchain, that serves as a public financial transaction database.

David Chaum conceived an anonymous cryptographic electronic money called ecash and implemented it through Digicash, a form of cryptographic electronic payments which required user software in order to withdraw notes from a bank and designate specific encrypted keys before it can be sent to a recipient. This allowed the digital currency to be untraceable by the issuing bank, the government, or any third party. Because it was linked to deposits, it is an example of a stablecoin, and was not intended to have a value decoupled from the regular economy. In 1996, the National Security Agency published a paper entitled How to Make a Mint: the Cryptography of Anonymous Electronic Cash, describing a Cryptocurrency system, first publishing it in an MIT mailing list and later in 1997, in The American Law Review (Vol. 16, Issue D). See, en.wikipedia.org/wiki/Cryptocurrency. In 1998. Wei Dai published a description of "b-money", characterized as an anonymous, distributed electronic cash system. Shortly thereafter, Nick Szabo described bit gold. Like bitcoin and other cryptocurrencies that would follow it, bit gold was described as an electronic currency system which required users to complete a proof of work function with solutions being cryptographically put together and published.

According to Jan Lansky, a cryptocurrency is a system that meets six conditions: The system does not require a central authority; its state is maintained through distributed consensus. The system keeps an overview of cryptocurrency units and their ownership. The system defines whether new cryptocurrency units can be created. If new cryptocurrency units can be created, the system defines the circumstances of their origin and how to determine the ownership of these new units. Ownership of cryptocurrency units can be proved exclusively cryptographically. The system allows transactions to be performed in which ownership of the cryptographic units is changed. A transaction statement can only be issued by an entity proving the current ownership of these units. If two different instructions for changing the ownership of the same cryptographic units are simultaneously entered, the system performs at most one of them (with a rule present to determine which one is performed).

A blockchain account can provide functions other than making payments, for example in decentralized applications or smart contracts. In this case, the units or coins are sometimes referred to as crypto tokens (or cryptotokens). Cryptocurrencies are generally generated by their own blockchain like Bitcoin and Litecoin whereas tokens are usually issued within a smart contract running on top of a blockchain such as Ethereum.

Decentralized cryptocurrency is produced by the entire cryptocurrency system collectively, at a rate (or under some other constraint) which is defined. Within a cryptocurrency system, the safety, integrity and balance of ledgers is maintained by a community of mutually distrustful parties referred to as miners who use their computers to help validate and timestamp transactions, adding them to the ledger in accordance with a particular timestamping scheme. Most cryptocurrencies are designed to gradually decrease production of that currency, placing a cap on the total amount of that currency that will ever be in circulation.

The validity of each decentralized cryptocurrency's coins is typically provided by a blockchain. A blockchain is a continuously growing list of records, called blocks, which are linked and secured using cryptography. Each block typically contains a hash pointer as a link to a previous block, a timestamp and transaction data. By design, blockchains are inherently resistant to modification of the data. It is "an open, distributed ledger that can record transactions between two parties efficiently and in a verifiable and permanent way". For use as a distributed ledger, a blockchain is typically managed by a peer-to-peer network collectively adhering to a protocol for validating new blocks. Once recorded, the data in any given block cannot be altered retroactively without the alteration of all subsequent blocks which requires collusion of the network majority.

Blockchains are secure by design and are an example of a distributed computing system with high Byzantine fault tolerance. Decentralized consensus has therefore been achieved with a blockchain. (Note that one aspect of the present invention is to reconsider the consensus rules, such that consensus alone would not necessarily produce retroactive changes however, a cryptocurrency must have mutually acceptable characteristics between parties to a transaction, and a liquid cryptocurrency requires a large pool of parties. Therefore, while a majority consensus may be abrogated, some form of consensus is required for a stable and valuable cryptocurrency). Cryptocurrencies use various timestamping schemes to "prove" the validity of transactions added to the blockchain ledger without the need for a trusted third party. The first timestamping scheme invented was the proof-of-work scheme. The most widely used proof-of-work schemes are based on SHA-256 and scrypt. Some other hashing algorithms that are used for proof-of-work include CryptoNight. Blake, SHA-3, and X11. The proofof-stake is a method of securing a cryptocurrency network and achieving distributed consensus through requesting users to show ownership of a certain amount of currency. It is different from proof-of-work systems that run difficult hashing algorithms to validate electronic transactions. The scheme is largely dependent on the coin, and there's currently no standard form of it. Some cryptocurrencies use a combined proof-of-work and proof-of-stake scheme. (The proof of stake is an interesting option for negative valued tokens, since the required proof of stake at least temporarily deanonymizes the token holder, but creates a game theoretic competing incentive for the outed stake holder to minimize the amount of liability represented).

In various cryptocurrency networks, mining is a validation of transactions. For this effort, successful miners may obtain new cryptocurrency as a reward. The reward decreases transaction fees by creating a complementary incentive to contribute to the processing power of the network. The rate of generating hashes, which validate any transaction, has been increased by the use of specialized machines such as FPGAs and ASIGs running complex hashing algorithms like SHA-256 and scrypt. Some miners pool resources, sharing their processing power over a network to split the reward equally, according to the amount of work they contributed to the probability of finding a block A "share" is awarded to members of the mining pool who present a valid partial proof-of-work. (The existence of such pools represents a collusion, and has negative implications for security of a strict consensus-based model). Proof-of-work cryptocurrencies, such as bitcoin, offer block rewards incentives for miners. There has been an implicit belief that whether miners are paid by block rewards or transaction fees does not affect the security of the blockchain, but a study suggests that this may not be the case under certain circumstances.

A cryptocurrency wallet stores the public and private "keys" or "addresses" which can be used to receive or spend the cryptocurrency. With the private key, it is possible to write in the public ledger, effectively spending the associated cryptocurrency. With the public key, it is possible for others to send currency to the wallet.

Bitcoin is pseudonymous rather than anonymous in that the cryptocurrency within a wallet is not tied to people, but rather to one or more specific keys (or "addresses"). Thereby, bitcoin owners are not identifiable, but all transactions are publicly available in the blockchain. Still, cryptocurrency exchanges are often required by law to collect the personal information of their users. Additions such as Zerocoin, Zerocash and CryptoNote have been suggested, which would allow for additional anonymity and fungibility. Most cryptocurrency tokens are fungible and interchangeable. However, unique non-fungible tokens also exist. Such tokens can serve as assets in games like Cryptokitties.

The rewards paid to miners, e.g., in a proof of work distributed consensus mechanism, increase the supply of the cryptocurrency. By making sure that verifying transactions is a costly business the integrity of the network can be preserved as long as benevolent nodes control a majority of computing power. The verification algorithm requires a lot of processing power, and thus electricity in order to make verification costly enough to accurately validate public blockchain. The current value, not the long-term value, of the cryptocurrency supports the reward scheme to incentivize miners to engage in costly mining activities. Some sources claim that the current bitcoin design is very inefficient, generating a welfare loss of 1.1% relative to an efficient cash system. The main source for this inefficiency is the large mining cost. This translates into users being willing to accept a cash system with an inflation rate of 230% before being better off using bitcoin as a means of payment. However, the efficiency of the bitcoin system can be significantly improved by optimizing the rate of coin creation and minimizing transaction fees. Another potential improvement is to eliminate inefficient mining activities by changing the consensus protocol altogether.

Transaction fees for cryptocurrency depend mainly on the supply of network capacity at the time, versus the demand from the currency holder for a faster transaction. The currency holder can choose a specific transaction fee, while network entities process transactions in order of highest offered fee to lowest. Cryptocurrency exchanges can simplify the process for currency holders by offering priority alternatives and thereby determine which fee will likely cause the transaction to be processed in the requested time. For ether, transaction fees differ by computational complexity, bandwidth use, and storage needs, while bitcoin transaction fees differ by transaction size and whether the transaction uses SegWit. Some cryptocurrencies have no transaction fees and instead rely on client-side proof-of-work as the transaction prioritization and anti-spam mechanism.

Cryptocurrency exchanges allow customers to trade cryptocurrencies for other assets, such as conventional fiat money, or to trade between different digital currencies Atomic swaps are a mechanism where one cryptocurrency can be exchanged directly for another cryptocurrency, without the need for a trusted third party such as an exchange.

An initial coin offering (100) is a controversial means of raising funds for a new cryptocurrency venture. An 100 may be used by startups with the intention of avoiding regulation. However, securities regulators in many jurisdictions, including in the U.S., and Canada, have indicated that if a coin or token is an "investment contract" (e.g., under the Howey test, i.e., an investment of money with a reasonable expectation of profit based significantly on the entrepreneurial or managerial efforts of others), it is a security and is subject to securities regulation. In an 100 campaign, a percentage of the cryptocurrency (usually in the form of "tokens") is sold to early backers of the project in exchange for legal tender or other cryptocurrencies, often bitcoin or ether. Cryptocurrency networks display a lack of regulation that has been criticized as enabling criminals who seek to evade taxes and launder money. Money laundering issues are also present in regular bank transfers, however with bank-to-bank wire transfers for instance, the account holder must at least provide a proven identity. Transactions that occur through the use and exchange of these altcoins are independent from formal banking systems, and therefore can make tax evasion simpler for individuals. Since charting taxable income is based upon what a recipient reports to the revenue service, it becomes extremely difficult to account for transactions made using existing cryptocurrencies, a mode of exchange that is complex and difficult to track. Systems of anonymity that most cryptocurrencies offer can also serve as a simpler means to launder money. Rather than laundering money through an intricate net of financial actors and offshore bank accounts, laundering money through altcoins can be achieved through anonymous transactions.

A particular problem of cryptocurrencies prior to Bitcoin is that, without a central ledger, the payee couldn't verify that one of the owners did not double-spend the coin. A common solution was therefore to introduce a trusted central authority, or mint, that checks every transaction for double spending. After each transaction, the coin must be returned to the mint to issue a new coin (or the coin transfer logged and associated with a new owner), and only coins issued (or reissued) directly from the mint are trusted not to be double-spent. The problem with this solution is that the fate of the entire money system depends on the entity running the mint, with every transaction having to go through them, just like a bank.

When the token is negative valued, the recipient in a transaction accepts the token as an expression of an obligation to pay a third party. "Double spending" does not occur in the same sense, since that would mean that the holder satisfied the debt multiple times, though in case the holder has multiple claimants seeking repayment, the issue is to whom and by whom is the debt owed?

The double payment issue in Bitcoin provides a way for the payee to know that the previous owners did not sign any earlier transactions. The earliest transaction is the one that counts, so we don't care about later attempts to double-spend. The only way to confirm the absence of a transaction is to be aware of all transactions. In the mint-based model, the mint was aware of all transactions and decided which arrived first. To accomplish this without a trusted party, transactions must be publicly announced [Dai Wei, "b-money". (1998-11-01) www.weidai.com/bmoney.txt], and we need a system for participants to agree on a single history of the order in which they were received. The payee needs proof that at the time of each transaction, the majority of nodes agreed it was the first received.

A timestamp server is provided, that works by taking a hash of a block of items to be timestamped and widely publishing the hash, such as in a newspaper or Usenet post [Henri Massias, Xavier Serret-Avila, Jean-Jacques Quisquater. "Design of a secure timestamping service with minimal trust requirements", 20th Symposium on Information Theory in the Benelux (1999-05) citeseerx.ist.psu.edu/viewdoc/summary?doi=10.1.1.13.6228; Stuart Haber, W. Scott Stornetta, "How to time-stamp a digital document". Journal of Cryptology (1991) doi.org/cwwxd4, DOI: 10.1007/bf00196791; Dave Bayer, Stuart Haber, W. Scott Stornetta, "Improving the Efficiency and Reliability of Digital Time-Stamping", Sequences II (1993) doi.org/bn4rpx. DOI: 10.1007/978-1-1613-9323-8_24; Stuart Haber, W. Scott Stornetta, "Secure names for bit-strings", Proceedings of the 1th ACM conference on Computer and communications security-CCS '97 (1997) doi.org/dtnrf6, DOI: 10.1145/266420.266430]. The timestamp proves that the data must have existed at the time, obviously, in order to get into the hash. Each timestamp includes the previous timestamp in its hash, forming a chain, with each additional timestamp reinforcing the ones before it.

To implement a distributed timestamp server on a peer-to-peer basis, a proof-of-work system similar to Adam Back's Hashcash [Adam Back, "Hashcash-A Denial of Service Counter-Measure", (2002-08-01) citeseerx.ist.psu.edu/viewdoc/summary?doi=10.1.1.15.8] was proposed, rather than newspaper or Usenet posts. The proof-of-work involves scanning for a value that when hashed, such as with SHA-256, the hash begins with a number of zero bits. The average work required is exponential in the number of zero bits required and can be verified by executing a single hash. For the Bitcoin timestamp network, the proof-of-work is implemented by incrementing a nonce in the block until a value is found that gives the block's hash the required zero bits. Once the CPU effort has been expended to make it satisfy the proof-of-work, the block cannot be changed without redoing the work. As later blocks are chained after it, the work to change the block would include redoing all the blocks after it.

The proof-of-work also solves the problem of determining representation in majority decision making. If the majority were based on one-IP-address-one-vote, it could be subverted by anyone able to allocate many IPs. Proof-of-work is essentially one-CPU-one-vote. The majority decision is represented by the longest chain, which has the greatest proof-of-work effort invested in it. If a majority of CPU power is controlled by honest nodes, the honest chain will grow the fastest and outpace any competing chains. To modify a past block, an attacker would have to redo the proof-of-work of the block and all blocks after it and then catch up with and surpass the work of the honest nodes. Satoshi concluded that the probability of a slower attacker catching up diminishes exponentially as subsequent blocks are added, though this is only true if the computational power available per CPU is equal and constant over time.

To compensate for increasing hardware speed and varying interest in running nodes over time, the proof-of-work difficulty is determined by a moving average targeting an average number of blocks per hour. If they're generated too fast, the difficulty increases. However, this does not address the difficulty of previously committed blocks of the blockchain.

The steps to run the network are as follows

1. New transactions are broadcast to all nodes.
2. Each node collects new transactions into a block.
3. Each node works on finding a difficult proof-of-work for its block.
1. When a node finds a proof-of-work, it broadcasts the block to all nodes.
5. Nodes accept the block only if all transactions in it are valid and not already spent.
6. Nodes express their acceptance of the block by working on creating the next block in the chain, using the hash of the accepted block as the previous hash.

Nodes always consider the longest chain to be the correct one and will keep working on extending it. If two nodes broadcast different versions of the next block simultaneously, some nodes may receive one or the other first. In that case, they work on the first one they received, but save the other branch in case it becomes longer. The tie will be broken when the next proof-of-work is found and one branch becomes longer, the nodes that were working on the other branch will then switch to the longer one. This, of course, exposes the risk that a first node with exponentially greater computational capacity might publish two blocks before other nodes publish one, in which case the chain from the first node is longer. If the intermediate node is corrupted, then the chain may be corrupted, and detecting the corruption and catching up by the other nodes may be difficult. Therefore, the security of the network over time is dependent on continued investment by participants to ensure computational parity and lack of domination by any one party. New transaction broadcasts do not necessarily need to reach all nodes. As long as they reach many nodes, they will get into a block before long. Block broadcasts are also tolerant of dropped messages. If a node does not receive a block, it will request it when it receives the next block and realizes it missed one. However, the ability of the Bitcoin community to tolerate distributed denial of service attacked is not well studied.

By convention, the first transaction in a block is a special transaction that starts a new coin owned by the creator of the block. This adds an incentive for nodes to support the network, and provides a way to initially distribute coins into circulation, since there is no central authority to issue them. The steady addition of a constant of amount of new coins is analogous to gold miners expending resources to add gold to circulation. In our case, it is CPU time and electricity that is expended. So long as the incentive to mine persists, so does the incentive to forge the first transaction. Likewise, if the reward is a debt, there is no incentive to mine, and an active disincentive to do so, meaning that this type of incentive is inoperative for negative valued tokens.

Bitcoin can also incentivize mining with transaction fees. This could be modified for negative valued token, since the miner could transfer a token representing debt to a participant in a transaction to be recorded on the blockchain. If the output value of a transaction is less than its input value, the difference is a transaction fee that is added to the incentive value of the block containing the transaction. Once a predetermined number of Bitcoins have entered circulation, the incentive can transition entirely to transaction fees and be completely inflation free.

The incentive may help encourage Bitcoin network nodes to stay honest. If a greedy attacker is able to assemble more CPU power than all the honest nodes, he would have to choose between using it to defraud people by stealing back his payments, or using it to generate new coins. He ought to find it more profitable to play by the rules such rules that favor him with more new coins than everyone else combined, than to undermine the system and the validity of his own wealth. The optimal incentive for an economy according to an inverse paradigm, with a negative valued token, are less readily ascertained.

Once the latest transaction in a coin is buried under enough blocks, the spent transactions before it can be discarded to save storage space. To facilitate this without breaking the block's hash, transactions are hashed in a Merkle Tree [Massias et al., Haber et al., Ralph C. Merkle, "Protocols for Public Key Cryptosystems", 1980 IEEE Symposium on Security and Privacy (1980-01) doi.org/bmvbd6. DOI: 10.1109/sp.1980.10006], with only the root included in the block's hash. Old blocks can then be compacted by stubbing off branches of the tree. The interior hashes do not need to be stored. However, this exposes a risk that if a majority of nodes are "fooled" by a sequence of fraudulent blocks, the evidence may be generally purged according to the normal operation of implementing code. A block header with no transactions would be about 80 bytes. If we suppose blocks are generated every 10 minutes 80 bytes*6*24*365=1.2 MB per year. With computer systems typically selling with 2 GB of RAM as of 2008, and Moore's Law predicting current growth of 1.2 GB per year, storage should not be a problem even if the block headers must be kept in memory.

It is possible to verify Bitcoin payments without running a full network node. A user only needs to keep a copy of the block headers of the longest proof-of-work chain, which he can get by querying network nodes until he's convinced he has the longest chain, and obtain the Merkle branch linking the transaction to the block it's timestamped in. He can't check the transaction for himself, but by linking it to a place in the chain, he can see that a network node has accepted it, and blocks added after it further confirm the network has accepted it. In the case of a debt or obligation, the party to whom the debt is owed (the "creditor") does not necessarily know who owes the debt (the "debtor"), since the tokenholder may remain anonymous. Presumably, that creditor would know if the obligation has been satisfied, and the prior token holder (prior debtor) would have an ability to retain proof of satisfaction. Note that the creditor itself holds an asset, that can be represented as a positive valued token, but this is different and distinct from the negative-valued token held by the debtor.

As such, the Bitcoin transaction verification is reliable as long as honest nodes control the network, but is more vulnerable if the network is overpowered by an attacker. This, trust in an intermediary is replaced with trust in consensus. While network nodes can verify transactions for themselves, the simplified method can be fooled by an attacker's fabricated transactions for as long as the attacker can continue to overpower the network. One strategy to protect against this would be to accept alerts from network nodes when they detect an invalid block, prompting the user's software to download the full block and alerted transactions to confirm the inconsistency. Businesses that receive frequent Bitcoin payments would probably still want to run their own nodes for more independent security and quicker verification. At present, transaction processing (mining) is typically by separate entities than commercial transaction consummation, and therefore the advice has not been heeded. In short, the risks of merchants relying on the Bitcoin miners far exceed the reward of a respective miner in performing its task, and merchants have generally avoided reasonable steps to mitigate the inherent risks.

Although it would be possible to handle Bitcoins individually, it would be unwieldy to make a separate transaction for every cent (e.g., Satoshi) in a transfer. To allow value to be split and combined, transactions contain multiple inputs and outputs. Normally there will be either a single input from a larger previous transaction or multiple inputs combining smaller amounts, and at most two outputs one for the payment, and one returning the change, if any, back to the sender. It should be noted that fan-out, where a transaction depends on several transactions, and those transactions depend on many more, is not a particular Bitcoin problem. There is never the need to extract a complete standalone copy of a Bitcoin transaction's history.

The traditional banking model achieves a level of privacy by limiting access to information to the parties involved and the trusted third party. The necessity to announce all transactions publicly precludes this method, but privacy can still be maintained by breaking the flow of information in another place: by keeping public keys anonymous. The public can see that someone is sending an amount to someone else, but without information linking the transaction to anyone. This is similar to the level of information released by stock exchanges, where the time and size of individual trades, the "tape", is made public, but without telling who the parties were.

As an additional firewall, a new key pair should be used for each Bitcoin transaction to keep them from being linked to a common owner. Some linking is still unavoidable with multi-input transactions, which necessarily reveal that their inputs were owned by the same owner. The risk is that if the owner of a key is revealed, linking could reveal other transactions that belonged to the same owner. The analogous privacy issues arise with respect to negative valued tokens.

Consider the scenario of an attacker trying to generate an alternate chain faster than the honest chain. Even if this is accomplished, it does not throw the system open to arbitrary changes such as creating value out of thin air or taking money that never belonged to the attacker. Nodes are not normally going to accept an invalid transaction as payment, and honest nodes will never accept a block containing them, assuming that this is detectable and steps are in place to actually detect the issue. An attacker might try also to change one of his own transactions to take back money he recently spent.

The race between the honest chain and an attacker chain can be characterized as a Binomial Random Walk. The success event is the honest chain being extended by one block, increasing its lead by +1, and the failure event is the attacker's chain being extended by one block, reducing the gap by −1.

The probability of an attacker catching up from a given deficit is analogous to a Gambler's Ruin problem. Suppose a gambler with unlimited credit starts at a deficit and plays potentially an infinite number of trials to try to reach breakeven. We can calculate the probability he ever reaches breakeven, or that an attacker ever catches up with the honest chain, as follows [William Feller, "An Introduction to Probability Theory and its Applications", John Wiley & Sons (1957), archive.org/details/AnIntroductionToProbabilityTheoryAndItsApplicationsVolume1]:

p=probability an honest node finds the next block
q=probability the attacker finds the next block
q=probability the attacker will ever catch up from z blocks behind $$q_z = \begin{Bmatrix} 1 & \text{if } p \le q \\ (q/p)^z & \text{if } p > q \end{Bmatrix}$$

Given the assumption that p>q, the probability drops exponentially as the number of blocks the attacker has to catch up with increases (subject to presumptions about commensurate computational power and lack of collusion). With the odds against him, if he doesn't make a lucky lunge forward early on, his chances become vanishingly small as he falls further behind.

We now consider how long the recipient of a new transaction needs to wait before being sufficiently certain the sender can't change the transaction. Assume the Bitcoin sender is an attacker who wants to make the recipient believe he paid him for a while, then switch it to pay back to himself after some time has passed. The receiver will be alerted when that happens, but the sender hopes it will be too late.

The Bitcoin receiver generates a new key pair and gives the public key to the sender shortly before signing. This prevents the sender from preparing a chain of blocks ahead of time by working on it continuously until he is lucky enough to get far enough ahead, then executing the transaction at that moment. Once the transaction is sent, the dishonest sender starts working in secret on a parallel chain containing an alternate version of his transaction.

The recipient waits until the transaction has been added to a block and s blocks have been linked after it. He doesn't know the exact amount of progress the attacker has made, but assuming the honest blocks took the average expected time per block, the attacker's potential progress will be a Poisson distribution with expected value: λ=zq/p.

To get the probability the attacker could still catch up now, we multiply the Poisson density for each amount of progress he could have made by the probability he could catch up from that point:

$$\sum_{k=0}^{\infty} \frac{\lambda^k e^{-\lambda}}{k!} \cdot \begin{Bmatrix} (q/p)^{(z-k)} & \text{if } k \le z \\ 1 & \text{if } k > z \end{Bmatrix}$$

Rearranging to avoid summing the infinite tail of the distribution . . .

$$1 - \sum_{k=0}^{\infty} \frac{\lambda^k e^{-\lambda}}{k!} \left(1 - (q/p)^{(z-k)}\right)$$

Bitcoin provides a system for electronic transactions without relying on trust. Bitcoins are made from digital signatures, which provides strong control of ownership, but is incomplete without a way to prevent double-spending. To solve this, a peer-to-peer network using proof-of-work is used to record a public history of transactions that quickly becomes computationally impractical for an attacker to change if honest nodes control a majority of CPU power. The network is robust in its unstructured simplicity. Nodes work all at once with little coordination. They do not need to be identified, since messages are not routed to any particular place and only need to be delivered on a best effort basis. Nodes can leave and rejoin the network at will, accepting the proof-of-work chain as proof of what happened while they were gone. They vote with their CPU power, expressing their acceptance of valid blocks by working on extending them and rejecting invalid blocks by refusing to work on them. Any needed rules and incentives can be enforced with this consensus mechanism.

System security derives from "proof or work", though an alternate "proof of stake" is also deemed feasible.

Cap, Clemens H. "A structural analysis of Bitcoin." INFORMATIK 2012 (2012) discusses a more rigorous analysis of Bitcoin, and proposes enhancements. In Bitcoin, participants issue transactions to change their local state and broadcast transactions to other participants using gossiping [Patrick Eugster, Pascal Felber, and Fabrice Le Fessant. The "art" of programming gossip-based systems. SIGOPS Oper. Syst. Rev., 41(5):37-12, October 2007.]: A node does not send its transactions to all other participants but only to a subset to which it is connected; recipients forward received transactions to their own peers unless they already knew the received transaction themselves. Broadcast is not reliable (i.e., a number of transactions may not be delivered to a number of nodes) and not ordered (i.e., the sequence in which transactions are received may differ from node to node and from the sequence in which they were sent). This is consistent with the failure model of Bitcoin, where a number of Byzantine (Byzantine failure mode assumes that a node may exhibit completely arbitrary, random, even malicious behavior) nodes may exhibit completely arbitrary or malicious behavior, and with the state of the art in totally ordered broadcast [Xavier Defago, Andre Schiper, and Peter Urban. Total order broadcast and multicast algorithms Taxonomy and survey. ACM Comput. Surv., 36(4):372-121, December 2004.] (impossible in asynchronous models with crash failures, difficult in Byzantine settings or without additional assumptions, such as channel reliability or trustworthy supernodes [Benjamin Reed and Flavio P. Junqueira. A simple totally ordered broadcast protocol. In Proceedings of the 2nd workshop on large-scale distributed systems and middleware, LADIS '08, pages 2:1-2:6, New York, NY, USA, 2008. ACM.], scaling badly if these assumptions are dropped).

This produces problems A node may receive transaction $t_2$ in a state where it cannot be applied (e.g., one node generates a bank account by $t_1$ and then references it in t; a different node receives $t_2$ before $t_1$). In spite of unreliable broadcast, every transaction should eventually be recognized by every node. If asked for their current state, different participants may report different states: There is no notion of global time and no mechanism to have the participants report their state at the "same" time. The sequence of states seen by a participant may depend on the participant. All this is due to the following reasons:

Latency: Some participants have not yet received all issued transactions or have not yet applied them for updating their local state.

Unreliable Broadcast: Some participants did not receive a transaction.

Order of Transactions Two participants X and Y may have seen two transactions t, and to in a different order. This may produce three conceptually different effects Same final state, different path; Different final states; Different sequence.

Byzantine Failures Participants misbehave, by bad intent or by malfunction. They send different transactions to some participants, tricking them into inconsistent states.

Network Partitioning may happen without the participants noticing. This produces several connected components, each of which is unaware of the transactions taking place in the other components.

Applications impose consistency criteria on the states of the participants.

Bitcoin takes a fresh approach. It rejects the idea of trust in a single entity. It assumes a (very) large number of participants (~$10^6$), which kills traditional serialization approaches. Furthermore, Bitcoin does not require a common code base: Every node exchanges messages with other nodes, and it is by a probabilistic game theoretic incentive that the swarm seems to pursue a common goal, which, hopefully, attracts a sufficient number of cooperative nodes, which only in turn guarantee the incentive, which was the reason to participate. In this sense, Bitcoin is a self-organized, emergent and (hopefully) self-stabilizing network of communicating nodes.

In the Bitcoin community, a more traditional, governed understanding is prevailing: A network of peer-to-peer nodes, running in their vast majority a recent version of the official Bitcoin software. A few nodes may deviate from the "official" behavior, which is tolerated by the probabilistic consensus as long as only a minority engages in counter-specification behavior. In Bitcoin, minority does not refer to numbers of participants but computing power, as demonstrated by a proof-of-work mechanism.

This more traditional interpretation may be due to social, economic and psychological effects: The active member of the community invests time, money (for running nodes) and entrepreneurial expectations. This is easier, if it is based on a belief in a stable system, well-governed by a solid architecture and endangered only by a small minority of malign attackers. This belief might be an appropriate (and stabilizing) social model; from a structural point of view, however, Bitcoin is an anarchic network of interacting but completely autonomous nodes, whose seemingly goal-directed behavior emerges from advantages the participants expect from their predictions on the average behavior of a majority of nodes.

Network partitioning is dealt with by assuming that in contemporary Internet a long-term partitioning into disconnected components will not go unnoticed by the participants and by hiding conflict resolution upon rejoining in the resilience properties against malicious minorities. Byzantine failures and unreliable communication are dealt with in a statistical manner; the algorithm aims that states of nodes eventually converge to a consistent world view. To guarantee such a common limit for all participants is the task of the Bitcoin algorithm: After a while all participants should have agreed on a common past (and on the produced states); the moment might be earlier or later, depending on the communication latency.

The incentive mechanism suggests modeling Bitcoin by game theory [James N. Webb. Game Theory: Decisions, Interaction and Evolution. Springer, 2006.]: A certain (large) number of participants is playing a repeated number of rounds. In every round, a participant may choose between a number of options, which in Bitcoin correspond to sending messages of a specific content to other participants. Since Bitcoin is not operating in synchronized rounds and with a fixed number of nodes, not sending a message is an option. The random nature of a proof-of-work may be reflected by mixed strategies and by placing constraints on the respective probabilities. From this perspective, a node decides between sending a correctly found new block (with a probability constrained by its hash performance), not sending a message, or sending an incorrect block. According to game theory, the goal of a node is to select its behavior in such a manner as to maximize the payoff in the game. Unfortunately, there are serious problems with this approach. In repeated games, the payoff often is obtained by summing the payoffs of all rounds. However, in Bitcoin a payoff is not connected with a single round, but evolves over time and retains a stochastic nature.

For example, an attacker might double spend to two different Bitcoin exchanges and subsequently ask them to convert his Bitcoins into Dollars. There is a certain probability that the attack succeeds and both exchanges will pay the appropriate amount in Dollar before realizing the attack by a block chain reorganization. This probability depends on the confirmation policy of the exchanges. Thus, the payoff depends on a large number of events, corresponding to many rounds in the game. Even worse, the probability that a Bitcoin transaction will be undone and the block chain will reorganize never becomes zero. The payoff becomes certain only when a participant finally crosses the boundary from digital (Bitcoin) to real (Dollar) economy. It is generally believed that this probability is so small that the impact can be neglected for practical purposes. However, when in search of a modeling tool which is able to rigorously prove this property we must not base the choice of the tool on the assumption we want to prove.

A more suitable tool might be a random walk, where the length of the walk provides a measure for the probability of reverting a transaction. This is the method chosen by Satoshi in the Bitcoin white paper. The approach assumes that a majority of nodes will adhere to the "official" Bitcoin protocol. It then argues in that a minority of nodes, which deviate from the official protocol, will not be able to damage the incentive, which is produced by the "official" protocol. This observation is important, since it guarantees Bitcoin stability of a convinced majority against a malevolent minority. However, for a completely decentralized system, this is not enough. There is no authority ensuring a majority or even a notion of an "official" protocol version. Every participant is free to switch to a modified protocol: he will switch, if this increases his payoff. The assumption, that a majority of nodes will stick to the "official" protocol is not accounted for or, in other versions of the debate, is explained (using circular reasoning) by referring to the incentive generated by the "official" protocol. The reasoning does not explain why a majority of nodes would want to stick to the "official" or any other currently used version of the protocol. The inherent dynamics of the protocol with regard to bounty-size and difficulty, as well as the growing interest by the open source community, is likely to further drive this issue by suggestions of new protocol variants. Both theories, game theory and random walks assume a behavior where nodes attempt to maximize their profit.

Heard-of Byzantine consensus lets the swarm chose "correct" behavior by a one-identity-one-vote scheme and is susceptible to sybil attacks. Proof-of-work improves this by counting the votes according to node hash performance. Proof-of-stake counts the votes according to the stake a node currently has in the Bitcoin system. The latter may be defined by the bounty acquired through past mining activities or by the total wealth currently held. When social aspects are a core aspect in Bitcoin stability, stake measured in real economic units might prove more important that hash performance.

According to the blockchain principle, rights are immutably stored on a ledger which may be distributed, and control over rights is provable by a claimant by possession of a cryptographic key. The immutability is a result of the consensus processing of a subsequent block, which depends on the prior block(s), and thus the accepted subsequent block constrains the entire chain of preceding blocks. If the consensus fails, there may be two subsequent blocks, each dependent on the prior chain, which is terms a fork. Forks may be intentionally created, or develop as a result of isolation of subsets.

Because an affirmative claim over a right represented in the blockchain is required, typically based on possession of a private (secret) key, an "owner" of a right recorded on a blockchain may deny ownership or simply refuse to be unmasked. For example, the entity behind the pseudonym "Satoshi Nakamoto", apparent inventor of Bitcoin, remains unknown, even though various claimants have alleged ownership, but without presentation of the private key that would prove identity, or at least chain of ownership. Further, per various accounts, even accidental loss of the key can result in irretrievable rights.

Therefore, the structure of the existing blockchain for recording, managing and transferring tokenized rights is dependent on a positive value of the right embodied in the record, and therefore a positive demand for its value. On the other hand, absent an incentive to claim a record, i.e., a negative economic value, the blockchain is suboptimal for tokenized liabilities.

A tokenized liability can be thought of, in one sense as the flip side of a tokenized right, though the incentives and constraints are vastly different, and as a result, the network dynamics of a blockchain would typically be destined for failure when employed for negative value tokens, e.g., liabilities.

For example, in the Bitcoin network, processing of blocks is incentivized by award of new tokens to "miners". Who would participate as a miner if the result was increased liability?

Inverting the stakes for miners would turn proof of work into proof of laziness, or proof of stake to proof of irrelevance. While alternate antitheses might be elaborated, in general. The logic and rules for such an infrastructure have not been presented in the body of work involving cryptocurrencies and smart contracts. In a smart contract, rights and obligations are coupled; however, enforcement of liabilities is typically automated, i.e., the obligation is an integral part of the smart contract, secured within the system, without volitional compliance.

On the other hand, one could imagine an inverted system in which "mining" blocks verifiably consumes tokens, and as a result, reduces liability, resulting in gain to the party who performs the "mining". Similarly, other mechanisms for reliable processing of blocks may be provided, for example by linking to another chain, transaction fees, or the like.

Likewise, in real economic transactions, each counterparty to the transaction provides "consideration" and thus transfers value to the other. Consider an exchange of a Bitcoin (BTC) for a corresponding amount of Bitcoin Cash (BCH). In the proposed transaction, there is presumably a paired transfer, but in actuality, each party is exposed to risk because only the acquisition of the "valuable" tokenized right is protected, while the counter-transaction (a liability) is not integrally coupled, and the fact that in the hypothetical, the liability is tokenized, is irrelevant. One solution is use of an escrow, but this requires a trusted intermediary.

Sidney Powell, "DeFi 2025 Unsecured Crypto Loans" (Jun. 17, 2019), medium.com/swlh/defi-2025-unsecured-crypto-loans-c54262507cc9, and Sidney Powell, "Crypto Lending-The Missing Ingredient" (Jun. 10, 2019) medium.com/swlh/crypto-lending-the-missing-ingredient-1862454cdf53 discusses crypto loans and unsecured crypto liabilities. Powell states that in 2018 and early 2019 an explosion in activity in the decentralized finance space (aka "DeFi" or "Open Finance") occurred, focusing on the lending segment within DeFi: this space comprises decentralized applications on which users can borrow cryptocurrency through smart contracts which are recorded on the Ethereum blockchain. The space opened up with the launch of Maker in December 2017 which allows users to borrow Dai stablecoin by staking Ether (ETH) as collateral for the loan and paying interest (referred to as the Stability Fee) in Maker's native token, MKR. Maker is offering a margin loan product in which borrowers provide security which is larger than the amount of money they want to borrow. If the borrower refuses to repay the loan then their security is liquidated to repay the loan. This form of lending depends on the security value remaining greater than the balance of the loan and with a buffer to ensure that if the asset has to be sold quickly in a distressed market, any decline in price can be absorbed without the loan being underwater. To ensure this is the case, borrowers are able to top up their security position by sending more ETH to the address of the smart contract managing the loan.

The margin loan product is particularly well suited to cryptocurrency lending because the overcollateralization makes enforcement in cases of default simple and automatic, there is no requirement to link an on-chain address to an off-chain identity for the purpose of collecting bad debts or taking security over a real-world asset like a car. The key roadblock to unsecured and under-collateralized crypto-loans is that enforcement must pierce the pseudonymity veil to access either a real-world identity or assets. A fraudulent borrower who defaults on an unsecured crypto-loan must be able to be blacklisted from future access to credit in a way that cannot easily be circumvented by creating a new wallet address. The problem for unsecured lending is that a lender faces only an address and cannot verify that the borrower on the other side of that address will not take out a loan, disappear and then create a new address to repeat the process. There are two perspectives on how to solve this identity verification, and gamification of the loan product. Identity verification would see borrowers required to submit to a full Know Your Customer (KYC) check to link the wallet address to a real identity that can't be duplicated. If that address defaulted, the identity could be blacklisted in a database accessible to any crypto-loan provider, and the requirement for any unsecured borrower to match their wallet address to an identity would prevent that borrower from just creating a new address and taking out a new loan.

Presently, there are a number of projects working on KYC solutions in which a user's information (e.g., passport, address date of birth, driver's license) is stored in a decentralized manner and they retain control over access to that information. A solution here which can plug into DeFi is still a long way off as there would also need to be a publicly queryable blacklist of defaulted borrowers to ensure that a borrower could not perpetrate the same fraud across multiple crypto-loan providers.

The second avenue, gamifying crypto loan products to disincentivize fraud, is nascent. This approach could take several novel forms, including a bounty for good behavior, referrals or staking reputation points for related addresses. While the identity verification approach aims to remove the potential for fraudulent actors to hide behind multiple wallet addresses, the gamification approach aims to set up incentives so that fraud is removed or minimized without removing the pseudonymity of wallet addresses. A user could have multiple addresses borrowing from the same platform but would choose to perform because of the threat of punishment for bad behavior or possibility of reward for good behavior outweighs the benefit of fraud, all without having to link their addresses to a real-world identity. Gamification, sought to structure incentives so that borrowers would voluntarily choose not to exit scam lenders. Gamification could at best defer an exit scam rather than prevent it altogether as long as the possibility remained for one user to control all addresses on the system.

Lenders using DeFi platforms to provide loans to customers need a source of funding. In the traditional financial system. Lenders borrow by issuing bonds to investors which are secured by a portfolio of loans. There is currently no way to do this on blockchain but there will need to be a solution for Lenders to raise funding on-chain to meet the coming wave of borrower demand for loans. This will be the beginning of the crypto-bond market, with bonds at-first secured by crypto-assets. The first crypto-assets beyond Ether or stablecoins to be used as collateral will be revenue-generating ones because the revenues can service the interest repayments. Crypto loans are an obvious example, but other options may include content rights, for example, a writer running an online publication with a subscriber base (paying in stablecoin) could borrow against future subscription fees by redirecting those fees to an escrow smart contract which repays bond investors.

Borrowing using an on-chain margin loan with Maker was easy; a borrower would lock up Ether as collateral and borrow in stablecoin (Dai on Maker). As long as the value of the locked Ether stayed above 150% of the loan balance the borrower would not be margin called. If it dropped below this threshold or the borrower defaulted, the locked Ether would be liquidated to repay the loan, ensuring that the Lender suffered no credit loss. Whilst margin loans had taken off, unsecured crypto loans were a different matter because of the vulnerability to fraudulent borrowers. A borrower who didn't have to supply at least 100% of the loan amount as collateral would always have some incentive to disappear with the loan. The threat of barring access to future finance would be a sufficient deterrent to most, however, the ability of malicious borrowers to easily create new pseudonymous addresses to repeat the process without detection meant that malicious actors could not be effectively blacklisted. In a worst-case scenario, a malicious user could create hundreds of fake addresses, take out loans and then proceed to default on all of them simultaneously, known as a Sybil Attack. As long as a given user could create multiple addresses which could not be traced back to them then unsecured crypto loans would be vulnerable to Sybil Attacks.

Know your customer (KYC) solutions attempted to replicate the inefficient process which had been applied as a norm in the 1990s when the web was still in its infancy. It was assumed that the process of importing the stock standard KYC process on-chain was worthwhile because it was an inherited norm endorsed in a number of jurisdictions. Proposed solutions involved photographing physical identification documents (often accompanied by handwritten notes to act as a timestamp), verifying them, and then encrypting and storing these in a decentralized manner to be shared at the user's discretion with third parties performing KYC checks, i.e., crypto lenders. Seeking to import the inefficient process on-chain threw up challenges who had custody of the digital copies could they be stored securely, could someone else's verification process by relied on by third parties and KYC standards differed across jurisdictions. Furthermore, many of the unbanked without government issued documentation who stood to benefit most would be shut off from access Thus, the DeFi space considered importing fees middle men, centralization and existing financial structures to solve the corresponding problems to those of non-crypto finance.

Meanwhile, the cost of biometric sensors was dropping, and many smartphones came with fingerprint recognition and cameras suitable for iris scanning. The same way that smartphone GPS birthed the ridesharing industry, smartphone biometrics held the key to DeFi's identity problem. Verified GPS geolocation coordinates can also assist in authentication. The community had been trying to reverse engineer a solution to pull an outmoded identity verification process into the future of finance, not unlike building a hyperloop for the horse-and-carriage. However, reduced to its most basic form, the problem lay in proving that a given address could not be one of many controlled by a single person. The solution could be inverted as a question of whether a method could be devised in which a person could take an unalterable piece of information unique to them and use it to create an address. The answer lay at the intersection of biometrics and cryptography.

Helium also developed a proof of location protocol. See, Amir Haleem, Andrew Allen, Andrew Thompson, Marc Nijdam, and Rahul Garg, "Helium: A Decentralized Machine Network" Whitepaper (2018-11-14).

Developers had started with the assumption that all addresses were created equal. There was one class of Externally Owned Accounts which were controlled by private key. Externally Owned Accounts triggered all activity with Contract Accounts on the Ethereum blockchain. Developers soon turned their attention to combining biometrics with cryptography. Working with teams of biochemists and cryptographers, they created the Biometrically Owned Account (BOA), a new class of Account in which the key pair was generated from the user's biometric signature. To enroll for a BOA, a user took their iris scan using a smartphone, then it was run through an open source algorithm to hash the biometric signature's binary code to generate a key and address.

The exact same address would be generated each time, giving an enrolling user only one possible Ethereum address. If a different encoding algorithm were used then a different address would result, hence it was important that all DeFi lenders adopted the same standard. The user's identity could not be reversed out of the address using the same open source algorithm, preserving privacy. Acknowledging users' desires not to have their financial activity commingled with other on-chain activity, other industries adopted different open source encryption algorithms so that a user could have different BOAs for different purposes—health, social media, finance etc.

Any person with access to a biometric-enabled smartphone could now create a unique address with their biometric signature, but only once, preventing Sybil fraud. The BOA became the ticket to accessing previously unavailable financial products. The global financial system was becoming flatter. As the BOA was the most effective means of lenders preventing a Sybil Attack, only users with a BOA address could apply for undercollateralized loans. Many crypto lenders emerged to meet the untapped demand for under-secured crypto loans as the total addressable market was orders of magnitude larger than the market for margin loans. Defaulting borrowers would lose access to DeFi loans through their BOA while the default remained unpaid. Of course, this didn't eliminate fraud entirely, there were still edge cases where BOAs were taken out for other people and window-dressed to appear legitimate. By-and-large however, the wholesale fraud people expected to engulf a pseudonymous system of borrowing never materialized because most people who wanted access wanted to reuse the product. While the advent of undercollateralized crypto loans and BOAs transformed access to finance, the precepts of underwriting remained the same. Lenders still needed to consider the borrower's ability to repay when underwriting. With a digital native financial product, it only made sense that credit assessment use digital native evidence. Lenders paid most attention to:

Age of the address—the older the address the longer the demonstrable track record of income;

Surplus income—the better the ratio of amounts transferred to the address relative to expenses transferred away from it, the stronger the application; and Network connections—more addresses transferring income to the address implies a more robust income stream.

Early adopters of the undercollateralized crypto loan were blockchain developers because they were already highly integrated with the on-chain economy. They were more likely to freelance on projects for multiple employers, were paid in cryptocurrency and were able to demonstrate a long track record of income to service loans. Underwriters would scrape their BOA's transaction history and provide approval and funds within minutes. A loan token would also be transferred to the BOA which contained the schedule of payments to demonstrate whether an account was overdue or not. Borrowers who repaid on time would receive access to better future loan terms.

Thus some thought has been invested in the problem of addressing liabilities represented in cryptographic token/currencies, extending to the unsecured model.

Drainville, Danielle. "An analysis of the Bitcoin electronic cash system." Univ. Waterloo 15 (2012), discusses Bitcoin. Bitcoin is a decentralized peer-to-peer network. It was introduced on Nov. 1, 2008 in a paper by the pseudonymous Satoshi Nakamoto [Nakamoto, S. Bitcoin: A Peer-to-Peer Electronic Cash System. Unpublished, Nov. 1, 2008. www.bitcoin.org; Buterin, V. Bitcoin: Prehistory, Predecessors and Genesis. Bitcoin Magazine, 1:14-18. May 2012]. Unlike paper cash or electronic cash, Bitcoin does not rely on a central authority like the government or a bank. Instead, it relies on a proof-of-work system to verify and authenticate transactions, which are also made public for further verification. This new form of currency is also unique in that the number of coins in circulation will increase in a predetermined way until the goal of 21 million coins in circulation is reached sometime in the year 2140 [Barber. S., Boyen, X., Shi, E, and Uzun, E. Bitter to Better—How to Make Bitcoin a Better Currency. 16th International Conference on Financial Cryptography and Data Security. Lecture Notes in Computer Science, 7397:399-414, 2012.]. Bitcoin is a peer-to-peer based electronic cash system that does not make use of a central authority. In the Bitcoin network, each node represents one of potentially many public keys belonging to a Bitcoin user, and communicates directly with each other node. All the information is made public for every user to see. Also, decisions are made through a majority vote. In Bitcoin, "voting" is primarily done by working with previous transactions and blocks.

A Bitcoin (BTC) can be thought of as a chain of digital signatures. When sending a coin from one user to another, the previous transaction in which this coin was used is hashed together with the recipient's public key, to then be signed by the sender. This hash and signature are then added to the end of the coin chain. Since the sender's public key is included in the previous transaction for the coin in question, any user can use it to verify the validity of the subsequent signature: see FIG. 1. As previously mentioned, transactions are publicly broadcasted for authentication and verification. It should be noted that, in Bitcoin, there is no such thing as "my" coin. "your" coin, or "same" coin, since all transactions are simply numbers A transaction can contain multiple inputs and multiple outputs. Consider the scenario where Alice received one Bitcoin from each of Bob and Charlie. Suppose she now wishes to send 1 BTC to Carol and 0.5 BTC to Oscar. The transaction in question will have the two coins she received from Bob and Charlie as two separate inputs. It will also have the 1 BTC to be sent to Carol, the 0.5 BTC to be sent to Oscar, and 0.5 BTC in change to be returned to Alice as outputs. Every output will then add a new link to the transaction chain of the coin in question. It should be noted that a node in the network will not accept multiple transactions using the same inputs Nodes will only accept the fi one they receive and reject the subsequent transactions.

To prevent a malicious user from double-spending a coin, some form of timestamping needs to be done. This leads to the proof-of-work (PoW) process which uses a reward system to motivate users, as well as generate new coins.

Proof-of-work is essentially taking the hash of a block of items and publishing this hash to the network. The items in question for the PoW block are transactions that need to be verified, the hash of the previous block, and a nonce. Since each block contains the hash of the previously generated block, the blocks form a chain of hash values as with transactions. The goal is to systematically increase the nonce so that the hash of the block that is currently being generated is less than a predetermined number given as targeted difficulty. This target is updated every 2016 blocks to ensure that the time it takes to generate a block is on average 10 minutes. This implies that the block cannot be altered without redoing all the work required to fi a nonce giving a valid hash, as well as the work required to generate all the subsequent blocks in the PoW chain. Users will accept a block if all the transactions contained in it are valid and if the coins have not been previously spent. They will show their acceptance of this block by using the newly found hash in the "previous hash" section of the next block they attempt to generate, thus adding a new block to the chain. This chain is called the block chain; see FIG. 2, in which "Previous Hash" is the hash of the previous block and each "Tx"

represents a transaction being verified. The transactions can be condensed together to save space using a Merkle hash tree [Merkle. R. Protocols for Public Key Cryptosystems. Proceedings of the 1980 IEFE Symposium on Security and Privacy, 122-134, 1980.]. There is no upper bound to the number of transactions that can be verified in a single block, but there has to be at least one.

Bitcoin users can generate new blocks or "mine", using their computing power. The more computing power they possess the greater the chance of being the fi to win the race to block generation. As a reward for expending this power, successful users are rewarded with a predetermined amount of Bitcoins. This is also how coins are introduced to the system. The reward is set to decrease by half every 210 000 blocks. It starts at 50 BTC& then will decrease to 25 BTCs, followed by 12.5 BTCs, and so on until the predetermined cap of 21 million BTCs are in circulation by the year 2110. As a matter of fact, the reward recently reduced to 25 BTCs on Nov. 28, 2012. Certain transactions contain an incentive of a few BTCs that go to the user who generated the block verifying the transactions in question. As an added bonus for spending their computing power for mining, these incentives are added to the reward. Both the reward and the incentives are stored in the block implicating them, in what is called the coinbase. Once a block is generated, this creates a transaction from the coinbase to the successful miner. It should be noted that this is the only type of transaction that does not have a traditional input.

Since multiple users are attempting to generate blocks and obtain the reward, there is a possibility that two blocks are created around the same time thus creating a fork in the chain. It should be noted that users are not necessarily creating blocks verifying the same transactions. To remedy the fork, users will have a tendency to trust the prong with the highest level of difficulty, which usually happens to be the longest chain. The blocks that are not part of the longest chain are then dropped and the transactions they verified are put back in miners' memory pool. The chain in its entirety stems from the "genesis block".

To ensure the security and validity of transactions, certain cryptographic primitives are used. For instance, the hash function used for both transactions and block generation is SHA-256 [FIPS 180-3. Secure Hash Standard, Federal Information Processing Standards Publication 180-3. National Institute of Standards and Technology, 2008.]. Also, the signature algorithm used is the elliptic curve digital signature algorithm (ECDSA) [Bitcoin Wiki: bitcoin.it/; FIPS 186-3. Digital Signature Standard. Federal Information Processing Standards Publication 186-3. National Institute of Standards and Technology, 2009.]. These are used to prevent a malicious user from breaking the system and gaining control of it. In this paper, the scheme is said to be broken if an attacker can impersonate other users by forging signatures or breaking the hash function and double-spending coins. The use of the hash function prevents malicious users from stealing and creating their own coins. This is due to the fact that they are protected by being hashed in a transaction, which is contained in a block, as well as with the added digital signature.

The way Bitcoin is designed implies that the last of the 21 million Bitcoins will be mined by the year 2140. This means that the cryptographic primitives used must remain secure until that time. Taking into consideration the growth of computer power over the past 10 years and the infamous Moore's Law, it is safe to assume that SHA-256 and ECDSA will be deemed insecure in that time frame. One of the more pressing concerns with cryptography nowadays is the pending arrival of large-scale quantum computers. Fortunately, the Bitcoin developers have mentioned a potential solution for this possibility. The hash function H used for the Bitcoin system is SHA-256 [FIPS 180-3. Secure Hash Standard, Federal Information Processing Standards Publication 180-3. National Institute of Standards and Technology. 2008.]. To prevent a malicious user from breaking the scheme, the function must satisfy all three cryptographic security requirements for hash functions, preimage resistance, second preimage resistance, and collision resistance. The signature algorithm used for validating transactions and confirming the identity of the payer is ECDSA [FIPS 186-3. Digital Signature Standard. Federal Information Processing Standards Publication 186-3. National Institute of Standards and Technology, 2009]. The elliptic curve used is secp256k1 from the SEC2 standard [Standards For Efficient Cryptography Group. SEC 2: Recommended Elliptic Curve Domain Parameters. p. 15. September 2000.]. This curve is a variation of the Koblitz curve.

Bitcoin is its own form of currency and payments are made directly from a user's wallet. Coins are represented by a long line of transactions, which can be found in the block chain. This implies the scheme is recognizable. The value associated to a coin is the value given to it by the Bitcoin community and virtual exchanges. To reduce the space requirement of the block chain, all transactions contained in a block can be compacted using a Merkle hash tree [Merkle, R. Protocols for Public key Cryptosystems, Proceedings of the 1980 IEEE Symposium on Security and Privacy. 122-131, 1980.]. It is also possible for users to store a portion of their wallet on their smartphone by simply downloading an application. This makes Bitcoin portable. The main feature of Bitcoin is that there is no central authority through which all transactions have to pass to be validated. Since there is no financial network, Bitcoin is transferable. Bitcoins are divisible. Bitcoins are unforgeable by design. The first thing a user in the network does when including a transaction in a block is verify the coin's history, as well as verify that the input value is greater than or equal to the output value. If either of these tests fail, it is determined that the payer is trying to send money that does not exist and the transaction is canceled.

Untraceability is not an intended feature of Bitcoin. By design, transactions are made widely public, thus implying that the path taken by coins can be traced from one address to another.

Anonymity is also not an intended security feature of Bitcoin. However, it is possible for a user to use their address as a pseudonym, use a different address per transaction and use mixers among other things to maintain some degree of anonymity. Reuse of the same address and tracing of token flows leak user identity.

Once a coin is spent, it is added to a block in the block chain. Therefore, if a malicious user were to double spend a coin, a miner would detect it. Also, Bitcoin prevents double-spending as long as the hash function and the signature algorithm are not broken. It must be noted that the Bitcoin system is only secure against double-spending in slow payment situations (situations where payments are left for an average of 10 minutes to be verified and added to the block chain before a good is delivered to the payer), as opposed to fast payment situations (situations where a good is delivered immediately).

Bitcoin also prevents a malicious user from spending coins that do not belong to her. This can be determined by comparing the receiving address in the previous transaction in which the coin in question was involved with the given public key. Also, if the transaction and signature do not coincide, it can be determined that the transaction has been tampered with.

A Bitcoin address is the hash of the elliptic curve public key, and not the public key itself. However, it is in fact perfectly legitimate cryptographic terminology to refer to the pubkey hash as a public key itself. This is because Bitcoin's cryptography can be considered to be a custom digital signature algorithm, where the public key consists of the hash of the ECC pubkey, the signature consists of the ECC pubkey concatenated with the BOC signature, and the verification algorithm involves checking the ECC pubkey in the signature against the ECC pubkey hash provided as a public key and then verifying the ECC signature against the ECC pubkey.

Vitalik Buterin, Ethereum White Paper, "A Next Generation Smart Contract & Decentralized Application Platform", discusses the Etherium platform.

When Satoshi Nakamoto first set the Bitcoin blockchain into motion in January 2009, he was simultaneously introducing two radical and untested concepts. The first is the "bitcoin", a decentralized peer-to-peer online currency that maintains a value without any backing, intrinsic value or central issuer. So far, the "bitcoin" as a currency unit has taken up the bulk of the public attention, both in terms of the political aspects of a currency without a central bank and its extreme upward and downward volatility in price. However, there is also another, equally important, part to Satoshi's grand experiment: the concept of a proof of work-based blockchain to allow for public agreement on the order of transactions. Bitcoin as an application can be described as a first-to-file system: if one entity has 50 BTC and simultaneously sends the same 50 BTC to A and to B, only the transaction that gets confirmed first will process There is no intrinsic way of determining from two transactions which came earlier, and for decades this stymied the development of decentralized digital currency. Satoshi's blockchain was the first credible decentralized solution. And now, attention is rapidly starting to shift toward this second part of Bitcoin's technology, and how the blockchain concept can be used for more than just money.

Commonly cited applications include using on-blockchain digital assets to represent custom currencies and financial instruments ("colored coins"), the ownership of an underlying physical device ("smart property"), non-fungible assets such as domain names ("Namecoin") as well as more advanced applications such as decentralized exchange, financial derivatives, peer-to-peer gambling and on-blockchain identity and reputation systems. Another important area of inquiry is "smart contracts"-systems which automatically move digital assets according to arbitrary pre-specified rules. For example, one might have a treasury contract of the form "A can withdraw up to X currency units per day, B can withdraw up to Y per day, A and B together can withdraw anything, and A can shut off B's ability to withdraw". The logical extension of this is decentralized autonomous organizations (DAOs)-long-term smart contracts that contain the assets and encode the bylaws of an entire organization. What Ethereum intends to provide is a blockchain with a built-in fully fledged Turing-complete programming language that can be used to create "contracts" that can be used to encode arbitrary state transition functions, allowing users to create any of the systems described above, as well as many others that we have not yet imagined, simply by writing up the logic in a few lines of code.

The concept of decentralized digital currency, as well as alternative applications like property registries, has been around for decades. The anonymous e-cash protocols of the 1980s and the 1990s, mostly reliant on a cryptographic primitive known as Chaumian blinding, provided a currency with a high degree of privacy, but the protocols largely failed to gain traction because of their reliance on a centralized intermediary. In 1998, Wei Dai's b-money became the first proposal to introduce the idea of creating money through solving computational puzzles as well as decentralized consensus, but the proposal was scant on details as to how decentralized consensus could actually be implemented. In 2005, Hal Finney introduced a concept of "reusable proofs of work", a system which uses ideas from b-money together with Adam Back's computationally difficult Hashcash puzzles to create a concept for a cryptocurrency, but once again fell short of the ideal by relying on trusted computing as a backend.

Because currency is a first-to-file application, where the order of transactions is often of critical importance, decentralized currencies require a solution to decentralized consensus. The main roadblock that all pre-Bitcoin currency protocols faced is the fact that, while there had been plenty of research on creating secure Byzantine-fault-tolerant multiparty consensus systems for many years, all of the protocols described were solving only half of the problem. The protocols assumed that all participants in the system were known, and produced security margins of the form "if N parties participate, then the system can tolerate up to N/4 malicious actors". The problem is, however, that in an anonymous setting such security margins are vulnerable to sybil attacks, where a single attacker creates thousands of simulated nodes on a server or botnet and uses these nodes to unilaterally secure a majority share.

The innovation provided by Satoshi is the idea of combining a very simple decentralized consensus protocol, based on nodes combining transactions into a "block" every ten minutes creating an ever-growing blockchain, with proof of work as a mechanism through which nodes gain the right to participate in the system. While nodes with a large amount of computational power do have proportionately greater influence, coming up with more computational power than the entire network combined is much harder than simulating a million nodes. Despite the Bitcoin blockchain model's crudeness and simplicity, it has proven to be good enough, and would over the next five years become the bedrock of over two hundred currencies and protocols around the world.

From a technical standpoint, the Bitcoin ledger can be thought of as a state transition system, where there is a "state" consisting of the ownership status of all existing bitcoins and a "state transition function" that takes a state and a transaction and outputs a new state which is the result. In a standard banking system, for example, the state is a balance sheet, a transaction is a request to move $X from A to B, and the state transition function reduces the value in A's account by $X and increases the value in B's account by $X. If A's account has less than $X in the first place, the state transition function returns an error. Hence, one can formally define:

APPLY(S,TX)→S' or ERROR

In the banking system defined above:

APPLY({Alice: $50, Bob: $50},"send $20 from Alice to Bob")={Alice: $30, Bob: $70}

But:

APPLY({Alice: $50, Bob: $50}, "send $70 from Alice to Bob")=ERROR

The "state" in Bitcoin is the collection of all coins (technically, "unspent transaction outputs" or UTXO) that have been minted and not yet spent, with each UTXO having a denomination and an owner (defined by a 20-byte address which is essentially a cryptographic public key). A transaction contains one or more inputs, with each input containing a reference to an existing UTXO and a cryptographic signature produced by the private key associated with the owner's address and one or more outputs, with each output containing a new UTXO to be added to the state.

The state transition function APPLY(S,TN)→S' can be defined roughly as follows:

1. For each input in TX:
   i. If the referenced UTXO is not in S, return an error.
   ii. If the provided signature does not match the owner of the UTXO, return an error.
2 If the sum of the denominations of all input UTXO is less than the sum of the denominations of all output UTXO, return an error.
3. Return S with all input UTXO removed and all output UTXO added.

The first half of the first step prevents transaction senders from spending coins that do not exist, the second half of the first step prevents transaction senders from spending other people's coins, and the second step enforces conservation of value.

In order to use this for payment, the protocol is as follows. Suppose Alice wants to send 11.7 BTC to Bob. First, Alice will look for a set of available UTXO that she owns that totals up to at least 11.7 BTC Realistically, Alice will not be able to get exactly 11.7 BTC; say that the smallest she can get is 6+4+2=12. She then creates a transaction with those three inputs and two outputs. The first output will be 11.7 BTC with Bob's address as its owner, and the second output will be the remaining 0.3 BTC "change", with the owner being Alice herself.

If we had access to a trustworthy centralized service, this system would be trivial to implement; it could simply be coded exactly as described. However, with Bitcoin we are trying to build a decentralized currency system, so we will need to combine the state transition system with a consensus system in order to ensure that everyone agrees on the order of transactions. Bitcoin's decentralized consensus process requires nodes in the network to continuously attempt to produce packages of transactions called "blocks". The network is intended to produce roughly one block every ten minutes, with each block containing a timestamp, a nonce, a reference to (ie. hash of) the previous block and a list of all of the transactions that have taken place since the previous block. Over time, this creates a persistent, ever-growing, "blockchain" that constantly updates to represent the latest state of the Bitcoin ledger.

The algorithm for checking if a block is valid, expressed in this paradigm, is as follows:

1. Check if the previous block referenced by the block exists and is valid
2. Check that the timestamp of the block is greater than that of the previous block[2] and less than 2 hours into the future.
3. Check that the proof of work on the block is valid.
4. Let S[0] be the state at the end of the previous block.
5. Suppose TX is the block's transaction list with n transactions. For all i in 0 . . . n−1, setS[i+1]=APPLY (S[i],TX[i]) If any application returns an error, exit and return false.
6. Return true, and register S[n] as the state at the end of this block Essentially, each transaction in the block must provide a state transition that is valid. Note that the state is not encoded in the block in any way; it is purely an abstraction to be remembered by the validating node and can only be (securely) computed for any block by starting from the genesis state and sequentially applying every transaction in every block. Additionally, note that the order in which the miner includes transactions into the block matters; if there are two transactions A and B in a block such that B spends a UTXO created by A, then the block will be valid if A comes before B but not otherwise.

The interesting part of the block validation algorithm is the concept of "proof of work": the condition is that the SHA256 hash of every block, treated as a 256-bit number, must be less than a dynamically adjusted target, which as of the time of this writing is approximately 2190. The purpose of this is to make block creation computationally "hard", thereby preventing sybil attackers from remaking the entire blockchain in their favor.

Because SHA256 is designed to be a completely unpredictable pseudorandom function, the only way to create a valid block is simply trial and error, repeatedly incrementing the nonce and seeing if the new hash matches. At the current target of 2192, this means an average of 264 tries; in general, the target is recalibrated by the network every 2016 blocks so that on average a new block is produced by some node in the network every ten minutes. In order to compensate miners for this computational work, the miner of every block is entitled to include a transaction giving themselves 25 BTC out of nowhere. Additionally, if any transaction has a higher total denomination in its inputs than in its outputs, the difference also goes to the miner as a "transaction fee". Incidentally, this is also the only mechanism by which BTC are issued; the genesis state contained no coins at all.

Bitcoin mining uses the hashcash proof of work function; the hashcash algorithm requires the following parameters a service string, a nonce, and a counter. In bitcoin the service string is encoded in the block header data structure, and includes a version field, the hash of the previous block, the root hash of the Merkle tree of all transactions in the block, the current time, and the difficulty. Bitcoin stores the nonce in the extraNonce field which is part of the coinbase transaction, which is stored as the left most leaf node in the Merkle tree (the coinbase is the special first transaction in the block). The counter parameter is small at 32-bits so each time it wraps the extraNonce field must be incremented (or otherwise changed) to avoid repeating work. When mining bitcoin, the hashcash algorithm repeatedly hashes the block header while incrementing the counter and extraNonce fields. Incrementing the extraNonce field entails recomputing the Merkle tree, as the coinbase transaction is the left most leaf node. The block is also occasionally updated as you are working on it.

A Block Header Contains these Fields:

| Field | Purpose | Update when . . . | Size (bytes) |
|---|---|---|---|
| Version | Block version number | You upgrade the software and it specifies a new version | 4 |
| hashPrevBlock | 256-bit hash of the previous block header | A new block comes in | 32 |

| Field | Purpose | Update when . . . | Size (bytes) |
|---|---|---|---|
| hashMerkleRoot | 256-bit hash based on all of the transactions in the block | A transaction is accepted | 32 |
| Time | Current block timestamp as seconds since 1970-01-01T00:00 UTC | Every few seconds | 4 |
| Bits | Current target in compact format | The difficulty is adjusted | 4 |
| Nonce | 32-bit number (starts at 0) | A hash is tried (increments) | 4 |

The body of the block contains the transactions. These are hashed only indirectly through the Merkle root. Because transactions aren't hashed directly, hashing a block with 1 transaction takes exactly the same amount of effort as hashing a block with 10,000 transactions. The compact format of target is a special kind of floating-point encoding using 3 bytes mantissa, the leading byte as exponent (where only the 5 lowest bits are used) and its base is 256. Most of these fields will be the same for all users. There might be some minor variation in the timestamps. The nonce will usually be different, but it increases in a strictly linear way. "Nonce" starts at 0 and is incremented for each hash. Whenever Nonce overflows (which it does frequently), the extraNonce portion of the generation transaction is incremented, which changes the Merkle root. Moreover, it is extremely unlikely for two people to have the same Merkle root because the first transaction in your block is a generation "sent" to one of your unique Bitcoin addresses Since your block is different from everyone else's blocks, you are (nearly) guaranteed to produce different hashes. Every hash you calculate has the same chance of winning as every other hash calculated by the network. Bitcoin uses: SHA256 (SHA256(Block_Header).

For example, the below Python code will calculate the hash of the block with the smallest hash as of June 2011, Block 125552. The header is built from the six fields described above, concatenated together as little-endian values in hex notation:

```
>>>import hashlib
>>>header_hex=("01000000"+
"81cd02ab7e569e8bcd9317e2fe99f2de44d49ab2b8851
ba-42308000000000000"+
"e320b6c2fffc8d750423db8bleb9422e710
e951ed797f7affc8892b0f1fc122b"+"c7f5d74d"+
"f2b9411a"+"42214695")>
>>>header_bin=header_hex.decode('hex')>
>>>hash=hashlib.sha256(hashlib.sha256(header_bin).digest( )).digest( )
>>>hash.encode('hex_codec')
'1dbd981fe6985776b641b173a400385ddc1a
222829688dle0000000000000000'
>>>hash[=.1].encode('hex_codec')
'00000000000000001e8d682928221adc5
d38d02473b144b6765798e61f98bdld'
```

The output of blockexplorer displays the hash values as big-endian numbers; notation for numbers is usual (leading digits are the most significant digits read from left to right). Example code in PHP without optimization:

```
<?
//This reverses and then swaps every other char
function SwapOrder($in){
$Split=str_split(strrev($in);
$x='';
for ($i=0; $i<count($Split; $i+=2) {
$x=$Split[$i+1].$Split[$i]
}
return $x;
}
//makes the little Endian
function little Endian($value){
return implode (unpack('H'*,pack("V*",$value);
}
$version=little Endian(1);
$prevBlockflash-SwapOrder('00000000000008>3:
41b85b8b29ad444def299fee21793cd8b9e5
67eab02cd81');
$rootHash=SwapOrder
('2b12fcflb09288fcaff797d71e950e71ae42
b91e8bdb2304758dfcffc2b620e3');
$time=littleEndian(1305998791);
$bits=little Endian(440711666);
$nonce=littleEndian(2504433986);
//concat it all
$header_hex=$version. $prevBlockHash. $rootHash.
$time. $bits $nonce;
//convert from hex to binary
$header_bin=hex2bin($header_hex);
//hash it then convert from hex to binary
$pass1=hex2bin(hash('sha256', $header_bin));
//Hash it for the seconded time
$pass2=hash('sha256', $pass1);
//fix the order
$FinalHash=SwapOrder($pass2);
echo $FinalHash;
?>
```

In order to better understand the purpose of mining, let us examine what happens in the event of a malicious attacker. Since Bitcoin's underlying cryptography is known to be secure, the attacker will target the one part of the Bitcoin system that is not protected by cryptography directly: the order of transactions. The attacker's strategy is simple:

1. Send 100 BTC to a merchant in exchange for some product (preferably a rapid-delivery digital good)
2 Wait for the delivery of the product
3. Produce another transaction sending the same 100 BTC to himself
4. Try to convince the network that his transaction to himself was the one that came first.

Once step (1) has taken place, after a few minutes some miner will include the transaction in a block, say block number 270000. After about one hour, five more blocks will have been added to the chain after that block, with each of those blocks indirectly pointing to the transaction and thus "confirming" it. At this point, the merchant will accept the payment as finalized and deliver the product; since we are assuming this is a digital good, delivery is instant. Now, the attacker creates another transaction sending the 100 BTC to himself. If the attacker simply releases it into the wild, the transaction will not be processed; miners will attempt to run APPLY(S,TX) and notice that TX consumes a UTXO which is no longer in the state. So instead, the attacker creates a "fork" of the blockchain, starting by mining another version of block 270000 pointing to the same block 269999 as a parent but with the new transaction in place of the old one. Because the block data is different, this requires redoing the proof of work. Furthermore, the attacker's new version of block 270000 has a different hash, so the original blocks 270001 to 270005 do not "point" to it; thus, the original chain and the attacker's new chain are completely separate. The rule is that in a fork the longest blockchain (i.e., the one backed by the largest quantity of proof of work) is taken to be the truth, and so legitimate miners will work on the 270005 chain while the attacker alone is working on the 270000 chain. In order for the attacker to make his blockchain the longest, he would need to have more computational power than the rest of the network combined in order to catch up (hence, "51% attack").

An important scalability feature of Bitcoin is that the block is stored in a multi-level data structure. The "hash" of a block is actually only the hash of the block header, a roughly 200-byte piece of data that contains the timestamp, nonce, previous block hash and the root hash of a data structure called the Merkle tree storing all transactions in the block.

A Merkle tree is a type of binary tree, composed of a set of nodes with a large number of leaf nodes at the bottom of the tree containing the underlying data, a set of intermediate nodes where each node is the hash of its two children, and finally a single root node, also formed from the hash of its two children, representing the "top" of the tree. The purpose of the Merkle tree is to allow the data in a block to be delivered piecemeal: a node can download only the header of a block from one source, the small part of the tree relevant to them from another source, and still be assured that all of the data is correct. The reason why this works is that hashes propagate upward: if a malicious user attempts to swap in a fake transaction into the bottom of a Merkle tree, this change will cause a change in the node above, and then a change in the node above that, finally changing the root of the tree and therefore the hash of the block, causing the protocol to register it as a completely different block (almost certainly with an invalid proof of work). The Merkle tree protocol is arguably essential to long-term sustainability. A "full node" in the Bitcoin network, one that stores and processes the entirety of every block, takes over 200 GB of disk space in the Bitcoin network. A protocol known as "simplified payment verification" (SPV) allows for another class of nodes to exist, called "light nodes", which download the block headers, verify the proof of work on the block headers, and then download only the "branches" associated with transactions that are relevant to them. This allows light nodes to determine with a strong guarantee of security what the status of any Bitcoin transaction, and their current balance, is while downloading only a very small portion of the entire blockchain.

The idea of taking the underlying blockchain idea and applying it to other concepts also has a long history. In 2005, Nick Szabo came out with the concept of "secure property titles with owner authority", a document describing how "new advances in replicated database technology" will allow for a blockchain-based system for storing a registry of who owns what land, creating an elaborate framework including concepts such as homesteading, adverse possession and Georgian land tax. However, there was unfortunately no effective replicated database system available at the time, and so the protocol was never implemented in practice. After 2009, however, once Bitcoin's decentralized consensus was developed a number of alternative applications rapidly began to emerge:

Namecoin is best described as a decentralized name registration database. In decentralized protocols like Tor, Bitcoin and BitMessage, there needs to be some way of identifying accounts so that other people can interact with them, but in all existing solutions the only kind of identifier available is a pseudorandom hash. Ideally, one would like to be able to have an account with a name like "george". However, the problem is that if one person can create an account named "george" then someone else can use the same process to register "george" for themselves as well and impersonate them. The only solution is a first-to-file paradigm, where the first registrant succeeds and the second fails-a problem perfectly suited for the Bitcoin consensus protocol. Namecoin is the oldest, and most successful, implementation of a name registration system using such an idea.

The purpose of colored coins is to serve as a protocol to allow people to create their own digital currencies—or, in the important trivial case of a currency with one unit, digital tokens, on the Bitcoin blockchain. In the colored coins protocol, one "issues" a new currency by publicly assigning a color to a specific Bitcoin UTXO, and the protocol recursively defines the color of other UTXO to be the same as the color of the inputs that the transaction creating them spent (some special rules apply in the case of mixed-color inputs). This allows users to maintain wallets containing only UTXO of a specific color and send them around much like regular bitcoins, backtracking through the blockchain to determine the color of any UTXO that they receive.

The idea behind a metacoin is to have a protocol that lives on top of Bitcoin, using Bitcoin transactions to store metacoin transactions but having a different state transition function. APPLY. Because the metacoin protocol cannot prevent invalid metacoin transactions from appearing in the Bitcoin blockchain, a rule is added that if APPLY" (S,TX) returns an error, the protocol defaults to APPLY"(S,TX)=S. This provides an easy mechanism for creating an arbitrary cryptocurrency protocol, potentially with advanced features that cannot be implemented inside of Bitcoin itself, but with a very low development cost since the complexities of mining and networking are already handled by the Bitcoin protocol.

Thus in general, there are two approaches toward building a consensus protocol: building an independent network, and building a protocol on top of Bitcoin. The former approach, while reasonably successful in the case of applications like Namecoin, is difficult to implement; each individual implementation needs to bootstrap an independent blockchain, as well as building and testing all of the necessary state transition and networking code. Additionally, the set of applications for decentralized consensus technology is predicted to follow a power law distribution where the vast majority of applications would be too small to warrant their own blockchain, and there exist large classes of decentralized applications, particularly decentralized autonomous organizations, that need to interact with each other.

The Bitcoin-based approach, on the other hand, has the flaw that it does not inherit the simplified payment verification features of Bitcoin. SPV works for Bitcoin because it can use blockchain depth as a proxy for validity: at some point, once the ancestors of a transaction go far enough back, it is safe to say that they were legitimately part of the state. Blockchain-based meta-protocols, on the other hand, cannot force the blockchain not to include transactions that are not valid within the context of their own protocols. Hence, a fully secure SPV meta-protocol implementation would need to backward scan all the way to the beginning of the Bitcoin blockchain to determine whether or not certain transactions are valid. Currently, all "light" implementations of Bitcoin-based meta-protocols rely on a trusted server to provide the data, arguably a highly suboptimal result especially when one of the primary purposes of a cryptocurrency is to eliminate the need for trust.

Even without any extensions, the Bitcoin protocol actually does facilitate a weak version of a concept of "smart contracts". UTXO in Bitcoin can be owned not just by a public key, but also by a more complicated script expressed in a simple stack-based programming language. In this paradigm, a transaction spending that UTXO must provide data that satisfies the script. Indeed, even the basic public key ownership mechanism is implemented via a script: the script takes an elliptic curve signature as input, verifies it against the transaction and the address that owns the UTXO, and returns 1 if the verification is successful and 0 otherwise. Other, more complicated, scripts exist for various additional use cases. For example, one can construct a script that requires signatures from two out of a given three private keys to validate ("multisig"), a setup useful for corporate accounts, secure savings accounts and some merchant escrow situations. Scripts can also be used to pay bounties for solutions to computational problems, and one can even construct a script that says something like "this Bitcoin UTXO is yours if you can provide an SPV proof that you sent a Dogecoin transaction of this denomination to me", essentially allowing decentralized cross-cryptocurrency exchange.

However, the scripting language as implemented in Bitcoin has several important limitations Lack of Turing-completeness-that is to say, while there is a large subset of computation that the Bitcoin scripting language supports, it does not nearly support everything. The main category that is missing is loops. This is done to avoid infinite loops during transaction verification; theoretically it is a surmountable obstacle for script programmers, since any loop can be simulated by simply repeating the underlying code many times with an if statement, but it does lead to scripts that are very space-inefficient. For example, implementing an alternative elliptic curve signature algorithm would likely require 256 repeated multiplication rounds all individually included in the code. Value—blindness—there is no way for a UTXO script to provide fine-grained control over the amount that can be withdrawn. For example, one powerful use case of an oracle contract would be a hedging contract, where A and B put in $1000 worth of BTC and after 30 days the script sends $1000 worth of BTC to A and the rest to B. This would require an oracle to determine the value of 1 BTC in USD, but even then, it is a massive improvement in terms of trust and infrastructure requirement over the fully centralized solutions that are available now. However, because UTXO are all-or-nothing, the only way to achieve this is through the very inefficient hack of having many UTXO of varying denominations (e.g., one UTXO of 2k for every k up to 30) and having the oracle pick which UTXO to send to A and which to B. Lack of state-UTXO can either be spent or unspent; there is no opportunity for multi-stage contracts or scripts which keep any other internal state beyond that. This makes it hard to make multi-stage options contracts, decentralized exchange offers or two-stage cryptographic commitment protocols (necessary for secure computational bounties). It also means that UTXO can only be used to build simple, one-off contracts and not more complex "stateful" contracts such as decentralized organizations, and makes meta-protocols difficult to implement. Binary state combined with value-blindness also mean that another important application, withdrawal limits, is impossible. Blockchain-blindness-UTXO are blind to blockchain data such as the nonce and previous hash. This severely limits applications in gambling, and several other categories by depriving the scripting language of a potentially valuable source of randomness.

Thus, there are at least three approaches to building advanced applications on top of cryptocurrency: building a new blockchain, using scripting on top of Bitcoin, and building a meta-protocol on top of Bitcoin. Building a new blockchain allows for unlimited freedom in building a feature set, but at the cost of development time and bootstrapping effort. Ising scripting is easy to implement and standardize, but is very limited in its capabilities, and meta-protocols, while easy, suffer from faults in scalability. With Ethereum, we intend to build a generalized framework that can provide the advantages of all three paradigms at the same time.

The intent of Ethereum is to merge together and improve upon the concepts of scripting, altcoins and on-chain meta-protocols, and allow developers to create arbitrary consensus-based applications that have the scalability, standardization, feature-completeness, ease of development and interoperability offered by these different paradigms all at the same time. Ethereum does this by building what is essentially the ultimate abstract foundational layer: a blockchain with a built-in Turing-complete programming language, allowing anyone to write smart contracts and decentralized applications where they can create their own arbitrary rules for ownership, transaction formats and state transition functions. A bare-bones version of Namecoin can be written in two lines of code, and other protocols like currencies and reputation systems can be built in under twenty. Smart contracts, cryptographic "boxes" that contain value and only unlock it if certain conditions are met, can also be built on top of our platform, with vastly more power than that offered by Bitcoin scripting because of the added powers of Turing-completeness, value-awareness, blockchain-awareness and state.

In Ethereum, the state is made up of objects called "accounts", with each account having a 20-byte address and state transitions being direct transfers of value and information between accounts. An Ethereum account contains four fields. The nonce, a counter used to make sure each transaction can only be processed once; The account's current ether balance; The account's contract code, if present; and The account's storage (empty by default).

"Ether" is the main internal crypto-fuel of Ethereum, and is used to pay transaction fees. In general, there are two types of accounts externally owned accounts, controlled by private keys, and contract accounts, controlled by their contract code. An externally owned account has no code, and one can send messages from an externally owned account by creating and signing a transaction; in a contract account, every time the contract account receives a message its code activates, allowing it to read and write to internal storage and send other messages or create contracts in turn. "Messages" in Ethereum are somewhat similar to "transactions" in Bitcoin, but with three important differences. First, an Ethereum message can be created either by an external entity or a contract, whereas a Bitcoin transaction can only be created externally. Second, there is an explicit option for Ethereum messages to contain data. Finally, the recipient of an Ethereum message, if it is a contract account, has the option to return a response; this means that Ethereum messages also encompass the concept of functions. "Transaction" is used in Ethereum to refer to the signed data package that stores a message to be sent from an externally owned account. Transactions contain the recipient of the message, a signature identifying the sender, the amount of ether and the data to send, as well as two values called STARTGAS and GASPRICE. In order to prevent exponential blowup and infinite loops in code, each transaction is required to set a limit to how many computational steps of code execution it can spawn, including both the initial message and any additional messages that get spawned during execution. STARTGAS is this limit, and GASPRICE is the fee to pay to the miner per computational step. If transaction execution "runs out of gas", all state changes revert-except for the payment of the fees, and if transaction execution halts with some gas remaining then the remaining portion of the fees is refunded to the sender. There is also a separate transaction type, and corresponding message type, for creating a contract; the address of a contract is calculated based on the hash of the account nonce and transaction data.

An important consequence of the message mechanism is the "first class citizen" property of Ethereum—the idea that contracts have equivalent powers to external accounts, including the ability to send message and create other contracts. This allows contracts to simultaneously serve many different roles for example, one might have a member of a decentralized organization (a contract) be an escrow account (another contract) between a paranoid individual employing custom quantum-proof Lamport signatures (a third contract) and a co-signing entity which itself uses an account with five keys for security (a fourth contract). The strength of the Ethereum platform is that the decentralized organization and the escrow contract do not need to care about what kind of account each party to the contract is.

The Ethereum state transition function, APPLY(S,TX) →S' can be defined as follows: 1. Check if the transaction is well-formed (ie. has the right number of values), the signature is valid, and the nonce matches the nonce in the sender's account. If not, return an error. 2. Calculate the transaction fee as STARTGAS*GASPRICE, and determine the sending address from the signature. Subtract the fee from the sender's account balance and increment the sender's nonce. If there is not enough balance to spend, return an error. 3. Initialize GAS=STARTGAS, and take off a certain quantity of gas per byte to pay for the bytes in the transaction. 4. Transfer the transaction value from the sender's account to the receiving account. If the receiving account does not yet exist, create it. If the receiving account is a contract, run the contract's code either to completion or until the execution runs out of gas. 5. If the value transfer failed because the sender did not have enough money, or the code execution ran out of gas revert all state changes except the payment of the fees, and add the fees to the miner's account. 6. Otherwise, refund the fees for all remaining gas to the sender, and send the fees paid for gas consumed to the miner.

For example, suppose that the contract's code is
if !contract.storage|msg.data[0]:
contract.storage[msg.data[0]]=msg.data[1]

Note that in reality the contract code is written in the low-level EVM code; this example is written in Serpent, a high-level language, for clarity, and can be compiled down to EVM code. Suppose that the contract's storage starts off empty, and a transaction is sent with 10 ether value, 2000 gas 0.001 ether gasprice, and two data fields: [2. 'CHARLIE'] [3]. The process for the state transition function in this case is as follows: 1. Check that the transaction is valid and well formed. 2. Check that the transaction sender has at least 2000*0.001=2 ether. If it is, then subtract 2 ether from the sender's account. 3. Initialize gas=2000; assuming the transaction is 170 bytes long and the byte-fee is 5, subtract 850 so that there is 1150 gas left. 1. Subtract 10 more ether from the sender's account, and add it to the contract's account. 5. Run the code. In this case, this is simple: it checks if the contract's storage at index 2 is used, notices that it is not, and so it sets the storage at index 2 to the value CHARLIE. Suppose this takes 187 gas, so the remaining amount of gas is 1150−187=963. 6. Add 963*0.001-0.963 ether back to the sender's account, and return the resulting state.

If there was no contract at the receiving end of the transaction, then the total transaction fee would simply be equal to the provided GASPRICE multiplied by the length of the transaction in bytes, and the data sent alongside the transaction would be irrelevant. Additionally, note that contract-initiated messages can assign a gas limit to the computation that they spawn, and if the sub-computation runs out of gas it gets reverted only to the point. 3 of the message call. Hence, just like transactions, contracts can secure their limited computational resources by setting strict limits on the sub-computations that they spawn.

The code in Ethereum contracts is written in a low-level, stack-based bytecode language, referred to as "Ethereum virtual machine code" or "EVM code". The code consists of a series of bytes, where each byte represents an operation. In general, code execution is an infinite loop that consists of repeatedly carrying out the operation at the current program counter (which begins at zero) and then incrementing the program counter by one, until the end of the code is reached or an error or STOP or RETURN instruction is detected. The operations have access to three types of space in which to store data: 1. The stack, a last-in-first-out container to which 32-byte values can be pushed and popped. 2. Memory, an infinitely expandable byte array. 3. The contract's long-term storage, a key/value store where keys and values are both 32 bytes. Unlike stack and memory, which reset after computation ends, storage persists for the long term. The code can also access the value, sender and data of the incoming message, as well as block header data, and the code can also return a byte array of data as an output.

The formal execution model of EVM code is simple. While the Ethereum virtual machine is running, its full computational state can be defined by the tuple (block_state, transaction, message, code, memory, stack, pc, gas), where block_state is the global state containing all accounts and includes balances and storage. Every round of execution, the current instruction is found by taking the $pc^{th}$ byte of code, and each instruction has its own definition in terms of how it affects the tuple. For example, ADD pops two items of the stack and pushes their sum, reduces gas by 1 and increments pc by 1, and SST0 RE pushes the top two items of the stack and inserts the second item into the contract's storage at the index specified by the first item, as well as reducing gas by up to 200 and incrementing pc by 1. Although there are many ways to optimize Ethereum via just-in-time compilation, a basic implementation of Ethereum can be done in a few hundred lines of code.

The Ethereum blockchain is in many ways similar to the Bitcoin blockchain, although it does have some differences. The main difference between Ethereum and Bitcoin with regard to the blockchain architecture is that, unlike Bitcoin, Ethereum blocks contain a copy of both the transaction list and the most recent state. Aside from that, two other values, the block number and the difficulty, are also stored in the block. The block validation algorithm in Ethereum is as follows 1. Check if the previous block referenced exists and is valid.
2. Check that the timestamp of the block is greater than that of the referenced previous block and less than 15 minutes into the future
3. Check that the block number, difficulty, transaction root, uncle root and gas limit (various low-level Ethereum-specific concepts) are valid.
4. Check that the proof of work on the block is valid.
5. Let S[0] be the STATE_ROOT of the previous block.
6. Let TX be the block's transaction list, with n transactions. For all in in 0 . . . n−1, setS[i+1]=APPLY(S[i], TX[i]). If any applications returns an error, or if the total gas consumed in the block up until this point exceeds the GASLIMIT, return an error.
7. Let S_FINAL be S[n], but adding the block reward paid to the miner.
8. Check if S_FINAL is the same as the STATE_ROOT. If it is, the block is valid; otherwise, it is not valid.

The approach may seem highly inefficient at first glance, because it needs to store the entire state with each block, but in reality efficiency should be comparable to that of Bitcoin. The reason is that the state is stored in the tree structure, and after every block only a small part of the tree needs to be changed. Thus, in general, between two adjacent blocks the vast majority of the tree should be the same, and therefore the data can be stored once and referenced twice using pointers (ie. hashes of subtrees). A special kind of tree known as a "Patricia tree" is used to accomplish this, including a modification to the Merkle tree concept that allows for nodes to be inserted and deleted, and not just changed, efficiently. Additionally, because all of the state information is part of the last block, there is no need to store the entire blockchain history-a strategy which, if it could be applied to Bitcoin, can be calculated to provide 5-20× savings in space.

On-blockchain token systems have many applications ranging from sub-currencies representing assets such as USD or gold to company stocks, individual tokens representing smart property, secure unforgeable coupons, and even token systems with no ties to conventional value at all, used as point systems for incentivization. Token systems can be implemented in Ethereum. A currency, or token system, fundamentally is a database with one operation: subtract X units from A and give X units to B, with the proviso that (i) X had at least X units before the transaction and (2) the transaction is approved by A. All that it takes to implement a token system is to implement this logic into a contract. The basic code for implementing a token system in Serpent looks as follows:

from=msg.sender to=msg.data[0] value=msg.data[1]
if contract.storage[from]>=value:
  contract.storage[from]=contract.storage[from]−value
  contract.storage[to]=contract.storage[to]+value This is essentially a literal implementation of the "banking system" state transition function. A few extra lines of code need to be added to provide for the initial step of distributing the currency units in the first place and a few other edge cases, and ideally a function would be added to let other contracts query for the balance of an address. Ethereum-based token systems acting as sub-currencies can potentially include another important feature that on-chain Bitcoin-based meta-currencies lack: the ability to pay transaction fees directly in that currency. This could be implemented in a contract which maintains an ether balance with which it would refund ether used to pay fees to the sender, and it would refill this balance by collecting the internal currency units that it takes in fees and reselling them in a constant running auction. Users would thus need to "activate" their accounts with ether, but once the ether is there it would be reusable because the contract would refund it each time.

Financial derivatives are the most common application of a "smart contract", and one of the simplest to implement in code. The main challenge in implementing financial contracts is that the majority of them require reference to an external price ticker; for example, a very desirable application is a smart contract that hedges against the volatility of ether (or another cryptocurrency) with respect to the ('S dollar, but doing this requires the contract to know what the value of ETH/USD is. The simplest way to do this is through a "data feed" contract maintained by a specific party (e.g., an oracle that receives data from NASDAQ) designed so that that party has the ability to update the contract as needed, and providing an interface that allows other contracts to send a message to that contract and get back a response that provides the price.

Given that critical ingredient, the hedging contract would look as follows:

1. Wait for party A to input 1000 ether.
2. Wait for party B to input 1000 ether.
3. Record the USD value of 1000 ether, calculated by querying the data feed contract, in storage, say this is $x.
4. After 30 days, allow A or B to "ping" the contract in order to send $x worth of ether (calculated by querying the data feed contract again to get the new price) to A and the rest to B.

Such a contract would have significant potential in crypto-commerce. One of the main problems cited about cryptocurrency is the fact that it's volatile; although many users and merchants may want the security and convenience of dealing with cryptographic assets, they many not wish to face that prospect of losing 23% of the value of their funds in a single day. Up until now, the most commonly proposed solution has been issuer-backed assets; the idea is that an issuer creates a sub-currency in which they have the right to issue and revoke units, and provide one unit of the currency to anyone who provides them (offline) with one unit of a specified underlying asset (e.g., gold, (USD). The issuer then promises to provide one unit of the underlying asset to anyone who sends back one unit of the crypto-asset. This mechanism allows any non-cryptographic asset to be "uplifted" into a cryptographic asset, provided that the issuer can be trusted. Because of its support for smart contracts and relatively low transaction cost and latency, it is preferred that the technology be implemented on an Etherium or Etherium-variant blockchain. However, the technology is not so limited.

In practice, however, issuers are not always trustworthy, and in some cases the banking infrastructure is too weak, or too hostile, for such services to exist. Financial derivatives provide an alternative. Here, instead of a single issuer providing the funds to back up an asset, a decentralized market of speculators, betting that the price of a cryptographic reference asset will go up, plays that role. Unlike issuers, speculators have no option to default on their side of the bargain because the hedging contract holds their funds in escrow. Note that this approach is not fully decentralized, because a trusted source is still needed to provide the price ticker, although arguably even still this is a massive improvement in terms of reducing infrastructure requirements (unlike being an issuer, issuing a price feed requires no licenses and can likely be categorized as free speech) and reducing the potential for fraud.

The earliest alternative cryptocurrency of all, Namecoin, attempted to use a Bitcoin-like blockchain to provide a name registration system, where users can register their names in a public database alongside other data. The major cited use case is for a DAS system, mapping domain names like "bitcoin.org" (or, in Namecoin's case, "bitcoin.bit") to an IP address Other use cases include email authentication and potentially more advanced reputation systems. Here is the basic contract to provide a Namecoin-like name registration system on Ethereum:

if !contract.storage[tx.data[0]]:
        contract.storage|tx.data[0]]=tx.data[1]

The contract is a database inside the Ethereum network that can be added to, but not modified or removed from. Anyone can register a name with some value, and that registration then sticks forever. A more sophisticated name registration contract will also have a "function clause" allowing other contracts to query it, as well as a mechanism for the "owner" (ie. the first registerer) of a name to change the data or transfer ownership. One can even add reputation and web-of-trust functionality on top.

Ethereum contracts can allow for the development of a decentralized file storage ecosystem, where individual users can earn small quantities of money by renting out their own hard drives and unused space can be used to further drive down the costs of file storage. The key underpinning piece of such a device would be what we have termed the "decentralized Dropbox contract". This contract works as follows. First, one splits the desired data up into blocks encrypting each block for privacy, and builds a Merkle tree out of it. One then makes a contract with the rule that, every \ blocks, the contract would pick a random index in the Merkle tree (using the previous block hash, accessible from contract code, as a source of randomness), and give X ether to the first entity to supply a transaction with a simplified payment verification-like proof of ownership of the block at that particular index in the tree. When a user wants to re-download their file, they can use a micropayment channel protocol (e.g., pay 1 szabo per 32 kilobytes) to recover the file; the most fee-efficient approach is for the payer not to publish the transaction until the end, instead replacing the transaction with a slightly more lucrative one with the same nonce after every 32 kilobytes.

An important feature of the protocol is that, although it may seem like one is trusting many random nodes not to decide to forget the file, one can reduce that risk down to near-zero by splitting the file into many pieces via secret sharing, and watching the contracts to see each piece is still in some node's possession. If a contract is still paying out money, that provides a cryptographic proof that someone out there is still storing the file.

The general concept of a "decentralized organization" is that of a virtual entity that has a certain set of members or shareholders which, perhaps with a 67% majority, have the right to spend the entity's funds and modify its code. The members would collectively decide on how the organization should allocate its funds. Methods for allocating a DAO's funds could range from bounties, salaries to even more exotic mechanisms such as an internal currency to reward work. This essentially replicates the legal trappings of a traditional company or nonprofit but using only cryptographie blockchain technology for enforcement. So far much of the talk around DAOs has been around the "capitalist" model of a "decentralized autonomous corporation" (DAC) with dividend-receiving shareholders and tradable shares: an alternative, perhaps described as a "decentralized autonomous community", would have all members have an equal share in the decision making and require 67% of existing members to agree to add or remove a member. The requirement that one person can only have one membership would then need to be enforced collectively by the group.

A general outline for how to code a DO is as follows. The simplest design is simply a piece of self-modifying code that changes if two thirds of members agree on a change. Although code is theoretically immutable, one can easily get around this and have de-facto mutability by having chunks of the code in separate contracts, and having the address of which contracts to call stored in the modifiable storage. In a simple implementation of such a DAO contract, there would be three transaction types, distinguished by the data provided in the transaction:

[0,i,k,V] to register a proposal with index i to change the address at storage index k to value V
    [0,i] to register a vote in favor of proposal i
    [2,i] to finalize proposal i if enough votes have been made The contract would then have clauses for each of these. It would maintain a record of all open storage changes, along with a list of who voted for them. It would also have a list of all members. When any storage change gets to two thirds of members voting for it, a finalizing transaction could execute the change. A more sophisticated skeleton would also have built-in voting ability for features like sending a transaction, adding members and removing members, and may even provide for Liquid Democracy-style vote delegation (i.e. anyone can assign someone to vote for them, and assignment is transitive so if A assigns B and B assigns C then C determines A's vote). This design would allow the DO to grow organically as a decentralized community, allowing people to eventually delegate the task of filtering out who is a member to specialists, although unlike in the "current system" specialists can easily pop in and out of existence over time as individual community members change their alignments.

An alternative model is for a decentralized corporation, where any account can have zero or more shares, and two thirds of the shares are required to make a decision. A complete skeleton would involve asset management functionality, the ability to make an offer to buy or sell shares, and the ability to accept offers (preferably with an order-matching mechanism inside the contract). Delegation would also exist Liquid Democracy-style, generalizing the concept of a "board of directors".

In the future, more advanced mechanisms for organizational governance may be implemented; it is at this point that a decentralized organization (DO) can start to be described as a decentralized autonomous organization (DAO). The difference between a DO and a DAO is fuzzy, but the general dividing line is whether the governance is generally carried out via a political-like process or an "automatic" process a good intuitive test is the "no common language" criterion: can the organization still function if no two members spoke the same language? Clearly, a simple traditional shareholder-style corporation would fail, whereas something like the Bitcoin protocol would be much more likely to succeed. Robin Hanson's futarchy, a mechanism for organizational governance via prediction markets, is a good example of what truly "autonomous" governance might look like. Note that one should not necessarily assume that all DAOs are superior to all DOs automation is simply a paradigm that is likely to have very large benefits in certain particular places and may not be practical in others, and many semi-DAOs are also likely to exist.

Savings wallets. Suppose that Alice wants to keep her funds safe, but is worried that she will lose or someone will hack her private key. She puts ether into a contract with Bob, a bank, as follows: Alice alone can withdraw a maximum of 1% of the funds per day. Bob alone can withdraw a maximum of 1% of the funds per day, but Alice has the ability to make a transaction with her key shutting of this ability. Alice and Bob together can withdraw anything.

Normally, 1% per day is enough for Alice, and if Alice wants to withdraw more she can contact Bob for help. If Alice's key gets hacked, she runs to Bob to move the funds to a new contract. If she loses her key, Bob will get the funds out eventually. If Bob turns out to be malicious, then she can turn off his ability to withdraw.

One can easily make a financial derivatives contract but using a data feed of the weather instead of any price index. If a farmer in Iowa purchases a derivative that pays out inversely based on the precipitation in Iowa (Crop insurance), then if there is a drought, the farmer will automatically receive money and if there is enough rain the farmer will be happy because their crops would do well.

For financial contracts for difference, it may actually be possible to decentralize the data feed via a protocol called "SchellingCoin". SchellingCoin basically works as follows: \ parties all put into the system the value of a given datum (eg. the ETH/USD price), the values are sorted, and everyone between the 25th and 75th percentile gets one token as a reward. Everyone has the incentive to provide the answer that everyone else will provide, and the only value that a large number of players can realistically agree on is the obvious default: the truth. This creates a decentralized protocol that can theoretically provide any number of values, including the ETH/USD price, the temperature in Berlin or even the result of a particular hard computation.

Bitcoin allows multisignature transaction contracts where, for example, three out of a given five keys can spend the funds, i.e., multisignature escrow. Ethereum allows for more granularity; for example, four out of five can spend everything, three out of five can spend up to 10% per day, and two out of five can spend up to 0.5% per day. Additionally, Ethereum multisig is asynchronous-two parties can register their signatures on the blockchain at different times and the last signature will automatically send the transaction.

The EVM technology can also be used to create a verifiable computing environment, allowing users to ask others to carry out computations and then optionally ask for proofs that computations at certain randomly selected checkpoints were done correctly. This allows for the creation of a cloud computing market where any user can participate with their desktop, laptop or specialized server, and spot-checking together with security deposits can be used to ensure that the system is trustworthy (ie. nodes cannot profitably cheat). Although such a system may not be suitable for all tasks that require a high level of inter-process communication, for example, cannot easily be done on a large cloud of nodes. Other tasks however, are much easier to parallelize: projects like SETI@home, folding @ home and genetic algorithms can easily be implemented on top of such a platform.

Any number of peer-to-peer gambling protocols, such as Frank Stajano and Richard Clayton's Cyberdice, can be implemented on the Ethereum blockchain. The simplest gambling protocol is actually simply a contract for difference on the next block hash, and more advanced protocols can be built up from there, creating gambling services with near-zero fees that have no ability to cheat.

Provided an oracle or SchellingCoin, prediction markets are also easy to implement, and prediction markets together with SchellingCoin may prove to be the first mainstream application of futarchy as a governance protocol for decentralized organizations.

On-chain decentralized marketplaces, using the identity and reputation system as a base: The "Greedy Heaviest Observed Subtree" (GHOST) protocol is an innovation first introduced by Yonatan Sompolinsky and Aviv Zohar in December 2013. The motivation behind GHOST is that blockchains with fast confirmation times currently suffer from reduced security due to a high stale rate-because blocks take a certain time to propagate through the network, if miner A mines a block and then miner B happens to mine another block before miner A's block propagates to B, miner B's block will end up wasted and will not contribute to network security. Furthermore, there is a centralization issue: if miner A is a mining pool with 30% hashpower and B has 10% hashpower. A will have a risk of producing a stale block 50% of the time (since the other 30% of the time A produced the last block and so will get mining data immediately) whereas B will have a risk of producing a stale block 90% of the time. Thus, if the block interval is short enough for the stale rate to be high. A will be substantially more efficient simply by virtue of its size. With these two effects combined, blockchains which produce blocks quickly are very likely to lead to one mining pool having a large enough percentage of the network hashpower to have de facto control over the mining process. As described by Sompolinsky and Zohar, GHOST solves the first issue of network security loss by including stale blocks in the calculation of which chain is the "longest"; that is to say, not just the parent and further ancestors of a block, but also the stale children of the block's ancestors (in Ethereum jargon, "uncles") are added to the calculation of which block has the largest total proof of work backing it. To solve the second issue of centralization bias we go beyond the protocol described by Sompolinsky and Zohar, and also allow stales to be registered into the main chain to receive a block reward: a stale block receives 93.75% of its base reward, and the nephew that includes the stale block receives the remaining 6.25%. Transaction fees, however, are not awarded to uncles.

Ethereum implements a simplified version of GHOST which only goes down five levels. Specifically, a stale block can only be included as an uncle by the 2nd to 5th generation child of its parent, and not any block with a more distant relation (e.g., 6th generation child of a parent, or 3rd generation child of a grandparent). This was done for several reasons. First, unlimited GHOST would include too many complications into the calculation of which uncles for a given block are valid. Second, unlimited GHOST with compensation as used in Ethereum removes the incentive for a miner to mine on the main chain and not the chain of a public attacker. Finally, calculations show that five-level GHOST with incentivization is over 95% efficient even with a 15 s block time, and miners with 25% hashpower show centralization gains of less than 3%.

Because every transaction published into the blockchain imposes on the network the cost of needing to download and verify it, there is a need for some regulatory mechanism, typically involving transaction fees to prevent abuse. The default approach, used in Bitcoin, is to have purely voluntary fees relying on miners to act as the gatekeepers and set dynamic minimums. This approach has been received very favorably in the Bitcoin community particularly because it is "market-based", allowing supply and demand between miners and transaction senders determine the price. The problem with this line of reasoning is, however, that transaction processing is not a market; although it is intuitively attractive to construe transaction processing as a service that the miner is offering to the sender, in reality every transaction that a miner includes will need to be processed by every node in the network, so the vast majority of the cost of transaction processing is borne by third parties and not the miner that is making the decision of whether or not to include it. Hence, tragedy-of-the-commons problems are very likely to occur. However, when given a particular inaccurate simplifying assumption is made, this is cancelled out. The argument is as follows. Suppose that: 1. A transaction leads to k operations, offering the reward kR to any miner that includes it where R is set by the sender and k and R are (roughly) visible to the miner beforehand. 2. An operation has a processing cost of C to any node (i.e., all nodes have equal efficiency). 3. There are \ mining nodes, each with exactly equal processing power (ie. I/N of total). 1. No non-mining full nodes exist. A miner would be willing to process a transaction if the expected reward is greater than the cost. Thus, the expected reward is kR/N since the miner has a 1/N chance of processing the next block and the processing cost for the miner is simply kC. Hence, miners will include transactions where kR/N>kC, or R>NC. Note that R is the per-operation fee provided by the sender, and is thus a lower bound on the benefit that the sender derives from the transaction, and NC is the cost to the entire network together of processing an operation. Hence, miners have the incentive to include only those transactions for which the total utilitarian benefit exceeds the cost. However, there are several important deviations from those assumptions in reality: 1. The miner does pay a higher cost to process the transaction than the other verifying nodes, since the extra verification time delays block propagation and thus increases the chance the block will become a stale. 2. There do exist non-mining full nodes. 3. The mining power distribution may end up radically inegalitarian in practice. 4. Speculators political enemies and crazies whose utility function includes causing harm to the network do exist, and they can cleverly set up contracts whose cost is much lower than the cost paid by other verifying nodes Point 1 provides a tendency for the miner to include fewer transactions, and point 2 increases NG hence, these two effects at least partially cancel each other out. Points 3 and 4 are the major issue; to solve them we simply institute a floating cap: no block can have more operations than BLK_LIMIT_FACTOR times the long-term exponential moving average. BLK_LIMIT_FACTOR and E MA_FACTOR are constants that will be set to 65536 and 1.5 for the time being, but will likely be changed after further analysis. Specifically:

blk.oplimit=floor(blk.parent.oplimit*(EMAFACTOR−1)+floor
(parent.opcount*BLK_LIMIT_FACTOR)/
EMA_FACTOR)

The Ethereum virtual machine is Turing-complete; this means that EVM code can encode any computation that can be conceivably carried out, including infinite loops. EVM code allows looping in two ways First, there is a JUMP instruction that allows the program to jump back to a previous spot in the code, and a JUMPI instruction to do conditional jumping, allowing for statements like while x<27: x=x*2. Second, contracts can call other contracts, potentially allowing for looping through recursion. This naturally leads to a problem: can malicious users essentially shut miners and full nodes down by forcing them to enter into an infinite loop? The issue arises because of a problem in computer science known as the halting problem: there is no way to tell, in the general case, whether or not a given program will ever halt.

As described in the state transition section, our solution works by requiring a transaction to set a maximum number of computational steps that it is allowed to take, and if execution takes longer computation is reverted but fees are still paid. Messages work in the same way. To show the motivation behind our solution, consider the following examples: 1. An attacker creates a contract which runs an infinite loop, and then sends a transaction activating that loop to the miner. The miner will process the transaction, running the infinite loop, and wait for it to run out of gas. Even though the execution runs out of gas and stops halfway through, the transaction is still valid and the miner still claims the fee from the attacker for each computational step. 2. An attacker creates a very long infinite loop with the intent of forcing the miner to keep computing for such a long time that by the time computation finishes a few more blocks will have come out and it will not be possible for the miner to include the transaction to claim the fee. However, the attacker will be required to submit a value for STARTGAS limiting the number of computational steps that execution can take, so the miner will know ahead of time that the computation will take an excessively large number of steps. 3. An attacker sees a contract with code of some form like send(A,contract.storage[A]); contract.storage[A]=0, and sends a transaction with just enough gas to run the first step but not the second (i.e., making a withdrawal but not letting the balance go down). The contract author does not need to worry about protecting against such attacks because if execution stops halfway through the changes get reverted. 4. A financial contract works by taking the median of nine proprietary data feeds in order to minimize risk. An attacker takes over one of the data feeds, which is designed to be modifiable via the variable-address-call mechanism described in the section on DAOs, and converts it to run an infinite loop, thereby attempting to force any attempts to claim funds from the financial contract to run out of gas. However, the financial contract can set a gas limit on the message to prevent this problem.

The alternative to Turing-completeness is Turing-incompleteness where JUMP and JUMPI do not exist and only one copy of each contract is allowed to exist in the call stack at any given time. With this system, the fee system described and the uncertainties around the effectiveness of the Etherium solution might not be necessary, as the cost of executing a contract would be bounded above by its size. Miners could try to detect logic bombs ahead of time by maintaining a value alongside each contract specifying the maximum number of computational steps that it can take, and calculating this for contracts calling other contracts recursively, but that would require miners to forbid contracts that create other contracts (since the creation and execution of all contracts above could easily be rolled into a single contract). Another problematic point is that the address field of a message is a variable, so in general it may not even be possible to tell which other contracts a given contract will call ahead of time.

The Ethereum network includes its own built-in currency, ether, which serves the dual purpose of providing a primary liquidity layer to allow for efficient exchange between various types of digital assets and, more importantly, of providing a mechanism for paying transaction fees.

The present technology need not be implemented on a Turing complete platform, and need not employ any particular token implementation, though the protocols require consideration for the fact that a recipient must accept a liability, and an incentive is not achieved by transferring tokens to a recipient, and rather accepting tokens from a party is an incentive to the party. As such, various risks incurred by cryptocurrency systems are inverted, and therefore solutions to typical problems may require reconsideration and reimplementation.

The Bitcoin mining algorithm basically works by having miners compute SHA256 on slightly modified versions of the block header millions of times over and over again, until eventually one node comes up with a version whose hash is less than the target (currently around 2190). However, this mining algorithm is vulnerable to two forms of centralization. First, the mining ecosystem has come to be dominated by ASICs (application-specific integrated circuits), computer chips designed for, and therefore thousands of times more efficient at, the specific task of Bitcoin mining. This means that Bitcoin mining is no longer a highly decentralized and egalitarian pursuit, requiring millions of dollars of capital to effectively participate in. Second, most Bitcoin miners do not actually perform block validation locally; instead, they rely on a centralized mining pool to provide the block headers. This problem is arguably worse, as it permits mining pools to indirectly control large portions of the processing power in the Bitcoin network, although this is mitigated by the fact that miners can switch to other mining pools if a pool or coalition attempts a 51% attack.

One common concern about Ethereum is the issue of scalability. Like Bitcoin, Ethereum suffers from the flaw that every transaction needs to be processed by every node in the network. The problem with a large blockchain size is centralization risk. If the blockchain size increases to, say, 100 TB, then the likely scenario would be that only a very small number of large businesses would run full nodes, with all regular users using light SPV nodes. In such a situation, there arises the potential concern that the full nodes could band together and all agree to cheat in some profitable fashion (e.g., change the block reward, give themselves BTC). Light nodes would have no way of detecting this immediately. Of course, at least one honest full node would likely exist, and after a few hours information about the fraud would trickle out through channels like Reddit, but at that point it would be too late: it would be up to the ordinary users to organize an effort to blacklist the given blocks a massive and likely infeasible coordination problem on a similar scale as that of pulling off a successful 51% attack. In the case of Bitcoin, this is currently a problem, but there exists a blockchain modification suggested by Peter Todd which will alleviate this issue. Ethereum includes an intermediate state tree root in the blockchain after processing each transaction. Even if block validation is centralized, as long as one honest verifying node exists, the centralization problem can be circumvented via a verification protocol. If a miner publishes an invalid block, that block must either be badly formatted, or the state S[n] is incorrect. Since S[0] is known to be correct, there must be some first state S[i] that is incorrect where S[i−1] is correct. The verifying node would provide the index i, along with a "proof of invalidity" consisting of the subset of Patricia tree nodes needing to process APPLY(S[i−1],TX[i])→S[i]. Nodes would be able to use those nodes to run that part of the computation, and see that the S[i] generated does not match the S[i] provided. Another, more sophisticated, attack would involve the malicious miners publishing incomplete blocks so the full information does not even exist to determine whether or not blocks are valid. The solution to this is a challenge-response protocol: verification nodes issue "challenges" in the form of target transaction indices, and upon receiving, a light node treats the block as untrusted until another node, whether the miner or another verifier, provides a subset of Patricia nodes as a proof of validity.

The contract mechanism allows anyone to build what is essentially a command line application run on a virtual machine that is executed by consensus across the entire network, allowing it to modify a globally accessible state as its "hard drive". However, for most people, the command line interface that is the transaction sending mechanism is not sufficiently user-friendly to make decentralization an attractive mainstream alternative. To this end, a complete "decentralized application" should consist of both low-level business-logic components, whether implemented entirely on Ethereum, using a combination of Ethereum and other systems (e.g., a P2P messaging layer, one of which is currently planned to be put into the Ethereum clients) or other systems entirely, and high-level graphical user interface components. The Ethereum client's design is to serve as a web browser, but include support for a "eth" Javascript API object, which specialized web pages viewed in the client will be able to use to interact with the Ethereum blockchain. From the point of view of the "traditional" web, these web pages are entirely static content, since the blockchain and other decentralized protocols will serve as a complete replacement for the server for the purpose of handling user-initiated requests. Eventually, decentralized protocols hopefully themselves in some fashion using Ethereum, may be used to store the web pages themselves.

The Ethereum protocol was originally conceived as an upgraded version of a cryptocurrency, providing advanced features such as on-blockchain escrow, withdrawal limits and financial contracts, gambling markets and the like via a highly generalized programming language. The Ethereum protocol would not "support" any of the applications directly, but the existence of a Turing-complete programming language means that arbitrary contracts can theoretically be created for any transaction type or application. What is more interesting about Ethereum, however, is that the Ethereum protocol moves far beyond just currency. Protocols and decentralized applications around decentralized file storage, decentralized computation and decentralized prediction markets, among dozens of other such concepts, have the potential to substantially increase the efficiency of the computational industry, and provide a massive boost to other peer-to-peer protocols by adding for the first time an economic layer. Finally, there is also a substantial array of applications that have nothing to do with money at all.

The concept of an arbitrary state transition function as implemented by the Ethereum protocol provides for a platform with unique potential; rather than being a closed-ended, single-purpose protocol intended for a specific array of applications in data storage, gambling or finance. Ethereum is open-ended by design, and we believe that it is extremely well-suited to serving as a foundational layer for a very large number of both financial and non-financial protocols in the years to come.

US 20170213287 provides a system and method for providing a cryptographic platform for exchanging debt securities denominated in virtual currencies. A web based system is provided for debt securities in a virtual currency, which may alternatively be referred to as "solidus bonds." may be implemented so as to have the following defining characteristics A cryptographic platform for exchanging debt securities denominated in virtual currencies may be implemented within a computer or digital data processing system, so as to provide a securities exchange distributed across a plurality of spatially distributed computers or digital data processing systems (such as a peer-to-peer network of computers). Such a system may provide for distributed ownership of a bond ledger, and may protect the authenticity of data transferred to and from the bond ledger and the integrity of the bond ledger by the use of cryptography (such as a cryptographic blockchain). The system may provide for the use of cryptographic signatures to allow users to prove ownership of a particular security, and thereby ensure the integrity of transactions, for example transfers of a security from one user to another. The system may also rely on the use of cryptography, for example a cryptographic blockchain, to prevent double spending, a problem analogous to "check kiting" in a digital environment. In some embodiments, network participants may be responsible for validating the bond principal and the bond coupons. The principal and the coupons may then be automatically liquidated as virtual currency, such as SwiftCoin currency. In an embodiment, these and other transactions that have been validated by network participants may be irreversible.

A smart contract is an automatically-implemented transaction dependent on software whose execution is controlled by a decentralized system which thereby reliably ensures that once conditions for execution are met, the execution and resulting action are guaranteed according to the decentralized system reliability. See, Smart Investment Contracts Disruption of Private Equity by the Emergence of the Smart Contract Attorney, assure.co/smart-contracts-are-not-what-you-think-they-are-they-are-just-code/

A smart contract is a computer code protocol using blockchain distributed ledger technology to execute transactions based on pre-defined parameters. At its core, a smart contract is not an agreement between parties memorialized in a document drafted by a lawyer, but simply software code written by computer programmers. As such smart contracts are a software coding construct first and only peripherally refer to the legal construction of the underlying transaction relationship, that is a smart contract is not a legally binding contract. However, a legal obligation may be memorialized in a smart contract, and execution of a smart contract (or justifiable failure to execute) may fulfill or completely satisfy a binding legal obligation. The Smart Investment Contract workflow facilitated by blockchain distributed ledger technology would proceed along these lines:

(1) Issuers and investors agree on the terms of a sale with the offering deal terms acting as variables in the templates programmable smart investment contract. (This agreement would represent a contract, and all else being equal, could be enforced if required formalities of contracts are fulfilled).

(2) Once the final terms are settled the smart investment contract is cryptographically signed by all parties with the final agreement terms encoded into a block on the distributed ledger. Depending on the agreement, the signing may fulfill the legal requirements; that is the agreement of the parties may be to delegate the execution to the software, and abrogate responsibility for personal fulfillment.

(3) Upon the closing date the smart investment contract protocol initiates the exchange of cash and transfer of securities, each of which is recorded permanently on the blockchain or otherwise ensure that the terms of the agreement are fulfilled. While smart contracts at present are typically tied to blockchains, this is not definitional for a smart contract, at least as used herein. This leads to an issue which is typically incompletely resolved in existing paradigms if the blockchain forks, and the smartcontract thereafter exists on both chains, what happens when both seek to execute? For example, the redundant execution could be duplicative or inconsistent. (To the extent this is encompassed by the present invention, the resolution is direct: the smartcontract includes a term or code to pre-elect which fork of the blockchain to respect, and therefore no duplication or inconsistency would occur).

(1) Upon a conversion or liquidation event, the smart investment contract initiates the exchange of a promissory note for securities or facilitates the exchange of stock for cash for each investor, with an applicable recordation on the blockchain.

Each party entering into the smart contract would be responsible to ensure that the programmer/"attorney" properly translates dates, deal terms, share prices, and conversion/liquidation mechanics into effective building blocks of "if-then" while simultaneously generating an equivalent summary "term sheet" for establishing mutual assent to an offer.

The use of smart contracts in Initial Coin Offerings ("ICOs") typically meets the standard definition of both an investment contract and a legally binding written contract. In this context a "smart investment contract" would be designed specifically to facilitate an investment agreement between a company and its investors. While there may be some variability between a traditional paper agreement and the representative digital code of the "smart investment contract," the blackletter principles of mutual assent to a valid offer and acceptance would be met in equal measure for the following reasons:

(1) smart investment contracts could provide ample objective evidence of an existence of a legally binding contract, including plain English prose describing the terms of the investment agreement from issuance to liquidation similar to what is currently happening in the public investment context through the "tokenization" of debt instruments and their associated data;

(2) digital signature procedures (E-SIGN Act and the Uniform Electronic Transaction Act provide legal basis for enforceability of digital signatures in most commercial transactions and efficacy to electronic records otherwise required to be in writing) and;

(3) immutable and verifiable recordation of performance of the parameters of the transaction on blockchain distributed ledger technology.

Shuai Wang, Yong Yuan, Xiao Wang, Juanjuan Li, Rui Qin. Fei-Fue Wang, "An Overview of Smart Contract: Architecture, Applications, and Future Trends", 2018 IEEE Intelligent Vehicles Symposium (IV) Changshu, Suzhou, China, Jun. 26-30, 2018, discusses a blockchain powered smart contract, using, e.g., parallel blockchain. Blockchain technology has enabled customizable programming logic to be stored in a decentralized way. This has revived the notion and facilitated the creation of smart contracts (also called blockchain contracts, digital contracts, or self-executing contracts) that were first proposed by Nick Szabo in 1994. Smart contracts are self-executing contracts with the terms of the agreement between interested parties. The contracts are written in the form of program codes that exist across a distributed, decentralized blockchain network. Smart contracts allow transactions to be conducted between anonymous or untrusted parties without the need for a central authority. Blockchain technology represented by Bitcoin and other cryptocurrencies has the typical features of decentralization, tamper-resistant, anonymity and auditability. However, writing contracts with complex logic is not possible due to the limitations of Bitcoin scripting language (Bitcoin scripting language has only 256 instructions, in which. 15 are currently disabled, and 75 are reserved). Due to limited functionality, Bitcoin can only be considered as the prototype of smart contracts. Newly emerging blockchain platforms such as Ethereum embrace the idea of running user-defined programs on the blockchain, thus creating an expressive customized smart contracts with the help of Turing-complete programming language. The codes of Ethereum smart contract are written in a stack-based bytecode language and executed in Ethereum Virtual Machine (EVM). Several high-level languages such as Solidity and Serpent can be used to write Ethereum smart contracts. The code of those languages can then be compiled into EVM bytecodes to be run. Ethereum is currently the most popular platform for developing smart contracts.

The correct implementation of smart contracts is enforced by the consensus protocols. The contracts can encode any pre-defined rules and execute the corresponding operations when trigger conditions are satisfied. Thus smart contracts can be applied in many fields, including intelligent assets and self-enforcing or autonomous governance applications (e.g., digital property management such as ujomusic, e-voting, and supply chain).

A typical blockchain system generally consists of six layers, namely, data layer, network layer, consensus layer, incentive layer, contract layer and application layer.

Data layer. This layer includes the underlying data blocks related encrypted messages, and timestamp, etc.

Network layer. The blockchain system usually adopts the P2P protocol that is completely distributed and can tolerate single point of failures (SPoF). Blockchain network nodes have the characteristics of equality, autonomy, and distribution. All the nodes are connected in a topological structure without any centralized authoritative nodes or hierarchy.

Consensus layer. The consensus layer encapsulates various types of consensus protocols. This is due to the decentralized blockchain is jointly managed and maintained by multiple parties. Some of the nodes may not be credible and therefore require support for the Byzantine Fault Tolerance (BFT). Common consensus algorithms include PoW (Proof of Work), PoS (Proof of Stake), PBFT (Practical Byzantine Fault Tolerance), etc. PoW consensus process (commonly known as mining, each node is called a miner) is as follows each node contributes their computing resources to compete solving a SHA256 mathematical puzzle (the difficulty of the puzzle could be adjusted dynamically), the winner miner broadcasts the mined block to other nodes, then other nodes confirm its validness. If the block is validated, other miners would append this new block to their own blockchains. However, PoW consumes large amounts of electricity resource, result in a huge waste of energy. Thus, researchers propose some alternative consensus protocols. For example, EOS adopts DPOS (Delegated Proof of Stake) consensus protocol which leverages the power of stakeholder approval voting to resolve consensus issues in a fair and democratic way \. Currently, Ethereum adopts PoW+PoS hybrid consensus mechanism and Hyperledger Fabric adopts PBFT mechanism.

Incentive layer. Consensus nodes in a decentralized system are self-interested, maximizing revenue is the fundamental goal of their participating in data verification and accounting. Therefore, incentive-compatible mechanisms should be designed, so that the individual rational behavior of the consensus nodes to maximize their own profits can be incentive-aligned with the overall goal of guaranteeing the safety and effectiveness of the decentralized blockchain ecosystem. Taking Bitcoin as an example, the economic incentive in Bitcoin s PoW consensus mechanism consists of two parts the newly issued Bitcoin rewards and the transaction fees. They are awarded to the node who can first solve the mathematical puzzle and record the block successfully.

Contract layer. The contract layer encapsulates various types of script codes, algorithms, and sophisticated smart contracts, and thus is the basis for flexible programming and manipulation of blockchain systems. Most of the cryptocurrencies, including Bitcoin and Litecoin, use non-Turing-complete scripting language which means they have no flow control, namely, no loops or conditionals Nowadays, more complex and flexible scripting languages for smart contracts have emerged, e.g., Solidity and Serpent, which enable blockchain to support a wider range of applications of finance and social systems.

Application layer. The main application in the Bitcoin system is digital currency transactions. For Ethereum platform, in addition to currency transactions, it also supports Decentralized Applications (Dapp). Dapp is an application that runs on a decentralized network such as Ethereum. Hyperledger Fabric mainly aimed at enterprise-level blockchain applications, its Dapps can be built on SDks using programming languages such as Go, Java, Python, and Node.js.

Smart contracts are a set of Scenario-Response procedural rules and logic. In other words, they are decentralized, trusted shared codes that deployed on blockchain. The parties signing a contract should agree on contractual details conditions of breach of contract, liability for breach of contract and the external verification data sources (oracles), then deploy it on the blockchain in the form of smart contract thus to automate the execution of contract on behalf of the signatories. The whole process is independent of any central agencies.

Normally, after the smart contracts are signed by all parties, they are attached to the blockchain in the form of program codes (e.g., a Bitcoin transaction), and are recorded in the blockchain after being propagated by the P2P network and verified by the nodes. Smart contract encapsulates a number of pre-defined states and transition rules, scenarios that trigger contract execution (such as at a given time or a particular event occurs), responses in a particular scenario, etc. The blockchain monitors the real-time status of smart contracts and executes the contract after certain trigger conditions have been met.

Smart contracts can be developed and deployed in different blockchain platforms. Different platforms have different characteristics. In this section, we will introduce two typical platforms, namely, Ethereum and Hyperledger Fabric.

Ethereum. Ethereum is a public blockchain platform on which applications run exactly as programmed without any possibility of downtime, censorship, fraud or third-party interference. A Turing-complete virtual machine called Ethereum Virtual Machine (EVM) is used to execute contract bytecode (the bytecode is compiled by Solidity as mentioned before). The applications on Ethereum are run on its platform-specific cryptographic token—Ether. Ether is used in two ways, one is traded as a digital currency like Bitcoin; another is used to compensate participant nodes for the computations they performed.

Hyperledger Fabric. Hyperledger Fabric is a blockchain framework implementation which is hosted by Linux Foundation. It is a platform for distributed ledger solutions, underpinned by a modular architecture delivering high degrees of confidentiality, resiliency, flexibility and scalability. It is designed to support pluggable implementations of different components, and accommodate the complexity and intricacies that exist across the economic ecosystem.

Hyperledger Fabric leverages container technology to host smart contracts called "chaincode" which comprise the application logic of the system. Besides that, "chaincode" is the only channel that interacts with the blockchain and the only source that generates the transactions.

The codes of Ethereum smart contracts are written in stack-based bytecode language and executed in EVM. Several high-level languages (e.g., Solidity, Serpent and LLL) can be used to write Ethereum smart contracts. The codes will then be compiled into EVM bytecodes to be run. Hyperledger Fabric develops smart contracts using Go and Java, etc. The essence of deploying smart contracts on Hyperledger Fabric is to realize the three functions—Init, Invoke and Query in the "chaincode" interface, which are respectively used to implement contract deployment, transaction processing and transaction inquiries.

Smart contracts have three characteristics, namely, autonomy, self-sufficiency, and decentralization. Autonomy means that after they are launched and executed, the contracts and the initiating agents need not be in further contact. Second, smart contract can be self-sufficient in their ability to marshal resources-that is, raising funds by providing services, and spending them when needed, e.g., gain processing power or storage. Third, smart contracts are decentralized as they do not subsist on a single centralized server, they are distributed and self-executed across network nodes.

Smart contracts have important implications for the blockchain. On one hand, smart contracts are the activators of blockchain that laying the foundation for the programmable financial and social systems. On the other hand, the automation and programmable features of smart contracts make it possible to encapsulate the complex behavior of nodes in a distributed blockchain system, which helps to promote the applications of blockchain technology in distributed artificial intelligence systems, and thus makes it possible to build various types of decentralized autonomous organization (DAO), decentralized autonomous corporation (DAC), and decentralized autonomous society (DAS) in the future.

There are various application scenarios where smart contract can be applied to. Some of these applications are as follows:

Financial transactions. Smart contract is particularly suitable to business models such as equity crowdfunding, peer-to-peer lending (P2P lending) and online insurance. Traditional financial trade need to be coordinated by central agencies such as central clearing institutions or exchanges, while the agility feature of smart contract can greatly reduce transaction costs and increase efficiency, thus avoiding cumbersome clearing and delivery.

Prediction markets. Prediction markets have been proven to be able to provide better future forecasts, more direct hedging and speculation mechanisms. Due to the distributed consensus verification and immutability, smart contract can be used in prediction markets. Two typical applications are Augur and Gnosis Augur manages to create a stunningly accurate forecasting tool with the help of blockchain. Gnosis provides participants with a playful environment to try out trading in markets and win GNO tokens as a reward for successful predictions. In addition, smart contract can also be used for voting or gambling.

Internet of Things (IoT). The combination of smart contracts and IoT can not only facilitate the sharing of information between devices, but also allow people to automate time-consuming workflows in a cryptographically veritable manner. Slock.it proposed the first autonomous lock that people can open with token. The owners of the lock only decide on two numbers—the deposit cost and the rental cost. The user of the lock scans it and sees what he or she has to pay in terms of deposit. When the deposit is received by the lock, control is granted. The users can then open and close the lock as often as they want to. When people no longer need the lock, they get back their deposit minus the cost of rental, which is transferred to the owner of the lock. Besides houses and apartments renting, the lock can be applied to cars, bikes, padlocks etc. Smart contract can also be used on smart grid that the renewable energy could be bought and sold in a P2P market, thus reducing intermediate costs.

There are also some possible application scenarios of smart contracts such as digital rights management, social media platforms, cloud storage, supply chain, intelligent transportation, etc.

Smart contracts have distinct characteristics compared with traditional distributed applications. On one hand, many smart contract platforms, such as Ethereum, operate on the public networks where arbitrary participants can join. On the other hand, due to the immutable nature of blockchain, contracts cannot be modified once they are deployed, so hackers can exploit this vulnerability to attack. In addition, since smart contract is generally used to transfer digital assets, security and privacy are of paramount importance. The issues include:

Reentrancy vulnerability. This problem occurs when an attacker utilizes a recursive call function to conduct multiple repetitive withdrawals while their balances are only deduced once. This may result in unexpected behaviors even eventually consuming all the gas.

Transaction-Ordering Dependence (TOD). This occurs when several dependent transactions that invoke the same contract are included in one block. We know that miners can set arbitrary order between transactions, namely, contract final state rest with how the miner sorts the transactions. Thus, an adversary can successfully launch an attack if those transitions were not executed in the right order.

Timestamp Dependence. Generally, the timestamp is set to the current time of the miner's local system. However, the miner can change this value while still having other miners accept the block. The security problem arises when the timestamp is used as a triggering condition to perform specific actions (e.g., sending money) because the attacker can use different block timestamps to manipulate the result of the contract. These are timestamp-dependent contracts.

Lacking of trustworthy data feeds Smart contracts sometimes require information from external resources, e.g., oracles. However, the reliability of the information cannot be guaranteed.

Privacy issues. Since all transaction history is stored on the blockchain and is visible to anyone, it is theoretically possible to obtain a user's private information by analyzing transaction graph structures, called a deanonymization attack.

Anonymous Zether is a private payment system, and is an anonymous extension of Binz, Agrawal, Zamani and Boneh's Zether protocol. The anonymous extension is sketched in Binz, Benedikt, Shashank Agrawal, Mahdi Zamani, and Dan Boneh. "Zether: Towards privacy in a smart contract world." In International Conference on Financial Cryptography and Data Security, pp. 123-113. Springer, Cham, 2020. Agrawal, Shashank, Karl Benedikt Bunz, Mahdi Zamani, and Dan Boneh. See US 20190161153. Anonymous Zether is an private value-tracking system, in which an Ethereum smart contract maintains encrypted account balances. Each Zether Smart Contract (ZSC) must, upon deployment, "attach" to some already-deployed ERC-20 contract; once deployed, this contract establishes special "Zether" accounts into/out of which users may deposit or withdraw ERC-20 funds. Having credited funds to a Zether account, its owner may privately send these funds to other Zether accounts, confidentially (transferred amounts are private) and anonymously (identities of transactors are private). Only the owner of each account's secret key may spend its funds, and overdraws are impossible. The (anonymous) Zether Smart Contract operates roughly as follows. Each account consists of an ElGamal ciphertext, which encrypts the account's balance under its own public key. To send funds, Alice publishes an ordered list of public keys-which contains herself and the recipient, among other arbitrarily chosen parties-together with a corresponding list of ElGamal ciphertexts, which respectively encrypt (under the appropriate public keys) the amounts by which Alice intends to adjust these various accounts' balances. The ZSC applies these adjustments using the homomorphic property of ElGamal encryption (with "message in the exponent"). Alice finally publishes a zero-knowledge proof which asserts that she knows her own secret key, that she owns enough to cover her deduction, that she deducted funds only from herself, and credited them only to Bob (and by the same amount she debited, no less); she of course also demonstrates that she did not alter those balances other than her own and Bob's. These adjustment ciphertexts-opaque to any outside observer-conceal who sent funds to whom, and how much was sent. Users need never interact directly with the ZSC rather, our front-end client streamlines its use. Anonymous Zether is feasible for mainnet use, as of EIP-1108. With that said, funding throwaway accounts (i.e., to pay for gas) represents a privacy challenge (as discussed in the original Zether paper). We don't yet endorse Anonymous Zether for use on the mainnet.

See: 7181017; 7869591; 8316237; 8419378; 8153219; 8193386; 8501762; 8522330; 8523657; 8566247; 8572207; 8621368; 8632193; 8671112; 8688525; 8719131; 8726379; 8727893; 8756151; 8756156; 8769643; 8777735; 8862506; 8904181; 8905303; 8909517; 8915781; 8918794; 8938534; 8947427; 8950004; 8961300; 8961301; 8962964; 8968082; 8968104; 8972612; 8974284; 8985442; 8986096; 8992311; 8992312; 9014661; 9015847; 9020110; 9027007; 9039508; 9046994; 9047600; 9056253; 9070252; 9070253; 9071444; 9076294; 9076295; 9087399; 9092939; 9092940; 9104873; 9135787; 9138652; 9160764; 9171299; 9177156; 9185161; 9210472; 9213949; 9214063; 9218470; 9219824; 9224262; 9232476; 9256769; 9258307; 9270534; 9275389; 9280792; 9294365; 9298806; 9299071; 9299218; 9300724; 9305428; 9305437; 9307047; 9311639; 9311640; 9317997; 9317998; 9317999; 9324062; 9330261; 9332302; 9338499; 9338500; 9344754; 9350753; 9350762; 9351032; 9351124; 9364950; 9373223; 9374280; 9386022; 9397985; 9398018; 9401850; 9406195; 9411976; 9413735; 9413780; 9418213; 9419951; 9425954; 9426151; 9426167; 9430905; 9436455; 9436811; 9436935; 9440152; 9443383; 9451010; 9452353; 9454365; 9454656; 9460322; 9463388; 9465488; 9466051; 9473503; 9473524; 9485736; 9489502; 9489522; 9489762; 9489798; 9495668; 9495679; 9501791; 9509699; 9514264; 9514293; 9514497; 9514609; 9514644; 9516035; 9519925; 9521045; 9531724; 9532222; 9533413; 9536385; 9542683; 9544143; 9548957; 9552580; 9552615; 9552694; 9552696; 9553882; 9553888; 9553982; 9558623; 9558624; 9559920; 9563470; 9569262; 9569771; 9576426; 9582182; 9595031; 9595034; 9596787; 9607156; 9607330; 9607461; 9608814; 9608829; 9619967; 9633513; 9635000; 9641338; 9641341; 9645604; 9646029; 9648015; 9648029; 9659104; 9659123; 9659439; 9660627; 9660803; 9665239; 9667427; 9667600; 9667809; 9672499; 9672509; 9672518; 9673979; 9674584; 9679275; 9679276; 9686247; 9697342; 9697362; 9704143; 9704190; 9710808; 9712500; 9712556; 9720649; 9721239; 9722790; 9728037; 9729318; 9734491; 9735958; 9740873; 9740906; 9741337; 9742744; 9747077; 9747586; 9747753; 9749140; 9749297; 9749860; 9754131; 9754490; 9762562; 9762590; 9763271; 9767520; 9767651; 9769189; 9772820; 9773232; 9773351; 9774448; 9774578; 9774579; 9781494; 9785369; 9785912; 9786127; 9787545; 9792600; 9792742; 9794074; 9800514; 9800517; 9807106; 9811981; 9813770; 9815191; 9818092; 9818098; 9818109; 9818116; 9820120; 9824222; 9824408; 9824540; 9825765; 9825931; 9830580; 9830593; 9836790; 9836908; 9842216; 9846856; 9849364; 9852305; 9852417; 9852426; 9852427; 9853819; 9853977; 9858546; 9858766; 9858781; 9862092; 9864970; 9866393; 9870562; 9872050; 9875489; 9875510; 9876646; 9876775; 9881176; 9882715; 9885672; 9886685; 9887975; 9887995; 9888007; 9888026; 9889382; 9892141; 9892400; 9892460; 9892597; 9894101; 9898739; 9898781; 9898782; 9900841; 9904544; 9904830; 9906513; 9906525; 9911102; 9911150; 9916290; 9916432; 9917754; 9917802; 9922380; 9922381; 9922498; 9930043; 9933790; 9934138; 9934502; 9935772; 9935948; 9940663; 9940779; 9942046; 9942048; 9942217; 9942231; 9942250; 9947033; 9948468; 9948682; 9949697; 9952908; 9953347; 9958840; 9959065; 9959080; 9960909; 9960920; 9961050; 9965628; 9965804; 9965805; 9967088; 9967091; 9967096; 9967102; 9967238; 9967333; 9967334; 9967747; 9973341; 9979718; 9979719; 9984243; 9985699; 9985937; 9985964; 9986305; 9987743; 9990418; 9990504; 9992022; 9992028; 9992194; 9992620; 9994339; 9996325; 9997023; 9998150; 9998282; 9998286; 9998539; D759073; D820859; D824404; 10002277; 10002362; 10002389; 10002396; 10003507; 10004429; 10007405; 10007826; 10007893; 10007913; 10012398; 10013548; 10013836; 10019696; 10019874; 10021113; 10022613; 10022614; 10025797; 10025887; 10025941; 10026082; 10026118; 10031775; 10035065; 10037527; 10037533; 10042782; 10043174; 10046228; 10046521; 10049017; 10050779; 10050959; 10055446; 10055554; 10055715; 10055720; 10055768; 10055926; 10055935; 10057065; 10057205; 10057222; 10057238; 10061668; 10063529; 10063531; 10063548; 10063572; 10067994; 10068228; 10068397; 10069672; 10075298; 10079682; 10079881; 10084607; 10084816; 10087783; 10089176; 10089489; 10089492; 10089819; 10089830; 10091180; 10095253; 10095549; 10097344; 10097345; 10097356; 10097362; 10097558; 10102065; 10102265; 10102510; 10102526; 10103885; 10103893; 10103953; 10104198; 10108589; 10108812; 10108819; 10108938; 10108954; 10110385; 10110576; 10114854; 10114963; 10114970; 10114980; 10115068; 10116453; 10116657; 10116667; 10116765; 10121019; 10121025; 10121126; 10121143; 10121172; 10121186; 10121215; 10121339; 10127105; 10127368; 10127378; 10127528; 10127552; 10127647; 10129032; 10129238; 10129250; 10130013; 10130195; 10134201; 10135607; 10135609; 10135616; 10135793; 10135834; 10135870; 10135921; 10136098; 10140470; 10140602; 10140658; 10142098; 10142312; 10142333; 10142347; 10146792; 10146947; 10147264; 10147428; 10148441; 10152756; 10153905; 10153939; 10153983; 10154029; 10157078; 10157294; 10157295; 10157380; 10158480; 10158492; 10158527; 10158703; 10158737; 10162519; 10162704; 10162954; 10163079; 10163080; 10163297; 10164773; 10164779; 10164952; 10166675; 10168693; 10169433; 10169586; 10169614; 10169770; 10169937; 10171245; 10171555; 10171967; 10176308; 10176309; 10176352; 10176481; 10176671; 10177908; 10178069; 10178105;

10180912; 10181113; 10182051; 10183214; 10185550;
10185759; 10185917; 10185928; 10186115; 10187203;
10187214; 10187369; 10187373; 10192073; 10193695;
10193696; 10193884; 10194320; 10195513; 10198311;
10198325; 10198905; 10198908; 10198949; 10200196;
10200197; 10200198; 10200199; 10200834; 10204148;
10204339; 10204341; 10204378; 10204472; 10206082;
10210502; 10217037; 10219744; 10223096; 10223520;
10223685; 10223873; 10225076; 10225078; 10225289;
10225614; 10229275; 10229396; 10229400; 10230526;
10230530; 10231077; 10231652; 10235402; 10235529;
10235538; 10235726; 10236006; 10237062; 10237064;
10237259; 10237583; 10238288; 10241842; 10242219;
10242538; 10243731; 10243738; 10243743; 10243748;
10243934; 10248119; 10248793; 10248813; 10249114;
10250381; 10250522; 10250535; 10250583; 10250694;
10252145; 10255001; 10255108; 10255342; 10255442;
10255460; 10255600; 10255625; 10255635; 10256829;
10256974; 10257268; 10257270; 10257496; 10257819;
10257960; 10261726; 10262138; 10262140; 10262163;
10262164; 10262311; 10262318; 10262321; 10262351;
10262377; 10268782; 10268829; 10268994; 10269004;
10269009; 10269012; 10269073; 10269110; 10270475;
10270476; 10270599; 10270600; 10275363; 10275627;
10275772; 10275902; 10277400; 10277561; 10282554;
10282741; 10282798; 10282938; 10284379; 10285133;
10289631; 10289716; 10289816; 10289915; 10289987;
10289989; 10291408; 10291413; 10291627; 10293263;
10296248; 10296729; 10296764; 10296794; 10296865;
10296894; 10297094; 10297106; 10298259; 10298396;
10298405; 10298571; 10298572; 10298585; 10303877;
10303887; 10304078; 10304143; 10304147; 10304280;
10304283; 10304295; 10305694; 10305833; 10305875;
10311240; 10311250; 10311406; 10311515; 10311668;
10313108; 10313360; 10313376; 10313385; 10313510;
10318505; 10318738; 10318747; 10318753; 10318938;
10320569; 10320768; 10320843; 10320969; 10321603;
10324790; 10325156; 10325257; 10325596; 10326766;
10331123; 10331412; 10332169; 10332205; 10332335;
10332336; 10333696; 10333705; 10333706; 10333721;
10333910; 10334050; 10335063; 10335064; 10338558;
10338913; 10339014; 10339506; 10339523; 10339750;
10339754; 10340038; 10341105; 10341121; 10341123;
10341309; 10341431; 10346406; 10346428; 10346814;
10346815; 10346826; 10346845; 10346846; 10346848;
10346869; 10347026; 10348368; 10348484; 10348707;
10348756; 10352797; 10354236; 10354301; 10354325;
10354494; 10355869; 10356066; 10356094; 10356099;
10361849; 10361859; 10361870; 10362010; 10362058;
10362278; 10362517; 10365981; 10366062; 10366204;
10366247; 10366388; 10366419; 10367353; 10367645;
10367803; 10367905; 10372942; 10372943; 10373129;
10373158; 10373426; 10373438; 10373441; 10375037;
10375105; 10380359; 10380373; 10380574; 10380589;
10380594; 10380613; 10380682; 10380685; 10380702;
10380812; 10380842; 10381758; 10382196; 10382205;
10382208; 10382388; 10386988; 10387850; 10387878;
10387881; 10387950; 10388097; 10388106; 10389518;
10389535; 10389713; 10389749; 10390458; 10391628;
10394762; 10394789; 10394845; 10395053; 10395058;
10395062; 10396988; 10396992; 10396997; 10396999;
10397328; 10401411; 10402594; 10402792; 10402793;
10402796; 10402808; 10402823; 10402829; 10402845;
10403093; 10404454; 10404455; 10404463; 10404469;
10404471; 10404523; 10404703; 10405215; 10406422;
10409783; 10409827; 10410209; 10410211; 10410232;
10410604; 10411897; 10411905; 10412086; 10412113;
10412185; 10412536; 10417188; 10417217; 10417615;
10419152; 10419209; 10419225; 10419454; 10423921;
10423938; 10423947; 10423961; 10423993; 10424125;
10424140; 10424149; 10424164; 10425230; 10425426;
10425428; 10425436; 10425698; 10430162; 10430499;
10430563; 10430574; 10430751; 10430771; 10430789;
10430874; 10430898; 10432402; 10432411; 10433112;
10435185; 10437328; 10437630; 10437790; 10438106;
10438170; 10438174; 10438197; 10438198; 10438207;
10438209; 10438249; 10438290; 10440101; 10444818;
10445643; 10445698; 10445708; 10445709; 10445732;
10445754; 10445836; 10445963; 10445965; 10446037;
10447478; 10447480; 10447664; 10447696; 10448064;
10448251; 10452127; 10452863; 10453065; 10453319;
10454878; 10454927; 10454933; 10454970; 10455742;
10459946; 10459990; 10460118; 10460283; 10460312;
10460313; 10460394; 10461940; 10462153; 10462174;
10462185; 10466277; 10467353; 10467391; 10467506;
10467586; 10467694; 10467861; 10469248; 10469250;
10469264; 10469487; 10469507; 10469525; 10474640;
10474836; 10474945; 10475002; 10475030; 10475062;
10475092; 10475115; 10475272; 10475273; 10475275;
10475287; 10476665; 10476847; 10476879; 10476907;
10482288; 10482446; 10482470; 10482538; 10484168;
10484178; 10484341; 10484346; 10484376; 10484413;
10484415; 10489385; 10489485; 10489709; 10489757;
10489780; 10489834; 10489837; 10491375; 10491378;
10491396; 10491402; 10491404; 10491414; 10491608;
10492337; 10493996; 10496327; 10496633; 10496914;
10496923; 10496963; 10496976; 10496989; 10496994;
10497037; 10497209; 10497325; 10498535; 10498541;
10498542; 10499525; 10503614; 10503750; 10503933;
10504080; 10504163; 10504178; 10504179; 10504193;
10504314; 10504843; 10505708; 10505717; 10505720;
10505723; 10505726; 10505740; 10505949; 10507787;
10509919; 10509932; 10510034; 10510053; 10510079;
10510441; 10511447; 10511580; 10511686; 10511827;
10512839; 10512843; 10515333; 10515409; 10515516;
10518178; 10518409; 10521593; 10521604; 10521623;
10521775; 10521814; 10521973; 10522006; 10522016;
10522112; 10523421; 10523443; 10523447; 10523526;
10523643; 10526142; 10528377; 10528551; 10528722;
10528776; 10528868; 10528924; 10528947; 10529015;
10529041; 10529042; 10529190; 10530577; 10530585;
10530734; 10530756; 10530834; 10530859; 10531230;
10532268; 10534634; 10534913; 10535063; 10535065;
10535111; 10535207; 10536265; 10536430; 10536434;
10536445; 10536482; 10538034; 10540209; 10540344;
10540514; 10540619; 10540639; 10540640; 10540653;
10540654; 10540671; 10541806; 10541820; 10541821;
10542030; 10542046; 10542060; 10542800; 10545491;
10545794; 10546296; 10546326; 10547401; 10547441;
10547446; 10547457; 10547594; 10547643; 10547981;
10572684; 10581805; 10581869; 10592985; 10593157;
10594484; 10614661; 10615960; 10621164; 10630468;
10630477; 10637645; 10650313; 10652014; 10664353;
10664591; 10664835; 10678931; 10680800; 10681033;
10692085; 10700850; 10708039; 10708250; 10713731;
10715317; 10715326; 10715500; 10719623; 10721217;
10721240; 10726657; 10728283; 10740455; 10747905;
10748370; 10749687; 10749848; 10755276; 10761877;
10762228; 10762506; 10778410; 10789590; 10790964;
10790987; 10790990; 10797887; 10803205; 10803451;
10810583; 10812274; 10817872; 10819505; 10824763;
10825024; 10825295; 10831903; 10832522; 10833858;
10839107; 10839411; 10841100; 10846372; 10853592;
10855455; 10861016; 10868865; 10872487; 10878108;

10878429; 10880089; 10885735; 10887100; 10887104; 10892888; 20010034640; 20020007457; 20020026345; 20020049601; 20020073202; 20020073318; 20020103999; 20020128978; 20020131600; 20020152252; 20030028423; 20030059041; 20030074330; 20030085997; 20030191956; 20040003278; 20040062399; 20040215828; 20040246960; 20040264927; 20050005266; 20050008152; 20050021479; 20050028009; 20050039034; 20050099960; 20050108391; 20050138364; 20050144468; 20050152596; 20050153624; 20050182937; 20050193048; 20060015737; 20060052962; 20060059333; 20060063205; 20060071951; 20060071981; 20060082609; 20060085647; 20060085651; 20060098814; 20060136728; 20060137006; 20060140401; 20060156392; 20060156416; 20060190378; 20060205011; 20060242699; 20060248334; 20070005594; 20070006150; 20070016528; 20070044139; 20070053506; 20070053507; 20070074036; 20070079342; 20070087756; 20070095909; 20070106908; 20070116283; 20070118746; 20070150404; 20070150596; 20070156553; 20070156586; 20070171050; 20070171851; 20070185878; 20070189519; 20070192864; 20070219933; 20070220279; 20070233602; 20070233606; 20070234431; 20070248232; 20070250718; 20070280482; 20070299952; 20080000969; 20080002578; 20080006615; 20080034203; 20080037785; 20080059791; 20080063210; 20080065882; 20080065903; 20080086757; 20080114681; 20080114682; 20080126801; 20080130902; 20080137863; 20080140577; 20080159294; 20080165956; 20080172233; 20080172333; 20080201398; 20080208560; 20080212780; 20080215897; 20080216051; 20080273696; 20080273697; 20080280559; 20080292104; 20080294909; 20080301448; 20080304657; 20080313264; 20080313691; 20080320300; 20090006855; 20090028322; 20090028336; 20090028339; 20090062942; 20090074006; 20090077444; 20090083279; 20090083546; 20090089789; 20090094464; 20090097642; 20090109916; 20090119518; 20090136033; 20090138486; 20090150982; 20090158054; 20090177591; 20090182667; 20090182997; 20090187757; 20090196304; 20090207819; 20090216970; 20090221439; 20090238365; 20090252327; 20090259843; 20090265547; 20090265548; 20090265737; 20090268908; 20090276841; 20090279694; 20090282039; 20090287924; 20090310582; 20090319802; 20090325575; 20090327141; 20100005309; 20100005310; 20100027784; 20100042828; 20100067462; 20100080152; 20100093364; 20100111296; 20100119069; 20100138671; 20100138882; 20100142704; 20100146299; 20100153714; 20100161998; 20100174904; 20100185863; 20100199090; 20100205430; 20100217613; 20100218037; 20100220643; 20100223057; 20100234022; 20100246812; 20100267386; 20100278221; 20100281267; 20100281269; 20100287370; 20100290617; 20100293293; 20100329448; 20100329454; 20110026781; 20110039589; 20110040820; 20110041178; 20110041180; 20110051931; 20110055300; 20110060901; 20110060917; 20110060918; 20110067012; 20110069630; 20110074850; 20110085658; 20110087885; 20110090879; 20110103253; 20110103374; 20110107105; 20110107364; 20110107379; 20110110525; 20110135096; 20110154016; 20110202766; 20110211692; 20110213962; 20110219067; 20110231555; 20110243320; 20110243324; 20110255687; 20110264920; 20110283099; 20110289311; 20110295752; 20110296438; 20110296481; 20120002811; 20120005719; 20120009939; 20120009949; 20120009950; 20120030468; 20120039463; 20120039465; 20120039473; 20120045056; 20120063593; 20120072737; 20120089494; 20120102335; 20120114123; 20120121080; 20120124393; 20120127890; 20120129550; 20120129551; 20120143922; 20120144186; 20120144459; 20120163222; 20120163584; 20120172050; 20120185437; 20120198560; 20120201378; 20120204026; 20120207299; 20120209790; 20120213359; 20120215845; 20120224474; 20120224688; 20120226900; 20120233460; 20120239932; 20120239944; 20120240062; 20120260092; 20120260348; 20120269348; 20120275592; 20120278622; 20120284530; 20120297198; 20120297201; 20120317034; 20120317656; 20120323981; 20130010686; 20130010950; 20130011215; 20130014270; 20130024689; 20130024693; 20130024933; 20130024936; 20130028415; 20130035979; 20130039489; 20130051551; 20130061263; 20130085916; 20130086378; 20130096943; 20130097431; 20130111205; 20130114811; 20130148551; 20130148868; 20130152160; 20130156188; 20130170640; 20130173917; 20130173929; 20130182848; 20130191650; 20130195267; 20130198522; 20130198854; 20130202109; 20130205331; 20130216044; 20130227283; 20130232567; 20130238897; 20130246813; 20130247230; 20130254532; 20130268772; 20130275743; 20130275752; 20130279690; 20130283393; 20130315390; 20130318351; 20130318360; 20130318560; 20130322627; 20130324155; 20130326224; 20130329883; 20130336474; 20130339743; 20130339754; 20130339814; 20140041039; 20140047544; 20140056426; 20140059345; 20140059347; 20140075183; 20140090023; 20140090036; 20140093077; 20140095860; 20140095865; 20140098960; 20140101765; 20140108020; 20140115090; 20140115321; 20140115322; 20140121990; 20140123301; 20140139608; 20140140514; 20140142958; 20140143369; 20140143764; 20140143878; 20140143879; 20140153717; 20140164760; 20140177828; 20140185797; 20140185803; 20140189361; 20140189792; 20140195818; 20140211943; 20140215217; 20140215222; 20140228049; 20140233726; 20140233731; 20140233740; 20140237253; 20140237254; 20140247939; 20140250301; 20140258396; 20140270159; 20140273958; 20140281511; 20140281567; 20140289536; 20140298028; 20140310527; 20140314232; 20140321642; 20140321644; 20140324447; 20140325217; 20140325230; 20140328279; 20140331059; 20140334622; 20140344575; 20140348326; 20140351104; 20140372769; 20140379991; 20150006908; 20150010147; 20150033033; 20150033120; 20150039586; 20150039912; 20150046450; 20150046708; 20150063563; 20150067336; 20150067874; 20150067875; 20150074803; 20150082425; 20150089243; 20150089589; 20150092667; 20150098566; 20150100785; 20150100794; 20150121062; 20150124962; 20150135329; 20150143111; 20150149767; 20150149773; 20150154357; 20150161398; 20150169889; 20150170197; 20150172049; 20150172258; 20150172260; 20150181308; 20150186683; 20150188949; 20150193628; 20150193633; 20150195083; 20150200840; 20150205967; 20150207630; 20150207846; 20150213239; 20150215123; 20150215669; 20150222422; 20150222648; 20150222938; 20150227930; 20150229472; 20150229480; 20150229619; 20150236849; 20150237519; 20150244517; 20150244710; 20150264626; 20150264627; 20150270952; 20150270967; 20150271541; 20150288519; 20150288662; 20150288665; 20150294117; 20150295712; 20150304329; 20150304851; 20150309863; 20150310228; 20150312031; 20150317362; 20150326389; 20150326392; 20150333905; 20150341173; 20150341174; 20150341326; 20150341335; 20150347435; 20150348087; 20150356281; 20150358153; 20150358167; 20150365227; 20150365435; 20150365440; 20150372809; 20150379301; 20150381348; 20150381349; 20150381350; 20150381588; 20160004874; 20160004879; 20160012238; 20160012240; 20160013930; 20160014456; 20160019279; 20160020898; 20160020904; 20160026807; 20160028698; 20160029076; 20160036584; 20160044003; 20160063189; 20160066027; 20160072623; 20160072800; 20160098198; 20160099872; 20160105400; 20160105402; 20160105414; 20160110403; 20160110500; 20160112197; 20160112396; 20160119119; 20160125141; 20160127125;

20160127128; 20160127335; 20160132317; 20160132692; 20160133164; 20160140348; 20160142750; 20160149866; 20160154971; 20160156595; 20160164670; 20160164671; 20160164676; 20160165268; 20160167164; 20160170996; 20160171212; 20160173275; 20160182222; 20160182226; 20160189461; 20160191233; 20160197726; 20160204917; 20160204936; 20160205074; 20160210131; 20160212103; 20160224735; 20160224964; 20160232553; 20160234010; 20160234686; 20160239647; 20160239653; 20160239657; 20160239658; 20160241531; 20160241532; 20160254911; 20160254914; 20160255498; 20160261404; 20160261592; 20160269174; 20160269775; 20160275308; 20160285836; 20160292430; 20160293172; 20160300252; 20160315761; 20160321654; 20160323098; 20160330018; 20160330026; 20160330034; 20160330209; 20160335440; 20160335450; 20160337319; 20160337464; 20160344557; 20160350552; 20160350648; 20160352510; 20160352710; 20160357791; 20160357869; 20160358165; 20160359617; 20160365973; 20160371064; 20160373440; 20160381405; 20170005787; 20170012970; 20170012996; 20170019248; 20170024585; 20170039377; 20170039386; 20170041132; 20170041298; 20170041300; 20170041395; 20170048208; 20170053249; 20170053282; 20170061833; 20170063526; 20170070340; 20170070351; 20170077950; 20170078438; 20170085382; 20170089291; 20170099133; 20170099262; 20170099263; 20170103217; 20170103227; 20170103391; 20170104582; 20170104583; 20170104752; 20170111165; 20170116396; 20170116410; 20170124348; 20170132279; 20170132537; 20170133022; 20170134158; 20170142109; 20170147835; 20170149558; 20170149796; 20170155515; 20170155628; 20170161314; 20170161829; 20170169241; 20170169425; 20170170960; 20170173262; 20170177899; 20170186255; 20170199818; 20170207919; 20170208043; 20170213287; 20170214666; 20170220617; 20170222800; 20170223008; 20170228559; 20170230171; 20170230344; 20170235736; 20170235969; 20170237551; 20170237725; 20170242961; 20170243028; 20170243284; 20170244553; 20170244988; 20170249460; 20170250796; 20170250799; 20170250819; 20170255769; 20170262651; 20170264426; 20170277773; 20170277774; 20170277775; 20170277906; 20170288856; 20170289008; 20170289111; 20170293913; 20170295143; 20170299226; 20170301052; 20170308580; 20170316391; 20170322800; 20170322977; 20170323118; 20170329209; 20170346627; 20170353296; 20170353310; 20170357826; 20170358161; 20170359321; 20170359323; 20170366338; 20170372201; 20170372226; 20180004743; 20180011801; 20180011996; 20180013748; 20180013828; 20180014241; 20180019983; 20180025435; 20180041345; 20180041481; 20180046812; 20180048459; 20180048467; 20180048628; 20180060604; 20180076956; 20180082043; 20180089419; 20180091306; 20180096166; 20180101697; 20180109376; 20180109541; 20180109831; 20180115412; 20180117446; 20180117447; 20180123802; 20180131507; 20180131512; 20180137549; 20180139190; 20180139481; 20180145825; 20180150642; 20180152299; 20180152300; 20180152426; 20180157558; 20180157854; 20180159680; 20180165470; 20180165781; 20180167197; 20180173890; 20180173906; 20180176017; 20180176216; 20180181964; 20180182036; 20180183570; 20180183571; 20180183572; 20180183768; 20180191692; 20180198601; 20180198613; 20180198630; 20180198632; 20180203808; 20180204284; 20180211673; 20180212750; 20180212751; 20180212752; 20180212753; 20180212755; 20180212764; 20180212775; 20180212933; 20180219913; 20180227121; 20180227278; 20180232381; 20180234253; 20180234254; 20180248684; 20180254893; 20180260576; 20180262485; 20180264347; 20180267981; 20180268062; 20180276400; 20180276409; 20180276417; 20180278410; 20180278421; 20180285576; 20180288023; 20180288039; 20180294951; 20180294952; 20180300497; 20180302380; 20180302382; 20180303420; 20180303421; 20180303422; 20180303423; 20180303424; 20180307859; 20180316495; 20180316676; 20180326291; 20180329783; 20180330077; 20180330078; 20180330079; 20180330125; 20180330179; 20180330343; 20180331821; 20180332011; 20180337775; 20180337860; 20180337899; 20180343109; 20180349577; 20180349632; 20180349636; 20180349637; 20180349638; 20180349740; 20180351745; 20180351922; 20180357434; 20180359078; 20180359079; 20180359084; 20180359097; 20180365201; 20180366036; 20180367294; 20180373834; 20180373849; 20180373882; 20180375639; 20180375640; 20190004999; 20190005254; 20190007059; 20190007197; 20190007212; 20190013943; 20190013950; 20190019183; 20190020470; 20190020651; 20190020712; 20190026146; 20190026730; 20190036678; 20190044697; 20190050589; 20190050591; 20190052458; 20190058580; 20190068374; 20190080392; 20190081783; 20190087600; 20190089372; 20190089526; 20190089537; 20190089547; 20190097787; 20190097985; 20190102163; 20190108350; 20190109701; 20190109712; 20190109828; 20190114706; 20190116035; 20190116174; 20190116180; 20190118767; 20190124051; 20190130125; 20190130698; 20190130701; 20190132295; 20190140818; 20190141051; 20190141568; 20190146917; 20190147143; 20190147415; 20190149317; 20190152435; 20190155643; 20190156078; 20190158272; 20190158594; 20190158906; 20190164153; 20190166113; 20190171847; 20190182027; 20190182035; 20190182216; 20190183255; 20190188708; 20190188711; 20190188712; 20190188732; 20190188787; 20190188790; 20190188793; 20190188806; 20190188941; 20190190261; 20190190694; 20190190695; 20190190698; 20190190701; 20190190713; 20190190714; 20190190719; 20190190742; 20190190987; 20190197094; 20190197249; 20190197378; 20190197534; 20190197589; 20190197600; 20190197622; 20190197635; 20190197831; 20190197835; 20190198144; 20190199511; 20190199514; 20190199516; 20190199518; 20190199531; 20190199535; 20190199693; 20190199695; 20190199700; 20190204881; 20190205066; 20190205115; 20190205317; 20190205486; 20190205547; 20190205558; 20190205563; 20190205568; 20190205773; 20190205832; 20190205844; 20190205849; 20190205853; 20190205870; 20190205873; 20190205875; 20190205881; 20190205886; 20190205894; 20190205932; 20190205943; 20190205970; 20190205980; 20190206182; 20190206183; 20190206191; 20190206272; 20190207757; 20190207760; 20190207763; 20190207767; 20190207770; 20190207781; 20190207951; 20190207955; 20190207969; 20190207995; 20190208354; 20190208414; 20190208422; 20190212159; 20190213311; 20190213312; 20190213333; 20190213335; 20190213371; 20190213462; 20190213573; 20190213584; 20190213586; 20190213590; 20190213633; 20190213699; 20190213751; 20190213840; 20190214848; 20190215159; 20190215311; 20190215404; 20190215670; 20190217022; 20190220010; 20190220324; 20190220603; 20190220624; 20190220768; 20190220813; 20190220836; 20190220851; 20190220852; 20190220854; 20190220856; 20190220857; 20190220858; 20190220859; 20190220860; 20190220861; 20190220886; 20190220919; 20190220922; 20190221076; 20190222424; 20190222567; 20190222575; 20190222586; 20190226850; 20190227515; 20190227553; 20190228019; 20190228133; 20190228174; 20190228178; 20190228386; 20190228387; 20190228397; 20190228407; 20190228409; 20190228413; 20190228461; 20190228484; 20190228612; 20190229887; 20190229889; 20190229891; 20190229892; 20190229909; 20190229911; 20190229914; 20190229918; 20190229920; 20190229921;

20190229927; 20190229930; 20190230054; 20190230070; 20190230073; 20190230092; 20190230114; 20190232161; 20190233060; 20190235933; 20190235946; 20190236214; 20190236286; 20190236298; 20190236300; 20190236559; 20190236561; 20190236562; 20190236563; 20190236564; 20190236591; 20190236593; 20190236594; 20190236598; 20190236606; 20190236627; 20190236665; 20190236698; 20190236699; 20190236716; 20190236879; 20190236880; 20190236881; 20190236893; 20190237095; 20190237171; 20190238316; 20190238319; 20190238327; 20190238337; 20190238344; 20190238487; 20190238525; 20190243611; 20190243820; 20190243912; 20190243988; 20190244138; 20190244195; 20190244215; 20190244227; 20190244255; 20190244287; 20190244290; 20190244294; 20190244298; 20190244483; 20190244531; 20190245680; 20190245917; 20190251018; 20190251075; 20190251077; 20190251078; 20190251079; 20190251080; 20190251124; 20190251187; 20190251199; 20190251249; 20190251262; 20190251270; 20190251271; 20190251284; 20190251296; 20190251489; 20190251523; 20190251524; 20190251526; 20190251527; 20190251551; 20190251552; 20190251553; 20190251554; 20190251557; 20190251558; 20190251563; 20190251566; 20190251573; 20190251575; 20190251576; 20190251603; 20190251624; 20190251627; 20190251629; 20190251648; 20190253235; 20190253239; 20190253244; 20190253245; 20190253250; 20190253252; 20190253254; 20190253256; 20190253257; 20190253258; 20190253259; 20190253260; 20190253261; 20190253263; 20190253265; 20190253523; 20190253524; 20190258523; 20190258610; 20190258687; 20190258807; 20190258828; 20190258953; 20190258971; 20190259008; 20190259013; 20190259025; 20190259029; 20190259093; 20190259095; 20190259099; 20190259114; 20190259120; 20190260574; 20190260579; 20190260585; 20190260715; 20190260761; 20190260788; 20190260829; 20190266128; 20190266146; 20190266178; 20190266235; 20190266263; 20190266327; 20190266576; 20190266577; 20190266597; 20190266601; 20190266612; 20190266897; 20190267119; 20190268138; 20190268141; 20190268147; 20190268163; 20190268165; 20190268284; 20190268312; 20190268466; 20190271959; 20190272393; 20190272512; 20190272534; 20190272537; 20190272538; 20190272721; 20190273610; 20190273616; 20190273619; 20190273725; 20190273739; 20190275894; 20190278765; 20190278907; 20190278918; 20190278920; 20190278921; 20190279143; 20190279160; 20190279172; 20190279181; 20190279197; 20190279204; 20190279206; 20190279210; 20190279215; 20190279247; 20190279257; 20190279321; 20190280856; 20190280861; 20190280864; 20190280872; 20190280873; 20190280880; 20190281026; 20190281028; 20190281030; 20190281066; 20190281259; 20190281465; 20190281857; 20190282906; 20190283239; 20190283240; 20190283252; 20190283648; 20190283962; 20190286102; 20190286138; 20190286139; 20190286152; 20190286164; 20190286490; 20190286532; 20190286805; 20190287046; 20190287047; 20190287059; 20190287062; 20190287063; 20190287069; 20190287102; 20190287105; 20190287107; 20190287149; 20190287174; 20190287175; 20190287199; 20190287200; 20190288832; 20190288850; 20190288853; 20190289068; 20190289454; 20190290964; 20190290965; 20190290991; 20190294513; 20190294689; 20190294805; 20190294817; 20190294822; 20190294956; 20190295038; 20190295045; 20190295049; 20190295050; 20190295069; 20190295073; 20190295078; 20190295079; 20190295114; 20190295126; 20190295159; 20190295176; 20190295177; 20190295182; 20190295193; 20190295350; 20190295371; 20190295415; 20190295547; 20190295722; 20190296895; 20190296896; 20190296897; 20190296902; 20190296903; 20190296904; 20190296907; 20190296910; 20190296915; 20190296916; 20190296920; 20190296958; 20190297031; 20190297062; 20190297064; 20190297101; 20190297109; 20190297134; 20190297442; 20190297544; 20190299105; 20190301875; 20190301883; 20190302249; 20190302717; 20190302993; 20190303111; 20190303121; 20190303250; 20190303296; 20190303349; 20190303353; 20190303362; 20190303363; 20190303413; 20190303441; 20190303445; 20190303448; 20190303463; 20190303540; 20190303541; 20190303543; 20190303550; 20190303551; 20190303552; 20190303559; 20190303579; 20190303587; 20190303590; 20190303600; 20190303603; 20190303620; 20190303621; 20190303622; 20190303623; 20190303670; 20190303781; 20190303790; 20190303805; 20190303807; 20190303834; 20190303843; 20190303853; 20190303854; 20190303867; 20190303879; 20190303882; 20190303886; 20190303887; 20190303888; 20190303892; 20190303893; 20190303913; 20190303920; 20190303921; 20190303922; 20190303926; 20190303927; 20190303929; 20190303931; 20190303932; 20190303933; 20190303935; 20190303939; 20190303942; 20190303951; 20190303960; 20190304005; 20190304012; 20190304027; 20190304038; 20190304165; 20190304253; 20190304259; 20190304260; 20190304578; 20190304582; 20190305931; 20190305932; 20190305933; 20190305934; 20190305935; 20190305936; 20190305937; 20190305938; 20190305943; 20190305949; 20190305950; 20190305952; 20190305954; 20190305956; 20190305957; 20190305958; 20190305959; 20190305960; 20190305964; 20190305965; 20190305966; 20190305967; 20190305968; 20190306124; 20190306128; 20190306137; 20190306143; 20190306147; 20190306148; 20190306150; 20190306151; 20190306173; 20190306176; 20190306190; 20190306230; 20190306232; 20190306235; 20190306463; 20190306549; 20190306552; 20190306574; 20190306647; 20190306757; 20190307388; 20190308806; 20190310137; 20190310695; 20190310878; 20190310900; 20190310943; 20190310980; 20190311006; 20190311033; 20190311054; 20190311090; 20190311096; 20190311100; 20190311102; 20190311108; 20190311116; 20190311125; 20190311147; 20190311148; 20190311153; 20190311196; 20190311296; 20190311336; 20190311337; 20190311341; 20190311343; 20190311351; 20190311352; 20190311353; 20190311357; 20190311358; 20190311359; 20190311392; 20190311417; 20190311428; 20190311429; 20190311431; 20190311437; 20190311443; 20190311447; 20190311571; 20190312440; 20190312719; 20190312727; 20190312728; 20190312731; 20190312734; 20190312736; 20190312792; 20190312831; 20190312848; 20190312852; 20190312855; 20190312863; 20190312869; 20190312875; 20190312877; 20190312878; 20190312879; 20190312886; 20190312915; 20190312928; 20190312939; 20190312941; 20190313576; 20190314726; 20190315314; 20190316912; 20190317220; 20190317651; 20190317677; 20190317810; 20190317924; 20190317934; 20190317935; 20190317936; 20190317961; 20190317964; 20190317968; 20190318012; 20190318043; 20190318066; 20190318109; 20190318117; 20190318122; 20190318128; 20190318129; 20190318243; 20190318257; 20190318265; 20190318286; 20190318291; 20190318302; 20190318326; 20190318327; 20190318328; 20190318329; 20190318332; 20190318333; 20190318338; 20190318346; 20190318348; 20190318349; 20190318350; 20190318351; 20190318353; 20190318356; 20190318358; 20190318359; 20190318367; 20190318377; 20190318399; 20190318408; 20190318423; 20190318424; 20190318425; 20190318427; 20190318433; 20190318631; 20190318807; 20190318814; 20190318816; 20190319780; 20190319791; 20190319792; 20190319794; 20190319798; 20190319806; 20190319808; 20190319809; 20190319861; 20190319927; 20190319928;

20190319932; 20190319938; 20190319939; 20190319940; 20190319945; 20190319948; 20190319961; 20190319964; 20190319968; 20190319971; 20190319980; 20190319987; 20190319993; 20190320004; 20190320006; 20190320014; 20190320037; 20190320061; 20190320070; 20190320210; 20190320242; 20190320580; 20190320898; 20190321132; 20190322187; 20190322426; 20190323858; 20190324431; 20190324432; 20190324433; 20190324434; 20190324435; 20190324436; 20190324437; 20190324438; 20190324439; 20190324440; 20190324441; 20190324442; 20190324443; 20190324444; 20190324772; 20190324867; 20190324958; 20190324989; 20190324995; 20190325038; 20190325044; 20190325048; 20190325082; 20190325085; 20190325115; 20190325148; 20190325161; 20190325162; 20190325165; 20190325227; 20190325258; 20190325262; 20190325367; 20190325402; 20190325403; 20190325405; 20190325406; 20190325407; 20190325408; 20190325420; 20190325430; 20190325431; 20190325432; 20190325433; 20190325436; 20190325447; 20190325452; 20190325468; 20190325473; 20190325478; 20190325495; 20190325498; 20190325502; 20190325507; 20190325512; 20190325515; 20190325517; 20190325522; 20190325523; 20190325526; 20190325528; 20190325532; 20190325541; 20190325642; 20190325684; 20190325691; 20190325692; 20190325700; 20190325719; 20190325794; 20190327077; 20190327078; 20190327079; 20190327080; 20190327081; 20190327082; 20190327083; 20190327084; 20190327088; 20190327090; 20190327094; 20190327097; 20190327102; 20190327180; 20190327200; 20190327216; 20190327218; 20190327234; 20190327239; 20190327259; 20190327292; 20190327299; 20190327328; 20190327329; 20190328227; 20190328457; 20190329669; 20190331505; 20190331702; 20190332430; 20190332431; 20190332552; 20190332586; 20190332608; 20190332691; 20190332702; 20190332718; 20190332719; 20190332729; 20190332783; 20190332791; 20190332807; 20190332809; 20190332810; 20190332817; 20190332818; 20190332821; 20190332921; 20190332931; 20190332955; 20190332966; 20190332974; 20190332995; 20190333029; 20190333030; 20190333031; 20190333032; 20190333033; 20190333048; 20190333051; 20190333054; 20190333056; 20190333057; 20190333058; 20190333059; 20190333066; 20190333096; 20190333097; 20190333116; 20190333142; 20190333143; 20190333146; 20190333147; 20190333148; 20190333149; 20190333166; 20190333169; 20190333171; 20190333181; 20190333214; 20190333304; 20190334694; 20190334695; 20190334697; 20190334698; 20190334699; 20190334700; 20190334703; 20190334704; 20190334708; 20190334711; 20190334715; 20190334716; 20190334717; 20190334719; 20190334723; 20190334724; 20190334725; 20190334726; 20190334728; 20190334730; 20190334859; 20190334886; 20190334904; 20190334905; 20190334912; 20190334920; 20190334954; 20190334957; 20190334997; 20190335551; 20190335715; 20190336401; 20190338962; 20190339668; 20190339678; 20190339684; 20190339685; 20190339686; 20190339687; 20190339688; 20190339712; 20190339756; 20190339974; 20190339975; 20190339977; 20190339978; 20190340013; 20190340042; 20190340110; 20190340136; 20190340169; 20190340170; 20190340216; 20190340264; 20190340266; 20190340267; 20190340269; 20190340306; 20190340350; 20190340352; 20190340361; 20190340362; 20190340369; 20190340371; 20190340379; 20190340467; 20190340575; 20190340584; 20190340586; 20190340587; 20190340588; 20190340594; 20190340597; 20190340600; 20190340605; 20190340607; 20190340608; 20190340609; 20190340619; 20190340623; 20190340627; 20190340645; 20190340673; 20190340683; 20190340685; 20190340686; 20190340689; 20190340703; 20190340707; 20190340715; 20190340716; 20190340885; 20190340888; 20190340906; 20190340946; 20190341134; 20190342073; 20190342074; 20190342076; 20190342077; 20190342078; 20190342084; 20190342085; 20190342087; 20190342094; 20190342095; 20190342099; 20190342143; 20190342149; 20190342270; 20190342290; 20190342295; 20190342336; 20190342344; 20190342382; 20190342407; 20190342415; 20190342422; 20190342528; 20190342731; 20190343317; 20190343429; 20190347105; 20190347243; 20190347268; 20190347290; 20190347347; 20190347368; 20190347397; 20190347398; 20190347399; 20190347420; 20190347433; 20190347442; 20190347444; 20190347601; 20190347605; 20190347624; 20190347625; 20190347626; 20190347627; 20190347628; 20190347651; 20190347652; 20190347653; 20190347654; 20190347655; 20190347656; 20190347657; 20190347658; 20190347660; 20190347661; 20190347663; 20190347685; 20190347699; 20190347724; 20190347725; 20190347738; 20190348158; 20190348174; 20190349185; 20190349188; 20190349190; 20190349191; 20190349195; 20190349199; 20190349200; 20190349201; 20190349203; 20190349205; 20190349254; 20190349261; 20190349321; 20190349343; 20190349346; 20190349347; 20190349356; 20190349361; 20190349371; 20190349372; 20190349426; 20190349433; 20190349628; 20190349680; 20190349708; 20190349733; 20190349794; 20190351694; 20190353139; 20190353629; 20190353685; 20190353709; 20190354076; 20190354170; 20190354189; 20190354191; 20190354374; 20190354397; 20190354398; 20190354450; 20190354518; 20190354523; 20190354606; 20190354607; 20190354611; 20190354614; 20190354628; 20190354693; 20190354694; 20190354708; 20190354723; 20190354724; 20190354725; 20190354771; 20190354829; 20190354887; 20190354922; 20190354943; 20190354944; 20190354945; 20190354962; 20190354963; 20190354964; 20190354966; 20190354967; 20190354968; 20190354969; 20190354970; 20190354971; 20190354972; 20190354975; 20190354976; 20190354977; 20190354989; 20190355005; 20190355025; 20190355031; 20190355053; 20190355057; 20190355059; 20190355060; 20190355076; 20190355113; 20190355450; 20190355460; 20190355472; 20190355483; 20190356164; 20190356467; 20190356469; 20190356470; 20190356471; 20190356472; 20190356473; 20190356475; 20190356481; 20190356484; 20190356491; 20190356493; 20190356539; 20190356609; 20190356638; 20190356641; 20190356657; 20190356658; 20190356662; 20190356672; 20190356674; 20190356680; 20190356733; 20190356736; 20190356745; 20190356775; 20190356945; 20190357049; 20190358428; 20190358515; 20190358543; 20190359056; 20190361626; 20190361663; 20190361697; 20190361731; 20190361842; 20190361867; 20190361869; 20190361874; 20190361891; 20190361917; 20190361992; 20190362054; 20190362068; 20190362287; 20190362305; 20190362323; 20190362340; 20190362348; 20190362352; 20190362361; 20190362376; 20190362388; 20190362389; 20190362392; 20190362400; 20190362430; 20190362443; 20190362446; 20190362457; 20190362616; 20190362716; 20190362826; 20190362828; 20190363854; 20190363870; 20190363871; 20190363872; 20190363873; 20190363874; 20190363875; 20190363877; 20190363878; 20190363881; 20190363882; 20190363883; 20190363884; 20190363889; 20190363890; 20190363892; 20190363896; 20190363905; 20190363938; 20190364021; 20190364045; 20190364046; 20190364055; 20190364056; 20190364057; 20190364426; 20190364698; 20190365014; 20190365016; 20190365063; 20190365282; 20190365592; 20190366475; 20190368233; 20190369644; 20190369721; 20190370012; 20190370058; 20190370223; 20190370241; 20190370250; 20190370286; 20190370330; 20190370334; 20190370358; 20190370366;

20190370446; 20190370479; 20190370484; 20190370486; 20190370500; 20190370504; 20190370624; 20190370634; 20190370652; 20190370732; 20190370740; 20190370760; 20190370761; 20190370762; 20190370788; 20190370789; 20190370791; 20190370792; 20190370793; 20190370797; 20190370798; 20190370799; 20190370806; 20190370807; 20190370808; 20190370809; 20190370810; 20190370811; 20190370813; 20190370816; 20190370839; 20190370842; 20190370847; 20190370855; 20190370857; 20190370866; 20190370905; 20190370919; 20190370925; 20190371102; 20190371106; 20190371117; 20190371129; 20190371176; 20190371335; 20190371457; 20190372345; 20190372754; 20190372755; 20190372756; 20190372759; 20190372760; 20190372762; 20190372763; 20190372765; 20190372768; 20190372769; 20190372770; 20190372772; 20190372773; 20190372776; 20190372778; 20190372779; 20190372781; 20190372786; 20190372825; 20190372834; 20190372882; 20190372931; 20190372938; 20190372950; 20190372956; 20190372965; 20190372985; 20190372987; 20190373015; 20190373047; 20190373051; 20190373134; 20190373136; 20190373137; 20190373339; 20190373459; 20190373472; 20190373521; 20190373862; 20190375373; 20190377029; 20190377336; 20190377394; 20190377461; 20190377617; 20190377645; 20190377648; 20190377660; 20190377712; 20190377722; 20190377724; 20190377805; 20190377806; 20190377811; 20190377889; 20190377899; 20190377904; 20190378024; 20190378069; 20190378073; 20190378080; 20190378081; 20190378092; 20190378094; 20190378096; 20190378098; 20190378106; 20190378119; 20190378121; 20190378122; 20190378127; 20190378128; 20190378133; 20190378134; 20190378136; 20190378137; 20190378139; 20190378140; 20190378142; 20190378152; 20190378153; 20190378162; 20190378164; 20190378165; 20190378166; 20190378176; 20190378192; 20190378207; 20190378220; 20190378224; 20190378227; 20190378230; 20190378352; 20190378386; 20190378418; 20190378619; 20190379529; 20190379530; 20190379531; 20190379538; 20190379543; 20190379544; 20190379545; 20190379546; 20190379619; 20190379639; 20190379642; 20190379646; 20190379649; 20190379653; 20190379660; 20190379664; 20190379673; 20190379699; 20190379724; 20190379727; 20190379754; 20190379761; 20190379768; 20190379797; 20190379925; 20190380030; 20190380031; 20190380032; 20190381242; 20190381654; 20190384250; 20190384263; 20190384385; 20190384587; 20190384593; 20190384594; 20190384595; 20190384627; 20190384639; 20190384686; 20190384748; 20190384832; 20190384833; 20190384834; 20190384839; 20190384842; 20190384892; 20190384895; 20190384927; 20190384932; 20190384933; 20190384935; 20190384968; 20190385096; 20190385100; 20190385115; 20190385120; 20190385130; 20190385136; 20190385153; 20190385154; 20190385156; 20190385157; 20190385160; 20190385162; 20190385165; 20190385167; 20190385170; 20190385172; 20190385175; 20190385182; 20190385183; 20190385215; 20190385223; 20190385229; 20190385236; 20190385240; 20190385244; 20190385256; 20190385269; 20190385407; 20190385711; 20190385748; 20190386814; 20190386817; 20190386818; 20190386829; 20190386832; 20190386833; 20190386834; 20190386940; 20190386951; 20190386968; 20190386969; 20190386970; 20190386975; 20190386986; 20190386990; 20190386995; 20190387000; 20190387058; 20190387060; 20190387281; 20190387341; 20190387356; 20190387832; 20190389323; 20190391268; 20190391540; 20190391550; 20190391551; 20190391552; 20190391663; 20190391829; 20190391845; 20190391971; 20190391972; 20190391973; 20190391979; 20190391980; 20190392019; 20190392049; 20190392064; 20190392088; 20190392118; 20190392119; 20190392123; 20190392138; 20190392159; 20190392162; 20190392164; 20190392178; 20190392361; 20190392386; 20190392392; 20190392403; 20190392406; 20190392407; 20190392429; 20190392432; 20190392434; 20190392437; 20190392438; 20190392439; 20190392457; 20190392468; 20190392470; 20190392489; 20190392511; 20190392530; 20190392536; 20190392659; 20190392677; 20190392683; 20190392684; 20190392928; 20190393627; 20190393699; 20190393701; 20190393721; 20190393722; 20190394018; 20190394019; 20190394023; 20190394025; 20190394026; 20190394027; 20190394039; 20190394044; 20190394046; 20190394047; 20190394048; 20190394050; 20190394052; 20190394091; 20190394100; 20190394113; 20190394175; 20190394176; 20190394179; 20190394203; 20190394222; 20190394242; 20190394243; 20190394257; 20190394267; 20190394302; 20190394511; 20190394637; 20190394648; 20200000366; 20200001185; 20200001836; 20200004016; 20200004500; 20200004611; 20200004643; 20200004732; 20200004737; 20200004771; 20200004788; 20200004846; 20200004854; 20200004855; 20200004932; 20200004945; 20200004946; 20200004951; 20200004962; 20200004969; 20200004973; 20200004981; 20200004986; 20200004987; 20200004988; 20200004995; 20200004996; 20200004997; 20200004998; 20200004999; 20200005031; 20200005107; 20200005168; 20200005173; 20200005180; 20200005189; 20200005207; 20200005212; 20200005213; 20200005219; 20200005224; 20200005253; 20200005254; 20200005255; 20200005264; 20200005267; 20200005271; 20200005281; 20200005282; 20200005283; 20200005284; 20200005285; 20200005286; 20200005290; 20200005292; 20200005293; 20200005295; 20200005296; 20200005299; 20200005302; 20200005307; 20200005308; 20200005316; 20200005332; 20200005349; 20200005388; 20200005390; 20200005398; 20200005403; 20200005404; 20200005410; 20200005415; 20200005559; 20200005587; 20200005589; 20200005590; 20200005591; 20200005597; 20200005767; 20200005777; 20200005912; 20200007311; 20200007312; 20200007313; 20200007314; 20200007315; 20200007316; 20200007317; 20200007318; 20200007322; 20200007331; 20200007333; 20200007336; 20200007338; 20200007342; 20200007343; 20200007344; 20200007345; 20200007346; 20200007393; 20200007414; 20200007464; 20200007511; 20200007513; 20200007514; 20200007525; 20200007540; 20200007544; 20200007558; 20200007567; 20200007581; 20200007918; 20200008299; 20200008320; 20200009983; 20200009990; 20200010080; 20200011557; 20200011683; 20200012248; 20200012527; 20200012579; 20200012625; 20200012634; 20200012676; 20200012703; 20200012731; 20200012763; 20200012765; 20200012767; 20200012768; 20200012779; 20200012805; 20200012806; 20200012809; 20200012810; 20200013025; 20200013026; 20200013027; 20200013028; 20200013029; 20200013045; 20200013046; 20200013047; 20200013048; 20200013049; 20200013050; 20200013053; 20200013055; 20200013062; 20200013063; 20200013073; 20200013083; 20200013093; 20200013118; 20200013229; 20200013250; 20200013251; 20200013268; 20200013302; 20200014527; 20200014528; 20200014529; 20200014531; 20200014536; 20200014537; 20200014542; 20200014546; 20200014632; 20200014664; 20200014668; 20200014671; 20200014691; 20200014720; 20200014745; 20200014759; 20200014816; 20200015034; 20200015078; 20200016363; 20200017117; 20200018800; 20200019154; 20200019155; 20200019288; 20200019397; 20200019421; 20200019450; 20200019538; 20200019545; 20200019613; 20200019616; 20200019626; 20200019677; 20200019680; 20200019706; 20200019707; 20200019723; 20200019821; 20200019864; 20200019865; 20200019867; 20200019894; 20200019898;

20200019923; 20200019931; 20200019936; 20200019937; 20200019938; 20200019946; 20200019959; 20200019961; 20200019963; 20200019966; 20200019967; 20200019980; 20200020032; 20200020037; 20200020038; 20200020064; 20200020091; 20200020174; 20200020175; 20200020176; 20200020187; 20200020319; 20200020398; 20200020424; 20200020425; 20200020440; 20200020454; 20200021429; 20200021439; 20200021443; 20200021444; 20200021446; 20200021546; 20200021568; 20200021569; 20200021570; 20200021588; 20200021589; 20200021590; 20200021598; 20200021600; 20200021602; 20200021643; 20200021649; 20200021714; 20200022201; 20200022416; 20200023273; 20200023846; 20200026076; 20200026253; 20200026270; 20200026289; 20200026444; 20200026510; 20200026548; 20200026552; 20200026613; 20200026619; 20200026691; 20200026699; 20200026700; 20200026712; 20200026741; 20200026785; 20200026787; 20200026800; 20200026834; 20200026862; 20200026867; 20200026973; 20200027005; 20200027010; 20200027050; 20200027066; 20200027067; 20200027079; 20200027080; 20200027082; 20200027084; 20200027085; 20200027089; 20200027091; 20200027093; 20200027096; 20200027106; 20200027117; 20200027120; 20200027125; 20200027132; 20200027133; 20200027162; 20200027169; 20200027179; 20200027182; 20200027303; 20200027314; 20200027315; 20200027565; 20200028360; 20200028667; 20200028668; 20200028675; 20200028681; 20200028688; 20200028691; 20200028692; 20200028693; 20200028697; 20200028775; 20200028797; 20200028800; 20200028804; 20200028834; 20200028844; 20200028885; 20200028908; 20200028926; 20200028947; 20200029128; 20200029139; 20200029190; 20200029250; 20200030172; 20200030971; 20200033821; 20200033834; 20200033837; 20200033887; 20200033931; 20200034311; 20200034334; 20200034338; 20200034343; 20200034352; 20200034353; 20200034356; 20200034395; 20200034411; 20200034448; 20200034453; 20200034454; 20200034456; 20200034457; 20200034469; 20200034501; 20200034536; 20200034548; 20200034550; 20200034551; 20200034552; 20200034553; 20200034571; 20200034610; 20200034712; 20200034766; 20200034788; 20200034792; 20200034804; 20200034813; 20200034818; 20200034828; 20200034833; 20200034834; 20200034836; 20200034839; 20200034841; 20200034868; 20200034869; 20200034876; 20200034888; 20200034919; 20200034925; 20200034928; 20200034944; 20200034945; 20200035059; 20200035337; 20200035339; 20200035340; 20200035341; 20200036225; 20200036511; 20200036514; 20200036515; 20200036517; 20200036519; 20200036520; 20200036523; 20200036530; 20200036531; 20200036533; 20200036549; 20200036585; 20200036687; 20200036695; 20200036707; 20200036712; 20200036728; 20200036729; 20200036740; 20200036743; 20200037034; 20200037158; 20200037381; 20200044837; 20200044863; 20200051361; 20200052890; 20200052898; 20200052903; 20200053054; 20200053124; 20200057755; 20200057920; 20200058022; 20200059495; 20200065480; 20200067699; 20200067707; 20200068404; 20200073560; 20200074110; 20200074112; 20200074456; 20200074457; 20200074459; 20200074548; 20200076570; 20200076614; 20200076829; 20200082113; 20200082126; 20200082259; 20200082433; 20200082738; 20200084017; 20200084039; 20200084191; 20200084288; 20200084483; 20200086828; 20200089872; 20200089906; 20200089919; 20200092094; 20200097256; 20200098011; 20200099666; 20200104636; 20200104705; 20200111022; 20200111093; 20200112424; 20200112429; 20200112442; 20200112545; 20200117690; 20200119921; 20200119969; 20200120070; 20200120074; 20200125739; 20200125744; 20200126070; 20200126075; 20200126660; 20200127810; 20200134207; 20200136797; 20200136798; 20200136799; 20200142986; 20200143066; 20200143076; 20200145195; 20200145384; 20200151356; 20200151992; 20200153624; 20200153627; 20200153628; 20200153801; 20200153803; 20200160290; 20200160388; 20200160641; 20200162235; 20200162251; 20200162268; 20200162451; 20200167503; 20200167512; 20200174949; 20200174990; 20200175180; 20200175183; 20200175611; 20200184036; 20200184093; 20200184465; 20200184471; 20200186325; 20200186350; 20200186352; 20200186528; 20200193042; 20200193066; 20200195419; 20200195437; 20200201679; 20200201910; 20200202018; 20200202171; 20200202345; 20200202376; 20200204340; 20200204375; 20200204524; 20200204563; 20200210392; 20200210404; 20200210405; 20200213079; 20200213130; 20200213134; 20200213329; 20200213331; 20200213839; 20200218825; 20200219362; 20200220851; 20200220870; 20200226470; 20200226867; 20200228307; 20200228309; 20200228313; 20200228314; 20200228317; 20200228325; 20200228339; 20200228340; 20200228341; 20200234719; 20200234794; 20200235908; 20200241960; 20200242102; 20200242466; 20200242557; 20200243176; 20200244435; 20200244437; 20200250318; 20200250320; 20200250679; 20200252198; 20200252199; 20200258339; 20200258340; 20200259638; 20200259639; 20200259896; 20200265159; 20200266974; 20200267144; 20200267553; 20200272475; 20200272744; 20200273028; 20200274693; 20200279045; 20200279253; 20200280430; 20200280431; 20200280553; 20200293643; 20200294158; 20200295926; 20200296128; 20200304284; 20200304290; 20200304293; 20200310767; 20200311300; 20200311566; 20200311695; 20200313886; 20200319853; 20200320206; 20200320340; 20200320825; 20200322125; 20200322127; 20200326937; 20200327250; 20200327252; 20200327546; 20200335107; 20200336292; 20200336468; 20200336470; 20200342118; 20200342331; 20200342452; 20200344049; 20200349054; 20200349274; 20200349435; 20200351078; 20200351083; 20200351089; 20200351098; 20200351253; 20200351258; 20200351657; 20200356085; 20200357031; 20200358187; 20200358594; 20200358595; 20200358599; 20200358601; 20200358610; 20200358611; 20200358746; 20200359207; 20200359222; 20200359550; 20200359582; 20200364456; 20200366459; 20200366487; 20200366503; 20200372145; 20200374100; 20200374103; 20200374118; 20200374270; 20200382274; 20200382288; 20200382299; 20200382325; 20200382478; 20200382510; 20200387777; 20200387893; 20200387896; 20200389292; 20200389298; 20200389303; 20200394287; 20200394518; 20200402073; 20200402171; 20200402625; 20200403772; 20200403781; 20200404023; 20200410134; 20200410399; 20200412550; 20200412702; 20200412715; 20210004493; 20210004502; 20210005112; 20210012029; 20210012282; 20210014047; 20210014063; 20210014071; 20210018953; 20210019143; 20210019893; and 20210021606.

"BigchainDB: The scalable blockchain database powering IPDB." 2017. www.bigchaindb.com/

"Bitcoin: The Cryptoanarchists' Answer to Cash". IEEE Spectrum.

"Blockchain". Investopedia. Based on the Bitcoin protocol, the blockchain database is shared by all nodes participating in a system.

"Blockchains: The great chain of being sure about things". The Economist. 31 Oct. 2015.

"Corda: Frictionless Commerce," 2017. www.corda.net/

"EOS.IO Technical White Paper v2," 2018. github.com/BOSIO/Documentation/blob/master/Technical WhitePaper.md "How Cryptocurrencies Could Upend Banks' Monetary Role".

"How To Make A Mint: The Cryptography of Anonymous Electronic Cash". groups.csail.mit.edu.

"Hyperledger Fabric project," 2017. www.hyperledger.org/projects/fabric

"On the Instability of Bitcoin Without the Block Reward" (PDF).

"Paul Krugman: Bitcoin is a more obvious bubble than housing was".

"Price Fluctuations and the Use of Bitcoin: An Empirical Inquiry" (PDF).

"Regulation of Cryptocurrency Around the World" (PDF). Library of Congress The Law Library of Congress, Global Legal Research Center. June 2018. pp. 4-5.

"SEC Issues Investigative Report Concluding DAO Tokens, a Digital Asset, Were Securities". sec.gov.

"The Economics of Cryptocurrencies—Bitcoin and Beyond" (PDF).

"What You Need To Know About Zero Knowledge". TechCrunch.

Alharby, M., and A. van Moorsel, "Blockchain-based Smart Contracts: A Systematic Mapping Study," arXiv: 1710.06372, 2017.

Ali, S. T; Clarke, D; Mccorry, P; Bitcoin: Perils of an Unregulated Global P2P Currency [By S. T Ali, D. Clarke, P. McCorry Newcastle upon Tyne: Newcastle University: Computing Science, 2015. (Newcastle University, Computing Science, Technical Report Series, No. CS-TR-1470)

Allison, I., "Ethereum-based Slock.it reveals first ever lock opened with money," 2015. www.ibtimes.co.uk/ethereum-based-slock-reveals-first-ever-lock-opened-money-1527014

Allison, Ian (8 Sep. 2015). "If Banks Want Benefits of Blockchains, They Must Go Permissionless". International Business Times Alsoszatai-Petheo, Melissa (14 May 2018). "Bing Ads to disallow cryptocurrency advertising". Microsoft.

Analysis of Cryptocurrency Bubbles, Bitcoins and Bank Runs Analysis of Market Imperfections and Investor Hysterics. Social Science Research Network (SSRN).

Androulaki, E, Karame, G. O., Roeschlin, M., Scherer, T., Capkun, S. Evaluating User Privacy in Bitcoin. IACR Cryptology ePrint Archive, 2012-596, 2012.

Annesley, G. (2018, Jun. 22). the enterprise journey to blockchain supplychainbeyond.com/the-enterprise-journey-to-blockchain-part-3/Antonopoulos, A., Mastering Bitcoin: Unlocking Digital Cryptocurrencies Sebastopol, CA: O'Reilly Media, 2014.

Badkar, Mamta (14 May 2018). "Fed's Bullard: Cryptocurrencies creating 'non-uniform' currency in US". Financial Times.

Bambara, Joseph J. (2018). Blockchain-A Practical Guide to Developing Business, Law and Technology Solutions (1st ed.). McGraw-Hill Education.

Barber, S., Boyen, X., Shi, E, and Uzun, E Bitter to Better How to Make Bitcoin a Better Currency. 16th International Conference on Financial Cryptography and Data Security, Lecture Notes in Computer Science, 7397:399-414, 2012.

Bedford Taylor, Michael (1 Sep. 2017). "The Evolution of Bitcoin Hardware". Computer.

Bell, Gregg, Matthew Hill, and Shawn Owen. "Blockchain oracle for managing loans collateralized by digital assets" U.S. patent application Ser. No. 16/163,411, filed Apr. 18, 2019.

Bencic, Federico Matteo; Podnar Zarko, Ivana (26 Apr. 2018), "Distributed Ledger Technology: Blockchain Compared to Directed Acyclic Graph", 2018 IEEE 38th International Conference on Distributed Computing Systems (ICDCS), University of Zagreb, pp. 1569-1570, arXiv: 180410013, doi: 10.1109/ICDCS.2018.00171, ISBN 978-1-5386-6871-9, S2CID 13741873

Benos, Evangelos, Rod Garratt, and Pedro Gurrola-Perez "The economics of distributed ledger technology for securities settlement." SSRN 3023779 (2017).

Bitcoin Fog: www.bitcoinfog.com/.

Bitcoin Wiki bitcoin.it/.

Bradbury, Danny (25 Jun. 2013). "Bitcoin's successors from Litecoin to Freicoin and onwards". The Guardian Brands, S., "Untraceable Off-line Cash in Wallets with Observers," Crypto'93, LNCS 773, pp. 302-318, August 1993

Brito, Jerry, and Andrea Castillo (2013). "Bitcoin: A Primer for Policymakers" (PDF). Mercatus Center. George Mason University.

Buterin, V. (2013). etherium white paper. blockchainlab-.com/pdf/Ethereum_white_paper-a_next generation_smart_contract_and_decentralized_application_platform-vitalik-buterin.pdf Buterin, V. Being Satoshi A Look Inside the Man Behind the Currency. Bitcoin Magazine, 1:28-31, May 2012.

Buterin, V. Bitcoin: Prehistory, Predecessors and Genesis. Bitcoin Magazine, 1:14-18, May 2012.

Buterin, V. The Silk Road Report: bitcoinmagaine.net/the-silkroad-report/, July 2012.

Buterin, V., "A next-generation smart contract and decentralized application platform." 2017. github.com/ethereum/wiki/wiki/White-Paper/

C. Jutla and M. Yung, "PayTree: Amortized-Signature for Flexible MicroPayments." Proc. of the 2nd USENIX Workshop on Electronic Commerce, pp. 213-221, November 1996

Casado-Vara, R., Briones, A. G., Prieto, J., & Corchado, J. (2019, Mar. 23). www.researchgate.net/publication/325628139_Smart_Contract_for_Monitoring_and_Control_of_Logistics_Activities_Pharmaceutical_Utilities_Case_Study Casey, Michael, 1967-(16 Jul. 2018). The impact of blockchain technology on finance: a catalyst for change. London, UK. ISBN 978-1-912179-15-2. 0CLC 1059331326.

Catherine Mulligan, j. Z. (2018). Block Chain Beyond the Hype. www.weforum.org/whitepapers/blockchain-beyond-the-hype Chan, A., Frankel, Y., and Tsiounis, Y., "Easy Come-Easy Go Divisible Cash," Advances in Cryptology, Eurocrypt 1998, LNCS 1403, pp. 561-575, Springer, 1998 doiorg/10.1007/BFb0054154

Chaum, D. Blind Signatures for Untraceable Payments, Advances in Cryptology—Crypto '82, 199-203, 1983.

Chaum, D., Fiat, A., and Naor, M. Untraceable Electronic Cash. Advances in Cryptology—Crypto '88, Lecture Notes in Computer Science, 403:319-327, 1990.

Chayka, Kyle (2 Jul. 2013). "What Comes After Bitcoin?". Pacific Standard.

Chi, Ellis, "Evaluation of Micropayment Schemes." HP Lab, technical report, 1997

Chow, J., "Ethereum, Gas, Fuel, & Fees," 2017. media.consensys.net/ethereum-gas-fuel-and-fees-3333el7feldc Christidis K., and M. Devetsikiotis, "Blockchains and Smart Contracts for the Internet of Things," in IEEE Access, vol. 4, pp. 2292-2303, 2016.

Chuen, David LEE Kuo, and Robert H. Deng, eds. Handbook of Blockchain, Digital Finance, and Inclusion, Volume 2: ChinaTech, Mobile Security, and Distributed Ledger. Academic Press, 2017.

Cimpanu, Catalin (4 Sep. 2018). "Bitcoin Gold delisted from major cryptocurrency exchange after refusing to pay hack damages". ZDNet.

Clark, J., and Essex, A. Commitcoin: Carbon Dating Commitments with Bitcoin. LACR Cryptology ePrint Archive, 2011:677, 2012.

Colored coins whitepaper: tinyurl.com/coloredcoin-whitepaper

Combs, C. (2018, Feb. 14). LinkSquares blog.linksquares.com/2018/02/14/legal-teams-can-prepare-smart-contract-revolution/Community, T. E. (2016). account types gas and transactions www.ethdocs.org/en/latest/contracts-and-transactions/account-types-gas-and-transactions.html Cryptocurrency and Global Financial Security Panel at Georgetown Diplomacy Conf De Solages A., and J. Traore, "An Efficient Fair Off-Line Electronic Cash System with Extensions to Checks and Wallets with Observers," Proc. of the 2nd Int. Conf. on Financial Cryptography, NOS 1465, pp. 275-295, February 1998 doi.org/10.1007/BFb0055189

Decentralized autonomous corporations, Bitcoin Magazine: tinyurl.com/Bootstrapping-DACs Delmolino, K., M. Arnett, A. Kosba, A. Miller, and E. Shi, "Step by Step Towards Creating a Safe Smart Contract: Lessons and Insights from a Cryptocurrency Lab," in International Conference on Financial Cryptography and Data Security, Springer, Berlin, Heidelberg, 2016, vol 9604, pp. 79-94.

Drainville, Danielle. "An analysis of the Bitcoin electronic cash system." Univ. Waterloo 45 (2012).

Ethereum Community. (2016). Contracts and Translations www.ethdocs.org/en/latest/contracts-and-transactions/account-types-gas-and-transactions.html Ethereum Merkle Patricia trees github.com/ethereum/wiki/wiki/0%5BEnglish %5D-Patricia-Tree Ethereum Organisation. (2019, Apr. 25). platform. www.stateofthedapps.com/dapps/platform/ethereum?page=1

Ethereum RLP: github.com/ethereum/wiki/wiki/0%5BEnglish0%5D-RIP

Fan, J., L. T. Yi, and J. W. Shu, "Research on the technologies of Byzantine system," Journal of Software, vol 24, no. 6, pp. 1346-1360, 2013.

Finney, Hal, Reusable proofs of work: www.finney.org/~hal/rpow/SMH-223.1

FIPS 180-3. Secure Hash Standard, Federal Information Processing Standards Publication 180-3. National Institute of Standards and Technology, 2008.

FIPS 186-3. Digital Signature Standard. Federal Information Processing Standards Publication 186-3. National Institute of Standards and Technology, 2009.

Foteinis, Spyros (7 Feb. 2018). "Bitcoin's alarming carbon footprint". Nature. 554 (7691): 169. Bibcode:2018Natur.554 . . . 169F. doi:10.1038/d41586-018-01625-x Foundation, T. S. (2016-2019). micro-payment channel solidity.readthedocs.io/en/latest/solidity-by-example.html#micropayment-channel Frantz, C K., & Nowostawski, M. (2016, Sep. 10). From Institutions to Code: Towards Automated Generation of Smart Contracts ieeexplore.jeee.org/document/7789470

Fridgen, G., Radszuwill, S., Urbach, N., & Utz, L. (2018). Cross-Organizational Workflow Management Using Blockchain Technology-Towards Applicability, Auditability, and Automation. hdl.handle.net/10125/50332

Garzik, Jeff, StorJ and Autonomous Agents, tinyurlcom/storj-agents

GHOST: www.cs.hujiac.il/~avivz/pubs/13/btc_scalability_full.pdf

Greenberg, Andy, (20 Apr. 2011). "Crypto Currency". Forbes.

GTNexus (2016). mktforms.gtnexus.com/rs/979-MCL-531/images/GTNexus-Digital-Transformation-Report-US-FINAL.pdf Hallam-Baker, Phillip M., "Micro Payment Transfer Protocol (MPTP) Version 0.1," W3C Working Draft, 1995

Hamilton, Marc. "Blockchain distributed ledger technology: An introduction and focus on smart contracts" Journal of Corporate Accounting & Finance.

Hankerson, D., Menezes, A., and Vanstone, S. Guide to Elliptic Curve Cryptography. Springer, 2003.

Hertig, A., "Ethereum Prediction Market Service Takes First Steps With Beta Launch," 2016. www.coindesk.com/ethereum-prediction-market-service-takes-first-steps-beta-launch/

Herzberg, A, and H. Yochai, "Mini-pay: Charging per Click on the Web," Proc. of the 6th Int. World Wide Web Conf., April 1997

Hofmann, Erik, Urs Magnus Strewe, and Nicola Bosia. "Discussion-How Does the Full Potential of Blockchain Technology in Supply Chain Finance Look Like ?." In Supply Chain Finance and Blockchain Technology, pp. 77-87. Springer, Cham, 2018.

Hughes, Heather. "Blockchain and the Future of Secured Transactions" SSRN 3345717 (2019).

Hughes, Sarah Jane. "Property, Agency, and the Blockchain: New Technology and Longstanding Legal Paradigms" Wayne L. Rev. 65 (2019): 57.

Hwang, Jing-Jang, Tzu-Chang Yeh, Jung-Bin Lie, "Securing on-line credit card payments without disclosing privacy information," computer Standards & Interfaces 25, pp. 119-129, 2003 doi.org/10.1016/S0920-5489(02)00102-2

Jansiti, Marco; Lakhani, Karim R. (January 2017). "The Truth About Blockchain". Harvard Business Review. Harvard University.

IBM. (2018, Jan. 28). Insights on Business www.ibm.com/blogs/insights-on-business/oracle-consulting/reinvent-erp-processes-blockchain/

Infosys. (2018). Integrating blockchain erp. www.infosys.com/Oracle/white-papers/Documents/integrating-blockchain-erp.pdf Intrinsic value: tinyurl.com/BitcoinMag-IntrinsicValue Iwamura, Mitsuru; Kitamura, Yukinobu; Matsumoto, Tsutomu (28 Feb. 2014). "Is Bitcoin the Only Cryptocurrency in the Town? Economics of Cryptocurrency and Friedrich A. Hayek". doi:10.2139/ssrn.2405790. hdl:10086/26493. S2CID 154268460. SSRN 2405790.

Jiang, Jennifer Hongbo. "How much does trust cost ?: analysis of the consensus mechanism of distributed ledger technology and use-cases in securitization." PhD diss., Massachusetts Institute of Technology, 2017.

Joshi, Saee M., Jayant Umale, and K. Rajeswari. "Blockchain Based Efficient and Accurate Property Title Retrieval and Secured Storage System." In International Conference on Computer Networks and Inventive Communication Technologies, pp. 246-255. Springer, Cham, 2019.

Kang, M. Z., and F. Y. Wang, "From parallel plants to smart plants intelligent control and management for plant growth," IEEE/CAA Journal of Automatica Sinica, vol. 4, no. 2, pp. 161-166, 2017.

Karame, G. O., Androulaki, E., and Capkun, S. Two Bitcoins at the Price of One? Double-Spending Attacks on Fast Payments in Bitcoin. IACR Cryptology ePrint Archive, 2012:248, 2012.

Kari Korpela, J. H. (2017). Digital Supply Chain Transformation toward Blockchain Integration scholarspace.manoa.hawaii.edu/bitstream/10125/41666/1/paper0517.pdf Khanh, Q. N., Y. Mu and V. Varadharajan, "Digital Coins based on Hash Chain," In proceeding of the ACM SIGMOD conference on Management of Data, pp. 169-180, Philadelphia, 1999.

Kosba, A., A. Miller, E. Shi, Z. K. Wen, and C Papamanthou, "Hawk: The Blockchain Model of Cryptography and Privacy-Preserving Smart Contracts," in 2016 IEEE Symposium on Security and Privacy (SP), San Jose, CA, USA, 22 May-26 May 2016, pp. 839-858.

Krause, Max J.; Tolaymat, Thabet (November 2018). "Quantification of energy and carbon costs for mining cryptocurrencies". Nature Sustainability. 1 (11): 711-718. doi:10.1038/s11893-018-0152-7. ISSN 2398-9629. S2CID 169170289.

Kristian Lauslahti, J. M. (2017, Jan. 9). ETLA Research Institute of the Finish Economy. www.etla.fi/wp-content/uploads/ETLA-Raportit-Reports-68.pdf Krugman, Paul (26 Mar. 2018). "Opinion-Bubble, Bubble, Fraud and Trouble". The New York Times Kshetri, Nir. "Potential roles of blockchain in fighting poverty and reducing financial exclusion in the global south." (2017): 201-204.

Kulkarni, A. (2018, Apr. 19). Blockchain versus ERP systems blog.chronicled.com/blockchain-versus-erp-systems-why-one-is-superior-for-supply-chain-management-1186c12d56b2

Lane, Alexi, Benjamin Leiding, and Alex Norta. "Lowering Financial Inclusion Barriers With a Blockchain-Based Capital Transfer System." URL: dak:2k324ib2z.cloudfront.net/59157962bdb-4300af2877129/5963c09d077a520b5a965208_20170710_EVX_WP.pdf (2017).

Lansky, Jan (January 2018). "Possible State Approaches to Cryptocurrencies". Journal of Systems Integration. 9/1: 19-31. doi: 10.20470/jsi.v9i1.335.

Law, Laurie; Sabett, Susan; Solinas, Jerry (11 Jan. 1997). "How to Make a Mint: The Cryptography of Anonymous Electronic Cash". American University Law Review. 46 (4).

Lee, Joseph. "Distributed ledger technologies (blockchain) in capital markets risk and governance." SSRN 3180553 (2018).

loi lu, d.-h. c. (2016, August). eprint. eprint.iacr.org/2016/633.pdf

Luu, L, D. H. Chu, H. Olickel, P. Saxena, and A. Hobor, "Making Smart Contracts Smarter," in Proceedings of the 2016 ACM SIGSAC Conference on Computer and Communications Security (CCS '16), Vienna, Austria, 24-28 Oct. 2016, pp. 254-269.

Mainelli, Michael, and Mike Smith. "Sharing ledgers for sharing economies an exploration of mutual distributed ledgers (aka blockchain technology)." Journal of Financial Perspectives 3, no. 3 (2015).

Manasse, M. S., "The Millicent Protocols for Electronic Commerce," Proc. of the 1st USENIX Workshop on Electronic Commerce, pp. 117-123, July 1995

Mao, W., "Lightweight Micro-Cash for the Internet," Proc. of the ESORICS'96, LNCS 1146, pp. 15-32, September 1996 doiorg/10.1007/3-540-61770-1_25

Mastercoin whitepaper.github.com/mastercoin-MSC/spec

McConnell, P. (2019). Blockchain Examining the Technical Architecture. IT Now, 38-41.

Mearian, L. (2018, Jan. 5). ethereum explores a fix for blockchain. www.computerworld.com/article/3245928/ethereum-explores-a-fix-for-blockchains-performance-problem.html Ménard, Xavier Foccroulle. "Cryptocurrency: Collateral for Secured Transactions ?." Banking & Finance Law Review 34, no. 3 (2019): 347-386.

Mendoza, Ron (14 Oct. 2019). "UNICEF Blockchain Fund: First UN Organization To Accept Cryptocurrency Donations". IB Times Merit Kolvart, M. P. (2016). The Future of Law and eTechnologies. In M. P. Merit Kolvart, The Future of Law and e Technologies (pp. 133-1-46). Wiley.

Merkle trees en.wikipedia.org/wiki/Merkle_tree

Merkle, R. Protocols for Public Key Cryptosystems. Proceedings of the 1980 IEEE Symposium on Security and Privacy, 122-134, 1980.

Mizrahi, A., "Everex helps migrant workers send remittance back to Myanmar via Ethereum," 2016. www.finance-magnates.com/cryptocurrency/education-center-2/everex-helps-migrant-workers-send-remittance-back-myanmar-via-ethereum/

Morris, David Z (24 Dec. 2013). "Beyond bitcoin: Inside the cryptocurrency ecosystem". Fortune.

Mu, Y., V. Varadharajan, and L. Y. X. Lin, "New Micropayment Schemes Based on PayWords" In Proceedings of 2nd Australasian Conference on Information Security and Privacy (ACISP '97), Lecture Notes in Computer Science 1270, pp. 283-293, Springer-verlag, 1997 doi org/10.1007/BFb0027935

Nakamoto, S. (2008). Bitcoin Whitepaper. satoshinakamoto.me/whitepaper/; bitcoin nakamotoinstitute.org/bitcoin/, "Bitcoin: a peer-to-peer electronic cash system," 2009. bitcoin.org/bitcoin.pdf Nakanishi, T. and Sugiyama, Y., "Unlinkable Divisible Electronic Cash." Proc. of the 3rd Int. Workshop on Information Security, ISW 2000, LNCS 1975, pp. 121-134, Springer, 2000

Namecoin: namecoin.org/

Narayanan, Arvind; Bonneau, Joseph; Felten, Edward; Miller, Andrew; Goldfeder, Steven (2016). Bitcoin and cryptocurrency technologies a comprehensive introduction. Princeton: Princeton University Press, ISBN 978-0-691-17169-2.

Natarajan, Harish, Solvej Krause, and Helen Gradstein. Distributed ledger technology and blockchain. World Bank, 2017.

Natoli, C, and V. Gramoli, "The Blockchain Anomaly," in IEEE 15th International Symposium on Network Computing and Applications (NCA), Cambridge, MA, USA, 31 Oct.-2 Nov. 2016, pp. 310-317.

Network Working Group, "AAA Authorization Application Examples," RFC 2905, www.faqs.org/rics/rfc2905.html Nguyen, K. Q., Y. Mu, and V. Varadharajan, "Micro-Digital Money for Electronic Commerce," Proc. of the 13th IEEE ACSAC, pp. 2-8, December 1997 doi.org/10.1109/CSAC1997.646167

Nguyen, K. Q., Y. Mu, and V. Varadharajan, "Secure and Efficient Digital Coins," Proc. of the 13th IEEE ACSAC, pp. 9-15, December 1997

Norta, A. (2019, Mar. 2). Creation of Smart Contracting Collaborations for Decentralized Autonomous Organisations www.researchgate.net/publication/277031537_Creation_of_Smart-Contracting_Collaborations_for_Decentralized_Autonomous_Organizations OpenAccessGovernment.org. (2018).

Okamoto, T. and K. Ohta, "Universal Electronic Cash," In proceedings of Crypto'91, Lecture Notes in Computer Science 576, pp. 324-337, Springer-Verlag, Berlin, Germany. 1992 doiorg/10.1007/3-540-16766-1_27

Okamoto, T., "An Efficient Divisible Electronic Cash Scheme," In Proceedings of Crypto'95, Lecture Notes in Computer Science, pp. 138-451, Springer-Verlag, Berlin. Germany, 1995

On the Complexity and Behaviour of Cryptocurrencies Compared to Other Markets, 7 Nov. 2014

O'Shields, Reggie. "Smart contracts: Legal agreements for the Blockchain." NC Banking Inst. 21 (2017): 177.

Patricia trees en.wikipedia.org/wiki/Patricia_tree

Pervez, Huma; Muneeb, Muhammad; Irfan, Muhammad Usama; Haq, Irfan Ul (19 Dec. 2018), "A Comparative Analysis of DAG-Based Blockchain Architectures", 2018 12th International Conference on Open Source Systems and Technologies (ICOSST), IEEE, pp. 27-34, doi: 10.1109/ICOSST.2018.8632193, ISBN 978-1-5386-9564-7, S2CID 59601449

Pinna, Andrea, and Wiebe Ruttenberg. "Distributed ledger technologies in securities post-trading revolution or evolution ?." ECB Occasional Paper 172 (2016).

Polgar, David. "Cryptocurrency is a giant multi-level marketing scheme". Quartz. Quartz Media LLC Pollard, J. Monte Carlo Methods for Index Computation mod p. Mathematics of Computation, 32:918-924, 1978.

Popper, Nathaniel (1 Oct. 2017). "Understanding Ethereum, Bitcoin's Virtual Cousin (Published 2017)". The New York Times.

Popper, Nathaniel (27 Mar. 2016). "Ethereum, a Virtual Currency, Enables Transactions That Rival Bitcoin's". The New York Times Proos, J., and Zalka, C Shor's Discrete Logarithm Quantum Algorithm for Elliptic Curves, Quantum Information and Computation, 3:317-311, 2003.

Qiao, Funcheng, Chaoqun Ma, Qiujun Lan, and Zhongding Zhou. "Inventory Financing Model Based on Blockchain Technology." In Fourth International Conference on Economic and Business Management (FEBM 2019). Atlantis Press, 2019.

Raeesi, Reza (23 Apr. 2015). "The Silk Road, Bitcoins and the Global Prohibition Regime on the International Trade in Illicit Drugs Can this Storm Be Weathered?". Glendon Journal of International Studies/Revue d'Études Internationales de Glendon. 8 (1-2). ISSN 2291-3920.

Raval, Siraj (2016). Decentralized Applications: Harnessing Bitcoin's Blockchain Technology. O'Reilly Media, Inc. pp. 1-2. ISBN 978-1-4919-2452-5.

Reid, F., and Harrigan, M. An Analysis of Anonymity in the Bitcoin System. 2011 International Conference on Privacy, Security, Risk, and Trust, and IEEE International Conference on Social Computing, 2011.

Rivest, R. L., and A. Shamir, "PayWord and MicroMint Two Simple Micropayment Schemes," Proc. of 1996 Int. Workshop on Security Protocols, LNCS 1189, pp. 69-87, April 1996 doi.org/10.1007/3-540-624945_6

Rivest, Ronald D., and A. Shamir, "Quantitative Analysis of the Full Bitcoin Transaction Graph." in Sadeghi A R. (eds) Financial Cryptography and Data Security (FC 2013), Lecture Notes in Computer Science, Springer, Berlin, Heidelberg, vol 7859, pp. 6-24

Rivest, Ronald D., Shamir, A. Quantitative Analysis of the Full Bitcoin Transaction Graph. LACR Cryptology ePrint Archive, 2012:584, 2012.

Roberto Casado-Vara, A. G. (2018, june 7). Smart Contract for Monitoring and Control of Logistics Activities: Pharmaceutical Utilities Case Study. link.springer.com/chapter/10.1007/978-3-319-94120-2_49

Roman, Beck, Stenum Czepluch Jacob, Lollike Nikolaj, and Malone Simon. "Blockchain—the gateway to trustfree cryptographic transactions." In European Conference On Information System (ECIS). Association For Information System (AIS), 2016.

Rushe, Dominic (25 Mar. 2014). "Bitcoin to be treated as property instead of currency by IRS". The Guardian.

Russell, Jon. "Tether, a startup that works with bitcoin exchanges, claims a hacker stole $31M". TechCrunch.

Rutkin, A., "Blockchain-based microgrid gives power to consumers in New York," 2016. www.newscientist.com/article/207933+blockchain-based-microgrid-gives-power-to-consumers-in-new-york/

Sagona-Stophel, Katherine. "Bitcoin 101 white paper" (PDF).

Saigal, Sanjay, (2017, May 22). sdcexec. Supply Chain Finance on the Blockchain: www.sdcexec.com/sourcing-procurement/article/12247812/supply-chain-finance-on-the-blockchain-enables-network-collaboration Scalability of the Bitcoin and Nano protocols a comparative analysis (PDF), Blekinge Institute of Technology, 2018.

Schmidt, Stefan, (2018, Feb. 26). Unibright White Paper. unibright.io/files/Unibright_Whitepaper.pdf Schnorr, C. P., "Efficient Signature Generation by Smart Cards" J. of Cryptology, Vol. 4, No. 3, pp. 161-174, 1991

Schroeder, Brian. "On the Applications of Blockchain-Enabled Distributed Ledger Technology in the Financial Industry." (2016).

Secure property titles with owner authority: szabo.best.vwh.net/securetitle.html Serrano, Sebastian, Luciana Marcela Gruszeczka, and Mugur Marculescu. "Loan processing service utilizing a distributed ledger digital asset as collateral." U.S. patent application Ser. No. 15/697,799, filed Mar. 15, 2018.

Shafer, Steven. "Blockchain and Cryptocurrencies" (2018).

Shao, Q. F., C. Q. Jin, Z Zhang, and W. N. Qian, "Blockchain: Architecture and Research Progress" Chinese Journal of Computer, vol. 40, no. 157, pp. 1-21, 2017.

Sharma, T. K. (2018, January). What Are The Alternative Strategies For Proof-Of-Work www.blockchain-council.org/blockchain/what-are-the-alternative-strategies-for-proof-of-work/

Shor, P. Polynomial-Time Algorithm for Prime Factorization and Discrete Logarithms on a Quantum Computer. SIAM Journal on Computing, 26:1484-1509, 1997.

Sillaber, C (2019, 03 23). Life Cycle of Smart Contracts in Blockchain Ecosystems link.springer.com/article/10.1007/s11623-017-0819-7

Simplified payment verification en.bitcoin.it/wiki/Scalability

Smart contracts en.bitcoin.it/wiki/Contracts

Smart property: en.bitcoin.it/wiki/Smart_Property

Sokolov B., K. A. (2018, 8 29). Comparison of ERP Systems with Blockchain Platform. doi.org/10.1007/978-3-030-0018+1_22.

Song, J. (2018, Jun. 11). the truth about smart contracts, medium.com/@jimmysong/the-truth-about-smart-contracts-ae825271811f?source=emailShare-f065cla9fe89-1553760069&_branch_match_id=640855061846909908

Standards For Efficient Cryptography Group. SEC 2: Recommended Elliptic Curve Domain Parameters. p. 15, September 2000.

Steadman, Ian (11 May 2013). "Wary of Bitcoin? A guide to some other cryptocurrencies". Ars Technica.

Stoll, Christian; Klaaßen, Lena; Gallersdorfer, Ulrich (17 Jul. 2019). "The Carbon Footprint of Bitcoin". Joule. 3 (7): 1647-1661. doi:10.1016/j.joule.2019.05.012. ISSN 2542-4785.

Stuart Haber, W. S. (1991). anf.es: www.anLes/pdf/Haber_Stornetta.pdf

Swan, M., Blockchain: Blueprint for a New Economy. Sebastopol, CA: O'Reilly Media, 2015.

Szabo, N. (1997). The Idea of Smart Contracts www.fon.hum.uva.nl/rob/Courses/InformationInSpeech/CDROM/Literature/LOTwinterschool2006/szabo.best.vwh.net/idea.html Szabo, N. (2002). A Formal Language for Analyzing Contracts. www.fon.hum.uva.nl/rob/Courses/InformationInSpeech/CDROM/Literature/LOTwinterschool2006/szabo.best.vwh.net/contractlanguage.html szabo.best.vwh.net/smart_contracts_idea.html Szabo, N. Smart Contracts: Building Blocks for Digital Markets. www.fon.hum.uva.nl/rob/Courses/InformationInSpeech/CDROM/Literature/LOTwinterschool2006/szabo.best.vwh.net/smart_contracts_2.html, 1996

Tapscott, D., and A. Tapscott, Blockchain Revolution: How the Technology Behind Bitcoin Is Changing Money, Business, and the World. London: Portfolio, 2016.

Tasca, Paolo (7 Sep. 2015). "Digital Currencies Principles, Trends, Opportunities, and Risks". Social Science Research Network. SSRN 2657598.

Tasca, Paolo. "Token-Based Business Models" In Disrupting Finance, pp. 135-148. Palgrave Pivot, Cham, 2019.

Todd, Peter, on Merkle sum trees sourceforge.net/p/bitcoin/mailman/message/31709140/

Van Oorschot, P., and Wiener, M. Parallel Collision Search with Cryptanalytic Applications Journal of Cryptology, 12:1-28, 1999.

Vimal, S., and S. K. Srivatsa. "A new cluster P2P file sharing system based on IPFS and blockchain technology." Journal of Ambient Intelligence and Humanized Computing (2019): 1-7.

Wang, F. Y., "Artificial societies, computational experiments, and parallel systems a discussion on computational theory of complex social-economic systems," Complex Systems and Complexity Science, vol. 1, no. 4, pp. 25-35, 2004.

Wang, F. Y., "Software-defined systems and knowledge automation: a parallel paradigm shift from Newton to Merton," Acta Automatica Sinica, vol. 41, no. 1, pp. 1-8, 2015.

Wang, F. Y., D. J. Zeng, and Y. Yuan, "An ACP-based approach for complex analysis of E-commerce system," Complex Systems and Complexity Science, vol 5, no. 3, pp. 1-8, 2008.

Wang, F. Y., J. J. Zhang, X. H. Zheng, X. Wang, Y. Yuan, X. X. Dai, J. Zhang and L. Q. Yang, "Where does AlphaGo go: from church-Turing thesis to AlphaGo thesis and beyond," IEEE/CAA Journal of Automatica Sinica, vol. 3, no. 2, pp. 113-120, 2016.

Wang, S., X. Wang, P. J. Ye, Y. Yuan, S. Liu, and F. Y. Wang, "Parallel crime scene analysis based on ACP approach," IEEE Transactions on Computational Social Systems, to be published.

Wang, X., L. X. Li, Y. Yuan, P. J. Ye, and F. Y. Wang, "ACP-based social computing and parallel intelligence: Societies 5.0 and beyond," CAAI Transactions on Intelligence Technology, vol. 1, no. 4, pp. 377-393, 2016.

Wang, Xiaonan, Wentao Yang, Sana Noor, Chang Chen, Miao Guo, and Koen H. van Dam. "Blockchain-based smart contract for energy demand management." Energy Procedia 158 (2019): 2719-2724

Wei Dai (1998). "B-Money".

Wen, D., Y. Yuan, and X. R. Li, "Artificial societies, computational experiments, and parallel systems an investigation on a computational theory for complex socioeconomic systems." IEEE Transactions on Services Computing, vol 6, no. 2, pp. 177-185, 2013.

Yli-Huumo, Jesse, D. K. (2016). Where Is Current Research on Blockchain Technology ?—A Systematic Review. www.ncbi.nlm.nih.gov/pmc/articles/PMC5047482/Johnson, S. (2018, Jan. 16). Beyond the Bitcoin Bubble. www.nytimes.com/2018/01/16/magazine/beyond-the-bitcoin-bubble.html Yuan, Y., and F. Y. Wang, "Blockchain: the state of the art and future trends," Acta Automatica Sinica, vol. 42, no. 4, pp. 481-494, 2016.

Yuan, Y., and F. Y. Wang, "Parallel blockchain: concept, methods and connotation analysis." Acta Automatica Sinica, vol. 43, no. 10, pp. 1703-1712, 2017.

Yuan, Y., and F. Y. Wang, "Towards blockchain-based intelligent transportation systems." in Proceedings of the 2016 IEEE 19th International Conference on Intelligent Transportation Systems (ITSC), Rio de Janeiro, Brazil, 2016, pp. 2663-2668.

Zeng, S., S. Wang, Y. Yuan, X. C. Ni, and Y. J. Ouyang, "Towards knowledge automation: a survey on question answering systems" Acta Automatica Sinica, vol. 13, no. 9, pp. 1491-1508, 2017.

Zhang, F., E. Cecchetti, K. Croman, A. Juels, and E. Shi, "Town Crier: An Authenticated Data Feed for Smart Contracts," in Proceedings of the 2016 ACM SIGSAC Conference on Computer and Communications Security (OS '16), Vienna, Austria, 24-28 Oct. 2016, pp. 270-282.

Zooko's triangle: en.wikipedia.org/wiki/Zooko's_triangle

SUMMARY OF THE INVENTION

The present technology provides a cryptographic tokenized economic value which represents a liability; i.e., having a negative demand function. The tokenized economic value may have one or more of the following features: transferability; public anonymity (pseudonomy) of the transferor; public anonymity of transferee; non-repudiation of transfer and/or receipt; avoidance of duplicate transfer, and lack of required trusted party in transaction or maintenance (but not excluding information oracles).

In another expression of an embodiment, the characteristics are: anonymity (pseudonomy) of the holder, non-repudiation of transfer, avoidance of duplicate transfer, and avoidance of failure of transfer (one and only one transfer); proof of transfer; and lack of required trusted party in transaction or maintenance (but not excluding information oracles).

In a further expression of an embodiment, a decentralized architecture and its elements are provided to issue/create, transfer, and extinguish tokens which include tokens that have a net negative utility value or have a contingent liability with respect to another party, such that no rational (objective) intrinsic existing incentive exists at the time of at least one transaction to accept such a token. The negative utility value at the time of a transaction means generally that the acceptance is one of involuntary, based on irrationality or altruism, or that the recipient intends to rely on the availability of anonymity to strategically hold the token. The embodiment provides that the current holder of the token is anonymous, meaning that no mandatory or network-intrinsic forensically reliable public record demonstrates ownership or possession of the token by any particular party, and that transfers of the token are also blinded, such that disclosure of a holder at a prior point in time, does not demonstrate current ownership. The anonymous transfer, however, is managed by a preferably decentralized network to allow parties to a respective transfer to demonstrate the existence of a transfer, to ensure that a holder can transfer can transfer once and only once, to ensure non-repudiation of transfer to the single recipient. In the preferred decentralized network, there is preferably no required trusted single party, or consortium of entities acting as a unit.

As noted above, known transactions employ cryptographic tokens to represent liabilities, and blockchain mechanisms may be used to manage and transact such liabilities. However, such transactions do not meet all of these respective criteria. For example, according to typical prior tokenized liabilities, the debt remains personal, and can be transferred only by satisfying the debt (with possible new transaction with new debtor).

According to the prior theories of liability, the basic alternates for ensuring payment were security and reputation. The reputation required linkage to an identity, which could be relatively anonymous, but tied to a unique individual, and not transferrable as a result. Thus, the transaction has the effect of a smart contract, with satisfaction of the debt according to the terms as the basic mechanism to close the record.

The present technology of course can make use of security, personal linkages of the debt, and reputational damage due to default, but also provides other options and enhancements.

When one possesses or is subject to a tokenized liability, that means that the owner of the token ("hot potato") at the time of the transaction, must provide the corresponding consideration defined by the tokenized terms. Thus, in contrast to a typical cryptocurrency in which consideration for the transaction to transfer the token comes from the transferee, in this case, it is the transferor that must compensate the transferee for acceptance of the tokenized liability. Such an obligation is typically associated with a term or conditions of payment, or other contingency, such that the liability is not ripe immediately upon creation. This creates opportunities for arbitrage, speculation, and risk transfer.

This type of economic system thus permits speculation on the supply and demand for the tokens, as well as the (optional) contingency and the underlying consideration.

The system preferably has no restriction on transferability of particular assets of the debtor, or on transfer of the liability token to another debtor who meets the security requirements, though according to a set of rules, presumably enforced within the distributed ledger and a smart-contract style implementation. To provide an incentive to a tokenholder, an existing token could be burned, i.e., transferred to an irretrievable address. Since this extinguishes the obligation of the debtor to the creditor, and in the case of fungible tokens, to the system, the authority to burn tokens must be part of the consensus protocol itself, and not a unilateral option of a token holder. That is, a debt token should not be extinguished unless (a) it is paired with an asset token, or (b) consensus permits the loss of token. It is possible to split tokens, similar to the fractional bitcoins.

FIG. 3 shows a schematic diagram of the operation of a system according to the present invention. A user 1 101 initiates the set of transactions by generating an Asset Token 102, and a Debt Token 103. The pair of tokens are recorded on the Blockchain 1 130. At this stage, there is no net value, since the pair are of equal but opposite attributes. For example, the main attribute may be monetary value, though some use cases involve other complementary features or characteristics. One or both of Asset Token 102 and the Debt Token 103 are then divested by the User 1 101, typically through a market auction process, which is represented as Market Auction 103 and Market Auction 105 in FIG. 3, but this could be a single market. As a result of the market auctions, the User 1 101 receives a benefit $120 for sale of the Asset Token 102, and conveys a benefit $121 for divestiture of the Debt Token 103. In the normal case, these would be equal and opposite, though various rules, terms and arbitrage opportunities may cause these markets to deviate from net sum zero. The acquirer Asset Buyer 2 106 of the Asset Token 108 from the Market Auction 104 pays benefit $122, which will approximate the benefit $120 received by the User 1 101, less transaction and market fees. The acquirer Debt Buyer 2 107 of the Debt Token 109 from the Market Auction 105 receives benefit $123, which will approximate the benefit $121 paid by the User 1 101, less transaction and market fees. The transfer of the Asset Token 108 and the Debt Token 109 are verified in a blockchain transaction, as to ownership and lack of duplicative transfer, for example, and the transaction added to the Blockchain 2 131. For exemplary purposes, an additional transfer of the tokens is shown in FIG. 3, to make clear that the tokens are freely transferrable. Thus, the acquirer Asset Buyer 3 110 of the Asset Token 112 pays benefit $124 to the prior owner, Asset Buyer 2 106, and this transaction may occur through a market auction process. The acquirer Debt Buyer 3 111 of the Debt Token 113 receives benefit $125 from the prior owner Debt Buyer 2 107, and this transaction may also occur through a market auction process. The transfer of the Asset Token 112 and the Debt Token 113 are verified in a blockchain transaction, as to ownership and lack of duplicative transfer, for example, and the transaction added to the Blockchain 3 132. At some time, triggered voluntarily or by Smart Contract 134, for example, the debt is called for repayment. At that time, the holder of the Asset Token 112, Asset Buyer 3 110, seeks payment from the holder of the Debt Token 113, Debt Buyer 111. However, the tokens are fungible, and therefore, depending on the rules and smart contract terms, the Asset Buyer 3 110 may receive recovery from any holder of a debt token, and not necessarily the holder of the same debt token through its chain of ownership. If the Asset Buyer 3 110 does not wish to simple receive the Debt Token 113 with a payment from the Debt Buyer 111, or does not wish to sell the Asset Token 112, the value is established in another Market Auction 105, which may be the same marketplace as Market Auction 104 and/or Market Auction 105, and the blockchain is updated for the transaction at Blockchain 4 133. When the tokens are held together in by a single entity (e.g., digital wallet), the pair of tokens may be burned, that is, withdrawn from circulation. This transaction may be also recorded on the blockchain at Blockchain 4 133, and the retired Burned Asset Token 114 and Burned Debt Token 115 transferred to an inaccessible repository, because these are logical values stored on a "permanent" distributed ledger.

The liability token may be unsecured. This use case requires an incentive for avoiding breach by the debtor. In some cases, a debtor willingly incurs and resolves a debt. For example, the debt itself may have tax advantages and defaulting on the debt would have adverse tax consequences. The debt may be a contingent liability, and take the form of insurance or an indemnity; in such cases, regardless of regulation, failure to honor the debt would damage the reputation of the debtor, which is the basis for its business operations. Note that the liability token is transferrable, and need not be held by the original debtor at the time of proposed settlement. Tracking down the debtor in an anonymous system may prove difficult, and therefore the various forms of incentives for adopting the debt (avoiding default on the obligation by the current token-holder) may be a source of speculation. A secured-type token is discussed in US20200394652.

While anonymity is preferably a default attribute, that may be waived, and anonymity may represent a contingency that changes the value of the token. A secured debt with a disclosed debtor may have the highest value, followed by secured debt with an anonymous debtor, followed by an unsecured debt with a disclosed debtor, followed by an unsecured debt with an anonymous debtor. One can therefore gain value by either disclosing the debtor's identity, securing the debt, or both. When a liability is transferred from a disclosed debtor to another debtor, disclosed or undisclosed, the prior disclosed debtor may remain secondarily liable, and as such, pay a lower price to the acquirer of the liability than if the acquirer is disclosed or the liability secured.

In order to avoid escape of a debtor from the liability, the system may thus anonymously encumber distinct assets associated with the debtor's wallet or key, or otherwise secure the liability in some form. Depending on the nature of the security, that may also be a basis for speculation. In this case, the security is not an integral part of a smart contract, and, for example, foreclosure of a security interest may be outside of the blockchain. The security may be substitutable, or other terms applied that are independent of the blockchain transaction. Further, the security need not be of economic form, and, for example, may be reputational, for example in the form of reputational announcements. Thus, for example, an anonymous wallet address may build a reputation as being credit-worthy, and the extension of credit may be based on the credit of the wallet. This score, or use of the underlying data, may represent analysis of the duration of the account, amounts at risk, compliance with terms, etc.

Another example of unlinked security is an asset within the same wallet. A holder of a defaulted obligation may be able to impose a lien on other transactions of the same wallet, and thus limit, without freezing all transactions of the wallet. Therefore, the lien may prevent withdrawals from the wallet, while permitting other transactions within the wallet to remain pending. Liens may be satisfied pro rata, in first-in, first-out order, or otherwise.

A still further example of an enforcement mechanism for the liability relates to tax benefits resulting from a claimed loss. In that case, the claim of a loss represents a partial benefit, and given that there is a legal reporting obligation, and risk of eventual disclosure with waiver of the benefit, there may be sufficient incentive to ensure lack of default. Further, while the identity of the party may be anonymous from the public, a regulated reporting entity may have sufficient identifying information to make a tax filing without public disclosure. For example, as part of the blockchain enforcement mechanism, a report to government may be encoded, separate from the parties to a transaction.

In some cases, the value of cryptographic tokens fluctuates, and a token with negative value may later have a positive value. When there is sufficient risk of this future state, possession of the token, even if a current nominal liability, may still have value and thus have associated incentive for claiming at the appropriate or required time. For example, the holder of a token may apply an implied interest rate of 8% to the token liability, while at the same time deploying the freed resources to a project with an implied internal rate of return of 30%. If the token is then secured by the project, the holder would generally claim and be responsible for the token liability so long as the project remains viable. When and if the project becomes non-viable, then the security for the transaction may be lost; however, even if the tokenized liability becomes unsecured, the default may trigger other loss of credit, reputational damage, and other impairments.

In an anonymous infrastructure, a party may determine that the non-economic costs of default are lower that then economic value of the liability. In that case, there would be incentive to repudiate the liability by the actual token holder to remain anonymous with respect to the creditor. The token holder may, for example, adopt a new wallet and abandon the prior anonymous identity. One way to curtail this is to used an assigned individual identifier, such as a social security number, to obtain a wallet, and prevent reuse of the same identifier to obtain a new wallet. The public information from the wallet does not reveal the user identifier, and thus preserves anonymity. Therefore, the token-holder would be forced to forego all future use of the network. This network and the wallet may be shared with other systems, and therefore greater incentives are maintained to avoid default.

Note that the one-sided transaction does not necessarily pair the liability with a corresponding asset, or encumber specific assets, or force a situation where the token state represents a neutral or affirmative value for the debtor. For example, if one secured the liability token with a hard asset at a discount, the token would therefore represent a net asset having the value of the discount for the debtor.

In another embodiment, the token itself represents a value which may be either an asset or a liability, depending on external circumstances. The present value may be considered according to a variant of Black Scholes option pricing theory (prediction of future value based on statistical properties of past valuation, subject to specific presumptions) depending on the contingencies relating to valuation. In such a case, the liability may be acquired with an expectation that in the future it will become an asset. However, during the period that it is underwater, the above discussion of debtor disclosure incentives would be applicable. Given the possibility that disclosure incentives could be weak over the term of the liability, this will influence the present value calculations.

In a further embodiment, the tokenized liability has a required periodic payment from the debtor. Globally, this may be generally analyzed assuming that the tokenized liability represents a bundle of different term liabilities, that periodically mature. This results if the token rights are severable. However, if the token itself is non-divisible, then if the token itself has a probability of having a positive future value, there will be an incentive to maintain the token against default for at least the present value of the token considering both present value of future liabilities, offset by possible appreciation.

In the pure liability case, the processing of transactions on the distributed ledger, especially if there are mining incentives, need to present inverted incentives with respect to positive asset value tokens. In the case where the value of the token can assume negative states or positive states with respect to a subjective norm, the incentives governing system operation must also provide stable operation regardless of the external economic conditions and contingencies.

The present technology also provides coupled transactions in which the distributed ledger operates as an automated escrow agent, assuring both sides (or all sides, in a transaction that involves more than 2 parties) receive the benefit or their bargain. In order to achieve fault tolerance, this escrow technology provides that the paired (or multiplexed) tokenized transactions be executed simultaneously, with both sides of the transaction verified and settled concurrently. Further, if the transaction is not settled, each party receives back its proffered tokens or consideration. Further, both parties to the transaction may collaborate to reverse the transaction on the distributed ledger, in contradistinction to performing a subsequent reverse transaction. This reversibility of a transaction and essentially expungement from a blockchain, permits correction of mistakes, a feature typically missing from prior systems. This has particular value if an escrow agent is corrupt.

If the counterparty has engaged in misconduct, and refuses to reverse the transaction, then limited recourse is available, which differs little from typical blockchain implementations. That is the transaction is non-reputable, and typically anonymous, leaving the parties in a careat emptor status. This is not a problem that the present technology seeks to solve, and in fact, prefers to incur the risk while ensuring non-reputability.

Therefore, the present technology expends cryptocurrency technologies to negative asset value scenarios of tokenized liabilities, increasing the flexibility of tokenized transactions.

One formulation of a debt that may be implemented according to the present technology is a guaranty. In this scenario, the debtor undertakes a future contingent liability in consideration of a single or periodic payments. In the periodic payment case, the debtor must remain "available" to receive the payments, and to the extent that the payments (in either case) as associated with a wallet address the default of one transaction may result in loss of future revenues. Thus, the basis for the debtor remaining responsible for the debt is because it has a business reason for doing so. The debt is not isolated from other transactions and the game theoretic analysis by the debtor regarding the costs of default are part of a sequential game paradigm.

It is noted that periodic payments or continuous activity are not the sole motivations for avoiding default. In addition to those discussed herein, other motivations may be a probability of a payoff, e.g., a lottery. That is, if there is a potential future payoff from the system (even after extinction of the debt), there will be motivation to treat the token as one having a potential future value, even if its short term value is objectively negative.

The infrastructure of the tokenized liabilities system preferably comprises a set of decentralized nodes. The tokens may be centrally generated or generated ad hoc by nodes. The tokens are, for example, generated in sets of at least two, and perhaps more components. Typically, in a pair, the two tokens have or are associated with at least one complementary property, such that the token have inverse correlated utility value. Note that, when the set of tokens are unseparated, there is no net value as a result of the complementary property. However, when paired (or the complete set aggregated), the tokens may also assume the properties of traditional cryptocurrency tokens, i.e., Bitcoin, Ethereum, etc. See, coinmarketcap.com/all/views/all/.

One implementation of the present technology provides a node that generates a set of tokens, that are together recorded on a blockchain, and representing a smart contract. The smart contract provides that one token represents a liability, and the other token represents an asset. The liability is extinguished when the liability token is paired with the asset token. The asset tokens are fungible, and standardized. While fungibility is not required, this eases liquidity within the system, and standardizes the value of the obligation. The smartcontract may also establish a cash equivalent maximum for the liability. In order to secure the tokens against physical or logical loss, they may be stored in a trusted platform module ("TPM"), which cryptographically secures information. Further, the information may be encrypted and stored on a blockchain. For example, a reliable blockchain may be provided which is accessible with biometric-key authentication. Therefore, the risk of loss before death is low. In case of death, an oracle may trigger a transfer-on-death rule, or a cancel debt-on-death rule (life insurance). See, U.S. Pat. Nos. 7,380,119; 10621366; 8505103; and 20140007087. The hardware may be similar to that disclosed in US 20190041703, and may include a microprocessor, a cryptoprocessor (cryptographic processing accelerator, with storage registers resistant to key extraction), memory, power supply, user interface, data communication interface to digital data communication network. Internet protocol communications, etc.

As noted above, the debt token is objectively undesirable, that is a rational actor would not accept the debt except for an accompanying benefit. Award of such a token provides no rational incentive, and for example, a mining (i.e., transaction processing) incentive would require consumption (marked as redeemed on the blockchain) of the debt tokens. Since this is an "unpaired" transaction without monetary transfer, it means that the corresponding asset must be fungible, and that the inflation if assets over debt in the cryptocurrency economy must be less than the increased value of the cryptocurrency economy as a result of an efficient transaction processing system. Alternately, transactions may be processed for a fee, with the transaction processing node receiving the fee.

The paradigm invites a proof of stake consensus, since the transactions rarely involve any individual creditor. Meanwhile, large creditors have a strong interest in maintaining the blockchain, and maintaining the value of the stake. Further, the perverse incentive is that a creditor will seek to redeem its own debt before redeeming the debt of others i.e., front running. However, core transactions on the blockchain will be generation/issuance of tokens, and redeeming of tokens Since the respective token represents a liability, the initial creation may be self-certified. However, if the token is created along with a positive valued token, then the creation must be authenticated, especially since the negative-valued token is anonymous/pseudonymous. Tokens may be transferred, and the transfers recorded on the blockchain. The redemption transaction is critical to the network. The transaction involves extinguishing a debt token upon authorization of the creditor, and in the case of fungible debt-coins, on behalf of an authorized creditor. The transfer of value in order to incentivize the creditor to authorize cancellation, may be on, or off, the blockchain. Likewise, the initial transaction to incentivize acceptance of the negative-valued token may also be on, or off, the blockchain. Therefore, from the perspective of the system, what differentiates the positive-valued token from a negative-valued token, is that for a positive-valued token, the holder's authority is critical to effect a valid transfer, while for a negative-valued token, the recipient's authority is critical to effect the valid transfer.

While distinct from the transaction, it is important to consider the game theoretic elements that provide incentives for stable operation of the network Why would someone voluntarily accept a liability? Typically for compensation. Why would someone voluntarily pay a debt? Typically to avoid a penalty. When the debt is anonymous/pseudonymous, what penalty could be imposed? This remains a difficult question. However, the answer to that question is a point of innovation, outside of the technology to provide an infrastructure surrounding it.

Various use cases in fact demonstrate the utility of the paradigm, without limiting the kinds of incentives that might exist.

For example, the token may represent an form of insurance (liability contingent on a condition subsequent), wherein the recipient of the token receives payment for undertaking the contingent liability, i.e., acceptance of the liability token. The token may in fact be defined by a smart contract. In fact, absent the token, blockchain and oracle-based insurance instruments exist and are prior art. However, the known obligation itself is tethered to a single entity (cryptocurrency wallet), and is not freely transferrable. On the other hand, in the case of a transferrable obligation, brokers, insurance companies, and reinsurers may all be linked on the blockchain, with recorded transfers of responsibility. Indeed, entities which engage in a business have a reputation, and that may be important to the use case. Customers (i.e., the insured) will naturally gravitate to insurance providers that have a reputation for good service and payment of obligations while those who fail to make good on obligations (especially where there is objective evidence of a failure, since the parties to the original transaction may well be known to each other). While the liability may be contingent, at any time prior to expiration, there remains a risk, and therefore a potential liability, thus driving the value below zero.

An insurance contract may be renewable. In that case, in order to collect the premium, the token holder must reveal him or herself. At that time, the token-holder receives the premium, but also deanonymizes itself and thus would then be subject to a direct claim by the insured if the contingent liability has matured.

Another use case is a simple loan. In this case, the question remains, why would one admit to indebtedness when not compelled? However, there are many instances of voluntary payments or donations, and therefore in such cases, the acceptance of the token may be similar to a charitable pledge. However, in a business context, there is also reputation, as discussed above. Further, there are many advantages to properly accounting for assets and liabilities. For example, income taxes are assessed against net income, which includes deductions for liabilities. money laundering regulations may require proof of source of funds, and thus a determination of where gross assets derive from. Failure to account for and admit such liabilities may incur excess tax liability. Also, distinct from reputation is credit-worthiness. Admission and repayment of debt may substantially increase credit score and availability of credit. One risk is that a great Ponzi scheme will emerge, until a large debt is defaulted. This raises the issue of counterparty risk. The amount of credit extended to a cryptocurrency wallet address may be monitored, to assess the risk. However, this does not address a party that has multiple anonymous/pseudonymous wallets, or a set of colluding parties each with a separate wallet address.

A way to address this is to have a third party credit rating agency assess the credit-worthiness of a party. This information may be available to an oracle, and may be implemented in a way to ensure that the debtor remains pseudonymous. For example, a party presents itself to a credit rating authority, and receives a rating. That rating may be associated with an anonymous/pseudonymous wallet address and e.g., an atomic key, proxy key, or homomorphic encryption technique may be used to transfer the rating to the wallet, without even the rating agency or authority knowing which wallet inherited the rating. While the existence of credibly deniable debt may itself impair credit rating, for ratable entities, the existence of token debt, though anonymous/pseudonymous, may nevertheless be audited by certified public accountants, and thus subject to oversight. Indeed, in one embodiment, the acquisition of debt tokens may be limited to regulated entities which are subject to oversight. Further, while the existence of regulation does not preclude risk of default, an entity may further be audited with respect to its actual defaults, and this fact used by an oracle to further restrict permitted recipients of the debt token.

"Homomorphic encryption" is a form of encryption where a specific algebraic operation performed on the plaintext is equivalent to another (possibly different) algebraic operation performed on the ciphertext. Homomorphic encryption schemes are malleable by design. The homomorphic property of various cryptosystems is used with cloud computing by ensuring the confidentiality of processed data. The "homomorphic" part of a fully homomorphic encryption scheme can also be described in terms of category theory. If C is the category whose objects are integers (i.e., finite streams of data) and whose morphisms are computable functions, then (ideally) a fully homomorphic encryption scheme elevates an encryption function to a function from C to itself.

Proxy key cryptography is a public key proxy encryption system provides a way of converting ciphertext intended for Alice into ciphertext that is decryptable by Bob without modifying the underlying plaintext. The proxy principal authorized to convert the ciphertexts cannot learn the underlying plaintext. A proxy re-encryption is generally used when one party, say Bob, wants to reveal the contents of messages sent to him and encrypted with his public key to a third party, Charlie, without revealing his private key to Charlie. Bob does not want the proxy to be able to read the contents of his messages. Bob could designate a proxy to re-encrypt one of his messages that is to be sent to Charlie. This generates a new key that Charlie can use to decrypt the message. Now if Bob sends Charlie a message that was encrypted under Bob's key, the proxy will alter the message, allowing Charlie to decrypt it. This method allows for a number of applications such as e-mail forwarding, law-enforcement monitoring, and content distribution. See, U.S. Pat. Nos. 9,419,951; 8,904,181; 8,566,247; 8,316,237; 7,869,591; and 7,181,017.

Homomorphic cryptographic algorithms and atomic proxy key cryptography may also be used to provide a remedy for digital wallet key loss. Essentially, an aggrieved party may seek a consensus authorization for execution of an unmasking or wallet contents transfer transaction, without transcending the normal operation of the network (i.e., forcing a fork), or special relief. The transaction, especially for debt coins, is of lower risk to the network, though essentially the same effect to remedy lost tokens may also be applied for positive valued tokens, and indeed for arbitrary information stored on the blockchain. That is, the private key is cryptographically masked and posted to the blockchain. A smart contract is triggered which then releases the "escrowed" information to the requesting and authenticated party, according to business or legal rules that are not themselves critical to this disclosure. The homomorphic or atomic proxy key algorithm permits the extraction of the information privately, while posting the public encrypted form. For example, the authorized requestor provides session keys to the algorithm, which then publicly masks the secret information during smart contract processing and communications, so that only the authorized recipient is privy to the result.

Blaze M. Strauss M (1998) Atomic proxy cryptography. Technical report 98.5.1. AT&T Labs Research, www.research.att.com/library/trs Blaze M. Bleumer G. Strauss M (1998) Divertible protocols and atomic proxy cryptography. In: Nyberg k (ed) Advances in cryptology—EUROCRYPT'98. Lecture notes in computer science, vol 1103. Springer, Berlin, pp 127-141.

Mambo M, Okamoto E (1997) Proxy cryptosystem: delegation of the power to decrypt ciphertexts. IHICE Trans B80-A(1):51-63 search.ieice.org/1997/pdf/a01005 Lpdf Ateniese G, Fu K, Green M, Hohenberger S (2005) Improved proxy re-encryption schemes with applications to secure distributed storage. Network and distributed system security symposium (NDSS) 2005, San Diego, pp 29-13.

Jakobsson M (1999) On quorum controlled asymmetric proxy re-encryption. In: Imai H, Zheng Y (eds) Proceedings of public key cryptography PKC99. Lecture notes in computer science, vol 1560. Springer, Berlin, pp 112-121.

Canetti R, Hohenberger S (2007) Chosen-ciphertext secure, proxy re-encryption. In: Proceedings of computer and communication security ACM-CCSOT. ACM-Press, New York, pp 185-194.

Girard P (2000) Secure personalization using proxy cryptography. In: Quisquater J-J, Schneier B (eds) CARDIS'98. Lecture notes in computer science, vol 1820. Springer, Berlin, pp 326-335.

Encryption technologies, particularly public key encryption systems, seek to share secrets amongst participants to a secure or private communication. Typical public key encryption technologies, presume that a pair of communications partners seek to communicate directly between each other, without the optional or mandatory participation of a third party, and, in fact, are designed specifically to exclude third party monitoring or "man in the middle" attacks. Third parties, however, may offer valuable services to the participants in a communication, but existing protocols for involvement of more than two parties are either inefficient or insecure.

Traditional encryption algorithms rely on use of one or more finite keys which are provided to an algorithm which generates a data string which is apparently random, called pseudorandom, but which can be predicted based on a knowledge of both the algorithm and the key(s), allowing extraction of a superimposed data message. Optimality of an algorithm for a given set of circumstances is based on a number of factors, and therefore many different cryptographic schemes coexist. Essentially, the key should be sufficiently long and stochastic that an extraordinarily long period of time would be necessary to attempt a brute force attack on the algorithm, while only a reasonable amount of time is required to generate keys, encrypt and decrypt messages. In addition, the key should be sufficiently long that observation of pseudorandom (encrypted) datastreams does not permit one to determine the key to the algorithm.

Public Key Encryption is a concept wherein sets of keys are provided. The keys may form a pair, such that a message encrypted with the first key of the pair may be decrypted only by the corresponding second key, but knowledge of one does not impart effective knowledge of the other. One of the keys may be maintained as a secret (private key) and the other published (public key) according to various implementations, to allow use for both secure communications and authentication. Communications may include use of multiple key pairs, to provide bilateral security. The public key pair may be self-generated, and therefore a user need not transmit the private key. It must, however, be stored. The basis for Diffie Hellman and RSA-type public key encryption methods is the large disparity in computational complexity between decrypting the public key created cipher text with the public key encryption private key, which is very rapid and simple to do, and working through the possibilities without the key, which takes a very long time through all known means A typical asymmetric function pair is multiplication and division, with the former being more computationally efficiently implement than the later with a Boolean logic processor. Modern public-key data encryption was originally suggested by Diffie and Hellman. "New Directions In Cryptography." I.E.E.E. Transactions on Information Theory (November 1976) (the disclosure of which is hereby incorporated by reference), and was further developed by Ronald L. Rivest. Adi Shamir, and Leonard M. Adleman: "A Method for Obtaining Digital Signatures and Public-key Cryptosystems." Communications of the ACM 21(2):120-126 (February 1978). See also, U.S. Pat. No. 1,351,982, expressly incorporated herein by reference.

The basic reason for public-key encryption system is to ensure both the security of the information transferred along a data line, and to guarantee the identity of the transmitter and to ensure the inability of a receiver to "forge" a transmission as being one from a subscriber on the data line. Both of these desired results can be accomplished with public-key data encryption without the need to maintain a list of secret keys specific to each subscriber on the data line, and without requiring the periodic physical delivery or the secure electronic transmission of secret keys to the various subscribers on the data line. According to the Diffie Hellman scheme, two hosts can create and share a secret key without ever communicating the key. Each host receives the "Diffie-Hellman parameters". A prime number, 'p' (larger than 2) and "base", 'g', an integer that is smaller than 'p'. The hosts each secretly generate their own private number, called 'x', which is less than 'p−1'. The hosts next generate a respective public key, 'y'. They are created with the function: $y=g^x$ mod p. The two hosts now exchange their respective public keys ('y') and the exchanged numbers are converted into a secret key, 'z' by the following function: $z=y^x$ Mod p. 'z' can now be used as an encryption key in a symmetric encryption scheme. Mathematically, the two hosts should have generated the same value for 'z', since according to mathematical identity theory, $z=(g^x \text{ Mod } p)^{x'} \text{ mod } p=(g^{x'} \text{ Mod } p)^x \text{ Mod } p$.

A method of public-key encryption developed by Rivest, Shamir & Adelman ("RSA"), is based upon the use of two extremely large prime numbers which fulfill the criteria for the "trap-door, one-way permutation." Such a permutation function enables the sender to encrypt the message using a non-secret encryption key, but does not permit an eavesdropper to decrypt the message by crypto-analytic techniques within an acceptably long period of time. This is due to the fact that for a composite number composed of the product of two very large prime numbers, the computational time necessary to factor this composite number is unacceptably long. A brute force attack requires a sequence of putative keys to be tested to determine which, if any, is appropriate. Therefore a brute force attack requires a very large number of iterations. The number of iterations increases geometrically with the key bit size, while the normal decryption generally suffers only an arithmetic-type increase in computational complexity. In the RSA encryption algorithm, the message (represented by a number M) is multiplied by itself (e) times (called "raising (M) to the power (e)"), and the product is then divided by a modulus (n), leaving the remainder as a ciphertext (C): $C=M^e$ mod n. In the decryption operation, a different exponent, (d) is used to convert the ciphertext back into the plain text: $M=C^d$ mod n. The modulus (n) is a composite number, constructed by multiplying two prime numbers (p) and (q), together: n=p*q. The encryption and decryption exponents, (d) and (e), are related to each other and the modulus (n) in the following way: $d=e^{-1}$ mod (p−1) (q−1), or equivalently, d+e=1 mod (p−1) (q−1). The RSA ciphertext is thus represented by the expression $C=M^e$ mod n. The associated decryption function is $M=C^d$ mod n. Therefore, $M=C^d$ mod n=$(M^e$ mod $n)^d$ mod n, indicating that the original message, encrypted with one key, is retrieved as plain text using the other key. To calculate the decryption key, one must know the numbers (p) and (q) (called the factors) used to calculate the modulus (n).

The RSA Algorithm may be divided, then, into three steps: (1) key generation: in which the factors of the modulus (n) (the prime numbers (P) and (q) are chosen and multiplied together to form (n), an encryption exponent (e) is chosen, and the decryption exponent (d) is calculated using (e). (p), and (q). (2) encryption: in which the message (M) is raised to the power (e), and then reduced modulo (n). (3) decryption: in which the ciphertext (C) is raised to the power (d), and then reduced modulo (n).

Micali, U.S. Pat. Nos. 6,026,163 and 5,315,658, teach a number of split key or so-called fair cryptosystems designed to allow a secret key to be distributed to a plurality of trusted entities such that the encrypted message is protected unless the key portions are divulged by all of the trusted entities. Thus, a secret key may be recovered, through cooperation of a plurality of parties. These methods were applied in three particular fields law enforcement, business auctions, and financial transactions. Essentially, the Micali systems provide that the decryption key is split between a number (n) of trusted entities, meeting the following functional criteria: (1) The private key can be reconstructed given knowledge of all n of the pieces held by the plurality of trusted entities: (2) The private key cannot be guessed at all if one only knows less than all (<n−1) of the special pieces and (3) For i−1 , . . . n, the $i^{th}$ special piece can be individually verified to be correct. The special pieces are defined by a simple public algorithm which itself exploits the difficulty in factoring large numbers as a basis for asymmetric security.

Micropayments are often preferred where the amount of the transaction does not justify the costs of complete financial security. In the micropayment scheme, typically a direct communication between creditor and debtor is not required; rather, the transaction produces a result which eventually results in an economic transfer, but which may remain outstanding subsequent to transfer of the underlying goods or services. The theory underlying this micropayment scheme is that the monetary units are small enough such that risks of failure in transaction closure is relatively insignificant for both parties, but that a user gets few chances to default before credit is withdrawn. On the other hand, the transaction costs of non-real time transactions of small monetary units are substantially less than those of secure, unlimited or potentially high value, real time verified transactions, allowing and facilitating such types of commerce. Thus the rights management system may employ applets local to the client system, which communicate with other applets and/or the server and/or a vendor/rights-holder to validate a transaction, at low transactional costs. Often, a micropayment involves a cryptographic function which provides a portable, self-authenticating cryptographic data structure, and may involve asymmetric cryptography. As will be clear from the discussion below, such characteristics may permit micropayments to be integrated as a component of the present invention, or permit aspects of the invention to operate as micropayments. The following U.S. Patents, expressly incorporated herein by reference, define aspects of micropayment, digital certificate, and on-line payment systems: 5,999,919; 5,930,777; 5,857,023; 5,815,657; 5,793,868; 5,717,757; 5,677,955; 5,839,119; 5,915,093; 5,937,391; 5,933,198; 5,903,880; 5,903,651; 5,881.277; 5,960,083; 5,963,921; 5,996,076; 6,016, 181; 6,018,724; 6,035,102; 6,049,786; 6,019,787; 6,058,381; 6,061,418; 5,987,132; 6,057,872; 6,061,665; 1,977,595 5,224,162; 5,237.159; 5,392,353; 5,621,201; 5,623,547; 5,679,910; 5,696,908; 5,751.939; 5,768.385; 5,799,087; 5,812.668; 5,828,810; 5,832.089; 5,850, 416; 5,889,862; 5,889,863; 5,898,151; 5,901.229; 5,920,629; 5,926,518; 5,943,121; 5,949,015; 5,952,638; 5,963,648; 5,978,840; 5,983,208; 5,987,140; 6,002,767; 6,003,765; 6,021,399; 6,026,379; 6,029,150; 6,029,151; 6,047,067; 6,047,887; 6,055,508; 6,065,675; and 6,072,870. See also, Rivest and Shamir, "PayWord and MicroMint: Two Simple Micropayment Schemes" (May 7, 1996); Micro PAYMENT transfer Protocol (MPTP) Version 0.1 (22-Nov.-95) et seq., www.w3.org/pub/WWW/TR/WD-mptp: Common Markup for web Micropayment Systems, www.w3.org/TR/WD-Micropayment-Markup (09-Jun.-99).

A type of cryptographic algorithm is known, called "proxy key cryptography", which provides means for converting a cryptographic transform between a first transform associated with a first set of keys, and a second cryptographic transform associated with a second set of keys, without requiring an intermediate decryption of the information. Therefore, for example, such an algorithm could be used to convert the decryption key of a secret record from an original format to a distribution format. See, U.S. Pat. Nos. 7,181,017; 6,937,726; 6,859,533; 6,779,111; 6,687,822; 6,587,946; 20020073202; See also:

Matt Blaze, Martin Strauss, "Atomic Proxy Cryptography", www.research.att.com, AT&T Labs-Research (Feb. 23, 1998);

Blaze M.; Bleumer G.; Strauss M.; Nyberg Kaisa, "Divertible protocols and atomic proxy cryptography", EUROCRYPT '98: Advances in Cryptology (Espoo, 31 May-4 Jun. 1998) International Conference On The Theory And Application Of Cryptographic Techniques, Espoo, FINLANDE (31/05/1998);

Markus Jakobsson, "On Quorum Controlled Asymmetric Proxy Re-Encryption", and Tatsuaki Okamoto, "Threshold Key-Recovery Systems for RSA";

M. Mambo and E. Okamoto, "Proxy cryptosystems: Delegation of the power to decrypt ciphertexts," IEICE Trans, on Fundamentals, Vol E80-A, No. 1, pp. 54-63 (1997);

Giuseppe Ateniese and Kevin Fu and Matthew Green and Susan Hohenberger, "Improved Proxy Re-Encryption Schemes with Applications to Secure Distributed Storage", Cryptology ePrint Archive, Report 2005/028, Proceedings of NDSS 2005 (journal version to appear in ACM TISSEC) (received 3 Feb. 2005, last revised 11 Jan. 2006). eprint.iacr.org/2005/028.pdf;

Susan Hohenberger, "Advances in Signatures, Encryption, and E-Cash from Bilinear Groups", (Ph.D. Thesis, MIT, May 2006);

Himanshu Khurana, Jin Heo, and Meenal Pant, "From Proxy Encryption Primitives to a Deployable Secure-Mailing-List Solution", To appear in the Eighth International Conference on Information and Communications Security (ICICS '06), Raleigh, NC, December 2006;

J. Basney, P. Flanigan, J. Heo, H. Khurana, J. Muggli, M. Pant, A. Slagell and V. Welch. Mithril: Adaptable Security for Survivability in Collaborative Computing Sites Workshop on Enterprise Network Security, held in conjunction with SecureComm 2006, Baltimore, MD; September, 2006;

Himanshu Khurana, Adam Slagell, and Rafael Bonilla, SELS: A Secure E-mail List Service, Proc. Security Track ACM Symp. Applied Computing (SAC), March 2005;

Himanshu Khurana, Jin Heo, Meenal Pant, "PSELS: Practical Secure Email Lists Services", Securecomm 2006, September 2006, Baltimore, MD;

Himanshu Khurana, SELS: Secure Email List Services, NOSA Private Sector Program Annual Meeting, Urbana, IL, May 2005;

Bao, Feng, and Robert Deng. Public Key Cryptography-PKC 2004; 7th International Workshop on Theory and Practice in Public Key Cryptography, Singapore, Mar. 1-4, 2004. Vol 7. Springer Science & Business Media, 2004.

Anca Ivan, Yevgeniy Dodis, Proxy Cryptography Revisited, Network and Distributed System Security Symposium Conference Proceedings 2003;

Shuhong Wang and Guilin Wang and Feng Bao and Jie Wang, "Cryptanalysis of a Proxy-protected Proxy Signature Scheme Based on Elliptic Curve Cryptosystem", citeseer.ist.psu.edu/wang02cryptanalysis.html In typical proxy key systems, a proxy receives a private key from a sender of an asymmetrically encrypted message, and a public key from a recipient of the transformed encrypted message, and computes a transform key (e.g., a product of p and q in an RSA type PKI algorithm) which is applied to the asymmetrically encrypted message. The application of the transform key allows the recipient to use its private key to decrypt the message. As discussed in U.S. 6,937,726, other types of algorithms and cryptographic schemes may also be applied with similar function. In these architectures, the proxy is provided with the decryption key for the original message, and thus is in a position to delegate its right and authority to decrypt the message to the recipient.

Asymmetric key encryption may be employed to provide the establishment of secure communications channels involving an intermediary, without making the intermediary privy to the decryption key or the message. Thus by transmitting only relatively unprivileged information, such as respective public keys, the information and integrity of the system remains fairly secure. In order to provide a three-party transaction in which the intermediary is a necessary party, the information sought to be transmitted is subjected to a secret comprehension function (e.g., a cryptographic or steganographie function) with the key known only to the intermediary. In establishing the communication channel, the information is transcoded between a first comprehension function and a second comprehension function without ever being publicly available. Modulo arithmetic is both additive and multiplicative, thus, using the same modulo n:

$(A^x \bmod n \cdot A^y \bmod n) \bmod n = A^{x+y} \bmod n;$ $((A) \bmod n + (B) \bmod n) \bmod n = (A+B) \bmod n.$ $((A) \bmod n \cdot (B) \bmod n) \bmod n = (A \cdot B) \bmod n.$ $(A^x \bmod n)^y \bmod n = (A^y \bmod n)^x \bmod n = A^{xy} \bmod n$ An algorithm that permits a blockchain and its associated processing to serve as a reliable, yet untrusted intermediary relies on, e.g., the multiplicative property of modulo arithmetic; in other words, A mod B*C mod B=(A*C) mod B. However, this property is not "reversible", in that knowledge of (A*C) mod B and either A or C does not yield the other, unless the product A*C is less than B, since the modulo function always limits the operand to be less than the modulus value. Thus, it is seen that in an RSA scheme, M=Cd mod n=(Me mod n)d mod n. Therefore, in order to communicate the intermediary private information to the intended recipient, the recipient public key 'e1' and intermediary private key 'd2' are defined using the same modulus n, multiplied, and provided to the sender. At the sender, the ciphertext C2=Me2 Mod n, previously encrypted with the intermediary's public key e2, is subjected to the function: C1=C2d2e1 mod n=Me1 mod n. The recipient may then apply its private key d1 to decrypt the message: M=C1d1 mod n. It should be understood that the algorithm described herein represents merely a portion of an RSA-type public key infrastructure, and that generally all known techniques for preparing the message, maintaining a public key directory, and the like, may be employed in conjunction therewith, to the extent not inconsistent. Thus, the transcoding algorithm should be considered as a generally interchangeable part of the entire cryptographic system, which may be substituted in various known techniques, to achieve the advantages recited herein. In general, only small changes will be necessary to the systems, for example, accommodating the larger composite key length. It is also particularly noted that there are a number of known barriers to exploits that are advantageously employed to improve and maintain the security of the present system and method. Similarly, other transitive functions may also be employed in analogous fashion to build partially homomorphic cryptographic processing, which may be implemented using distributed consensus technologies, such as proof of work, or proof of stake, distributed blockchain transaction processing. Of course, the implementation need not be distributed. See, David Chaum, "Blind Signatures for Untraceable Payments", Proceedings of Crypto 82, August 1982, p. 199-203. According to the Chaum scheme, a server assists a user in decrypting a message without releasing its secret key or gaining access to the encrypted message. The user communicates a symmetric function of the ciphertext to the server, which is then processed with the secret key, and the resulting modified ciphertext returned to the user for application of an inverse to the symmetric function. See, U.S. Pat. No. 6,192, 472.

According to an embodiment of the present invention, a source privy to the communication employs a public key encryption paradigm to require that for comprehension of an encrypted message, at least two keys are required, with all of the predefined keys being required to decrypt the message, and with no apparent relation between the keys making prediction of one key part difficult or impossible based on the corresponding other key part(s) and the ciphertext message. Thus, at least three parties must cooperate to transmit a message, the sender, the recipient, and a third party holding a necessary key part. This results in an ability to audit and log communications without giving access to confidential information to the auditor. This also facilitates economic transactions, since the communication of the missing key information provides an opportunity for a mandatory third party accounting.

The transaction for conveying the information need not occur in real time or near real time, and therefore this technology may maintain a secret for a period of time, and then at a later time, when the required information becomes available, the secrecy is waived. In accordance with the present invention, the identity of the token holder (or original token holder) may be maintained as a cryptographically protected secret, which is revealed in certain circumstances. For example, so long as a debt is not in default, the debtor's identity remains unknown. However, a smart contract may execute based on a proven event of default, to release the identity of the debtor, or original debtor. In practice, this is in part a split key escrow, but with the possibility of chained algorithmic execution to provide layers of encryption.

Using this scheme, the original ciphertext encryption key and recipient private key need never be disclosed, and thus may each be retained for use over an extended period. The session encryption key, however, will vary with each message. It is noted that, since the intermediary holds the decryption key for the record, it may, in exceptional circumstances and in cooperation with the repository, decrypt the plaintext message. Therefore, it is seen that, even if a user fails to comply with the required access rules, desired information is not lost, locked or completely unavailable. Rather, the intermediary (or trustee) may be given the discretion to release the records or to request release of the records during an emergency. The scheme may be employed to securely communicate cryptographic codes between parties to a communication, for example a symmetric encryption key. For example, the Advanced Encryption Standard (AES) employs the Rijndael algorithm, which may provide highly efficient encryption and decryption. Thus, the asymmetric key encryption may be directed principally toward key exchange. According to another embodiment of the invention, an encrypted message (ciphertext) is "transcoded" from a first encryption type to a second encryption type, without ever passing through a state where it exists as a plaintext message. Thus, for example, an intermediary to the transaction who negotiates the transaction, need not be privileged to the information transferred during the transaction. In the case of medical records, therefore, this means that the intermediary need not be "trusted" with respect to this information. A preferred embodiment of the technology provides composite key asymmetric cryptographic algorithms to, among other advantages, avoid revealing a plaintext message during intermediate processing. However, it is also possible to employ symmetric key cryptography, especially since the remote key handler is a privileged environment, and may be provided with sufficient security to abate the risk of message disclosure. Further, in some embodiments, the system risks attendant in releasing both the permanent encryption key along with the ciphertext are insubstantial, and therefore a transcoding or transcription process is not required. These various embodiments are encompassed by the present invention.

The following identities characterize the known RSA algorithm: $C=M^e$ mod n and $M=C^d$ mod n. For the complete transformation, the relationship is as follows: $M=C^d$ mod $n=(M^e)^d$ mod n. According to the present invention, it is desired to transform ciphertext 1 (C1) into ciphertext 2 (C2), in a secure manner without ever revealing the plaintext message during the process. In order to achieve this transformation from C1 to C2, the process is consolidated. Thus, the decryption according to a first decryption key $M=C1^{d1}$ mod n and the reencryption according to a second decryption key $C2=M^{e2}$ mod n are combined into a single transcription operation, $C1^{d1-e2}$ mod $n=$We mod $n=C2$. So long as the factors of d1·e2 remain secret, it is infeasible to factor thus number, and thus this transformation inherits the advantages of the RSA encryption scheme. Thus, the plaintext message remains secure through this transformation. In fact, because the transformation is integral, relatively low security is required for the starting and transformed ciphertext, and the crypto-processor itself. This process also lends itself to three (or more) party transactions, wherein each party is a required participant (maintains secret information necessary for the communication) but only an intended recipient (user) has access to the plaintext message. Accordingly, if a transaction intermediary supplies a transcoding or transcription key to the message repository, comprising at least two secret components (so that the composite key may not be factored), an existing ciphertext may be transformed into a new ciphertext. While the components of the composite transcode key are secret, due to the nature of public key systems, these are insufficient for the intermediary to gain access to the message. The two secret components include a key specific for the user, and a key specific for the existing encryption of the message ciphertext. The resulting transformed ciphertext is therefore a public key encrypted message for the user, which can only be decrypted with the user's private key. In order to maintain the security of the original message against subsequent uses, it is preferred that the user's public key-private key pair be a session key, that is accounted for and used only for the single transmission and subsequently discarded. The "public" portion of the session key pair is transmitted by the user to the intermediary, which is held in secrecy and multiplied by the private key for the existing ciphertext message. In this way, the intermediary has no knowledge of the "private" session key, and cannot itself intercept the communication.

Consider encoding schemes of the following type. An encoding system consists of four components: (i) a message space X which is a collection of possible messages. (ii) a key space k which is a set of possible keys (iii) a computationally efficient encoding transformation E:K·K→X and (iv) a computationally efficient decoding transformation D: K·X→X. For each k & k, the encoding transformation $E_k$:X→X and decoding transformation $D_k$:X→X are injection (one-to-one) mappings on X. and they satisfy that, for every message xɛX, $D_k(E_k(x))=x$. Certainly, such defined encoding schemes can be varied in several ways to cover a wider range of ones. One is to differentiate the space of encoded messages from the one of original messages and another is to consider that keys used for encoding and decoding are different. In terms of cryptography, the encoding schemes considered below are essentially private-key (or, more precisely, symmetric), endomorphic cryptosystems. Such defined encoding schemes have some advantageous properties. Given an encoding scheme (X, K, E, D), each encoding transformation and its corresponding decoding transformation are inverse transformation of each other; that is, for each k∈K. $D_k=(E_k)^{-1}$ and $E_k=(D_k)^{-1}$. If X is a finite set, each encoding or decoding transformation is just a permutation on X.

In a multiplicative scheme M, a message in this scheme is an element in $X=Z_n=\{0, 1, \ldots, n-1\}$ for some integer n>0. A key is also an element a in Z, but satisfying gcd(a, n)=1, where the "gcd" function specifies the greatest common integer divisor of the two arguments. That is, the key space K consists of the elements in the multiplicative group $Z_n^*=\{a\in Z_n \mid \gcd(a, n)=1\}$. The encoding of a message x with a key a is $y=E_a(x)=ax(\text{mod } n)$ and the decoding of a message y with a key a is $x=D_a(y)=a^{-1}y(\text{mod } n)$, where a is the multiplicative inverse of a modulo n; that is, $a^{-1}$ is an element in Z such that $a \cdot a^{-1} \pmod n = a^{-1} \cdot a \pmod n = 1$. Note that the condition on a, gcd(a, n)=1, is used to guarantee that a has the inverse $a^{-1}$. It is known that the number of such as is equal to the value of the Euler phi-function $$\phi(n) = \prod_{i=1}^{m}(p_i^{e_i} - p_i^{e_i-1}),$$

where $$n = \prod_{i=1}^{m} p_i^{e_i}$$

is the prime decomposition of n. So the number of keys in the scheme M is φ(n).

Shift Scheme S. Messages and keys of the shift scheme, are all elements in $Z_n=\{0, 1, \ldots, n-1\}$ for some integer n>0; that is $N=K=Z_n$. Thus, the number of messages and the number of keys in the shift scheme are all equal to n. To encode a message x with a key b, one calculates $y=E_b(x)=x+b(\text{mod } n)$ and to decode a message y with b, one computes $x=D_b(y)=y-b(\text{mod } n)$.

Substitution Scheme P. This scheme is also defined over X=Z However, the key space K=Π, consists of all permutations of elements in $Z_n$. Thus, the total number of keys is n!. For each permutation p∈Π$_n$, the encoding is $y=E_p(x)=p(x)$ while the decoding is $x=D^p(y)=p^{-1}(y)$, where $p^{-1}$ is the inverse permutation of p. It should be noted that the multiplicative and shift schemes are special cases of the substitution scheme which include only φ(n) and n of the n! possible permutations of n elements, respectively.

New encoding schemes can be constructed by combining existing ones. One way is to form their "product." Suppose S and S' are two encoding schemes with the same message space X. The product of S and S', denoted by S·S', has the same message space X. A key of the product scheme has the form (k, k'), where k and k' are keys of S and S', respectively. The encoding and decoding transformations of the product scheme are defined as follows for each key (k·k')∈k, $E_{(k,k')}=E_{k'}(E_k(x))$ and $D_{(k,k')}(x)=D_k(D'_{k'}(c))$. That is the message x is first encoded with $E_k$, and the resulting message is then "re-encoded" with $E_{k'}$. Decoding is similar, but it is done in the reverse order. It is straightforward to check that the product construction is always associative: (S·S')·S"=S·(S"·S"). If an encoding scheme S is taken to form the product with itself, one obtains the scheme S·S, denoted by $S^2$. If the n-fold product is taken, the resulting scheme, denoted by $S^n$, is called an iterated encoding scheme. A simple example to illustrate the definition of product encoding schemes is as follows. Affine Scheme A. This scheme is also defined over $K=Z_n$. A key of the affine scheme is a pair of integers (a, b) in $Z_n$, where gcd(a, n)=1. The encoding transformation is $y=E_{(a,b)}(x)=(ax+b)(\text{mod } n)$ and the decoding transformation is $x=D_{(a,b)}(y)=a^{-1}(y-b)(\text{mod } n)$, where $a^{-1}$ is the modular inverse of a modulo n. These transformations of the type ax+b are usually called affine transformations, hence the name affine scheme. Note that the scheme A reduces to the multiplicative scheme M when b=0 and the shift scheme S when a=1. Thus, M and S are special cases of A. On the other hand, A is their product M·S. As seen before, a key in the multiplicative scheme M is an element a∈$Z^*_n$; the corresponding encoding transformation is $E_a(x)=ax \pmod n$. A key in the shift scheme is an element b∈Z, and the corresponding encoding transformation is $E_b(x)=x+b \pmod n$. Hence, a key in the product scheme M·S has the form (a,b)∈$Z^*_n \cdot Z_n$, and its encoding is $E_{(a,b)}(x)=E_b(E_a(x))=ax+b \pmod n$. This is precisely the definition of the encoding transformation in the affine scheme. Similarly, the decoding transformation in the affine scheme is the composition of the decoding transformations of the shift and multiplicative schemes.

The objective of transferring the right to decode messages in any given encoding scheme (X, K, E, D) can be stated as follows: for any given message x∈X and keys k,k'∈k, convert in some efficient way the encoded message $y=E_k(x)$ using the key k into the encoded message $y'=E_{k'}(x)$ using the key k' so that the new message y' can be decoded correctly using the key k'. If this can be achieved, it is said that the right to decode the message y has been transferred or delegated from the key holder of k to the key holder of k'. In many cases, the key space K of an encoding scheme is not merely a set. Equipped with some operation "*", K may possess some mathematical structure. For instance, the key spaces of all the example schemes given in the previous section can be equipped with some operations to become mathematical groups. Table 1, below, shows some of these operations, where ○ stands for the composition operator of permutations and *: $(Z_n^* \times Z_n)(Z_n^* \times Z_n) \rightarrow Z_n^* \times Z_n$ is defined as (a,b)*(a'*b')=(a'a)(mod n), a'b+b'(mod n)).

When the key space K of an encoding scheme (X, K, E, D) is a group with some operation "*", the encoding and decoding transformations may be uniquely determined by the keys. This happens when the key space K is isomorphic, as a group, to the transformation groups $E=\{E_k | k \in K\}$ and $D=\{D_k | k \in K\}$ formed by the encoding and decoding transformations on the message space X; that is, for any k,k'∈K. $D_k=(E_k)^{-1}=E_{k^{-1}}$ and $E_{k'} \circ E_k = E_{k,k'}$ and $E_k=(D_k)=D^{-1}$ and $D_k \circ D_{k'}=D_{k \cdot k'}$, where ○ is the composition operator of the transformations, which is defined as, for example, $E_{k'} \circ E_k(x)=E_{k'}(E_k(x))$ for all x∈X.

Key-determined encoding schemes permit a systematic way to transfer the right to decode messages from one key holder to another. With the isomorphism between the key space and the transformation groups, the composition of the decoding transformation with one key k and the encoding transformation with another key k' can then be viewed as the encoding transformation determined by the composed key $k^{-1} \cdot k$. Let (X, K, E, D) be a key-determined encoding scheme. Suppose $y=E_k(x)$ is the encoded version of the message x∈X with the key k∈K. The right to decode the encoded message of x can be transferred from the key holder of k to the key holder of k' in a two-step algorithm. First, generate a transfer key $t=k^{-1} \cdot k$. Then encode the message with the transfer key t according to $y'=E_t(y)$. The algorithm is correct thanks to the property of the key space being isomorphic to the encoding and decoding transformation groups. The correctness can be verified as follows:

$$D_k(y')=D_k(E_k(y))=D_k(E_{k^{-1}}\cdot(y)=D_k(E_k(E_k^{-1}(y)))=\\E_k^{-1}(y)=D_k(y)=D_k(E_k(x))=x$$

The generality of the algorithm makes it immediate to derive the transference steps for the example schemes set forth above. For the XOR Scheme X over $B_n$, to convert $y=E_k(x)$ to $y'=E_{k'}(x)$, first generate a transfer key $t=k \oplus k'$. Then encode the message with the transfer key t according to $y'=y \oplus t$. For the Multiplicative Scheme M over $Z^*_n$ to convert $y=E_a(x)$ to $y'=E_a'(x)$, first generate a transfer key $t=a'a^{-1}$ (mod n). Then encode the message with the transfer key t according to $y'=ty$ (mod n). For the Shift Scheme S over $Z_n$, to convert $y=E_b(x)$ to $y'=E_b'(x)$, first generate a transfer key $t=b'-b$ (mod n). Then encode the message with the transfer key t according to $y'=y+t$ (mod n). For the Substitution Scheme P over $\pi_n$, to convert $y=E_p(x)$ to $y'=E_p'(x)$, first generate a transfer key $t=p^{-1} \circ p'$. Then encode the message with the transfer key t according to $y'=t(y)$.

As will be described below, it is also possible to transfer the right to decode in product schemes of not only key-determined encoding but also commuting schemes. In order to define commuting schemes, it is necessary to characterize encoding schemes that are essentially equivalent. Suppose that $S=(X, K, E, D)$ and $S'=(X, K', E', D')$ are two encoding schemes with the same message space X. S is said to be equivalent to S', denoted by $S \equiv S'$, if there is a bijective (one-to-one and onto) mapping $h:k \to K'$ such that for each message $X \varepsilon X$ and for each key $k \varepsilon K$, $$E_k(x)=E_{h(k)}'(x) \text{ and } D_k(x)=D_{h(k)}'(x).$$

Clearly, the scheme equivalence relation $\equiv$ is an equivalence relation; that is, it satisfies that, for any encoding schemes S, S', S", the following hold: (i) $S \equiv S$; (ii) $S \equiv S'$ implies $S' \equiv S$; and (iii) $S \equiv S'$ and $S' \equiv S''$ imply $S \equiv S''$. Thus, equivalent encoding schemes form an equivalence class in that each scheme in the class provides no more and no less functionality than any others in the class. The scheme equivalence relation allows one to characterize encoding schemes in several ways. An encoding scheme S is said to be idempotent if $S^2 \equiv S$. Many of the encoding schemes are idempotent, including the XOR, multiplicative, shift, substitution, and affine schemes. If a scheme S is idempotent, then there is no point in using the product scheme $S^2$, as it requires an extra key but provides no more functionality. Another characterization on encoding schemes using the scheme equivalence relation $\equiv$ is that of commuting schemes. Two encoding schemes S and S' are said to commute if $S \cdot S' \equiv S' \cdot S$. Trivially, any scheme commutes with itself. A not-so-trivial example is that of the multiplicative scheme M and the shift scheme S. To see that they commute, i.e., $M \cdot S \equiv S \cdot M$, one can compare the equations $E_b(E_a(x))=ax+b(\text{mod } n)$ and $E_a(E_b(x))=ax+ab(\text{mod } n)$ and find out that the mapping $h:K_S \times K_M \to K_M \times K_S$ defined by $h(b,a)=(a, a^{-1}b(\text{mod } n))$ makes the product S·M isomorphic to the product M·S. Product schemes of key-determined and commuting encoding schemes enjoy a systematic way of transferring the right to decode messages. Let $S_1 \cdot S_2$ be the product scheme of two key-determined and commuting encoding schemes. Suppose that $h=(h_1, h_2):K_2 \cdot K_1 \to K_1 \cdot K_2$ is the mapping that makes $S_2 \cdot S_1$ isomorphic to $S_1 \cdot S_2$, where $h_1:K_2 K_1 \to K_1$ and $h_2:K_2 K_1 \to K_2$. First, observe that the product scheme is also key-determined; the product key space $K_1 \cdot K_2$ is a group with respect to the operation * defined by $(k_1, k_2)*(k_1', k_2')=(k_1 \cdot h_1(k_2, k_1'), h_2(k_2, k_1') \cdot k_2')$ This is because $$E_{(k_1,k_2)} \circ E_{(k_1',k_2')}=E_{k_1} \circ E_{k_2} \circ E_{k_1'} \circ E_{k_2'}=E_{k_1} \circ E_{h_1(k_2,k_1')} \circ\\E_{h_2(k_2,k_1')} \circ E_{k_2'}=E_{k_1}E_{h_1(k_2,k_1')} \circ E_{h_2(k_2,k_1')}=\\E_{(k_1,k_2)*(k_1',k_2')}$$

Now, the right to decode the encoded message of x can be transferred from the key holder of k to the key holder of another key k' in the two-step algorithm. First, generate a transfer key $t=(h_1(k_2^{-1},k_1^{-1} \cdot k_1'), h_2(k_2^{-1},k_1^{-1} \cdot k') \cdot k_2')$. Then encode the message with the transfer key t according to $y'=E_t(y)$. The correctness of the transference algorithm is verified by the following equality:

$$E_t(y) = \\ E_{h_1(k_2^{-1},k_1^{-1} \cdot k_1')} \circ E_{h_2(k_2^{-1},k_1^{-1} \cdot k_1') \cdot k_2'}(y) = E_{h_1(k_2^{-1},k_1^{-1} \cdot k_1')} \circ E_{h_2(k_2^{-1},k_1^{-1} \cdot k_1')} \circ E_{k_2'}(y) = \\ D_{k_2} \circ D_{k_1} \circ E_{k_1'} \circ E_{k_2'}(y) = E_{k_1'} \circ E_{k_2'}(x) = E_{(k_1',k_2')}(x)$$

where the last entity can be readily decoded using the key $k'=(k_1', k_2')$.

The method is best illustrated with the following example, applying the affine cipher A over $Z_n$. Since A=M·S. and M and S are key-determined, commuting schemes, the method described above applies to the affine scheme. As seen before, it is the mapping $h(b, a)=(a, ab)$ that makes S·M isomorphic to M·S. Thus, $h_1(b, a)=a$ and $h_2(a, b)=ab$ (mod n). The transfer key t from (a, b) to (a', b') can be derived as $$t=(h_1(b^{-1},a^{-1} \cdot a'),h_2(b^{-1},a^{-1} \cdot a') \cdot b')=(a' \cdot a^{-1},\\h_1(b^{-1},a^{-1} \cdot a') \cdot b')=(a'a^{-1},-a'a^{-1}(b+b'))$$

Then, to decode y using a second key (a', b'), first generate a transfer key $t=(a'a^{-1}(\text{mod } n),-a'a^{-1}b+b'(\text{mod } n) \triangleq (t_1,t_2)$. Then encode the message using the transfer key t according to $y'=t_1 y+t_2$ (mod n). The methods presented herein for transferring the right to decode messages are transitive. This means that two sequential transfers from Alice to Bob and then from Bob to Carol are equivalent to a direct transfer from Alice to Carol. It is important to note that, in each of the example schemes, a transfer key is also a key of the scheme. Accordingly, two transfer keys used in the two sequential transfers can be combined to form a transfer key for the direct transfer. Take the affine scheme as an example. Let k=(a, b), k'=(a', b'), and k"=(a", b") be the keys for Alice, Bob, and Carol, respectively. Then the transfer keys are $t=(a'a^{-1}, -a'a^{-1}b+b')$ from Alice to Bob, $t'=(a''a'^{-1},-a''a'^{-1}b'+b'')$ from Bob to Carol, and $t''=(a''a^{-1}, -a''a^{-1}b+b'')$ from Alice to Carol. It is straightforward to verify that the composition of t and t' as keys in the affine scheme yields t":

$$t \cdot t'=(t't_1,t_1't_2+t_2')=(a''a'^{-1})(a'a^{-1}),(a''a'^{-1})(-a'a^{-1}b+\\b')+-a''a'^{-1}b'+b'')=(a''a^{-1},-a''a^{-1}b+b'')=t''$$

In other words, the composition of sequential transfers of the right to decode messages is memory-less; all the intermediate transfers will not be reflected in the overall transfer. It should be noted also that, for the schemes X, M, and S, the transfer key generation step is equivalent to "decoding" k' with k. Thus, the computation needed in the transfer is the same as the one used in the decoding-and-re-encoding method for these schemes. One may think that the new method shows no improvement in this efficiency regard, but it has been found that the transfer key is message-independent and hence needs to be computed only once. When the number of messages m involved in the transfer increases, this feature will cut the computation required by the re-encoding method by half. Moreover, the transfer key t does not leak any useful information on the keys k and k', and a transfer performed according to the methods set forth herein will not reveal the message x. These properties make the proposed method appealing when the security of the message x and the decoding keys k and k' is an issue during a transfer.

The goal of proxy encryption is to delegate the decryption right from one to another in secure and efficient ways. For the discussion that follows, it is convenient to define the roles of parties that may be involved in proxy encryption. The two most important roles are those of grantor and grantee. A grantor is an original key holder of encrypted messages who wants to delegate the decryption right to someone else. A grantee is a key holder designated to perform decryption on behalf of a grantor and thus act as grantor's decryption proxy. In the motivating example in the introduction, Alice is the grantor while Bob is the grantee. Other roles may include an encryptor who is the one that originally encrypts messages for the grantor, and a facilitator who may help to perform some message processing tasks, such as transforming messages encrypted for the grantor into messages encrypted for the grantee. Certainly, it is not necessary that all these roles are played by different parties. For example, a party may play roles of the grantor and facilitator, as in the Mambo and Okamoto schemes discussed below. With these roles in place, a proxy encryption scheme is just a description of how a grantee, possibly with some aid from a facilitator, delegates a grantee the right to decrypt messages originally generated by an encryptor for the grantee. A proxy encryption scheme may consist of four generic steps message encryption, proxy key generation, proxy transformation and message decryption. These steps will be described in further detail below.

1. Message encryption E The encryptor generates an encrypted message using grantor's encryption key and delivers it to the grantor.

2. Proxy generation $\pi$: To delegate the decryption right to the grantee, the grantor generates a proxy key $\pi$ as a commitment token that allows the grantee to decrypt the message encrypted for the grantor.

3. Proxy transformation $\pi$: When necessary, the facilitator performs a proxy transformation $\pi$, possibly using the proxy key $\pi$, to convert the message encrypted for the grantor to a message encrypted for the grantee.

4. Message decryption D: Upon receiving the transformed message and possibly the proxy key $\pi$, the grantee decrypts the message.

Accordingly, it should be observed that the generic scheme above covers the two straightforward solutions to proxy encryption mentioned in the introduction. The re-encryption scheme is a special case where the grantor (Alice) is also the facilitator who actually decrypts the message and then encrypts for the grantee (Bob), and the proxy $\pi$ can be considered as a collection of grantor's decryption key and grantee's encryption key, which is used only by the grantor and not by the grantee. The scheme of passing grantor's decryption key to the grantee is another special case of the generic scheme, where the proxy key is the decryption key and the proxy transformation is the identity transformation. However, not all schemes that can be derived from the generic one above are qualified as proxy encryption schemes Intuitively, a proxy encryption scheme has to satisfy some basic requirements, namely delegation, security, transitivity and performance, as described below. To ensure that, at the end of the message decryption step, the grantee is able to recover the original message correctly, the following equation must hold for any message m: $D(\Pi E(m, e_A), \pi), d_b, \pi) = m$, where $E(m,e)$ is an encryption function of message m under encryption key e, $D(c,d,\pi)$ is a corresponding decryption function of encrypted message e under decryption key d and possibly proxy key $\pi$, $\Pi(e,\pi)$ is the proxy function that converts encrypted message e according to proxy key $\pi$, and $e_a$, $e_b$, $d_a$, and $d_b$ are the encryption and decryption keys of the grantor A and grantee B, respectively.

In addition to the correctness above, the functionality of delegation should be guaranteed. In one form, this means that, after the proxy key is issued and the proxy transformation is completed, the message decryption step should require no private information from the grantor, and it should be carried out solely by the grantee. In another form, this is equivalent to undeniability of the delegation from the grantor; that is, once the proxy key is created and proxy transformation is performed, the grantor should not be able to deny the delegation, without seeking other means such as preventing the grantee from obtaining the proxy key and receiving the transformed message. As a consequence of this functionality, the grantor's decryption key can be destroyed with grantee's decryption key and possibly the proxy key maintaining the ability to decrypt the message.

In essence, a proxy encryption scheme is also an encryption scheme at least from the grantee's point of view. The introduction of proxy keys and transformations must in no way com-promise security and privacy of the encryption. Thus, it should be at least computationally hard for any unauthorized third party to recover the original message and decryption keys of the grantor and grantee from publicly available information. Moreover, forging valid proxy keys by any untrusted party should be very hard. It must be clear, though, that generating the proxy key $\pi$ requires knowledge of at least the decryption key of the grantor; otherwise the underlying encryption system is not secure. Naturally, the proxy relationship should be transitive. After the grantor delegates the decryption right, the grantee should be able to act as a new grantor to delegate the right further to another grantee, by just following the same scheme. Moreover, it should be possible for someone, say the first grantor, to delegate the right directly to a new grantee by combining all intermediate proxy keys into one proxy key and composing all consecutive proxy transformations into one transformation. As the re-encryption scheme is an intuitive, straightforward solution to proxy encryption and it satisfies the above delegation, security and transitivity requirements, any practically useful proxy encryption scheme should have no degradation in computational performance when compared with the re-encryption scheme. Proxy encryption schemes may vary according to their application requirements. They can be categorized according to many aspects. Obvious ones include whether they are public-key or private-key based, and whether their security measures are perfect in the information theoretical sense or rely on intractability of some computational problems. The following aspects are related to the proxy key and transformation. While secrecy of messages and decryption keys has to be enforced, secrecy of proxy keys and proxy transformations may not be a mandatory requirement. A scheme is called public if proxy keys it generates may be published without compromising its security and proxy transformations applied in untrusted environments; otherwise, the scheme is private. In a private scheme, when a proxy key is transferred from the grantor to the facilitator and grantee, care must be taken to protect the proxy key from disclosure. As a result, the proxy transformation which uses the proxy key must be performed in private as well.

In terms of messages, the grantee must be unconditionally trusted by the grantor, since proxy encryption by definition allows the former to decrypt on behalf of the latter. However, the trust model may be different for their private information. A proxy encryption scheme is commutative if the grantor and grantee have to trust each other with regard to their private keys otherwise, it is non-commutative. A commutative example is that the proxy key is such created that either one of the grantor and grantee can obtain other's decryption key from it. Whenever this is the case, the proxy encryption mechanism may be simplified to a key exchange protocol that allows the grantee to use grantor's decryption key to decrypt the encrypted messages directly. Generality. In many cases, the grantor wants to restrict the scope of the delegated decryption right. Often intended restrictions include that the proxy key may only be used by a designated grantee, that the proxy key may only be applicable to a specific message, or that the proxy transformation may only be applied by a specific facilitator. For example, when a proxy encryption scheme is used in some applications like key escrow, it would be ideal that proxy keys are independent of messages they will apply to. But for occasional delegation such as securely specifying inheritance in someone's will, it may be highly desirable that a proxy key can only be restricted to a designated party (e.g., a grandchild), applicable to a specific message (e.g., some portion of the will) and possibly used in the proxy transformation by a particular party (an attorney). When used in the extreme situation where the grantor and grantee are a same person with a same decryption key, a proxy encryption scheme should reduce to a regular encryption scheme, without introducing any complications (such as non-trivial proxy keys and transformations, and the requirement of an extra facilitator).

Encryption schemes based on discrete logarithms are particularly advantageous because of their technical advantages over RSA-type schemes and their natural generalizations to many finite groups such as elliptic curve groups over finite fields. For any natural number n, let $Z_n = \{0.1, \ldots, n-1\}$ denote the ring of integers modulo n, and let $Z^*_n = \{m \varepsilon Z_n | \gcd(m,n)=1\}$ denote the multiplicative group of $Z_n$. Note that, when n is a prime. $Z^*_n = \{1, \ldots, n-1\}$. For a modulo n and a number a that is relatively prime to n, let $a^{-1}$ denote the multiplicative inverse of a modulo n; that is, $a^{-1}$ is the element that satisfies $aa^{-1}=1 \pmod{n}$. An element a of $Z^*_p$ is said to be of order m if the number of its powers modulo n is m. A generator g of $Z^*_n$, if it exists, is an element of order $|Z^*_n|$ (the size of $Z^*_n$); in this case, $Z^*_n$ is a cyclic group. When n is a prime, every element of $Z^*_n$ except 1 is a generator of $Z^*_n$. Let $Z^*_n$ be a cyclic group with a generator g. The discrete logarithm of an element x to the base g, denoted as log.sub.g x, is the unique integer a, $0<a<n-1$, such that $x=g^a \pmod{n}$. The discrete logarithm problem is that, given a prime p, a generator g of $Z^*_p$, and an element $X \varepsilon Z^*_p$, find the integer a. $0<a<p-2$, such that $g^a = x \pmod{p}$.

A very closely related problem is the Diffie-Hellman problem: given a prime p, a generator g of $Z^*_p$, and elements $g^a \pmod p$ and $g^b \pmod p$, find $g^a b \pmod p$. The discrete-logarithm problem is at least as hard as the Diffie-Hellman problem, because any solution to the former problem can be used to solve the latter problem. The ElGamal encryption scheme is a part of a discrete-logarithm based, public-key cryptosystem proposed by ElGamal for both encryption and digital signature. See T. ElGamal, "A public key cryptosystem and a signature scheme based on discrete logarithm," IEEE Trans on Information Theory, Vol. 31, pp. 165-172 (1985). The ElGamal scheme is set up by establishing two public parameters p and g, where p is a prime (typically 512 bits in length), such that p−1 has a large (typically 160 bit) prime factor q (e.g., p=2q+1) and g is a generator in $Z^*_p$. A private key for a user is set by uniformly choosing a random number a $\varepsilon Z^*_p-1$. Its related public key is calculated as $a=g^a \pmod p$. The user publishes a and keeps a secret. To encrypt a message m to be sent to user A with public key a, a random number $k \varepsilon Z^*_p-1$; is uniformly chosen, and a pair of numbers (r,s), together representing the encrypted message to be sent to A, is calculated as follows $r=g^k \pmod p$ and $s=ma^k \pmod p$. To decrypt the message (r,s), the recipient A recovers the message m by calculating $m=s(r^a)^{-1} \pmod p$. Note that the selection of the public parameters is intended to establish equation $g^{p-1} \pmod p = 1$ (Fermat's little theorem). These parameters should be authentically known to all users. They can be chosen, say, by some trusted authority. Also, the way that private key a is chosen ensures that the inverse $a^{-1}$ of a modulo $p^{-1}$ exists and is unique.

Unlike the RSA public-key encryption scheme, the ElGamal scheme is non-deterministic, since the encrypted message also depends on the random number k. Indeed, it is similar in nature to the Diffie-Hellman key exchange protocol; the key established between the sender and receiver for encrypting and decrypting the message m is $g^a k \pmod p$ from $r=g^k \pmod p$ (part of the encrypted message) and $a=g^a \pmod p$ (the public key of A). Nevertheless, the security of the ElGamal encryption scheme relies on the intractability of the discrete logarithm problem and the Diffie-Hellman problem. To date, practice in seeking optimal algorithms for the discrete logarithm problem has not found any efficient (polynomial-time) solution. It is similar to the situation for the integer factorization problem upon which security of the RSA scheme is based. Moreover, it has also been shown that, for some primes p, solving the discrete logarithm problem is at least as hard as solving the factorization problem of a same size. This implies that for those p's the ElGamal scheme is at least as secure as the RSA scheme.

To delegate the decryption right to a grantee B, the grantor A creates a proxy key π by uniformly choosing a random number a' $\varepsilon Z^*_p-1$ and calculating π=aa'(mod(p−1)). Then, A delivers the proxy key π to B in a secure manner (e.g., by encrypting it with B's public key) and keeps the value of a' private. To allow B to decrypt the message, A calculates $r'=r^{a'^{(\wedge-1)}} \pmod p$, where $a'^{-1}$ is the multiplicative inverse of a' modulo p−1. The pair (r', s) is the transformed, encrypted message to be sent to B. Upon receiving the transformed message (r', s) and the proxy key T. B decrypts the message m by calculating $m=s(r'^{\pi})^{-1} \pmod p$. This proxy encryption scheme uses the encryption and decryption components of the ElGamal scheme, except B's private key is replaced by the proxy key π. It is correct because, when using π to decrypt the transformed message (r', s), the following hold $s(r')^{\pi})^{-1} \pmod p = s(r^{aa'a^{-1}})^{-1} \pmod p = mg^{ka}(g^{ka})^{-1} \pmod p = m$ The security of this scheme is evaluated in two aspects. The complexity for anyone, including the grantee B, to discover grantor A's private key a based on all the available information is as same as the one for solving the discrete logarithm problem. The difficulty for anyone, even with the proxy key, to impersonate A to transform the encrypted message (i.e., to generate (r', s) is the same as the one for solving the Diffie-Hellman problem.

This scheme has several very appealing features. First, its security implies that it is hard for B to recover A's private key. In this sense, there is no need for A to trust B, and hence the scheme is non-commutative. Second, the proxy key $\pi$ generated is message-independent. B can use it to decrypt all the messages transformed by A. Third, this scheme satisfies the transitivity requirement. Upon receiving both the proxy key $\pi$ and the transformed message (r', s), the delegated user B can further delegate the proxy to another user C by treating $\pi$ as the private key a and (r', s) as (r, s) and repeating the proxy generation and transformation. Fourth, the scheme requires less computational efforts than the re-encryption scheme. However, implementing proxy encryption in the manner of this scheme has several shortcomings. First, the proxy key contains no information about the delegated grantee B; it is solely derived from grantor A's private key. Moreover, the message decryption performed by B does not need B's private decryption key either. Consequently, the message can be recovered by anyone that gets hold of the proxy key and encrypted message, not necessarily B. Thus, B can ask anyone to decrypt the message by directly passing the proxy information. In many cases, this is not desirable; A should be able to specify the key holder who is to act on A's behalf. Second, the proxy key $\pi$ has to be a secret between A and B and needs to be transmitted from A to B in a secure manner: As a result of $\pi$ containing no information of B and (r', s) being possibly communicated in public, revealing $\pi$ is essentially equal to disclosing the message. Third, the proxy transformation has to be conducted by A. The value a' used in the transformation is a secret to A and it is vital to preventing B from knowing A's decryption key a. In short, the scheme is non-commutative and message-independent, but private and unable to specify the designated grantee.

Blaze and Strauss have described another public-key proxy encryption scheme, which is similar in structure to ElGamal encryption, but with the parameters used differently and the inverse of the secret used to recover the message. Given a message m that needs to be sent to a grantor A with public key a, the message m is encrypted by uniformly choosing a random number $k \varepsilon Z^*_{p-1}$ and calculating a pair of numbers (r, s) representing the encrypted message as follows $r=mg^k \pmod{p}$ and $s=a^k \pmod{p}$. To delegate the decryption right to a grantee B, the grantor A creates a proxy key $\pi$ by obtaining B's private decryption key b and computing $\pi=a^{-1}b \pmod{p-1}$, where $a^{-1}$ is the inverse of the private key a of A modulo p-1. The proxy key $\pi$ can be made public. To use the proxy key $\pi$ to convert a message (r, s) encrypted for A to a message encrypted for B, the facilitator (not necessarily A, since the proxy key $\pi$ is public) computes $s'=s\pi \pmod{p}$. The pair (r, s') represents the transformed encrypted message, which can then be transmitted to B. To decrypt the transformed message, B computes $m=r(s'^{b(\wedge -1)})^{-1} \pmod{p}$, where b is B's private key and $b^{-1}$ is the inverse of b modulo p-1. The scheme is correct, since in the message decryption $s'^{b-1}=g^k \pmod{p}$ and $m=r(g^k)^{-1} \pmod{p}$. The scheme is secure in that the message m and secret keys a and b cannot be recovered from the encrypted messages and public keys. Moreover, publishing the proxy key compromises neither the message m nor the secret keys a and b. More precisely, the problem of recovering m from the public information (a, ß, r, s, $\pi$, s') is as hard as the Diffie-Hellman problem. In contrast to the previous scheme, the last security feature makes it unnecessary to keep the proxy key $\pi$ private. Thus, the grantor A can publicly send $\pi$ to whoever (facilitator) is to perform the proxy transformation, or can simply publish it. Moreover, the scheme does not require any secret from A in order to carry out the proxy transformation, and consequently it allows anyone, trusted or not, to perform the transformation and hence eliminates the necessity of A's, as well as B's presence in the transformation. Also unlike the previous scheme, there is no difference to the user B between decrypting a regular encrypted message and decrypting a proxy transformed message. This elegant feature allows the user B to treat all incoming encrypted messages uniformly. In fact, it is possible for an untrusted facilitator or server to perform the proxy transformation and then forward the message to the user B. In spite of these desirable features, this scheme is commutative; the involved key holders A and B must trust one another bilaterally. B can learn A's secret key a (by multiplying the proxy key by $b^{-1}$). In addition, the proxy key is also message-independent, as it is in the previous scheme, which delegates B the right to decrypt all messages encrypted for A's private key a. Accordingly, this scheme is public and message-independent but commutative.

To understand how to adapt the ElGamal scheme into a proxy encryption scheme, it is helpful to examine some details of the ElGamal scheme. It should be noted that the r component of the encrypted message m is independent of the recipient A's private key a and public key a. As $s=ma^k \pmod{p}=mg^k$ a $\pmod{p}$, a is only used in the s component, and a is implicitly embedded in s's exponent. Thus, it is sufficient for the proxy transformation to convert the message encrypted for A into the message encrypted for B by removing A's private key a from s and replacing it with B's private key b. In order to prevent B from obtaining A's private key a, the function to generate the proxy key must be somehow "one-way." Indeed, this can be achieved with aid of the random number k as follows $\pi=g^{k(b-a)} \pmod{p}$. Consequently, the proxy transformation that completes the message conversion should look like the following: $s'=s\pi \pmod{p}=mg^{ka}g^{k(b-a)} \pmod{p}=mg^{kb} \pmod{p}$. It turns out that the proxy key and transformation satisfy the security requirement and provide desired being-public and non-commutativity features Given a message m that needs to be sent to a grantor A with public key a, the message m is encrypted by uniformly choosing a random number $k \varepsilon Z^*_{p-1}$ and calculating a pair of numbers (r, s) representing the encrypted message as follows $r=g^k \pmod{p}$ and $s=ma^k \pmod{p}$. To delegate the decryption right to a grantee B, grantor A creates a proxy key $\pi$ by obtaining B's authentic decryption key b and calculating $\pi=r^{b-a} \pmod{p}$. The message is transformed from (r, s) to (r, s') by calculating $s'=s\pi \pmod{p}$. The message m is then decrypted by B from (r, s') by computing $m=s'(r^b)^{-1} \pmod{p}$. Clearly, this scheme uses the message encryption and decryption steps of the ElGamal scheme. It is correct as the message m can be recovered from $$s'(r^b)^{-1} \pmod{p} = s\pi(r^b)^{-1} \pmod{p} = mg^{ak}g^{k(b-a)}(g^{kb})^{-1} \pmod{p} = m.$$

A nice feature of this scheme is that, not only do regular and proxy encrypted messages appear no different to the grantee B, but also the scheme coincides with the ElGamal scheme when A and B are the same user with the same key; in this case, the proxy value $\pi$ is equal to 1 and the proxy transformation is the identity transformation. It is easy to see that the scheme is transitive. Upon receiving the proxy transformed message, the grantee B can act like the grantor A to further delegate the decryption right to, say, another grantee C by repeating the proxy generation step with the keys b and e in place of a and b. Also like the commutative scheme, the proxy generation step requires both A's and B's private keys in order to generate the proxy key $\pi$. As an alternative, this step can be carried out by anyone that is trusted by both A and B. As noted above, A's private key is definitely needed, as otherwise anyone can issue a proxy key to recover the message and the underlying encryption scheme is not secure. To establish and communicate B's private key b, many key-exchange protocols such as the Diffie-Hellman key exchange may be used. As shown in further detail below, in some practical applications the requirement of the key b either is not a problem or can be relaxed. But unlike the private and commutative schemes, this scheme does not make it easy for the grantee B to decrypt messages encrypted for A other than the intended one. Clearly, the proxy key TE contains a piece of information that is specific to the encrypted message m, namely, the random number k. In this sense, the proxy scheme is message-dependent. Moreover, the scheme is non-commutative in the sense that it is hard for B to discover A's private key a. This fact, together with the performance of the scheme will be established below. Note that, in the previous scheme, the proxy transformation only changes the s component of the encrypted message. Since s is the part that actually carries the information about the message m, the scheme may not be efficient when m is a very long message. For example, the proxy key generated would be as long as the message and the effort spent in the proxy transformation would be linear with regard to the length of the entire message. This scheme tends to improve this situation. It uses the message encryption step of the commutative scheme in which the message m is shifted from s to r. Its proxy key and transformation now have no direct dependence on the message m. Given a message m that needs to be sent to a grantor A with public key a, the message m is encrypted by uniformly choosing a random number $k \varepsilon Z^*_{p-1}$ and calculating a pair of numbers (r, s) representing the encrypted message as follows $r=mg^k \pmod p$ and $s=a^k \pmod p$. To delegate the decryption right to a grantee B, grantor A creates a proxy key $\pi$ by obtaining B's authentic decryption key b and calculating $\pi=(s^{a^{(-1)}})^b-a \pmod p$, where $a^{-1}$ is the inverse of a modulo p−1. The message is transformed from (r, s) to (r, s') by calculating $s'=s\pi \pmod p$. The message m is then decrypted by B from (r, s') by computing $m=r(s'^{b^{(-1)}})^{-1} \pmod p$, where $b^{-1}$ is the inverse of b modulo p−1. This scheme is correct since $$r(s'^{b^{-1}})^{-1} \pmod p = r((s\pi)^{b^{-1}})^{-1} \pmod p =$$

$$r((s(s^{a^{-1}})^{b-a})^{b^{-1}})^{-1} \pmod p = r((g^{ka}g^{k(b-a)})^{b^{-1}})^{-1} \pmod p =$$

$$r((g^{kb})^{b^{-1}})^{-1} \pmod p = mg^k(g^k)^{-1} \pmod p = m$$

Other properties of this scheme can be verified in the same way as the previous scheme.

Due to their similarity in nature, only the first of the two new schemes is analyzed in this section in regard to its security and non-commutativity. An almost same discussion can be carried out for the second scheme. In addition, though the first scheme (as well as the second scheme) is transitive and its security may involve more than two key holders, the analysis to be given only considers the two-key-holder case; the general case is also similar. For presentation clarity, the phrase "(mod p)" will be omitted in this subsection; its occurrence should be clear from context. Other than the scheme parameters (p, g), the public information available from the scheme includes $a=g^a$, $ß=g^b$, $r=g^k$, $s=mg^{ak}$, $\pi=g^{k(b-a)}$, $s'=mg^{bk}$. For the reasons set forth below, the scheme is computationally secure. It is hard to recover the message m and secret keys a and b from the public information, provided that the Diffie-Hellman and discrete-logarithm problems are hard to solve. Since the proxy key is part of the public information, this implies publishing it compromises neither the message nor the secret keys. A consequence of this is that it is also hard for anyone to forge a valid proxy key in a systematic manner. Beyond that, the scheme is shown to be non-commutative in the sense that even with B's private key, it is still hard to recover A's private key. If the proxy key is indeed generated by a third party trusted by both A and B, this fact implies that it is not necessary for B to trust A either. This is a significant improvement over the commutative scheme. Note that the total number of operations for re-encryption using the ElGamal scheme is twice the number of operations for a single ElGamal encryption and decryption, since the message must first be encrypted, then decrypted, then re-encrypted, then re-decrypted. Moreover, the computation in the second scheme can be optimized by (i) pre-computing the inverses $a^{-1}$ and $b^{-1}$ in the scheme setup step and (ii) multiplying the two exponential components (modulo (p−1)) in the proxy generation step instead of using two exponentiations. The second set of numbers under the second scheme result from this optimization.

For example, the component r of the encrypted message can be generated using any private-key encryption scheme with k=g (mod p) as the secret session key. Accordingly, the message m can be recovered in the message decryption step by its corresponding private-key decryption using the secret session key $K'=s'^{(b^{-1})} \pmod p=K$. In fact, the secret-key encryption scheme used in the scheme is $r=E_K(m)=mK \pmod p$ for encryption and $m=D_K'(r)=rK'^{-1} \pmod p$ for decryption. Another simple example is the encryption scheme based on bit-wise XOR ($\oplus$). In this case, the computation of r and m can be replaced by $r=E_K(m)=m \oplus K$ and $m=D_K(r)=r \oplus K$. Certainly, more sophisticated private-key encryption schemes such as DES and triple-DES can be employed if stronger security is needed. The second observation is that, if the grantor A is the one who encrypts the message m, then A can keep the random number k private and use B's public key $ß=g^b \pmod p$, instead of B's private key b, to generate the proxy key: $\pi=(ßa^{-1})^k \pmod p$, where a is A's private key. This eliminates the requirement for B's private key b (or key exchange between A and B), and implies that B does not have to trust A, either. These two observations lead to a document distribution scheme, which is based on the second proxy encryption scheme discussed above. In the scheme, a private-key encryption scheme is used to encrypt the message just once for all recipients, while a less expedient proxy-key portion is used to encrypt a small amount of information—the session key-customized once for each recipient. A beneficial feature of this scheme is that the encrypted document can be stored in a publicly accessible repository, and the proxy transformation can be performed by the document owner A, the recipient B, or the repository where the document is physically stored, depending upon the needs of real document management and distribution systems. The scheme is set up the same way as a standard ElGamal scheme. In addition, a symmetric, private-key encryption scheme is selected. Its encryption function is $m \rightarrow E_K(m)$ and decryption function is $r \rightarrow D_K(r)$, where K is some private key. To encrypt a document m, owner A first chooses a uniformly random number $k \varepsilon Z^*_{p-1}$ and calculates a session key $k=g^k \pmod p$. The encrypted document (r, s) is then calculated as follows $r=E_K(m)$ and $s=K^a \pmod p$, where a is A's private key. A keeps the pair (s, k) private. Upon request from a recipient B for the encrypted document (r, s), A first obtains B's authentic public key B and retrieves k from the pair (s, k). A then computes $\pi_b = B^k s^{-1} \pmod{p}$, where $s^{-1}$ is the inverse of s modulo p, as the proxy key for B. The document is then transformed by computing $s' = s\pi_b \pmod{p}$; the pair (r, s') represents the transformed document customized for B. To decrypt the customized document (r, s') and retrieve the original document m, B first recovers the session key by calculating $k = S'^{b^{(\wedge-1)}} \pmod{p}$, where $b^{-1}$ is the inverse of b modulo p−1. Then the document itself is decrypted by calculating $m = D_k(r)$.

A file protection scheme may also be provided which uses a smart card to store and update decryption keys. It is again based on the second proxy encryption scheme presented herein. To encrypt a file m, a processor embedded in a smart card chooses a random number $k \epsilon Z^*_{p-1}$, and computes $r = mg^k \pmod{p}$ and $s = (g^k)^a \pmod{p}$, where a is the smart card's private key. The pair (r, s) represents the file m in encrypted form. Whenever necessary or desired, for example every few weeks or after a predetermined number of document accesses, the smart card generates another uniform random number $a' \epsilon Z^*_p - 1$ and computes $s' = (s^{a^{(\wedge-1)}})^{a'} \pmod{p}$, where $a^{-1}$ is the multiplicative inverse of a modulo p−1. The encrypted file (r, s) is then replaced with (r, s'), and the decryption key a is replaced with a new decryption key a'. These steps can be repeated as many times as desired. To recover the message m from its encrypted version (r, s), the processor on the smart card uses the latest decryption key a to compute $m = r^{a^{(\wedge-1)}} \pmod{p}$. Note that the file encryption step can start with any secret key it generates, not necessarily the smart card's private key. To keep encrypted files fresh by updating encryption data with a piece of smart-card-generated information helps to maintain single useful copies of protected files. This, in some sense, provides copy protection as well. Moreover, the non-commutativity of the scheme renders previous copies of the files useless as the corresponding secret information stored in the smart card has been changed (and preferably destroyed).

The Cramer-Shoup public-key cryptosystem is the first practical public-key system to be provably immune to the adaptive chosen ciphertext attack. See R. Cramer and V. Shoup, "A Practical Public key Cryptosystem Provably Secure against Adaptive Chosen Ciphertext Attack," Proceedings of Crypto'98, Springer Verlag LNGS, vol. 1162, pp. 13-25 (1998). The adaptive chosen ciphertext attack assumes that the attacker can obtain decryptions of any chosen ciphertexts other than the target ciphertext. For example, if the target ciphertext for which the plaintext is wanted is c, then the attacker is assumed to have access to a "decryption oracle" which will decrypt any ciphertext except c, including for example c+1, 4c, etc. RSA and ElGamal fall easily to this kind of attack. A different, but equivalent, notion of security against active attacks is called non-malleability; however, known non-malleable systems are not practical. A hash-free version of the Cramer-Shoup cryptosystem, the security of which is based strictly on the Diffie-Hellman decision problem for an arbitrary group is provided. Thereafter, how to delegate the right to decrypt in a Cramer-Shoup scheme will be illustrated in two different situations. The system is set up by choosing G as a group of prime order q, where q is large. The system assumes that cleartext messages are (or can be encoded as) elements of G, and ciphertext messages are elements of $G^4 = G \cdot G \cdot G \cdot G$; that is, a ciphertext message is four times as long as its corresponding plaintext message. A good example of the group G is the subgroup of order q in the multiplicative set $Z^*_p$ for some large prime $p = 2q+1$. In this case, a message m from the set $\{1, \ldots, q\}$ can be "encoded" by squaring it modulo p, resulting in an element in G, and the message m can be recovered from its encoding by computing the unique square root of its encoding modulo p, in the set $\{1, \ldots, q\}$. A key is generated as follows. First, random elements $g_1, g_2 \epsilon G$ are chosen, and random elements $x_1, x_2, y_{11}, y_{12}, y_{21}, y_{22}, y_{31}, y_{32}, z \epsilon Z_q$ are chosen. Next, the group elements $c = g_1^{x_1} g_2^{x_2}$, $d_1 = g_1^{y_{11}} g_2^{y_{12}}$, $d_2 = g_1^{y_{21}} g_2^{y_{22}}$, $d_3 = g_1^{y_{31}} g_2^{y_{32}}$, and $h = g_1^z$ are computed. The public key is then calculated to be $(g_1, g_2, c, d_1, d_2, d_3, h)$ and the private key is calculated to be $(x_1, x_2, y_{11}, y_{12}, y_{21}, y_{22}, y_{31}, y_{32}, z)$. Given a message $m \epsilon G$, the encryption method begins by choosing $r \epsilon Z_q$ at random. Then the ciphertext $(u_1, u_2, e, v)$ is calculated as follows $u_1 = g_1^r$, $u_2 = g_2^r$, $e = h^r m$, and $v = c^r d_1^{u_1 r} d_2^{u_2 r} d_3^{er}$. Given the ciphertext $(u_1, u_2, e, v)$, the corresponding decryption algorithm first tests if $v = u_1^{x_1 + u_1 y_{11} + u_2 y_{21} + e y_{31}} u_2^{x_2 + u_1 y_{12} + u_2 y_{22} + e y_{32}}$. If not, the decryption effort is rejected. Otherwise, the message m is calculated as $m = e/u_1^z$. The correctness of a cryptosystem can be verified by checking that the decryption of an encryption of a message yields the message. In this case, since $u_1 = g_1^r$ and $u = g_2^r$, one has $u_1^{x_1} u_2^{x_2} = g_1^{rx_1} g_2^{rx_2} = c^r$. Likewise, $u_1^{x_1 + u_1 y_{11} + u_2 y_{21} + e y_{31}} u_2^{x_2 + u_1 y_{12} + u_2 y_{22} + e y_{22}} = c^r d_1^{u_2 r} d_2^{u_2 r} d_3^{er}$ and $u_1^z = h^r$. Therefore, for the valid ciphertext, the test performed in the decryption algorithm will pass.

The security of this cryptosystem relies upon the difficulty in solving the Diffie-Hellman decision problem. An algorithm that solves the Diffie-Hellman decision problem is a statistical test that can effectively distinguish the following two distributions: (2) random quadruples $(g_1, g_2, u_1, u_2) \epsilon G^4$, and (b) random quadruples $(g_1, g_2, u_1, u_2) \epsilon G^4$, where $g_1, g_2$, are random and $u_1 = g_1^r$ and $u_2 = g_2^r$ for some random $r \epsilon Z_q$. Related to the Diffie-Hellman decision problem are the Diffie-Hellman problem (given g, $g^x$, and $g^y$, compute $g^{xy}$), and the discrete logarithm problem (given g and $g^x$, compute x). Within polynomial time, the Diffie-Hellman decision problem can be reduced to the Diffie-Hellman problem which in turn can be reduced to the discrete logarithm problem. It is this relationship between the three problems that leads to the possibility of delegating the right to decrypt for the Cramer-Shoup system.

Assume that someone wants to delegate the right to decrypt from a delegator (Alice, A) to a delegatee (Bob, B). Suppose that Alice has the public key $(g_1, g_2, c, d_1, d_2, d_3, h)$ and the private key $(x_1, x_2, y_{11}, y_{12}, y_{21}, y_{22}, y_{31}, y_{32}, z)$, and that Bob has the public key $(g'_1, g'_2, c', d'_1, d'_2, d'_3, h')$ and the private key $(x'_1, x'_2, y'_{11}, y'_{12}, y'_{21}, y'_{22}, y'_{31}, y'_{32}, z')$. Recall, that for a given plaintext message $m \epsilon G$, the ciphertext message for delegator A is $M = (u_1, u_2, e, v)$, where $u_1 = g_1^r$, $u_2 = g_2^r$, $e = h^r m$, and $v = c^r d_1^{u_1 r} d_2^{u_2 r} d_3^e r$. Similarly, if the message m is directly encrypted for the delegatee B, the ciphertext message is $M' = (u'_1, u'_2, e', v')$, where $u'_1 = g'_1^{r'}$, $u'_2 = g'_2^{r'}$, $e' = h'^{r'} m$, and $v' = c'^{r'} d'_1^{u'_1 r'} d'_2^{u'_2 r'} d'_3^{e' r'}$, where r' is also a random number from $Z_q$. Note further that $v = (cd_1^{u_1} d_2^{u_2} d_3^e)^r$ and $v' = (c'd'_1^{u'_1} d'_2^{u'_2} d'_3^{e'})^{r'}$. To delegate the right to decrypt from A to B involves generating a transfer key π, using that transfer key to transform M into M. In the following, it is assumed that the components $g'_1, g'_2$ of B's public key are identical to the components $g_1, g_2$ of A's public key (analogously to the ElGamal system parameters described above). Also, it is assumed that the random number r' is the same as r. Under these two assumptions, elements $u'_1, u'_2$ of B's ciphertext message are the same as elements $u_1, u_2$ of A's ciphertext message.

A system may be set up by choosing G as a group of prime order q, where q is large. Then, as above, key is generated as follows. First, random elements $g_1, g_2 \varepsilon G$ are chosen, and random elements $x_1$, $x_2$, $y_{11}$, $y_{12}$, $y_{21}$, $y_{22}$, $y_{31}$, $y_{32}$, $z \varepsilon Z$ are chosen. Next, the group elements $c = g_1^{x_1} g_2^{x_2}$, $d_1 = g_1^{y_{11}} g_2^{y_{12}}$, $d_2 = g_1^{y_{21}} g_2^{y_{22}}$, $d_3 = g_1^{y_{31}} g_2^{y_{32}}$, and $h = g_1^z$ are computed. The public key is then calculated to be $(g_1, g_2, c, d_1, d_2, d_3, h)$ and the private key is calculated to be $(x_1, x_2, y_{11}, y_{12}, y_{21}, y_{22}, y_{31}, y_{32}, z)$. Given a message $m \varepsilon G$, the encryption method begins by choosing $r \varepsilon Z$ at random. Then the ciphertext $(u_1, u_2, e, v)$ is calculated as follows $u_1 = g_1^r$, $u_2 = g_2^r$, $e = h^r m$ and $v = c^r d_1^{u_1 r} d_2^{u_2 r} d_3^{e r}$ If B's private key is available for generating the transfer key Tt, that key is obtained and then scan be calculated as follows $\pi = (\varepsilon, \theta, \delta_1, \delta_2, \delta_3)$ where $$\varepsilon = e'/e = g_1^{(z'-z)r} = u_1^{z'-z}$$

$$\theta = C''/c^r = g_1^{(x_1'-x_1)r} g_2^{(x_2'-x_2)r} = u_1^{x_1'-x_1} u_2^{x_2'-x_2}$$

$$\delta_1 = d_1^r/d_1^r = u_1^{y_{11}'-y_{11}} u_2^{y_{12}'-y_{12}}$$

$$\delta_2 = d_2^r/d_2^r = u_1^{y_{21}'-y_{21}} u_2^{y_{22}'-y_{22}}$$

$$\delta_3 = d_3^{er}/d_3^{er} = u_1^{y_{31}' e - y_{31}} u_2^{y_{32}' e - y_{32}}$$

The ciphertext transformation is then $u_1' = u_1$, $u_2' = u_2$, $e' = e\varepsilon$, and $v' = v \theta \delta_1^{u'_1} \delta_2^{u'_2} \delta_3^{e'}$. This transforms the ciphertext $(u_1, u_2, e, v)$ into $(u_1, u_2, e', v')$. The recipient/delegatee is then able to decrypt the transformed cyphertext $(u_1, u_2, e', v')$. As above, the decryption algorithm first tests if $v' = u_1'^{x_1+u'_1 \ y_{11}+u'_2 y_{21}'+e'y_{31}} u_2'^{x_2+u'_1 y_{12}'+u'_2 y_{22}'+e'y_{32}}$. If not, the decryption effort is rejected. Otherwise, the message m is calculated as $m = e'/u'_1{}^{z'}$. In the case where only the public key of the delegatee B can be used for delegating the right to decrypt the message from the delegator A to B, one needs to save and use the random number r used initially in encrypting the message for A. This may be a problem where the party to generate the transfer key is not A, and may not be a problem if the party is in fact, A. In any case, if it is available, the transfer key $\pi$ can be generated using B's public key as follows: $\pi = (\varepsilon, \theta, \delta_1, \delta_2, \delta_3)$ where $$\varepsilon = e'/e = (g_1^{z'}/g_1^z)^r = (h'/h)^r \theta = c''/c^r = (c'/c)^r$$

$$\delta_1 = d_1^r/d_1^r = (d_1'/d_1)^r \quad \delta_2 = d_2^r/d_2^r = (d_2'/d_2)^r \quad \delta_3 = d_3^{er}/d_3^{er} = (d_3'^e/d_3)^r$$

The proxy transformation is then $u_1' = u_1$, $u_2' = u_2$, $e' = e\varepsilon$, and $v' = v \theta \delta_1^{u'_1} \delta_2^{u'_2} \delta_3^{e'}$. It is straightforward to verify, in either case, that the delegatee B can use his own private key to decrypt the ciphertext $(u'_1, u'_2, e', v')$ transformed by the methods set forth above. Since the mechanisms used herein on the Cramer-Shoup cryptosystem are the same as those used above on ElGamal-like cryptosystems, they are public and non-commutative, assuming the Diffie-Hellman problem and the discrete logarithm problem are difficult to solve.

US 20200387893, 20190013913 and WO201612082612, incorporated herein by reference, management of commitments and beneficiaries on a blockchain. They seek to enable a decentralized identification that meets the requirements of implementing "smart contract" type executable commitments [en.wikipedia.org/wiki/Smart_contract], now used in consensus protocols, particularly in a permissionless environment where anyone can join and leave dynamically, and where there is no prior knowledge of the consensus nodes, usually supported by computational puzzles [Dwork & Naor, 1992: www.hashcash.org/papers/pvp.pdf: Back, 2002: www.hashcash.org/papers/hashcash.pdf] to counter "sybil attacks" and with the theory that a major part of the calculation power is held by honest participants [Nakamoto, 2008: bitcoin.org/bitcoin.pdf]. The state of the art as regards smart contracts is mainly represented by the Ethereum system [github.com/ethereum/wiki/wiki/White-Paper]. A transactional system is proposed with peer-to-peer architecture, implementing unit of account transfer transactions between unit emitter nodes and unit receiver nodes, each incoming transaction having an input referring to an output of a previous transaction (or several inputs each referring to an output of a previous transaction) and itself having at least one new output specifying a number of units of account and a receiver node, each transaction capable of being validated in response to a broadcast, by insertion, in a blockchain stored in a distributed manner between at least some nodes, of at least one signature of the transaction, at least some nodes also being capable of exchanging units of account by transactions without compulsory broadcast via payment channels between nodes, each node having a channel (Ch (i,j) with another node possessing a ceiling (C(i,j) of units of account transferable through this channel without the need to broadcast, and a transfer of units of account between two nodes the transfer being capable of being performed via a node chain having in pairs a payment channel, characterized in that the nodes have connection weights (W(i,j)) with respect to other nodes, representative of a degree of trust or proximity between the nodes or users associated with the nodes, and in that it comprises means of adjustment of the unit of account ceiling of a given node on a given channel based on a connection weight of said node with respect to the node with which it possesses said given channel.

According to the present technology, a special purpose cryptographic processing hardware module is provided, that is used to chain authentication based on primitives existing in, and/or executable on the hardware module. The module provides persistently stored, electrically erasable, non-interrogable storage of at least one cryptographic key. Because the eraseability and no-interrogability may make the bit error rate high, error correction and detection is implemented to an arbitrary high standard, e.g., no likely net errors in 10-100 years of normal use, e.g., 10 years 25 years, and 50 years. Indeed, the cryptographic functionality key may be dependent on weak bits or error likelihood as a result of stochastic manufacturing variations, with the electronically stored information interactive with functional variations in a particular module with respect to other modules. For example, a plurality of ring oscillators are implemented with a readout circuit responsive to variations between the oscillators. An electrically programmable memory layer stores empirical calibration data, which will be non-deterministic, and therefore truly random. A sufficient number of oscillators and calibration precision are provided to achieve a set of calibration data with a high net entropy, e.g., equivalent of 2048 or 4096 bits of uncorrelated data. An internal low drift crystal may also be provided as a timing, though self-reference of timing may alleviate need for a precision internal or external timebase. The output of the device is dependent on (a) stored information supplied externally: (b) internal stored calibration information; and (c) the oscillators which vary stochastically as a result of manufacturing tolerances. The oscillators may vary based on voltage and temperature, for example, and are compensated for these effects. The module may also be affected by cosmic radiation or X-ray exposure, and these effects may be residual; the module is intended to fail when subjected to various types of reverse engineering, and therefore residual fragility is a virtue in that regard. Because the module is fragile, the risk of loss of information is finite and non-infinitesimal. Therefore, a backup method is provided. Essentially, the function of the module is replicated virtually based on information in a blockchain or other distributed execution environment. Because a blockchain has discrete time execution and latency between blocks the recovery algorithm implemented as a smart contract on a blockchain may be computationally infeasible for an attacker. Further, a finite recovery cost may be charged in the smart contract, which is asymmetric based on information known to the authentic user versus an attacker, representing a real cost asymmetry in recovery. Thus, a smart contract may be implemented that chains results between successive execution in different blocks and dependent on information in, or accessible, to the different blocks of the blockchain. If blocks are processed every 10 minutes, and a fee of e.g., $1 in cryptocurrency is charged for each execution, and based on information provided by an authentic user, the recovery takes 100 executions (1000 minutes, ~17 hours), while for a non-authentic user without the information, takes >1,000,000 times longer (>~17,000 hours >$50,000.000), the asymmetry may make the process infeasible, especially where the attempts are visible to observers. A rule may be implemented to cease execution of recovery attempts where the probability that the recovery attempt is unauthorized is >99.9%.

According to another embodiment, the distributed ledger processing system is an permissioned system, wherein each authorized user platform has a trusted platform module (TPM), and as a distributed network stores the private information. The smart contracts execute on the authorized user platforms, and therefore may employ interaction between the TPM and smart contract processing to secure information while using that information.

According to another variant, fully or partially homomorphic cryptographic algorithms (which may be implemented within a customized TPM, or perhaps as a software executable algorithm), depending in security risks and breach risk tolerance. Advantageously, the input information is engineered to be efficiently processed using a homomorphic algorithm. en.wikipedia.org/wiki/Homomorphic_encryption. Homomorphic encryption is a form of encryption allowing one to perform calculations on encrypted data without decrypting it first. The result of the computation is in an encrypted form, when decrypted the output is the same as if the operations had been performed on the unencrypted data. Homomorphic encryption can be used for privacy-preserving outsourced storage and computation. Homomorphic encryption is a form of encryption with an additional evaluation capability for computing over encrypted data without access to the secret key. The result of such a computation remains encrypted. Homomorphic encryption can be viewed as an extension of either symmetric-key or public-key cryptography. Homomorphic refers to homomorphism in algebra: the encryption and decryption functions can be thought of as homomorphisms between plaintext and ciphertext spaces. en.wikipedia.org/wiki/Homomorphism Homomorphic encryption includes multiple types of encryption schemes that can perform different classes of computations over encrypted data. Some common types of homomorphic encryption are partially homomorphic, somewhat homomorphic, leveled fully homomorphic, and fully homomorphic encryption. The computations are represented as either Boolean or arithmetic circuits. Partially homomorphic encryption encompasses schemes that support the evaluation of circuits consisting of only one type of gate, e.g., addition or multiplication. Somewhat homomorphic encryption schemes can evaluate two types of gates, but only for a subset of circuits. Leveled fully homomorphic encryption supports the evaluation of arbitrary circuits of bounded (pre-determined) depth. Fully homomorphic encryption (FHE) allows the evaluation of arbitrary circuits of unbounded depth, and is the strongest notion of homomorphic encryption. For the majority of homomorphic encryption schemes, the multiplicative depth of circuits is the main practical limitation in performing computations over encrypted data. Homomorphic encryption schemes are inherently malleable. In terms of malleability, homomorphic encryption schemes have weaker security properties than non-homomorphic schemes. However, the security level is arbitrary and may be high, up to the limit of feasibility. Various schemes include: RSA cryptosystem (unbounded number of modular multiplications); ElGamal cryptosystem (unbounded number of modular multiplications); Goldwasser-Micali cryptosystem (unbounded number of exclusive or operations); Benaloh cryptosystem (unbounded number of modular additions): Paillier cryptosystem (unbounded number of modular additions); Sander-Young-Yung system (after more than 20 years solved the problem for logarithmic depth circuits); and Boneh-Goh-Nissim cryptosystem (unlimited number of addition operations but at most one multiplication); Ishai-Paskin cryptosystem (polynomial-size branching programs).

Craig Gentry, using lattice-based cryptography, described the first plausible construction for a fully homomorphic encryption scheme. Gentry's scheme supports both addition and multiplication operations on ciphertexts, from which it is possible to construct circuits for performing arbitrary computation. The construction starts from a somewhat homomorphic encryption scheme, which is limited to evaluating low-degree polynomials over encrypted data. Gentry based the security of his scheme on the assumed hardness of two problems certain worst-case problems over ideal lattices and the sparse (or low-weight) subset sum problem. Marten van Dijk, Craig Gentry, Shai Halevi and Vinod Vaikuntanathan presented a second fully homomorphic encryption scheme, which uses many of the tools of Gentry's construction, but which does not require ideal lattices. Instead, they show that the somewhat homomorphic component of Gentry's ideal lattice-based scheme can be replaced with a very simple somewhat homomorphic scheme that uses integers. The scheme is therefore conceptually simpler than Gentry's ideal lattice scheme, but has similar properties with regards to homomorphic operations and efficiency. Newer homomorphic cryptosystems include: The Brakerski-Gentry-Vaikuntanathan (BGV, 2011) scheme, building on techniques of Brakerski-Vaikuntanathan: The NTRU-based scheme by Lopez-Alt, Tromer, and Vaikuntanathan (LTV, 2012); The Brakerski/Fan-Vercauteren (BFV, 2012) scheme, building on Brakerski's scale-invariant cryptosystem; and The NTRU-based scheme by Bos, Lauter, Loftus and Nachrig (BLLN, 2013), building on LTV and Brakerski's scale-invariant cryptosystem. The security of most of these schemes is based on the hardness of the (Ring) Learning With Errors (RLWE) problem, except for the LTV and BLIN schemes that rely on an overstretched variant of the NTRU computational problem. This NTRU variant was subsequently shown vulnerable to subfield lattice attacks, which is why these two schemes are no longer used in practice. All the second-generation cryptosystems still follow the basic blueprint of Gentry's original construction, namely they first construct a somewhat homomorphic cryptosystem and then convert it to a fully homomorphic cryptosystem using bootstrapping. Craig Gentry, Amit Sahai, and Brent Waters (GSW) proposed a new technique for building FHE schemes that avoids an expensive "relinearization" step in homomorphic multiplication. Zvika Brakerski and Vinod Vaikuntanathan observed that for certain types of circuits, the GSW cryptosystem features an even slower growth rate of noise, and hence better efficiency and stronger security. Jacob Alperin-Sheriff and Chris Peikert then described a very efficient bootstrapping technique based on this observation. These techniques were further improved to develop efficient ring variants of the GSW cryptosystem: FHEW (2014) and TFHE (2016). The FHEW scheme was the first to show that by refreshing the ciphertexts after every single operation, it is possible to reduce the bootstrapping time to a fraction of a second. FHEW introduced a new method to compute Boolean gates on encrypted data that greatly simplifies bootstrapping, and implemented a variant of the bootstrapping procedure. The efficiency of FHEW was further improved by the TFHE scheme, which implements a ring variant of the bootstrapping procedure using a method similar to the one in FHEW. The CKKS scheme supports efficient rounding operations in encrypted state. The rounding operation controls noise increase in encrypted multiplication, which reduces the number of bootstrapping in a circuit.

If the RSA public key has modulus n and encryption exponent e, then the encryption of a message m is given by $\varepsilon(m) = m^e \bmod n$. The homomorphic property is then $$\varepsilon(m_1) \cdot \Sigma(m_2) = m_1^e m_2^e \bmod n = (m_1 m_2)^e \bmod n = \varepsilon(m_1 \cdot m_2)$$

In the ElGamal cryptosystem, in a cyclic group G of order q with generator g, if the public key is (G, q, g, h), where $h = g^x$, and x is the secret key, then the encryption of a message m is $\varepsilon(m) = (g^r, m \cdot h^r)$ for some random $r \varepsilon \{0, \ldots, q-1\}$. The homomorphic property is then $$\varepsilon(m_1) \cdot E(m_2) = (g^{r_1}, m_1 \cdot h^{r_1})(g^{r_2}, m_2 \cdot h^{r_2}) = (g^{r_1+r_2}, (m_1 \cdot m_2) h^{r_1+r_2}) = \varepsilon(m_1 \cdot m_2).$$

In the Goldwasser-Micali cryptosystem, if the public key is the modulus n and quadratic non-residue x, then the encryption of a bit b is $\varepsilon(b) = x^b r^2 \bmod n$, for some random $r \in \{0, \ldots, n-1\}$. The homomorphic property is then $\varepsilon(b_1) \cdot E(b_2) = x^{b_1} r_1^2 x^{b_2} r_2^2 \bmod n = x^{b_1+b_2}(r_1 r_2)^2 \bmod n = \varepsilon(b_1 \oplus b_2)$, where $\oplus$ denotes addition modulo 2, (i.e. exclusive-or).

In the Benaloh cryptosystem, if the public key is the modulus n and the base g with a blocksize of c, then the encryption of a message m is $\varepsilon(m) = g^m r^c \bmod n$, for some random $r \varepsilon \{0, \ldots, n-1\}$. The homomorphic property is then $\varepsilon(m_1) \cdot \varepsilon(m_2) = (g^{m_1} r_1^c)(g^{m_2} r_2^c) \bmod n = g^{m_1+m_2}(r_1 r_2)^c \bmod n = \varepsilon(m_1 + m_2)$.

In the Paillier cryptosystem, if the public key is the modulus n and the base g, then the encryption of a message m is $\varepsilon(m) = g^m r^n \bmod n^2$, for some random $r \varepsilon \{0, \ldots, n-1\}$. The homomorphic property is then $$\varepsilon(m_1) \cdot \varepsilon(m_2) = (g^{m_1} r_1^n)(g^{m_2} r_2^n) \bmod n^2 = g^{m_1+m_2}(r_1 r_2)^n \bmod n^2 = \varepsilon(m_1 + m_2).$$

A cryptosystem that supports arbitrary computation on ciphertexts is known as fully homomorphic encryption (FHE). Such a scheme enables the construction of programs for any desirable functionality, which can be run on encrypted inputs to produce an encryption of the result. Since such a program need never decrypt its inputs, it can be run by an untrusted party without revealing its inputs and internal state. Fully homomorphic cryptosystems have great practical implications in the outsourcing of private computations, for instance, in the context of cloud computing.

There are several open-source implementations of second- and third-generation fully homomorphic encryption schemes. Second-generation FHE scheme implementations typically operate in the leveled FHE mode (though bootstrapping is still available in some libraries) and support efficient SIMD-like packing of data; they are typically used to compute on encrypted integers or real/complex numbers. Third-generation FHE scheme implementations often bootstrap after each Boolean gate operation but have limited support for packing and efficient arithmetic computations; they are typically used to compute Boolean circuits over encrypted bits. The choice of using a second-generation vs. third-generation scheme depends on the input data types and the desired computation. A community standard for homomorphic encryption is maintained by the HomomorphicEncryption.org group, an open industry/government/academia consortium co-founded in 2017 by Microsoft, IBM and Duality Technologies. The current standard document includes specifications of secure parameters for RLWE.

A. Lopez-Alt, E. Tromer, and V. Vaikuntanathan. On-the-Fly Multiparty Computation on the Cloud via Multikey Fully Homomorphic Encryption. In STOC 2012 (ACM)

Adriana Lopez-Alt, Eran Tromer and Vinod Vaikuntanathan, Multikey Fully Homomorphic Encryption and On-the-Fly Multiparty Computation, eprint.iacr.org/2013/094

Alan Turing Institute, London, UK (2019-11-01). "SHEEP, a Homomorphic Encryption Evaluation Platform".

Armknecht, Frederik; Boyd, Colin; Gjosteen, Kristian; Jäschke, Angela; Reuter, Christian; Strand, Martin (2015). "A Guide to Fully Homomorphic Encryption".

Bootstrapping for HELib, eprint.iacr.org/2014/873

C Gentry, A. Sahai, and B. Waters Homomorphic Encryption from Learning with Errors Conceptually-Simpler, Asymptotically-Faster, Attribute-Based. In CRYPTO 2013 (Springer)

Cheon, J. H.; Jeong, J; Lee, C (2016). "An algorithm for NTRU problems and cryptanalysis of the GGH multilinear map without a low-level encoding of zero". LMS Journal of Computation and Mathematics 19 (1): 255-266. doi:10.1112/S1461157016000371.

Cheon, Jung Hee; Kim, Andrey; Kim, Miran; Song, Yongsoo (2017). "Homomorphic encryption for arithmetic of approximate numbers". Takagi T., Peyrin T. (eds) Advances in Cryptology—Asiacrypt 2017. Springer, Cham. pp. 109-437. doi:10.1007/978-3-319-706948_15.

Chris Peikert and Sina Shiehian, Multi-key FHE from LWE. Revisited, eprint.iacr.org/2016/19%

Coron, Jean-Sébastien; Lepoint, Tancrede; Tibouchi, Mehdi (2013). "Batch Fully Homomorphic Encryption over the Integers". Eurocrypt 2013.

Coron, Jean-Sébastien; Lepoint, Tancrede; Tibouchi, Mehdi (2014). "Scale-Invariant Fully Homomorphic Encryption over the Integers". PKC Coron, Jean-Sebastien; Mandal, Avradip; Naccache, David: Tibouchi, Mehdi (2011). "Fully Homomorphic Encryption over the Integers with Shorter Public Keys". Crypto 2011. Lecture Notes in Computer Science. 6841: 487-504. doi:10.1007/978-3-642-22792-9_28. ISBN 978-3-612-22791-2.

Coron, Jean-Sébastien; Naccache, David; Tibouchi, Mehdi (2011). "Public Key Compression and Modulus Switching for Fully Homomorphic Encryption over the Integers". Eurocrypt 2012.

Craig Gentry, S. Halevi, and N. P. Smart. Better Bootstrapping in Fully Homomorphic Encryption. In PKC 2012 (Springer)

Craig Gentry, A fully homomorphic encryption scheme, crypto.stanford.edu/craig/craig-thesis.pdf Craig Gentry, Amit Sahai and Brent Waters, Homomorphic Encryption from Learning with Errors Conceptually-Simpler, Asymptotically-Faster, Attribute-Based, eprint.iacr.org/2013/310

Craig Gentry, Computing Arbitrary Functions of Encrypted Data, Communications of the ACM Craig Gentry, Shai Halevi and Nigel Smart, Fully Homomorphic Encryption with Polylog Overhead. In EUROCRYPT 2012 (Springer) eprint.iacr.org/2011/566

Craig Gentry, Shai Halevi and Nigel Smart, Homomorphic Evaluation of the AES Circuit, CRYPTO 2012 (Springer) eprint.iacr.org/2012/099

Craig Gentry, Shai Halevi and Vinod Vaikuntanathan, A Simple BGN-Type Cryptosystem from LWE, eprint.iacr.org/2010/182

Craig Gentry, Shai Halevi and Vinod Vaikuntanathan, i-Hop Homomorphic Encryption and Rerandomizable Yao Circuits, eprint.iacr.org/2010/145

Craig Gentry, Shai Halevi, Chris Peikert and Nigel P. Smart, Field Switching in BGV-Style Homomorphic Encryption, eprint.iacr.org/2012/240

Craig Gentry, Toward basing fully homomorphic encryption on worst-case hardness, www.iacr.org/archive/crypto2010/62230116/62230116.pdf Craig Gentry. "A Fully Homomorphic Encryption Scheme (Ph.D. thesis)".

Craig Gentry. Fully Homomorphic Encryption Using Ideal Lattices. In the 41st ACM Symposium on Theory of Computing (STOC), 2009.

Craig Gentry; Halevi, Shai (2010). "Implementing Gentry's fully-homomorphic encryption scheme". Eurocrypt 2011.

Crypto Experts. "PV-NFLlib".

Dan Boneh, Eu Jin Goh and Kobbi Nissim, Evaluating 2-DNF Formulas on Ciphertexts, In Theory of Cryptography Conference, 2005, crypto.stanford.edu/~dabo/abstracts/2dnf.html Daniele Micciancio (2010-03-01). "A First Glimpse of Cryptography's Holy Grail". Association for Computing Machinery. p. 96.

Daniele Micciancio, SWIFFT, github.com/micciancio/SWIFFT

David Wu and Jacob Haven, Using Homomorphic Encryption for Large-Scale Statistical Analysis, crypto.stanford.edu/people/dwu4/papers/FHE-SI_Report.pdf EPFL-LDS. "Lattigo v1.3.0".

Fan, Junfeng; Vercauteren, Frederik (2012). "Somewhat Practical Fully Homomorphic Encryption".

Florian Bourse, Rafael Del Pino, Michele Minelli and Hoeteck Wee, FHE Circuit Privacy Almost for Free, eprint.iacr.org/2016/381

Guilhem Castagnos and Fabien Laguillaumie (2015). "Linearly Homomorphic Encryption from DDH" (PDF).

Hao Chen, Kim Laine and Rachel Player (Microsoft Research), SEAL: Simple Encrypted Arithmetic Library, www.microsoft.com/en-us/research/project/homomorphic-encryption/

Ilaria Chillotti and Nicolas Gama and Mariya Georgieva and Malika Izabachène, Faster Fully Homomorphic Encryption: Bootstrapping in less than 0.1 Seconds, eprint.iacr.org/2016/870

Ivan Damgard and Mads Jurik, A Generalisation, a Simplification and Some Applications of Paillier's Probabilistic Public-Key System, www.brics.dk/RS/00/45/

J. Alperin-Sheriff and C. Peikert. Faster Bootstrapping with Polynomial Error. In CRYPTO 2014 (Springer)

J. Bos, K. Lauter, J. Loftus, and M. Nachrig. Improved Security for a Ring-Based Fully Homomorphic Encryption Scheme. In IMACC 2013 (Springer)

Jacob Alperin-Sheriff and Chris Peikert, Faster Bootstrapping with Polynomial Error, eprint.iacr.org/2014/094

Junfeng Fan and Frederik Vercauteren, Somewhat Practical Fully Homomorphic Encryption, eprint.iacr.org/2012/141

Jung Hee Cheon, Kyoohyung Han, Andrey Kim, Miran Kim and Yongsoo Song. Bootstrapping for Approximate Homomorphic Encryption. In EUROCRYPT 2018 (Springer).

Jung Hee Cheon; Kyoohyung Han; Andrey Kim; Miran Kim; Yongsoo Song. "Homomorphic Encryption for Arithmetic of Approximate Numbers".

Kristin Lauter, Michael Naehrig and Vinod Vaikuntanathan, Can Homomorphic Encryption be Practical?, eprint.iacr.org/2011/405

Leo Ducas and Damien Stehle, Sanitization of THE Ciphertexts, eprint.jacr.org/2016/164

Leo Ducas and Daniele Micciancio, PHEW, github.com/lducas/FHEW

Leo Ducas and Daniele Micciancio, FHEW: Bootstrapping Homomorphic Encryption in less than a second, eprint.iacr.org/2014/816

Leo Ducas; Daniele Micciancio. "PHEW: A Fully Homomorphic Encryption library".

Levieil, Eric, and David Naccache. "Cryptographic test correction." In International Workshop on Public Key Cryptography, pp. 85-100. Springer, Berlin, Heidelberg, 2008.

Li, Baily; Micciancio, Daniele (5 Jan. 2021). "On the Security of Homomorphic Encryption on Approximate Numbers" (PDF), LACR ePrint Archive 2020/1533.

M. Albrecht, S. Bai, and L. Ducas. A subfield lattice attack on overstretched NTRU assumptions, In CRYPTO 2016 (Springer)

Marten van Dijk, Craig Gentry, Shai Halevi and Vinod Vaikuntanathan, Fully Homomorphic Encryption over the Integers, Van Dijk, Marten; (2009). Eurocrypt 2010, eprint.iacr.org/2009/616

Michael Clear and Ciaran McGoldrick, Multi-Identity and Multi-Key Leveled PHE from Learning with Errors, eprint.iacr.org/2014/798

Microsoft Research. "Microsoft SEAL". Retrieved 20 Feb. 2019.

MoMA Lab, New York University Abu Dhabi (2019-07-24). "Encrypt-Everything-Everywhere (E3)".

N. Gama, M. Izabachene, P. Q. Nguyen, and X. Xie Structural Lattice Reduction: Generalized Worst-Case to Average-Case Reductions and Homomorphic Cryptosystems. In EUROCRYPT 2016 (Springer)

Nigel Smart and Frederik Vercauteren, Fully Homomorphic Encryption with Relatively Small Key and Ciphertext Sizes, eprint.iacr.org/2009/571

NuCypher. "A GPU implementation of fully homomorphic encryption on torus".

Pascal Paillier, Public-key Cryptosystems based on Composite Degree Residuosity Classes, Springer Link Pratyay Mukherjee and Daniel Wichs, Two Round Multiparty Computation via Multi-Key PHE, eprint.iacr.org/2015/345

R. L. Rivest, L. Adleman, and M. L. Dertouzos. On data banks and privacy homomorphisms. In Foundations of Secure Computation, 1978, people.csail mit.edu/rivest/RivestAdlemanDertouzos-OnDataBanksAndPrivacyHomomorphisms.pdf Rafail Ostrovsky, Anat Paskin-Cherniavsky and Beni Paskin-Cherniavsky, Maliciously Circuit-Private PHE, eprint.iacr.org/2013/307

Raphael Bost, Shafi Goldwasser, Raluca Ada Popa and Stephen Tu, Machine Learning Classification on Encrypted Data, eprint.iacr.org/2014/331

Ron Rothblum, Homomorphic Encryption: From Private Key to Public Key, eccc.weizmann.ac.il/report/2010/146/

Ryo Hiromasa, Masayuki Abe and Tatsuaki Okamoto, Packing Messages and Optimizing Bootstrapping in GSW-FHE Sander, Tomas: Young, Adam L; Yung, Moti (1999). Non-Interactive CryptoComputing For NCI. Focs1991. pp. 554-566. doi:10.1109/SFFCS.1999.814630. ISBN 978-0-7695-0409-4. S2CID 1976588.

Shafi Goldwasser and Silvio Micali, Probabilistic Encryption, groups.csail.mit.edu/cis/pubs/shafi/1984-jcss.pdf Shai Halevi and Craig Gentry, Fully Homomorphic Encryption without Squashing Using Depth-3 Arithmetic Circuits, eprint.iacr.org/2011/279

Shai Halevi and Victor Shoup, HELib: An Implementation of Homomorphic Encryption, github.com/shaih/HElib Shai Halevi, Homomorphic Encryption, Tutorial on the Foundations of Cryptography, Dedicated to Oded Goldreich, Pre-FHE Shai Halevi; Victor Shoup. "HElib: An Implementation of homomorphic encryption".

Shai Halevi; Victor Shoup. Algorithms in HELib, eprint.iacr.org/2014/106

Smart, Nigel P.; Vercauteren, Frederik (2014). "Fully Homomorphic SIMD Operations". Designs, Codes and Cryptography. 71 (1): 57-81. doi:10.1007/s10623-012-9720-4 S2CID 11202438.

Taher El Gamal, A Public-key Cryptosystem and a Signature Scheme based on Discrete Logarithms, link.springer.com/chapter/10.1007/3-540-39568-7_2

Tancrede Lepoint and Michael Nachrig, A Comparison of the Homomorphic Encryption Schemes FV and YASHE, eprint.iacr.org/2014/062

Tancrede Lepoint, NFLLib, github.com/quarkslab/NFLib

Vinod Vaikuntanathan, Computing Blindfolded: New Developments in Fully Homomorphic Encryption, FOCS 2011 Tutorial Vinod Vaikuntanathan. "Homomorphic Encryption References". people.csail.mit.edu/vinodv/FHE/FHE-refs.html Wei Dai, Farkin Doroz and Berk Sunar, cuHE CIDA Homomorphic Encryption Library, github.com/vernamlab/cuHE Y. Ishai and A. Paskin. Evaluating branching programs on encrypted data. In Theory of Cryptography Conference, 2007.

Yevgeniy Dodis, Shai Halevi, Ron Rothblum and Daniel Wichs, Spooky Encryption and Its Applications, eprint.iacr.org/2010/182

Yuriy Polyakov, Kurt Rohloff, PALISADE, "PALISADE Lattice Cryptography Library". palisade-crypto.org/Zvika Brakerski and Renen Perlman, Lattice-Based Fully Dynamic Multi-Key FHE with Short Ciphertexts, eprint.iacr.org/2016/339

Zvika Brakerski and Vinod Vaikuntanathan, Efficient Fully Homomorphic Encryption from (Standard) LWE. POCS 2011 (IEEE), eprint.iacr.org/2011/344

Zvika Brakerski and Vinod Vaikuntanathan, Lattice-Based FHE as Secure as PKE, ITCS 2014, eprint.iacr.org/2013/541

Zvika Brakerski, Craig Gentry and Vinod Vaikuntanathan, Fully Homomorphic Encryption without Bootstrapping, ITCS 2012 eprint.iacr.org/2011/277

Zvika Brakerski, Craig Gentry, and Shai Halevi, Packed Ciphertexts in LWE-Based Homomorphic Encryption, eprint.iacr.org/2012/565

Zvika Brakerski, Fully Homomorphic Encryption without Modulus Switching from Classical GapSVP, Crypto 2012 (Springer) eprint.iacr.org/2012/078

See, U.S. Pat. Nos. 9,569,771; 9,992,028; 10022613; 10046228; 10049017; 10050959; 10114969; 10195513; 10200197; 10219744; 10231652; 10236006; 10289816; 10291627; 10297106; 10320843; 10333696; 10335063; 10335064; 10341121; 10362058; 10388097; 10425426; 10445965; 10476701; 10476847; 10484168; 10504314; 10528722; 10532268; 10554394; 10554753; 10572679; 10572684; 10581869; 10592985; 10593157; 10600006; 10614661; 10615960; 10621164; 10630468; 10630477; 10637645; 10650313; 10652014; 10664353; 10664591; 10664835; 10678931; 10680800; 10681033; 10700850; 10708039; 10708250; 10713731; 10715317; 10715326; 10715500; 10719623; 10721058; 10721217; 10721240; 10726657; 10728283; 10740455; 10747905; 10748370; 10748644; 10749687; 10749848; 10755276; 10761877; 10762228; 10762506; 10778410; 10789590; 10790961; 10790964; 10790987; 10790990; 10797887; 10803205; 10803451; 10810583; 10812274; 10817872; 10819505; 10824763; 10825024; 10825295; 10831903; 10832522; 10833858; 10839107; 10839411; 10841100; 10846372; 10855455; 10861016; 10868865; 10872487; 10878108; 10878429; 10880089; 10885203; 10885735; 10887100; 10887104; 10892888; 10892894; 10904000; 20160072800; 20160170996; 20160224803; 20160300252; 20160321654; 20160330034; 20160358165; 20170155515; 20170161829; 20170173262; 20170243284; 20170250796; 20170287068; 20170289111; 20170316391; 20170329980; 20180025435; 20180041345; 20180082043; 20180109541; 20180117446; 20180117447; 20180157558; 20180183768; 20180198630; 20180264347; 20180303420; 20180303421; 20180303422; 20180303423; 20180303424; 20180307859; 20180326291; 20180329783; 20180330077; 20180330078; 20180330079; 20180330125; 20180330343; 20180331821; 20180332011; 20180365201; 20190013943; 20190014176; 20190019183; 20190020651; 20190026146; 20190036678; 20190052458; 20190058580; 20190089537; 20190102163; 20190116174; 20190130698; 20190130701; 20190132295; 20190147415; 20190158272; 20190158594; 20190164153; 20190166161; 20190166162; 20190182035; 20190183255; 20190188787; 20190190701; 20190205773; 20190221076; 20190236879; 20190236880; 20190236881; 20190238311; 20190244195; 20190244290; 20190251270; 20190251553; 20190251554; 20190251558; 20190253235; 20190268312; 20190280880; 20190281066; 20190288853; 20190294805; 20190294956; 20190295073; 20190295371; 20190296910; 20190303541; 20190303579; 20190303623; 20190303951; 20190305957; 20190305959; 20190305968; 20190306173; 20190306176; 20190311351; 20190312719; 20190312734; 20190318367; 20190325044; 20190327078; 20190332807; 20190334694; 20190334695; 20190334715; 20190334716; 20190342074; 20190358515; 20190361917; 20190362054; 20190363877; 20190371106; 20190372762; 20190385162; 20190385711; 20190386814; 20190394019; 20200004973; 20200007331; 20200013073; 20200013118; 20200013251; 20200019864; 20200021569; 20200021600; 20200028693; 20200034550; 20200036519; 20200036707; 20200042994; 20200042999; 20200044863; 20200050774; 20200051077; 20200051361; 20200052898; 20200052903; 20200053054; 20200057920;

20200058022; 20200073560; 20200074456; 20200074457; 20200074459; 20200074548; 20200076829; 20200082126; 20200082433; 20200084483; 20200089872; 20200104636; 20200111022; 20200111093; 20200112442; 20200112545; 20200117690; 20200118458; 20200119969; 20200120074; 20200126070; 20200126075; 20200128075; 20200134624; 20200134625; 20200136799; 20200142986; 20200143368; 20200145195; 20200150885; 20200151992; 20200153627; 20200153628; 20200153801; 20200153803; 20200160290; 20200160641; 20200162251; 20200162268; 20200167503; 20200167512; 20200174990; 20200175180; 20200175502; 20200175509; 20200175611; 20200177366; 20200184093; 20200184465; 20200184471; 20200186350; 20200193292; 20200193419; 20200193434; 20200195419; 20200195437; 20200201679; 20200201910; 20200202018; 20200202345; 20200202376; 20200204375; 20200204563; 20200210392; 20200210404; 20200210405; 20200211018; 20200213130; 20200213134; 20200213329; 20200213331; 20200219362; 20200226867; 20200228317; 20200242102; 20200250320; 20200258339; 20200258340; 20200259638; 20200273028; 20200274693; 20200279253; 20200279260; 20200280431; 20200280553; 20200286083; 20200286092; 20200294158; 20200295926; 20200296128; 20200304290; 20200311566; 20200311695; 20200311720; 20200320340; 20200320825; 20200327250; 20200327546; 20200336470; 20200342452; 20200349054; 20200349274; 20200349563; 20200351083; 20200351089; 20200351098; 20200351253; 20200351258; 20200351657; 20200356085; 20200356689; 20200358595; 20200359550; 20200359582; 20200364456; 20200364700; 20200364704; 20200366459; 20200366460; 20200366503; 20200374118; 20200374135; 20200382478; 20200387777; 20200387893; 20200387896; 20200389292; 20200402171; 20200404023; 20200412550; 20210012282; 20210014071; and 20210018953.

Trusted Platform Module (TPM, also known as ISO/IEC 11889) is an international standard for a secure cryptoprocessor, a dedicated microcontroller designed to secure hardware through integrated cryptographic keys. The TPM makes use of cryptographic hash operations, and currently uses the SHA-1 hash algorithm. This hash algorithm is used to "extend" the values in the Platform Configuration Registers (PCRs), to detect and prevent data modification, identify keys and to create "capabilities" used to improve the efficiency of command chaining. Capabilities are created by hashing particular command parameters together with the secret value TPM Proof in order to create a 160-bit capability string which cannot be forged by an adversary. This is useful in improving the performance of (for example) third-party approved migration, where the third-party produces an authorization certificate processed by the TPM. The TPM has Facilities for the secure generation of cryptographic keys for limited uses: Remote attestation (Creates a nearly unforgeable hash key summary of the hardware and software configuration. The software in charge of hashing the configuration data determines the extent of the summary. This allows a third party to verify that the software has not been changed); Binding (Encrypts data using the TPM bind key, a unique RSA key descended from a storage key); and Sealing (Similar to binding, but in addition, specifies the TPM state for the data to be decrypted (unsealed). Computer programs can use a TPM to authenticate hardware devices, since each TPM chip has a unique and secret Endorsement key (EK) burned in as it is produced. Pushing the security down to the hardware level provides more protection than a software-only solution. The responsibility of assuring said integrity using TPM is with the firmware and the operating system. For example, Unified Extensible Firmware Interface (UEFI) can use TPM to form a root of trust: The TPM contains several Platform Configuration Registers (PCRs) that allow secure storage and reporting of security relevant metrics. These metrics can be used to detect changes to previous configurations and decide how to proceed.

The endorsement key is a 2018-bit RSA public and private key pair that is created randomly on the chip at manufacture time and cannot be changed. The private key never leaves the chip, while the public key is used for attestation and for encryption of sensitive data sent to the chip, as occurs during the TPM_TakeOwnership command. This key is used to allow the execution of secure transactions: every Trusted Platform Module (TPM) is required to be able to sign a random number (in order to allow the owner to show that he has a genuine trusted computer), using a particular protocol created by the Trusted Computing Group (the direct anonymous attestation protocol) in order to ensure its compliance of the TOG standard and to prove its identity; this makes it impossible for a software TPM emulator with an untrusted endorsement key (for example, a self-generated one) to start a secure transaction with a trusted entity. The TPM should be designed to make the extraction of this key by hardware analysis hard, but tamper resistance is not a strong requirement. Memory curtaining extends common memory protection techniques to provide full isolation of sensitive areas of memory—for example, locations containing cryptographic keys. Even the operating system does not have full access to curtained memory. The exact implementation details are vendor specific. Sealed storage protects private information by binding it to platform configuration information including the software and hardware being used. This means the data can be released only to a particular combination of software and hardware. Sealed storage can be used for DRM enforcing. Remote attestation allows changes to the user's computer to be detected by authorized parties. For example, software companies can identify unauthorized changes to software, including users circumventing technological protection measures. It works by having the hardware generate a certificate stating what software is currently running. The computer can then present this certificate to a remote party to show that unaltered software is currently executing. Remote attestation is usually combined with public-key encryption so that the information sent can only be read by the programs that presented and requested the attestation, and not by an eavesdropper.

When a user requires an AIk (Attestation Identity key) the user wants its key to be certified by a CA (Certification Authority). The user through a TPM (Trusted Platform Module) sends three credentials a public key credential, a platform credential, and a conformance credential. This set of certificates and cryptographic keys will in short be referred to as "EK". The EK can be split into two main parts, the private part "EKpr" and the public part "EKpub". The EKpr never leaves the TPM. Disclosure of the EKpub is however necessary (version 1.1). The EKpub will uniquely identify the endorser of the platform, model, what kind of software is currently being used on the platform, details of the TPM, and that the platform (PC) complies with the TOG specifications. If this information is communicated directly to another party as a process of getting trusted status it would at the same time be impossible to obtain an anonymous identity. Therefore, this information is sent to the privacy certification authority. (trusted third party). When the CA (Privacy certification Authority) receives the EKpub sent by the TPM, the CA verifies the information. If the information can be verified it will create a certified secondary key pair AIk, and sends this credential back to the requestor. This is intended to provide the user with anonymity. When the user has this certified AIk, he or she can use it to communicate with other trusted platforms. In version 1.2, the TOG have developed a new method of obtaining a certified AIk. This process is called DAA Direct anonymous attestation. This method does not require the user to disclose his/her EKpub with the TTP. The unique new feature of the DAA is that it has the ability to convince the remote entity that a particular TPM (trusted platform module) is a valid TPM without disclosing the EKpub or any other unique identifier. Before the TPM can send a certification request for an AIk to the remote entity, the TPM has to generate a set of DAA credentials. This can only be done by interacting with an issuer. The DAA credentials are created by the TPM sending a TPM-unique secret that remains within the TPM. The TPM secret is similar but not analogous to the EK. When the TPM has obtained a set of DAA credentials, it can send these to the Verifier. When the Verifier receives the DAA credentials from the TTP, it will verify them and send a certified AIk back to the user. The user will then be able to communicate with other trusted parties using the certified AIk. The Verifier may or may not be a trusted third party (TTP). The Verifier can determine whether the DAA credentials are valid, but the DAA credentials do not contain any unique information that discloses the TPM platform.

"IEEE P1363: Standard Specifications For Public-Key Cryptography".

"ISO/IEC 11889-1:2009—Information technology—Trusted Platform Module—Part 1: Overview". ISO.org. International Organization for Standardization. May 2009.

"LUKS support for storing keys in TPM NVRAM". github.com. 2013.

"Part 1: Architecture" (PDF), Trusted Platform Module Library, Oct. 30, 2014, "PC Client Protection Profile for TPM 2.0", "Section 23: Enhanced Authorization (EA) Commands", Trusted Platform Module Library; Part 3: Commands (PDF), Mar. 13, 2014, "TCG TPM 2.0 Library Profile for Automotive-Thin". trustedcomputinggroup.org. Mar. 1, 2015. trustedcomputinggroup.org/wp-content/uploads/TPM-Main-Part-2-TPM-Structures_v1.2_rev116_01032011.pdf; "TPM 2.0 Mobile Reference Architecture Specification", "TPM Library Specification 2.0". Oct. 1, 2014. "Errata for TPM Library Specification 2.0", "Trusted Platform Module (TPM) Specifications". Mar. 1, 2011, "Trusted Platform Module 2.0: A Brief Introduction" Oct. 13, 2016, "tspi_data_bind(3)—Encrypts data blob" (Posix manual page). TPM Main Specification Level 2, Part 1—Design Principles (Version 1.2, Revision 116 ed.); TPM Main Specification Level 2, Part 3—Commands (Version 1.2, Revision 116 ed.), Trusted Platform Module Library Specification, Family "2.0", Part 1—Architecture, Section 12, TPM Operational States (Level 00, Revision 01.59 ed.), trustedcomputinggroup.org/wp-content/uploads/mainP2Struct_rev85.pdf; TOG-_Algorithm_Registry_Rev_1.27_FinalPublication.pdf; TPM-main-1.2-Rev94-part-2.pdf; TPM-Main-Part-1-Design-Principles_v1.2_rev116_01032011.pdf; PC-Client-Specific-Platform-TPM-Profile-for-TPM-2-0-v13-150126.pdf; TCG_Algorithm_Registry_Rev_1.22.pdf; TPM-Rev-2.0-Part-1-Architecture-01.16.pdf, Trusted Computing Group.

Alin Suciu, Tudor Carean (2010). "Benchmarking the True Random Number Generator of TPM Chips". arXiv: 1008.2223 [cs.CR].

Arthur, Will; Challener, David; Goldman, Kenneth (2015). A Practical Guide to TPM 2.0: Using the New Trusted Platform Module in the New Age of Security. New York City: Apress Media, LLC p. 69. doi: 10.1007/978-1-1302-6584-9. ISBN 978-1430265832. S2CID 27168869.

Chris Mitchell (2005). Trusted Computing. IET. ISBN 978-0-86341-525-8.

E. W. Felten, "Understanding trusted computing: will its benefits outweigh its drawbacks?", Security & Privacy, IEEE, Vol. 1(3), pp. 60-62.

en.wikipedia.org/wiki/Trusted_Computing; en.wikipedia.org/wiki/Trusted_Platform_Module F. Stajano, "Security for whom? The shifting security assumptions of pervasive computing", Lecture notes in computer science, vol. 2609, pp. 16-27, 2003.

Greene, James (2012). "Intel Trusted Execution Technology" (PDF) (white paper). Intel.

Oltsik, Jon (January 2006). "Trusted Enterprise Security: How the Trusted Computing Group (TOG) Will Advance Enterprise Security" (PDF). White Paper. Enterprise Strategy Group.

Rau, Shane (February 2006). "The Trusted Computing Platform Emerges as Industry's First Comprehensive Approach to IT Security" (PDF). IDC Executive Brief. International Data Corporation.

Ross Anderson, "Cryptography and Competition Policy-Issues with 'Trusted Computing'", in Economics of Information Security, from series Advances in Information Security, Vol. 12. Apr. 11, 2006.

Stallman, Richard Matthew, "Can You Trust Your Computer", Project GNU, Philosophy, Free Software Foundation Tal Garfinkel, Ben Pfaff, Jim Chow, Mendel Rosenblum, Dan Boneh, "Terra: a virtual machine-based platform for trusted computing", ACM SIGOPS Operating Systems Review, Vol. 37, No. 5, pp. 193-206, 2003.

Gideon Greenspan, "Why Many Smart Contract Use Cases Are Simply Impossible" [www.coindesk.com/three-smart-contract-misconceptions/] describes the limitations of Ethereum (and other blockchains more generally) regarding interactions with the world. However, using proxy key cryptography and/or homomorphic cryptography, some of these issues, especially relating to secret sharing, are alleviated. In fact, the trusted oracle issue is not as extreme as insinuated, and the need for consensus is also inherent in the platform. With respect to the high computational demands of homomorphic cryptographic processing, these could be substituted for some or all of the hash-processing algorithms to demonstrate proof or work, and thus add no additional computational burdens on the mining process. As intimated distributed consensus processing may be used to process encrypted information without revealing the underlying secrets, according to underlying known and demonstrated cryptographic primitives.

In this aspect of the invention, it is noted that complete and/or permanent anonymity or pseudonymity may be waived, and therefore a more traditional underlying debtor-creditor relationship established. In event of default, mechanisms are provided to unmask the debtor, and compel to some degree satisfaction of the creditor's claim. This in turn, permits recordation of security interests and the like.

When the debt token is fungible, that means that the debt may be satisfied against any token holder. In an economy, that suggests a market process in which debtors compete to offer the highest amount to satisfy the token, and to the extent that the corresponding asset is fungible, the creditors compete to agree to the lowest satisfaction threshold. The tokens are typically linked macroeconomically, for example through an exchange, but the tokens may also have an asset securitization. The efficiency of a smart contract executed through a blockchain, versus a legal process or security interest foreclosure, may provide a significant arbitrage to compel value through the use of tokenized debt. Note that the present technology does not require automatic payment of a debt; while that could be implemented according to known proposals, it is not the particular problem to be solved herein. Rather, the present technology establishes a transferrable debt-representing token, that has sufficient attributes to establish a negative value, such that relinquishing the token rationally requires a compensatory transfer to the recipient. The incentive and markets for satisfaction of the debt establishes a statistical value of the debt. The incentive is in a sense arbitrary with respect to the technology, though technological incentives (or penalties) are supported herein. Somewhat inherent in a negative-valued cryptocurrency token is a requirement that the recipient accept the obligation; one would generally not permit gifting of a liability, though when the net value of the gift is positive, the transfer of the accompanying liability may be acceptable. This is a deviation from a typical cryptocurrency transaction, in which the transferor authorizes the transfer to a wallet address and the recipient may remain passive. On the other hand, one would not normally proactively assume a liability without consideration, and therefore passivity of the transferor seems unlikely for a typical transaction.

See, U.S. Pat. Nos. 9,569,771; 9,992,028; 10022613; 10046228; 10049017; 10050959; 10114969; 10168693; 10195513; 10200197; 10219744; 10231652; 10236006; 10289816; 10291627; 10297106; 10320843; 10333696; 10335063; 10335064; 10341121; 10346815; 10362058; 10362278; 10388097; 10425426; 10445965; 10476701; 10476847; 10484168; 10504314; 10528722; 10532268; 10545491; 10554394; 10554753; 10572679; 10572684; 10581869; 10592985; 10593157; 10600006; 10614661; 10615960; 10621164; 10630468; 10630477; 10637645; 10650313; 10652014; 10657595; 10664353; 10664591; 10664835; 10678931; 10680800; 10681033; 10685399; 10700850; 10708039; 10708250; 10713731; 10715317; 10715326; 10715500; 10719623; 10721058; 10721217; 10721240; 10726657; 10728283; 10740455; 10747905; 10748370; 10748644; 10749687; 10749848; 10755276; 10761877; 10762228; 10762506; 10778410; 10789590; 10790961; 10790964; 10790987; 10790990; 10797887; 10803205; 10803451; 10810550; 10810583; 10812274; 10817872; 10819505; 10819959; 10824763; 10825024; 10825295; 10831903; 10832522; 10833858; 10839107; 10839411; 10841100; 10846372; 10855455; 10861016; 10868865; 10872487; 10878108; 10878429; 10880089; 10885203; 10885735; 10887100; 10887104; 10892888; 10892894; 10904000; 20160072800; 20160170996; 20160224803; 20160300252; 20160321654; 20160330034; 20160358165; 20170155515; 20170161829; 20170173262; 20170243284; 20170250796; 20170287068; 20170289111; 20170316391; 20170329980; 20180025435; 20180041345; 20180068359; 20180071789; 20180074481; 20180075386; 20180075406; 20180082043; 20180109541; 20180117446; 20180117447; 20180157558; 20180183768; 20180189753; 20180198630; 20180240191; 20180264347; 20180285970; 20180285996; 20180303420; 20180303421; 20180303422; 20180303423; 20180303424; 20180307859; 20180326291; 20180329783; 20180330077; 20180330078; 20180330079; 20180330125; 20180330343; 20180331821; 20180331835; 20180332011; 20180365201; 20180365764; 20190005471; 20190012660; 20190012663; 20190013943; 20190014176; 20190019183; 20190020651; 20190026146; 20190036678; 20190052458; 20190058580; 20190080392; 20190089537; 20190095880; 20190095995; 20190102163; 20190114706; 20190116174; 20190122297; 20190130483; 20190130698; 20190130701; 20190132295; 20190139007; 20190147415; 20190158272; 20190158594; 20190164152; 20190164153; 20190166161; 20190166162; 20190182035; 20190183255; 20190188787; 20190190701; 20190205773; 20190220861; 20190221076; 20190228469; 20190236879; 20190236880; 20190236881; 20190238311; 20190244195; 20190244290; 20190251270; 20190251553; 20190251554; 20190251558; 20190253235; 20190268312; 20190279204; 20190280880; 20190281066; 20190281259; 20190287175; 20190288853; 20190294805; 20190294956; 20190295073; 20190295371; 20190296910; 20190303541; 20190303579; 20190303623; 20190303931; 20190303951; 20190305957; 20190305959; 20190305968; 20190306173; 20190306176; 20190311351; 20190311352; 20190312719; 20190312734; 20190318367; 20190325044; 20190327078; 20190332807; 20190333051; 20190334694; 20190334695; 20190334715; 20190334716; 20190342074; 20190347725; 20190355472; 20190358515; 20190361917; 20190362054; 20190363877; 20190371106; 20190372762; 20190378096; 20190385162; 20190385711; 20190386814; 20190394019; 20200004973; 20200007331; 20200012676; 20200013073; 20200013118; 20200013251; 20200019864; 20200021569; 20200021600; 20200027179; 20200028693; 20200033837; 20200034550; 20200036519; 20200036707; 20200042988; 20200042989; 20200042994; 20200042995; 20200042998; 20200042999; 20200044863; 20200050774; 20200051077; 20200051188; 20200051361; 20200052898; 20200052903; 20200053054; 20200057876; 20200057920; 20200058022; 20200073560; 20200074456; 20200074457; 20200074459; 20200074460; 20200074548; 20200074552; 20200076829; 20200082126; 20200082360; 20200082433; 20200084483; 20200089872; 20200104636; 20200106708; 20200111022; 20200111093; 20200112442; 20200112545; 20200117690; 20200118458; 20200119969; 20200120074; 20200126070; 20200126075; 20200128075; 20200134612; 20200134624; 20200134625; 20200136799; 20200136829; 20200142986; 20200143368; 20200143466; 20200145195; 20200150885; 20200151709; 20200151992; 20200153627; 20200153628; 20200153801; 20200153803; 20200160290; 20200160641; 20200162251; 20200162268; 20200167503; 20200167512; 20200174990; 20200175180; 20200175502; 20200175509; 20200175611; 20200177366; 20200184093; 20200184465; 20200184471; 20200184555; 20200184556; 20200186350; 20200192957; 20200193292; 20200193418; 20200193419; 20200193434; 20200193516; 20200193541; 20200195419; 20200195437; 20200201679; 20200201910; 20200202018; 20200202345; 20200202376; 20200202427; 20200202429; 20200204375; 20200204563; 20200210380; 20200210392; 20200210404; 20200210405; 20200211018; 20200213110; 20200213130; 20200213134; 20200213291; 20200213292; 20200213329; 20200213331; 20200219188; 20200219362; 20200226687; 20200226867; 20200228317; 20200242102; 20200250320; 20200250590; 20200258339; 20200258340; 20200259638; 20200273028; 20200273099; 20200273100; 20200273101; 20200273578; 20200274693; 20200279253; 20200279260; 20200279324; 20200279325; 20200279326; 20200280431; 20200280553; 20200286083; 20200286092; 20200286170; 20200294128; 20200294129; 20200294131; 20200294132; 20200294133; 20200294134; 20200294135; 20200294136; 20200294137; 20200294138; 20200294139; 20200294158; 20200295926; 20200296128; 20200302523; 20200302525; 20200304290; 20200311566; 20200311695; 20200311720; 20200311816; 20200320043; 20200320340; 20200320481; 20200320825;

20200327250; 20200327546; 20200327609; 20200334669; 20200334776; 20200336470; 20200342452; 20200342528; 20200342529; 20200342530; 20200349054; 20200349274; 20200349563; 20200351083; 20200351089; 20200351098; 20200351253; 20200351258; 20200351657; 20200356085; 20200356689; 20200358595; 20200359550; 20200359582; 20200364456; 20200364700; 20200364703; 20200364704; 20200366459; 20200366460; 20200366503; 20200374118; 20200374135; 20200380476; 20200382478; 20200387777; 20200387891; 20200387893; 20200387896; 20200387965; 20200387966; 20200387967; 20200387968; 20200389292; 20200389301; 20200394652; 20200394708; 20200394709; 20200396065; 20200402171; 20200404023; 20200410585; 20200412550; 20210012282; 20210012335; 20210012416; 20210012419; 20210012433; 20210014071; 20210018953; and 20210019792.

Another aspect of the technology is that the token may represent a risk instrument having a negative present value, but which may vary over time. In some cases, a recipient might accept such a risk without consideration, and in other cases, the token may have a positive current value, but substantial risk of assuming a future negative value, and in either case a transfer would be accepted by voluntary affirmance and not simply foisted upon an unsuspecting victim. While smart contracts are not necessarily legally binding or enforceable contracts, it is generally understood that a liability outside of the code of the smart contract would need assent of the obligor.

The present technology also permits the creation of artificial (virtual) legal entities which may be outside of jurisdictional corporate law. In such a case, the virtual entity would be capitalized by its incorporator with some assets, which would generally be a cryptocurrency. Real assets are difficult to transfer to an unincorporated entity without recourse to the transferor under jurisdictional law. Once capitalized within the cryptocurrency system, the entity may engage in transactions. In some cases, the transactions themselves may occur within the real economy. A virtual entity may, for example, acquire goods or rights, especially if the vendor is satisfied. One possible transaction for a virtual entity is a leveraged acquisition. That is the virtual entity borrows based on existing capital and the assets being acquired. While the transaction could be structured as a loan per se to the identified virtual entity, another option is for the lender to transfer debt token and an asset to the recipient virtual entity. In this case, one option is for the tokens in the account (both asset and liability) to be visible to observers in the blockchain. Therefore, the net assets are visible, and a future creditor can determine net assets based on the public ledger, all without breaching the anonymity of the control over the entity. In this design, distributions for the virtual entity would be limited or disclosed, so that a creditor has recourse against the virtual entity or its proceeds.

A particular distinction of tokenized debt versus debt is that the liability is on the part of the token-holder. In some cases the payment for receiving the token exceeds the satisfaction cost; for example, the process of satisfying a debt may unmask the creditor; therefore, a creditor that values its anonymity may transfer before satisfaction, and pay for that privilege. Meanwhile, the intermediate recipient has an arbitration opportunity. Similarly, the creditor may also be unmasked in a satisfaction transaction, and transfer the asset token before satisfaction, with a similar arbitration opportunity. In a special case, the intermediate for both creditor and debtor is the same entity, though the likelihood of matching creditor and debtor in an anonymous transaction is low, except for a large clearinghouse.

A debt transaction may be a demand liability, a term liability, or an open-ended liability with accruing interest. When the asset token is fungible, the obligation would generally be put to market, with a competitive "market value" transaction to satisfy the obligation. The demand may be put to market any time for a demand or open-ended obligation, or within a fixed window (at last on the minimum duration) for a term obligation. Likewise, a tender may be made to surrender the debt token at market payment at any time, subject to term constraints of the underlying transaction. In event of a default, various mechanisms may be implemented to incentivize compliance with the transaction rules. In a stake-based system, the debtor has net assets within the cryptocurrency system, and a default diminishes the value of the stake. However, this may be a weak incentive. The token debt obligation may be secured, and a legal process implemented (or implementable) to collect the debt. A reputation score may be applied, with debtor addresses vying to demonstrate high payment rates, and therefore high credit-worthiness. Note that because of pyramid risk, the creditworthiness of a party may be gamed before a large default. As noted above, one penalty may be an unmasking of a defaulting party through a smart contract, along with personal association of associated wallet addresses, which may provide a high incentive, so long as the party cares about reputation within the cryptosystem (and otherwise). When unmasked, assets attributed to the debtor may be subject to seizure or forfeiture, in satisfaction of the debt. Where the obligation is indirect (or in other cases, such as where a defense is proposed), the wallet may be frozen or sequestered, rather than drained or emptied.

Where the debt token is anonymous and transferrable, typically there is a reason for the debtor to surface or appear. For example, the debt token may represent a risk that has potential positive value over time, that is ascertainable only upon committing assets, e.g., wallet asset contents, escrowed assets, external funds source. Therefore, each time the debtor seeks to determine status, it may risk being forced to pay. Similarly, the unmasking may be periodic, such as once per year. A party may, in advance of unmasking, transfer assets to a "street name", which in turn would only accept the debt token with accompanying payment to satisfy the obligation. After unmasking, the party may reacquire the debt token.

While a street name or clearinghouse or intermediary may be a trusted or untrusted entity, it may itself be implemented in a decentralized manner through, e.g., smart contracts, Unmasking may take the form of achieving public knowledge of a decryption key holding a record of the current owner of a debt token. When a party acquires a debt token, it is transferred according to a distributed ledger. In this case, once the transaction is cleared, sufficient information to identify a prior owner of the debt token is unavailable (unless a separate rule is triggered to unmask the prior owner). A default of a debt coin typically occurs in a term debt obligation, where the demand is asserted on a date certain. A default may also occur in a demand note obligation, though such an obligation has low (but not zero) feasibility in a blockchain transaction as defined herein. In an open-ended obligation, the debt may never have to be paid. In that case, the initial ratio of amount received for accepting the debt coin and the obligation will be high, e.g., 100:1, depending on the rules and an additional incentive for eventual payment provided (as one of the rules). For example, the establishment of a wallet may incur service and maintenance fees which could be implemented as recurring transfers of debt tokens to the wallet. When the wallet has assets, and a transaction occurs, the debt is satisfied at the time of the transaction, akin to a service fee. When the token represents a risk or contingency liability, an oracle may trigger a rule dependent on occurrence of the contingency, that unmasks the debtor. While some language used herein supposes that smart contracts are continuously executing, all such determinations may occur at predefined times or on occurrence of particular transactions. Further, while traditional smart contracts are executed in a distributed manner, this need not be so, and rather, the creditor may issue a demand or request, e.g., execute the underlying code in a secure and authenticated manner/environment, and transfer the result as a proposed transaction to be processed if authenticated according to the consensus protocol. Once the request for processing is issued, the distributed consensus execution environment may then verify the result, and issue the transaction based on the result. That is, the entire system is not burdened by each smart contract for each block update, and rather a party with a stake may trigger execution of the smart contract.

Note that proxy key, escrowed key, split key, and homomorphic cryptography are not necessary to all embodiments of the invention, and where external information off the blockchain is invoked, may also be maintained by trusted repositories rather than virtual constructs. The essential underlying theme is a token that has or may assume, a negative value at the time of a transaction, and thus that the recipient authorizes receipt under an incentive that may be intrinsic or extrinsic to the transaction. Further, because the token may at a relevant time have a negative value, some mechanism exists for accepting consideration to extinguish the debt, or the token representing the debt at a future time. The tokenized debt is transferrable, and preferably fungible, such that a market exists for transfer of debt tokens accompanying consideration. The tokenized debt may be associated with tokenized assets, and each may be transferrable on the blockchain. Because the debt and asset may be created in pairs mechanisms may be provided to permit additions of sets of tokens to the blockchain with zero (or near zero) net value, with rules governing withdrawals or debt extinction that materially affect other token-holders. The distributed consensus processing system may be run using a transaction fee model, and/or a mining incentive token model. Where a mining incentive is provided, care is employed to avoid deflation of asset values and other instabilities. Proof of work is useful, where the necessary computations are executed to implement smart contracts. Proof of stake may also be employed wherein creditors have an incentive to maintain the system to support their assets. Other available consensus mechanisms are delegated proof of stake, proof of capacity, proof of space, proof of elapsed time (PoET), proof of burn, proof of edit distance, delegated proof of importance, proof of process, proof of signature, proof of retrievability, proof of location, proof or reputation, proof of proof, proof of history, proof of existence, proof of research, proof of activity, proof of weight, proof of zero, proof of care, proof of value, proof of participation, proof of believability, proof of presence, proof of ownership, proof of quality, proof of authority, proof of activity, proof of processed payments, proof of time, proof of disintegration, Byzantine fault tolerance, proof of trust, proof of devotion, direct acyclic graph., etc. See tokenseconomy.gitbook.io/consensus/ (all discussed mechanisms expressly incorporated herein by reference). Each consensus mechanism has a different spectrum of advantages and disadvantages, and hybrid schemes are also available. Indeed, where competitive proof of work is not the key principle, multiple consensus techniques may operate concurrently, with perhaps a transaction closing delay for the multiple schemes to converge on a consensus See U.S. Pat. No. 10,643,288, and also:

Saber, Reza Olfati, and Richard M. Murray. "Consensus protocols for networks of dynamic agents" (2003): 951-956.

Xiao, Yang, Ning Zhang, Wenjing Lou, and Y. Thomas Hou. "A survey of distributed consensus protocols for blockchain networks" IEEE Communications Surveys & Tutorials 22, no. 2 (2020): 1432-1465.

Li, Keqiang, Shengbo Eben Li, Feng Gao, Ziyu Lin, Jie Li, and Qi Sun. "Robust distributed consensus control of uncertain multiagents interacted by eigenvalue-bounded topologies" IEEE Internet of Things Journal 7, no. 5 (2020): 3790-3798.

Charapko, Aleksey, Ailidani Ailijiang, and Murat Demirbas "PigPaxos Devouring the communication bottlenecks in distributed consensus." arXiv preprint arXiv:2003.07760 (2020).

Olfati-Saber, Reza, and Richard M. Murray. "Consensus problems in networks of agents with switching topology and time-delays" IEEE Transactions on automatic control 49, no. 9 (2004): 1520-1533.

Bauso, Dario, Laura Giarre, and Raffaele Pesenti. "Nonlinear protocols for optimal distributed consensus in networks of dynamic agents" Systems & Control Letters 55, no. 11 (2006): 918-928.

Salimitari, Mehrdad, and Mainak Chatterjee. "A survey on consensus protocols in blockchain for iot networks" arXiv preprint arXiv:1809.05613 (2018).

Zuo, Zongyu, and Lin Tie. "Distributed robust finite-time nonlinear consensus protocols for multi-agent systems" International Journal of Systems Science 47, no. 6 (2016): 1366-1375.

Wu, Weigang, Jiannong Cao, Jin Yang, and Michel Raynal "Design and performance evaluation of efficient consensus protocols for mobile ad hoc networks" IEEE Transactions on Computers 56, no. 8 (2007): 1055-1070.

Salimitari, Mehrdad, and Mainak Chatterjee. "An overview of blockchain and consensus protocols for IoT networks." arXiv preprint arXiv:1809.05613 (2018).

Cachin, Christian, and Marko Vukolić. "Blockchain consensus protocols in the wild." arXiv preprint arXiv:1707.01873 (2017).

Fang, Lei, Panos J. Antsaklis, and Anastasis Tzimas "Asynchronous consensus protocols Preliminary results, simulations and open questions" In Proceedings of the 44th IEEE Conference on Decision and Control, pp. 2194-2199. IEEE, 2005.

Dolev, Danny, Cynthia Dwork, and Larry Stockmeyer. "On the minimal synchronism needed for distributed consensus." Journal of the ACM (JACM) 34, no. 1 (1987): 77-97.

Li, Tao, Minyue Fu, Lihua Xie, and Ji-Feng Zhang. "Distributed consensus with limited communication data rate." IEEE Transactions on Automatic Control 56, no. 2 (2010): 279-292.

Ren, Wei, and Randal W. Beard. Distributed consensus in multi-vehicle cooperative control Vol. 27, no. 2. London: Springer London, 2008.

Jiang, He, Xiao-Kang Liu, Haibo He, Chengzhi Yuan, and Danil Prokhorov. "Neural network based distributed consensus control for heterogeneous multi-agent systems" In 2018 Annual American Control Conference (ACC), pp. 5175-5180. IEEE, 2018.

Jiang, He, Xiao-Kang Liu, Haibo He, Chengzhi Yuan, and Danil Prokhorov. "Neural network based distributed consensus control for heterogeneous multi-agent systems" In 2018 Annual American Control Conference (ACC), pp. 5175-5180. IEEE, 2018.

Zhou, Hong, and Chang Yu. "Distributed cooperative control algorithm for optimal power sharing for AC microgrids using Cournot game theory." Neural Computing and Applications (2020): 1-11.

Vamvoudakis, Kyriakos G., and João P. Hespanha. "Game-theory-based consensus learning of double-integrator agents in the presence of worst-case adversaries" Journal of Optimization Theory and Applications 177, no. 1 (2018): 222-253.

Wang, Wei, Xin Chen, Hao Fu, and Min Wu. "Model-free distributed consensus control based on actor-critic framework for discrete-time nonlinear multiagent systems" IEEE Transactions on Systems, Man, and Cybernetics Systems 50, no. 11 (2018): 4123-4134

Liu, Ziyao, Nguyen Cong Luong, Wenbo Wang, Dusit Niyato, Ping Wang, Ying-Chang Liang, and Dong In Kim. "A survey on applications of game theory in blockchain." arXiv preprint arXiv: 1902.10865 (2019).

Narang, Shivika, Megha Byali, Pankaj Dayama, Vinayaka Pandit, and Y. Narahari. "Design of trusted B2B market platforms using permissioned blockchains and game theory." In 2019 IEEE International Conference on Blockchain and Cryptocurrency (ICBC), pp. 385-393. IEEE 2019.

Xue, Lei, Changyin Sun, and Fang Yu. "A game theoretical approach for distributed resource allocation with uncertainty." International Journal of Intelligent Computing and Cybernetics (2017).

Jaggard, Aaron D., Neil Lutz, Michael Schapira, and Rebecca \. Wright. "Dynamics at the boundary of game theory and distributed computing." ACM Transactions on Economics and Computation (TEAC) 5, no. 3 (2017): 1-20.

Yadav, Satya Prakash. "5 Distributed Consensus" Distributed Artificial Intelligence: A Modern Approach (2020): 69.

Ma, Lifeng, Zidong Wang, Qing-Long Han, and Furong Liu. "Consensus control of stochastic multi-agent systems a survey." Science China Information Sciences 60, no. 12 (2017): 1-15.

Nguyen, Cong T., Dinh Thai Hoang, Diep \. Nguyen, Dusit Niyato, Huynh Tuong Nguyen, and Fryk Dutkiewicz. "Proof-of-stake consensus mechanisms for future blockchain networks fundamentals, applications and opportunities" IEFE Access 7 (2019): 85727-85745.

Fanani, Amit Jacob, and Itay Harel. "Impossibility of n-1-strong-equilibrium for Distributed Consensus with Rational Agents" arXiv preprint arXiv:1708.02543 (2017).

Dai, Mingjun, Shengli Zhang, Hui Wang, and Shi Jin. "A low storage room requirement framework for distributed ledger in blockchain." IEEE Access 6 (2018): 22970-22975.

Mell, Peter, John Kelsey, and James Shook "Cryptocurrency smart contracts for distributed consensus of public randomness" In International Symposium on Stabilization, Safety, and Security of Distributed Systems, pp. 410-125. Springer, Cham, 2017.

The Bitcoin protocol imposes the need to wait for transaction confirmations block by block, which, depending on the approach adopted, currently take from a few seconds to around ten minutes each and limits the volumes of transactions. Ethereum, as well as FR 3018377, enables the decentralized execution of executable contracts. Sidechains technology was designed, essentially, to enable commitments and transactions to be managed in a manner other than that envisaged in Bitcoin and to be able to return to the original Bitcoin on demand [blockstream.com/sidechains.pdf]. More recently, in addition to these systems, "state-channel networks" such as "Lightning Network" [lightning.network/lightning-network-paper.pdf], and Payment-Channel Network [raiden.network] have been proposed for Ethereum, to avoid the need to use blockchain for each transaction. This approach involves the nodes monitoring the blockchain to react in the event of the insertion of transactions that do not reflect the current state, in order to rectify this problem, which requires implementing locks to secure an observation time window, which rather slows down the process WO2016/120826 A2 describes a system-on-chip (Sol, called "Wallet Node" or "WN." or even "entity") integrated into—or coupled with—a connected device such as a smartphone, a connected thing of the Internet of Things (IoT) or even a computer, offering guarantees of integrity of execution so that the access restrictions between its different parts cannot be altered or circumvented. Basically, the only possible execution of a WN is to react to an incoming message, by verifying its integrity and then executing the executable Wallet Program code corresponding to the hash specified in this message. With reference to this PCT application, in the present text. "message" means "Wallet Message" except when explicitly stated otherwise.

According to another aspect, a transactional system with peer-to-peer architecture is proposed implementing transactions enabling units of account to be transferred between unit emitter nodes and unit receiver nodes, each transaction having an input referring to an output of a previous transaction (or several inputs each referring to an output of a previous transaction) and itself having at least one new output specifying a number of units of account and a receiver node, it being possible to validate each transaction by entering, in a blockchain stored in a distributed manner between the nodes, a signature of the transaction, characterized in that at least some of the transactions are performed by nodes capable of ensuring a blindness condition of said transactions, in that it comprises a set of transactions satisfying the condition of blindness so as to simplify this set based on the quantities of units of account and addresses of the emitter nodes and receiver nodes involved in these transactions, in order to generate a smaller set of transactions and so as to generate and store in the blockchain only some of the signatures of transactions of said smaller set and only on the instruction of the nodes concerned. The present technology may be implemented in an automated agent which operates according to a game theoretic paradigm and protocol. See, US 20200187018; 20180068358; 20180049043; 20170206512; 20170103457; 20160224951; 20150111591; 20140081793; 20130080307; 20110004513; 20100317420; 20100235285; 20080262893; 20070087756; 20070053513; 20060167784; 20210014150; 20210012421; 20200402623; 20200344060; 20200327378; 20200327254; 20200311816; 20200250590; 20200219017; 20200204524; 20200193418; 20200192957; 20200184278; 20200175623; 20200143459; 20200126365; 20200125999; 20200120023; 20200097849; 20200043007; 20200042995; 20200042988; 20200021589; 20200011683; 20190386814; 20190379642; 20190349372; 20190349371; 20190334904; 20190334717; 20190319861; 20190272589; 20190251509; 20190251503; 20190228351; 20190036678; 20180285840; 20180276626; 20180204111; 20180078843; 20170232300; 20170206512; 20160224951; 20160088012; and 20140310243. In such an environment, the agent or node would be expected to act rationally, according to rules, constraints and context. "Cheating" may either be prohibited (by rule), or disincentivized. When a debt token is included within a decentralized economic paradigm for independent agents, it allows increased economic freedoms and provides additional tools. Thus an agent is not limited by its present resources, and may predict its future resources, and discount accordingly to best manage its value and expectations. Likewise, nodes with excess resources may loan those for a gain, especially a gain after risk and opportunity cost adjustment. Thus there will be a net increase in societal wealth resulting from availability of credit, and the present technology permits a market valuation of the debt. This market valuation (through e.g., an automated auction), allows assessment of the rational expectation of risks and opportunity costs, and arbitraging of superior or different information for these factors.

A further aspect of the technology allows the transaction rules to vary in dependence on a time-varying economic (dimensionless) value associated with a token. For example, when a token has a positive value, a more traditional framework regarding authentication and transfers is adopted, while when the value is negative, as assessed by consensus, oracles, trusted resources, etc., the framework as described herein is adopted. For example, exchanges establish the value of a token per external assets. Multiple exchanges may be queried for current value, and filters and constraints applied, on a predetermined basis. The smart contracts established and executing on a blockchain assess the external value, and execute selectively dependent on that value. Presumably, near-zero values are filtered, since sign inversions may be common, and the existence of a significant negative value determined. In such a case, the recipient must actively authorize receipt of the token. When the value is significantly positive, the sender must actively authorize receipt. (In the case of passive receipt, a wallet may have a smart contract that liquidates positive-valued tokens as they near zero, to avoid undesired liabilities). When the value of tokens is near zero, the volume of transactions may increase dramatically, for example to meet an external funding requirement. However, in a market, the likelihood that a viable cryptocurrency can remain at near zero value with high trading volume is low. That is to remain near zero value at large volumes for an issue that is not limited at zero value, supply and demand must be equal, which is unlikely over an extended duration.

It is therefore an object to provide a method of transacting a liability, comprising: defining smart contract which separates a set of rights as a first fungible token type and set of responsibilities as a second fungible token type, the second token type comprising a representation of a liability; in a first transaction, establishing a first transaction consideration which offsets a difference in a value of the set of rights and the set of responsibilities, and allocating a first fungible token with a requirement to pay the consideration to a first party, and allocating the second fungible token with a right to receive the consideration to a second party; and in a second transaction, merging possession of a token of the first fungible token type and a token of the second fungible token type, and extinguish the smart contract set of rights and the set of responsibilities to thereby satisfy the liability.

It is also an object to provide a method of creating a gain within a coupled transaction, comprising: defining cryptographically-secured agreement which defines a set of rights and set of responsibilities the set of responsibilities being represented as a token, the set of responsibilities comprising an economic obligation to a holder of the set of rights transferring the set of responsibilities to a holder, and thereby creating a debt by the holder in an amount representing the economic obligation; and satisfying the economic obligation.

It is a further object to provide a tokenized transaction, comprising transferring a token subject to a smart contract, in consideration of a transfer of a first asset to the token holder, wherein the token holder incurs pursuant to the smart contract a future liability to tender a second asset to a designated recipient.

Another object provides a system for tokenization and management of liability, comprising: a digital token having a set of stored rules stored related to a liability, including terms between an issuer and a creditor; and a processor configured to: update a status of the digital token within an electronic distributed ledger which is cryptographically secure and supports token authentication, transactor authentication, non-repudiation, and avoidance of inconsistent subsequent transactions; reassess a value associated with the liability in response to an external contingency; and extinguishing the digital token if material terms of the contract are satisfied, by broadcast of an update of the digital token to the electronic distributed ledger. The set of rules may be immutable or updatable according to a cryptographic protocol, for example. The digital token may have a status dependent on a state of performance of one or more terms of the contract. The reassessed value associated with liability may be based on the state of performance of one or more terms of the contract, external information from at least one oracle, external information from a plurality of oracles, external information from all counterparties of the contract or external information from all counterparties of the contract who are subject to prejudice according to the reassessed value, for example. The value associated with the liability may be subject to fluctuation, e.g., with markets or sentiments.

It is another object to provide a method for transacting a digital token representing a liability, comprising: generating a digital token comprising a set of stored rules stored related to at least a liability associated with the digital token, the set of rules comprising terms of a contract obligating a holder of the token to settle the liability; modifying a parameter associated with the digital token in response to an updated status of one of the terms of the contract; modifying a settlement value of the liability associated with the digital token in response to the updated status of one of the terms of the contract; and updating an electronic distributed ledger with at least one of the modified parameter and the modified settlement value of the liability associated with the digital token. A proxy key may be used to escrow transactions, wherein the escrow may comprise valuable information, rather than a more traditional asset escrow. The information may represent a non-economic penalty to provide an incentive orthogonal to the cryptocurrency regime. The method may further comprise generating a hash function associated with the updated status of the terms of the contract. The settlement value of the liability may fluctuate. The method may further comprise adding at least one new rule to the terms of the contract after generation of the token.

It is a still further object to provide a computer program product for controlling an automated processor to perform at least said updating step. In general, some embodiments of the technology tie the objective (economic) liability represented by the token, to a subjective value or non-economic (i.e., not valued according to objective economic principles) right or feature, such that the default risk is reduced. However, the liability representing token is preferably transferrable, and would therefore naturally gravitate to those holders who have the highest difference between the objective liability discounted by the default risk, and the subjective value, resulting in potential risk increase for the rights holder. However, the creditor also discounts the valuation based on these ultimate risks.

It is a further object to provide a method of transacting a liability, comprising issuing a fungible token representing a liability; transferring the fungible token representing the liability from a first party to a second party, wherein the second party authorizes acceptance of the fungible token representing the liability, the transfer being automatically recorded on a distributed ledger system operating according to a consensus mechanism; defining a smart contract which automatically executes on the distributed ledger system, the smart contract being operable to receive evidence of satisfaction of the liability and upon receipt of the evidence of satisfaction of the liability, updating the distributed ledger system to represent a satisfaction of the liability: communicating evidence of satisfaction of the liability to the distributed ledger system for processing by the smart contract; and selectively recording extinction of the liability on the distributed ledger system, by the smart contract, dependent on receipt of the communication evidencing satisfaction of the liability. The distributed ledger system may comprise a blockchain, and the fungible token may comprise a cryptocurrency token. The smart contract may be further operable to determine a term of the liability, and to impose at least one of an incentive for satisfaction of the liability, and a penalty for failure of satisfaction of the liability, upon the second party, after the term of the liability is matured.

The issuing of the fungible token representing the liability may be concurrent with issuing of a fungible token representing a right to satisfaction of the liability. A fungible token representing the right to satisfaction of the liability may be transferred to a third party, the transfer being automatically recorded on the distributed ledger system. The smart contract may automatically execute on the distributed ledger system to match the fungible token representing the liability with the fungible token representing a right to satisfaction of the liability. The updating of the distributed ledger system to represent a satisfaction of the liability may comprise extinction of both the fungible token representing the liability and the fungible token representing a right to satisfaction of the liability.

A first fungible token representing the right to satisfaction of the liability may be transferred to a third party, the transfer being automatically recorded on the distributed ledger system. The smart contract may automatically execute on the distributed ledger system to match the fungible token representing the liability with a second fungible token representing a right to satisfaction of a liability having corresponding terms to the first fungible token representing the right to satisfaction of the liability. The updating of the distributed ledger system to represent a satisfaction of the liability may comprise extinction of both the fungible token representing the liability and the second fungible token.

The issuing of the fungible token representing the liability may be concurrent with issuing of a first fungible token representing a right to satisfaction of the liability, and the smart contract may be operable to merge ownership of the fungible token representing the liability with the first fungible token representing a right to satisfaction of the liability, and to record the merger on the distributed ledger system.

The method may further comprise conducting an automated auction for pricing the transfer of the fungible token representing the liability from the first party to the second party. The method may further comprise compensating the at least one participant in the distributed ledger system operating according to a consensus mechanism which executes the smart contract. The method may further comprise, upon execution of the smart contract, automatically generating at least one second fungible token representing a right to satisfaction of a liability having corresponding terms to the first fungible token representing the right to satisfaction of the liability.

It is also an object to provide a method of transacting a liability, comprising defining smart contract automatically executing on a blockchain system, which separates a set of rights as a first fungible token type and set of responsibilities as a second fungible token type, the second token type comprising a representation of a liability. The tokens may be fungible and transferrable. In a first transaction, a first transaction consideration may b established which offsets a difference in a value of the set of rights and the set of responsibilities, a first fungible token allocated with a requirement to pay the consideration to a first party, and the second fungible token allocated with a right to receive the consideration to a second party. In a second transaction, possession of a token of the first fungible token type and a token of the second fungible token type is merged, and the smart contract set of rights and the set of responsibilities extinguished, to thereby satisfy the liability.

It is another object to provide a system supporting a liability transaction, comprising: a fungible digital token representing a liability; a distributed ledger system operating according to a consensus mechanism; a smart contract which automatically executes on the distributed ledger system, the smart contract being operable to receive evidence of satisfaction of the liability and upon receipt of the evidence of satisfaction of the liability, updating the distributed ledger system to represent a satisfaction of the liability; a communication port of the distributed ledger system, configured to receive evidence of satisfaction of the liability for processing by the smart contract; and at least one automated processor, configured to: record a transfer of the fungible token representing the liability from a first party to a second party on the distributed ledger system, selectively dependent on authorization of acceptance of the fungible token representing the liability by the second party; and execute the smart contract to selectively record extinction of the liability on the distributed ledger system, dependent on the receipt of the communication evidencing satisfaction of the liability. The fungible digital token may comprise a set of stored rules stored related to the liability, the set of rules including terms of a contract between an issuer and a creditor, the fungible digital token being cryptographically secure and support token authentication, transactor authentication, non-repudiation, and avoidance of inconsistent subsequent transactions.

The at least one automated processor may be further configured to update a status of the fungible digital token within an automated electronic distributed ledger operating according to a consensus mechanism; and reassess a value associated with the liability in response to an external contingency. The digital token may have a status dependent on a state of performance of one or more terms of the contract. The reassessed value associated with liability may be based on the state of performance of one or more terms of the contract. The reassessed value associated with liability may be based on external information from at least one oracle. The distributed ledger system may comprise a blockchain, and the fungible token may comprise a cryptocurrency token. The smart contract may determine a term of the liability, and to impose at least one of an incentive for satisfaction of the liability, and a penalty for failure of satisfaction of the liability, upon the second party, after the term of the liability is matured.

The issuing of the fungible token representing the liability may be concurrent with issuing of a fungible token representing a right to satisfaction in an amount of the liability, and both the fungible token representing the liability and the fungible token representing the right to satisfaction in the amount of the liability being issued to the first party, the issuance of the fungible token representing the liability and the fungible token representing the right to satisfaction in the amount of the liability each being recorded on the distributed ledger system. The distributed ledger system may further record ownership of plurality of fungible tokens representing the right to satisfaction of the liability. The smart contract may be operable to match the fungible token representing the liability with a selected fungible token representing a right to satisfaction in the amount of the liability. The updating of the distributed ledger system to represent a satisfaction of the liability may comprise extinction of both the fungible token representing the liability and the selected fungible token representing the right to satisfaction of the amount of the liability. The match of the fungible token representing the liability with the selected fungible token representing a right to satisfaction in the amount of the liability by the smart contract may cause a transfer and merger of ownership of the fungible token representing the liability and the selected fungible token representing a right to satisfaction in the amount of the liability.

DETAILED DESCRIPTION OF THE PREFERRED EMBODIMENTS

Figure 1:
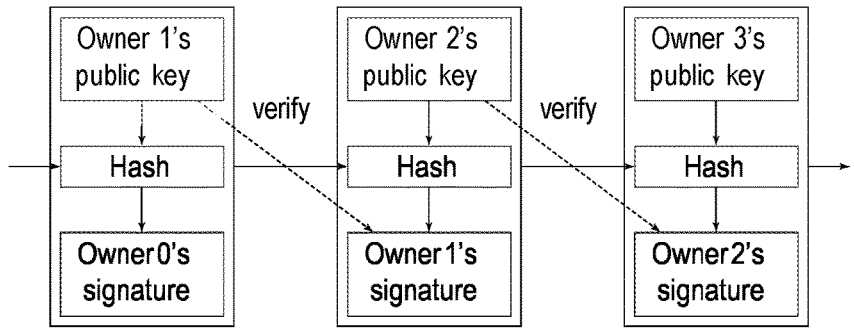
FIG. 1 shows a transaction chain of a Bitcoin.
Figure 2:
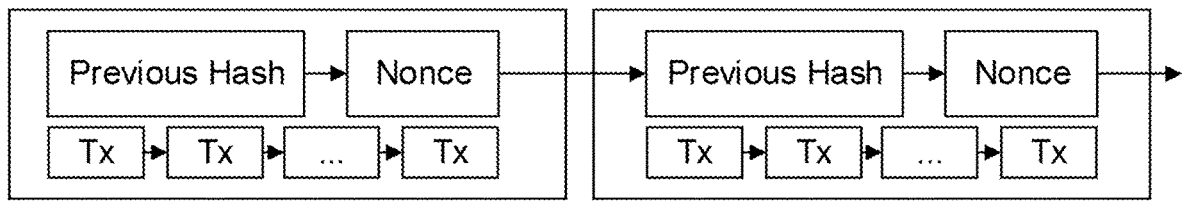
FIG. 2 shows a blockchain.
Figure 3:
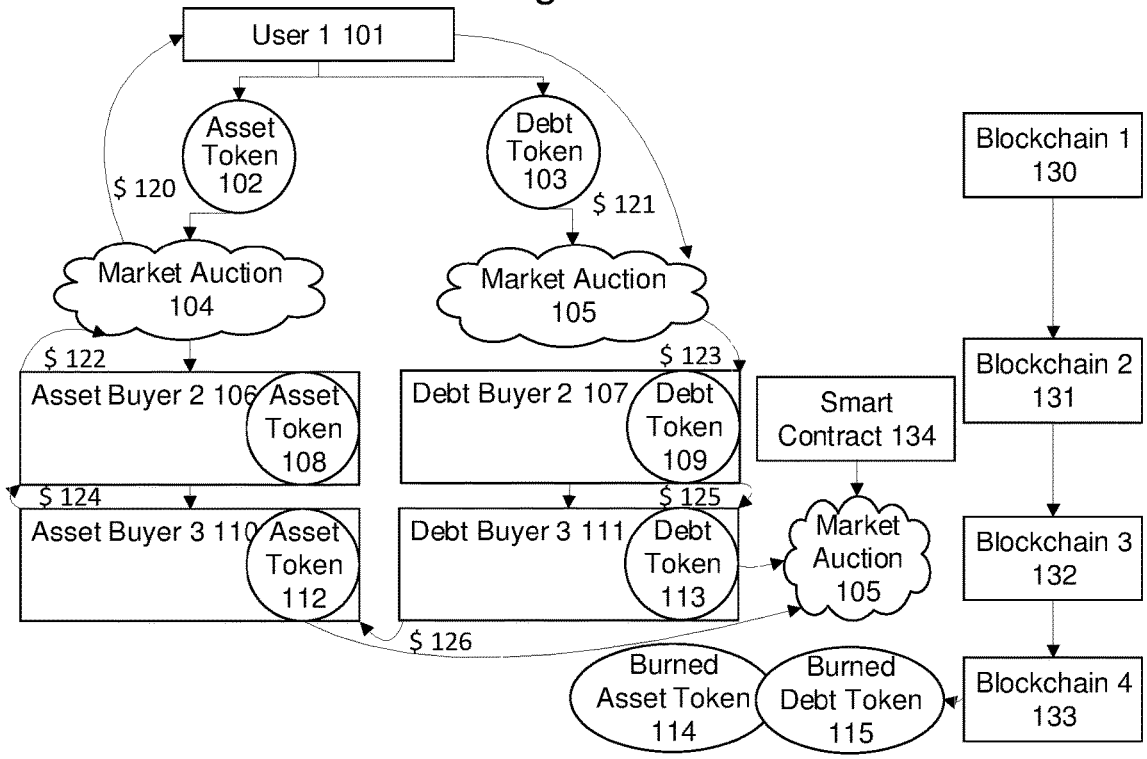
FIG. 3 shows a schematic diagram of transactions according to the present invention.

EXAMPLE 1. According to an exemplary transaction, a first person Bob seeks to borrow 1 Bitcoin (or any amount of any asset, cryptocurrency, or right) from John under terms of a smart contract, e.g., at a defined interest rate due at a predetermined time. Bob receives the consideration, e.g. a Bitcoin through a traditional Bitcoin transaction, which is further coupled to a second transaction which issues a token to Bob representing the smart contract, e.g., loan agreement, which is hereinafter referred to as a Truly Undesirable non-Recourse Debt token (debt token), having a present value of negative 1 bitcoin. As a result of completion of the transaction, John possesses (is issued a counter-token (anti-debt token) representing the smart contract rights, and has relinquished 1 Bitcoin. Therefore, the initial transaction is revenue neutral, and has no gain or loss, at least to the extent that the smart contract terms represent fair consideration for the transaction as a whole. The loan agreement may have a high interest rate, representing return in the risk that John takes in entering into the transaction. The smart contract may permit substitution of assets, if the asset is not "special". This permits satisfaction of the obligation without a transaction in the same market, thus avoiding market perturbing effects, and also permits transactions in relatively illiquid assets.

The transaction has the following attributes: Bob's and John's debt and anti-debt tokens are each transferrable to third parties. John's identity (and the identity of any transferee) is not reported publicly, and may remain anonymous to Bob. Bob's identity (and the identity of any transferee) is not required to be reported publicly, and may remain anonymous to John. On transaction closing, neither party may repudiate the debt and anti-debt token transfers. The Bitcoin (or any other accompanying consideration provided) is subject to its own authentication and transaction paradigm. The debt and anti-debt tokens are recorded on a ledger (which may be a distributed ledger, or blockchain) are subsequent transactions verified to avoid duplicate transfer. No trusted third party is required either to effectuate the transaction, or to maintain the status of the transaction before the debt is satisfied. The debt is satisfied when debt and anti-debt tokens of the same value come under common possession, and are mutually negated. The debt and anti-debt tokens are fungible, so satisfaction of the debt can be achieved on a market rate basis, and without special matching.

According to the protocol, new corresponding debt and anti-debt tokens may be generated by a party, with perhaps a transaction fee to record the new tokens on a ledger. Therefore, the transaction may be initiated by generating a pair of debt and anti-debt tokens having matching opposite value, and transferring either the debt or anti-debt tokens to the counterparty. For example. John generates the debt and anti-debt token pair, and transfers the debt token to Bob, along with a cryptocurrency (e.g., Bitcoin) payment. Therefore, assuming that the smart contract agreement has no other material terms, John is an unsecured creditor of the holder of the debt token, and can transfer or sell the anti-debt token to a third party to assume his rights under the smartcontract. Since the debt token has at inception, a presumed negative value, i.e., represents a debt, there is no essential economic incentive within the confines of the transaction heretofore described, for Bob to admit to possessing the debt token. However, if Bob is subject to income taxes the acceptance of the smart contract consideration, e.g., the Bitcoin, without also accepting the debt token, leads to a taxable gain. Further, the smart contract terms may have a future contingent benefit for the debt token-holder, and therefore there may be other incentives for Bob to comply with the smart contract and honor the debt. In some cases, the present valuation of the debt token is subjective, that is, it is linked to a subjectively valued risk, or to a subjectively valued right or obligation. Taking the risk first, according to the Black-Scholes model, which is used to determine the fair price or theoretical value for a call or a put option based on six variables such as volatility, type of option, underlying stock price, time, strike price, and risk-free rate. If the option is an American Option, that permits exercise over the option period, the holder of the option has to exercise correctly. See, en.wikipedia.org/wiki/Black-Scholes_model. However, subjective biases will make the actual option worth more or less to different people, regardless of the objective valuation potential. Similarly, other types of illiquid instruments subject to risk also have subjective valuation. Clearly, the value of an antidote to one who needs it is higher than to one who does not.

Therefore, at the time of separation of the debt and anti-debt token pair, the objective value of the separation may be neutral, but each respective token of the pair may have distinct demand, such that for Bob, the debt token has intrinsic value, and for John, the anti-debt token has intrinsic value. Given the offsetting coupled transaction, the objective value of Bob's net and John's net will each be near zero, but the subjective valuation of the transaction for Bob and John may each be positive. Therefore, according to game theory, the net gains from the transaction are positive, even if objectively no gain is otherwise apparent from the initial severing of the debt and anti-debt token pair held by a single individual. Stated otherwise, the gains result from the transaction, and not the division of the rights and responsibilities. This is therefore a feature of the technology, that the valuation even of an objectively observed obligation may nevertheless create positive subjective incentives to comply.

EXAMPLE 2. The term "liability" as used herein refers to the obligation of one party to another in the performance of an agreement. In some environments, liability management is performed through the use of actuarial assumption tables. These tables estimate future redemption probabilities. e.g., for insurance products. These estimates are quantified and applied to the reported liability on for example, financial statements such as a balance sheet. In some applications, for example redemption programs, these approaches result in variance risk, which is the difference between the estimated liability redemption and the actual liability redemption. Redemption variance may result in an unexpected financial loss to the reporting entity. Thus, it may be difficult and inefficient for the issuer to make changes to reported estimated financial liability when a redemption variance occurs.

Liability agreements, especially in the form if blockchain-implemented smart contracts, are typically static. The ability to change an agreement usually requires the consent of both parties, which may necessitate redrafting written documents. If an agreement is modifiable within predetermined timelines, the ability to modify multiple liability agreements is generally unfeasible by a person needing to review the liability of each agreement and changing terms as needed. In systems using computer aided liabilities, the ability of liabilities to be used in rapidly executed transactions is stymied by the fact that each transaction needs to be manually evaluated for the change in liability. Systems that use computer aided tracking of liability agreements still use human input to record changes. Thus conventional approaches still suffer from the need for a person to physically redraft agreements because of the modified terms. Of course, the value of a modified liability also changes, the tracking of which is difficult to assess one agreement at a time. The technology provides a system and method for management of liabilities and in some embodiments, a specific solution mitigating variance in the assessment of liability values. The embodiment permits anonymity of the debtor, and unsecured liability. These features therefore imply high risk by the creditor, and as a result, opportunities for speculation, derivatization, risk aggregation and de-aggregation, risk transfer, and risk profiling.

With respect to risk profiling, assuming a high liquidity of markets, the market assessment of liability value may be used to estimate valuation in less liquid markets, and therefore may be used to forecast economic conditions and market participant sentiment. In these cases, actual profits or losses in trading tokens may be less important to the users than ensuring high market liquidity and trades based on current sentiment, though the sentiment must be economically motivated.

Embodiments disclosed below generally exist within an electronic online environment. In an exemplary embodiment, a liability may be created under rules stored in the form of a digital token. A digital token maybe a string of bytes entered into an electronic ledger. In an exemplary embodiment, the digital token is processed by computer executable instructions that change the string of bytes from one state to another upon fulfillment of a contingency or based on reliably determined externalities, e.g., from a so-called oracle. The rules may form a contract (sometimes referred to as a "smart contract" because of the ability of the automated system to apply rules with high reliability, without discretion, and without trust. In exemplary applications, the token may have tangible value that can appreciate/depreciate and may thus be a tradeable asset or commodity. The rights and liability represented by the token may remain static or be modified based on criteria within the rules being met. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. For example, while the foregoing was described in the context of a rewards or redemption program and associated liabilities, it will be understood that other applications may use aspects of the subject technology to track information and assess changing value as provided by the system and processes disclosed.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may include a machine- or machines-executable instructions. For example, a module may be implemented as a hardware circuit including custom VLSI circuits or gate arrays, off-the-shelf semiconductors such as analog circuits, quantum computers, microprocessors, logic chips transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, include one or more physical or logical blocks of computer instructions that may be organized as an object, procedure, or function. Nevertheless, the executables of an identified module need not be physically located together, but may include disparate instructions stored in different locations that, when joined logically together, include the module, and when executed by the processor, achieve the stated data transformation. A module of executable code may be a single instruction, or many instructions and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices. The absence of a module reflects the inability of system including the module to execute in given circumstances to perform the function of the respective module, and not that its physical or logical constituents are excluded, that is, the module is unavailable. In the foregoing description, numerous specific details are provided, such as examples of programming, software modules, user selections, network transactions, distributed ledgers, blockchains, smart contracts, database queries, database structures, hardware modules, hardware circuits, hardware chips, etc., to provide a thorough understanding of the present embodiments. One skilled in the relevant art will recognize, however, that the invention requires a specific implementation that requires special purpose technology for implementation, that generic hardware alone will not achieve the objectives set forth herein.

As used herein, various terminology is for the purpose of describing particular implementations only and is not intended to be limiting of implementations. For example, as used herein, an ordinal term (e.g., "first." "second." "third." etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other, but in that case the unitary element must meet established criteria for each item. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art.

The phrase "and/or" means "and" or "or". To illustrate. A, B, and/or C includes A alone, B alone, C alone, a combination of A and B, a combination of A and C, a combination of B and C or a combination of A, B, and C. In other words "and/or" operates as an "inclusive or". Similarly, the phrase "A, B, C or a combination thereof" or "A, B, C, or any combination thereof" includes A alone, B alone, C alone, a combination of A and B, a combination of A and C, a combination of B and C or a combination of A, B, and C.

As used herein, whether in the above description or the following claims the terms "comprising," "including," "carrying," "having," "containing," "involving," and the like are to be understood to be open-ended, that is to mean including but not limited to. The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has" or "includes" one or more elements possesses those one or more elements, but is not limited to possessing only those one or more elements. Likewise, a method that "comprises." "has." or "includes" one or more steps possesses those one or more steps, but is not limited to possessing only those one or more steps.

Any embodiment of any of the systems, methods and article of manufacture can consist of or consist essentially of-rather than comprise/have/include-any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Thus, the transitional phrases "consisting of" and "consisting essentially of," respectively, shall be considered exclusionary transitional phrases, as set forth, with respect to claims, in the United States Patent Office Manual of Patent Examining Procedures. Additionally, the terms "wherein" or "whereby" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

The phrase "configured to" means a specification or clarification of the structure or composition of an element defining what the element is, by way of a specific description of its configuration and interface with other elements or an external constraint. Functional language within such a specification is taken to be an affirmative limitation, and not a mere intended use.

The claims hereinbelow are to be construed as excluding abstract subject matter as judicially excluded from patent protection, and the scope of all terms and phrases is to be constrained to only include that which is properly encompassed. By way of example, if a claim phrase is amenable of construction to encompass either patent eligible subject matter and patent ineligible subject matter, then the claim shall be interpreted to cover only the patent eligible subject matter. The scope of the claims shall be considered definite in accordance with the ability of a judicial or administrative court or tribunal to make this determination, regardless of any retroactive or ex post facto changes in interpretation by such court or tribunal. The various disclosure expressly provided herein, in conjunction with the incorporated references, are to be considered to encompass any combinations, permutations, and subcombinations of the respective disclosures or portions thereof, and shall not be limited by the various exemplary combinations specifically described herein.

The invention claimed is:

1. A system supporting a liability transaction, comprising:
a memory configured to store instructions defining at least a portion of a protocol of a distributed consensus system having a distributed ledger, which controls a transfer of a digital token between members of the distributed consensus system through a network based on communications between the members, the protocol being adapted to (a) ensure non-repudiation of a transaction to transfer the digital token, (b) avoid an inconsistent transaction to transfer the digital token, and (c) support a transaction of the digital token associated with the distributed consensus system representing a liability or contingent liability;

an interface with the network; and at least one automated processor operating according to the instructions stored in the memory, configured to:
control communication with the network through the interface;
transmit a proposed transfer of the digital token according to the protocol;
record a transfer of the digital token from a first party to a second party in the distributed ledger of the distributed consensus system according to the protocol, selectively dependent on authorization of acceptance of the digital token by the second party and an authentication by the distributed consensus system of the proposed transfer; and
record a satisfaction of the liability or contingent liability in the distributed ledger of the distributed consensus system.

2. The system according to claim 1,
wherein the digital token is selectively associated with a set of stored rules related to the liability or contingent liability, the set of rules comprising terms of a smart contract between an issuer and a creditor,
the at least one automated processor being further configured to perform cryptographically secure computations according to the protocol, and support digital token authentication, authentication of the first party and the second party, ensure the non-repudiation of the transaction to transfer the digital token, and avoidance of an inconsistent transaction to transfer the digital token.

3. The system according to claim 2, wherein the at least one automated processor is further configured to:
update the distributed ledger of the distributed ledger system with a status of the digital token; and
reassess a value associated with the liability or contingent liability in response to an external contingency.

4. The system of claim 3, wherein the status of the digital token is dependent on a state of performance of one or more terms of the smart contract.

5. The system of claim 4, wherein the reassessed value associated with liability or contingent liability is based on the state of performance of one or more terms of the smart contract.

6. The system of claim 3, wherein the reassessed value associated with liability is based on external information from at least one oracle.

7. The system of claim 1, wherein the distributed consensus system comprises a blockchain, and the digital token comprises a fungible cryptocurrency token.

8. The system of claim 1, further comprising:
a distributed virtual machine of the distributed consensus system;
a smart contract stored in the distributed ledger, configured to automatically execute on the distributed virtual machine of the distributed consensus system,
the smart contract being operable to:
process evidence of satisfaction of the liability or contingent liability and upon authentic authentication of evidence of satisfaction of the liability or contingent liability, update the distributed consensus system to represent a satisfaction of the liability or contingent liability;
determine a durational term of the liability or contingent liability; and
impose upon the second party at least one of (a) an incentive for satisfaction of the liability or contingent liability, and (b) a penalty for failure of satisfaction of the liability or contingent liability, after the maturation of the durational term of the liability or contingent liability.

9. The system of claim 1, wherein:
the digital token is one of a plurality of fungible digital tokens representing the liability or contingent liability; and
the protocol further controls a transfer of a respective fungible digital counter-token between members of the distributed consensus system through the network based on communications between the members, wherein a current ownership of the respective fungible digital counter-token is each recorded on the distributed ledger of the distributed consensus system, each fungible digital counter-token representing a right to satisfaction in an amount of the liability or contingent right to satisfaction in an amount of the contingent liability;
the at least one automated processor is further configured to:
issue a respective fungible digital token representing the liability or contingent liability concurrent with issue of a respective fungible digital counter-token;
record the issue of the respective fungible digital token and the respective fungible digital counter-token on the distributed ledger of the distributed consensus system;
record a transfer of the respective fungible digital token from the first party to the second party on the distributed ledger of the distributed consensus system; and
match the respective fungible digital token with the respective fungible digital counter-token, and update the distributed ledger of the distributed consensus system to represent a satisfaction of the liability or contingent liability by extinction of both the respective fungible digital token and the respective fungible digital counter-token.

10. The system of claim 1, wherein the digital token representing the liability or contingent liability is matched with a digital counter-token representing a right to satisfaction in the amount of the liability or contingent liability, to merge ownership of the digital token representing the liability or contingent liability and the digital counter-token representing a right to satisfaction in the amount of the liability or contingent liability.

11. A system supporting a transaction which transfers a digital token which represents a liability, comprising:
a memory configured to store the digital token defined according to a protocol of a distributed consensus system, the protocol being adapted to ensure at least;
(a) non-repudiation of transactions, and (b) avoidance of inconsistent transactions involving transfer of the digital token, the digital token being adapted to at least represent a liability;
an interface configured to communicate with a network comprising a plurality of nodes operating according to the protocol of the distributed consensus system; and
at least one automated processor operating according to the protocol, configured to:
control communication through the interface according to the protocol;
engage in a distributed consensus transaction on the distributed consensus system using the digital token according to the protocol based on a communication through the interface with the plurality of nodes, by:
transmission of a message indicating a proposed transfer of the digital token to the plurality of nodes according to the protocol, based on the digital token stored in the memory; and determination of a satisfaction of the liability according to the protocol; and record the transaction on the distributed consensus system according to the protocol selectively dependent on:

the satisfaction of the liability, authorization of acceptance of the digital token by a recipient, a communication received from the distributed consensus system authenticating the transfer; and record the satisfaction of the liability on the distributed consensus system, selectively dependent on the determination of satisfaction of the liability.

12. The system according to claim 11, further comprising a smart contract stored in the distributed ledger, configured to automatically execute on the distributed consensus system, operable to receive evidence of satisfaction of the liability, and upon receipt of the evidence of satisfaction of the liability, updating the distributed consensus system to represent the satisfaction of the liability.

13. The system according to claim 11, wherein:

the digital token representing the liability comprises a fungible cryptocurrency token representing a debt;

the satisfaction of the liability represents a payment of the debt;

the repayment of the debt comprises a transaction involving a fungible cryptocurrency token representing an asset; and the fungible cryptocurrency token representing the liability and the cryptocurrency token representing the asset are both transacted according to the protocol of the distributed consensus system.

14. The system according to claim 11, wherein:

the digital token representing the liability represents a loan or allocation of a resource;

the satisfaction of the liability represents a return or reallocation of the resource comprising a transaction involving receipt of the digital token representing an asset; and the digital token representing the liability and the digital token representing the asset are both transacted according to the distributed consensus protocol of the distributed consensus system.

15. The system according to claim 11, wherein the digital token representing the liability is created in conjunction with the digital token representing the asset as a consolidated blockchain transaction.

16. The system according to claim 15, further comprising information defining a smart contract stored in the distributed ledger, configured to selectively record extinction of the liability on a blockchain of the distributed consensus system, dependent on pairing of the digital token representing the liability and the digital token representing the asset.

17. The system according to claim 11, further comprising information defining a smart contract configured to determine a durational term of the liability, and to impose at least one of an incentive for satisfaction of the liability, and a penalty for failure of satisfaction of the liability, upon expiration of the durational term of the liability.

18. The system according to claim 11, further comprising information defining a smart contract configured to automatically execute on a distributed virtual machine of the distributed consensus system to match the digital token representing the liability with a digital token representing a right to satisfaction of the liability, wherein the distributed consensus system is updated by the smart contract to represent a satisfaction of the liability and to at least one of extinguish or merge the digital token representing the liability and the digital token representing a right to satisfaction of the liability.

19. The system according to claim 11, wherein the at least one automated processor is further configured to participate in an automated auction conducted through the interface for pricing of the transfer of the digital token representing the liability.

20. A method for supporting a transaction within a distributed consensus system, comprising:

operating at least one processor according to stored instructions defining at least a portion of a protocol of the distributed consensus system in a memory, the protocol being adapted to validate and record a transfer of a digital token representing the liability between accounts, to ensure at least non-repudiation of transactions, and avoidance of inconsistent transactions;

communicating a first message proposing a transfer of the digital token representing the liability from a first account to a second account to the distributed consensus system according to the protocol;

communicating a second message authorizing acceptance of the proposed transfer of the digital token representing the liability by the second account according to the protocol; and recording a transaction for transfer of the digital token according to the first message proposing the transfer of the digital token representing the liability from the first account to the second account in a non-reputable manner within the distributed consensus system according to the protocol, selectively dependent on the second message authorizing acceptance of the proposed transfer of the digital token representing the liability by the second account and a validation of the transaction with respect to lack of prior inconsistent transactions.

21. The method according to claim 20, further comprising:

communicating a third message comprising information relating to satisfaction of the liability; and recording a satisfaction of the liability on the distributed consensus system according to the protocol in a non-reputable manner, after validation of the satisfaction of the liability with respect to lack of prior inconsistent transactions.

\* \* \* \* \*